US011549502B2

(12) United States Patent
van der Merwe et al.

(10) Patent No.: US 11,549,502 B2
(45) Date of Patent: Jan. 10, 2023

(54) MODULAR VALVE APPARATUS AND SYSTEM

(71) Applicant: DEKA Products Limited Partnership, Manchester, NH (US)

(72) Inventors: Dirk A. van der Merwe, Canterbury, NH (US); Timothy D. Moreau, Manchester, NH (US); Richard J. Lanigan, Concord, NH (US); Michael A. Baker, Manchester, NH (US); David Blumberg, Jr., Deerfield, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 379 days.

(21) Appl. No.: 16/839,548

(22) Filed: Apr. 3, 2020

(65) Prior Publication Data

US 2020/0301453 A1 Sep. 24, 2020

Related U.S. Application Data

(60) Division of application No. 14/967,093, filed on Dec. 11, 2015, now Pat. No. 10,613,553, which is a (Continued)

(51) Int. Cl.
*F04B 43/06* (2006.01)
*G05D 7/06* (2006.01)
(Continued)

(52) U.S. Cl.
CPC .......... *F04B 43/06* (2013.01); *F04B 43/0009* (2013.01); *F04B 49/22* (2013.01);
(Continued)

(58) Field of Classification Search
CPC ...... F04B 43/06; F04B 43/0009; F04B 49/22; F16K 11/044; F16K 27/003;
(Continued)

(56) References Cited

U.S. PATENT DOCUMENTS 3,215,158 A * 11/1965 Bass, Jr. ................. F15B 13/08
137/625.69
3,506,029 A * 4/1970 Demler, Sr. ............. F16L 47/04
285/133.4
(Continued)

*Primary Examiner* — Matthew W Jellett
*Assistant Examiner* — Christopher D Ballman
(74) *Attorney, Agent, or Firm* — Michael George Norris

(57) ABSTRACT

A valved manifold module is disclosed, constructed and arranged to be readily connected in a chain with similar modules to form a manifold assembly. The modular manifolds allows for expansion or modification of the manifold assembly to control a group of pneumatically or hydraulically driven pumps, valves or combinations thereof in a liquid flow control apparatus. The valved manifold module can be configured to accept a group of four substantially identical valve assemblies, and can be controlled by a local controller mounted to the manifold module, thus forming an independently programmable valved manifold module. The resulting modular system is expandable to allow for coordinated operations of a liquid flow control system, using substantially independent controller functions originating at the manifold assembly level.

9 Claims, 102 Drawing Sheets

Related U.S. Application Data continuation-in-part of application No. 14/327,206, filed on Jul. 9, 2014, now abandoned.

(60) Provisional application No. 62/091,351, filed on Dec. 12, 2014, provisional application No. 61/844,202, filed on Jul. 9, 2013.

(51) Int. Cl.

| | |
|---|---|
| *F16K 31/06* | (2006.01) |
| *F16K 31/00* | (2006.01) |
| *F04B 43/00* | (2006.01) |
| *F04B 49/22* | (2006.01) |
| *F16K 31/08* | (2006.01) |
| *F16K 27/00* | (2006.01) |
| *F16K 27/02* | (2006.01) |
| *F16K 11/044* | (2006.01) |

(52) U.S. Cl.
CPC .......... *F16K 11/044* (2013.01); *F16K 27/003* (2013.01); *F16K 27/029* (2013.01); *F16K 27/0263* (2013.01); *F16K 31/003* (2013.01); *F16K 31/0606* (2013.01); *F16K 31/0627* (2013.01); *F16K 31/0631* (2013.01); *F16K 31/0679* (2013.01); *F16K 31/082* (2013.01); *G05D 7/0635* (2013.01); *G05D 7/0676* (2013.01)

(58) Field of Classification Search
CPC .. F16K 27/0263; F16K 27/029; F16K 31/003; F16K 31/0606; F16K 31/0627; F16K 31/0631; F16K 31/0679; F16K 31/082; G05D 7/0635; G05D 7/0676
See application file for complete search history.

(56) References Cited

U.S. PATENT DOCUMENTS

| | | | | |
|---|---|---|---|---|
| 3,934,605 A * | 1/1976 | Legris | ...................... | F16L 37/26 285/125.1 |
| 4,082,324 A * | 4/1978 | Obrecht | .............. | F15B 13/0814 285/364 |
| 4,281,683 A * | 8/1981 | Hetherington | ........ | F16K 27/003 137/884 |
| 4,782,852 A * | 11/1988 | Legris | ................... | F16L 37/252 137/271 |
| 5,333,647 A * | 8/1994 | Fukano | ................. | F16K 27/003 137/271 |
| 5,529,088 A * | 6/1996 | Asou | ................... | F15B 13/0857 137/271 |
| 5,699,834 A * | 12/1997 | Hayashi | ............... | F15B 13/0817 137/271 |
| 5,749,562 A * | 5/1998 | Moller | ................ | F15B 13/0825 251/367 |
| 5,860,445 A * | 1/1999 | Yoshimura | .......... | F15B 13/0402 137/884 |
| 5,915,409 A * | 6/1999 | Kaneko | ............... | F15B 13/0832 137/884 |
| 5,971,022 A * | 10/1999 | Hayashi | ............... | F16K 11/0712 137/625.69 |
| 6,196,256 B1 * | 3/2001 | Klampfer | .............. | F24D 3/1075 285/133.11 |
| 6,929,032 B2 * | 8/2005 | Rehder | ................... | F16L 41/03 137/884 |
| 7,591,280 B2 * | 9/2009 | Narita | ................. | F15B 13/0857 137/271 |
| 7,644,725 B2 * | 1/2010 | Matsuzawa | ............. | F16K 11/22 137/240 |
| 7,753,073 B2 * | 7/2010 | Owczarczak | ........ | A61M 16/209 251/65 |
| 8,322,367 B2 * | 12/2012 | Harris | ................... | F16K 27/003 137/884 |
| 8,465,268 B2 * | 6/2013 | Baxter | .................... | E21B 43/25 417/454 |
| 8,555,927 B2 * | 10/2013 | Roys | ....................... | F16N 25/02 184/29 |
| 9,163,740 B2 * | 10/2015 | Hartwig | ............... | F16K 27/003 |
| 9,206,919 B2 * | 12/2015 | Neumeister | ............. | F16K 27/02 |
| 9,645,585 B2 * | 5/2017 | Nguyen | ................... | F16K 11/24 |
| 10,317,094 B2 * | 6/2019 | Sørensen | ............ | F24D 19/1015 |
| 10,627,034 B2 * | 4/2020 | Sasaki | ................. | F16L 41/03 |
| 10,746,201 B2 * | 8/2020 | Weickel | ................... | B33Y 80/00 |
| 10,823,299 B2 * | 11/2020 | Miyazoe | ............... | F16K 27/003 |
| 11,092,255 B2 * | 8/2021 | Miyazoe | ............. | F15B 13/0871 |
| 11,320,058 B2 * | 5/2022 | Kidder | .................... | F16K 11/22 |
| 2005/0039807 A1 * | 2/2005 | Ford | ..................... | F15B 13/086 137/884 |
| 2007/0289652 A1 * | 12/2007 | Curran | ................... | F16L 47/03 137/884 |
| 2009/0212247 A1 * | 8/2009 | Inaba | .................... | F16K 31/426 251/129.15 |
| 2010/0148101 A1 * | 6/2010 | Narita | ................. | F15B 13/0839 251/129.01 |
| 2010/0258207 A1 * | 10/2010 | Schnur | ................ | F15B 13/0839 29/592 |
| 2011/0081268 A1 * | 4/2011 | Ochoa | ..................... | F04B 53/14 417/521 |
| 2011/0168285 A1 * | 7/2011 | Seabolt | ................... | F16L 41/03 137/884 |
| 2015/0211739 A1 * | 7/2015 | Loveless | ................ | F23N 5/247 137/544 |
| 2021/0131459 A1 * | 5/2021 | Weickel | ................ | F15B 20/005 |

* cited by examiner

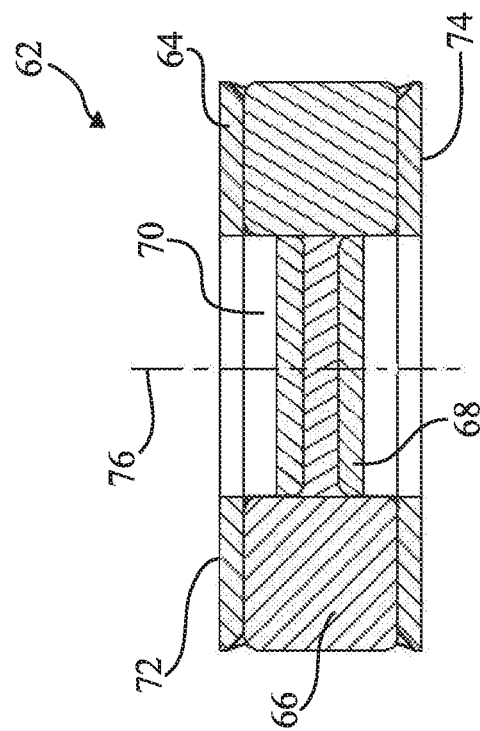
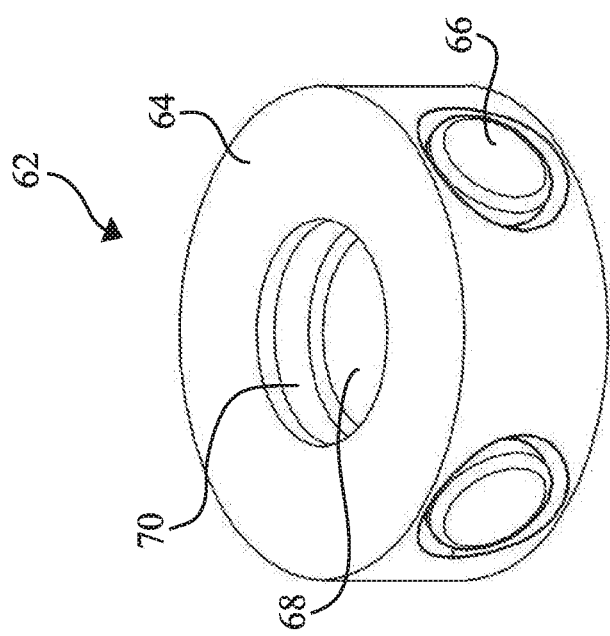
FIG. 4B
FIG. 4A

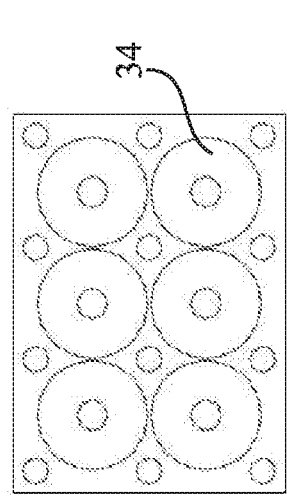
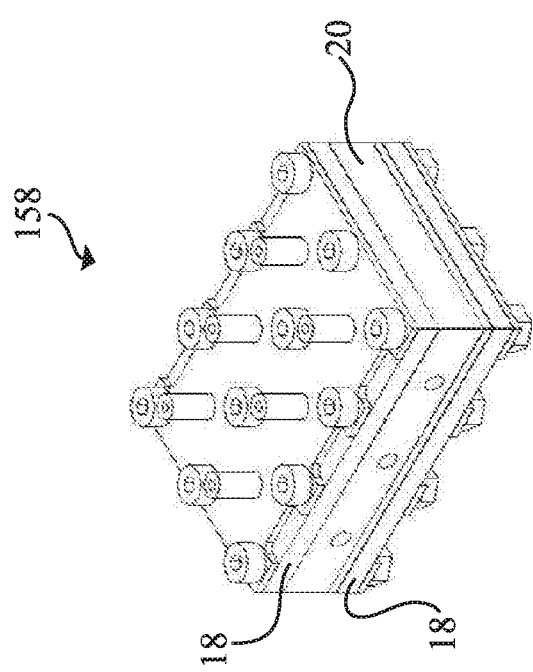
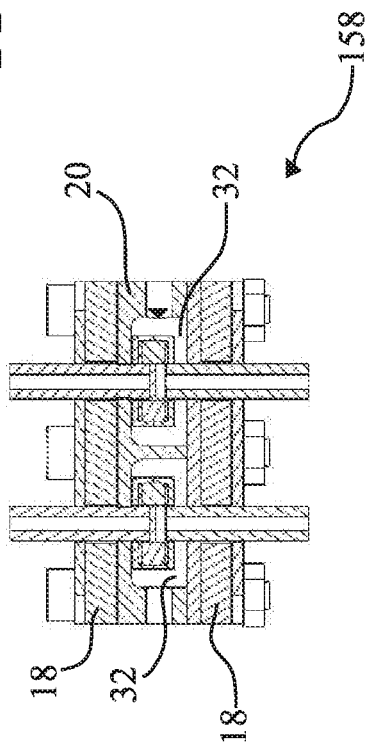
FIG. 10A
FIG. 10B
FIG. 10C

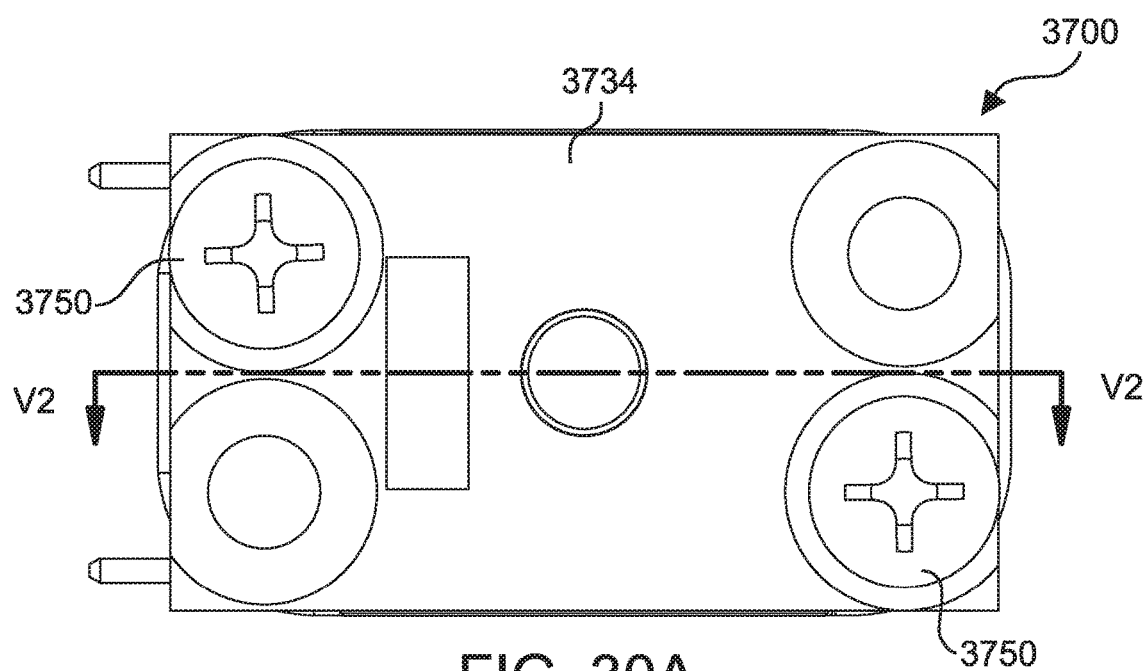
FIG. 30A
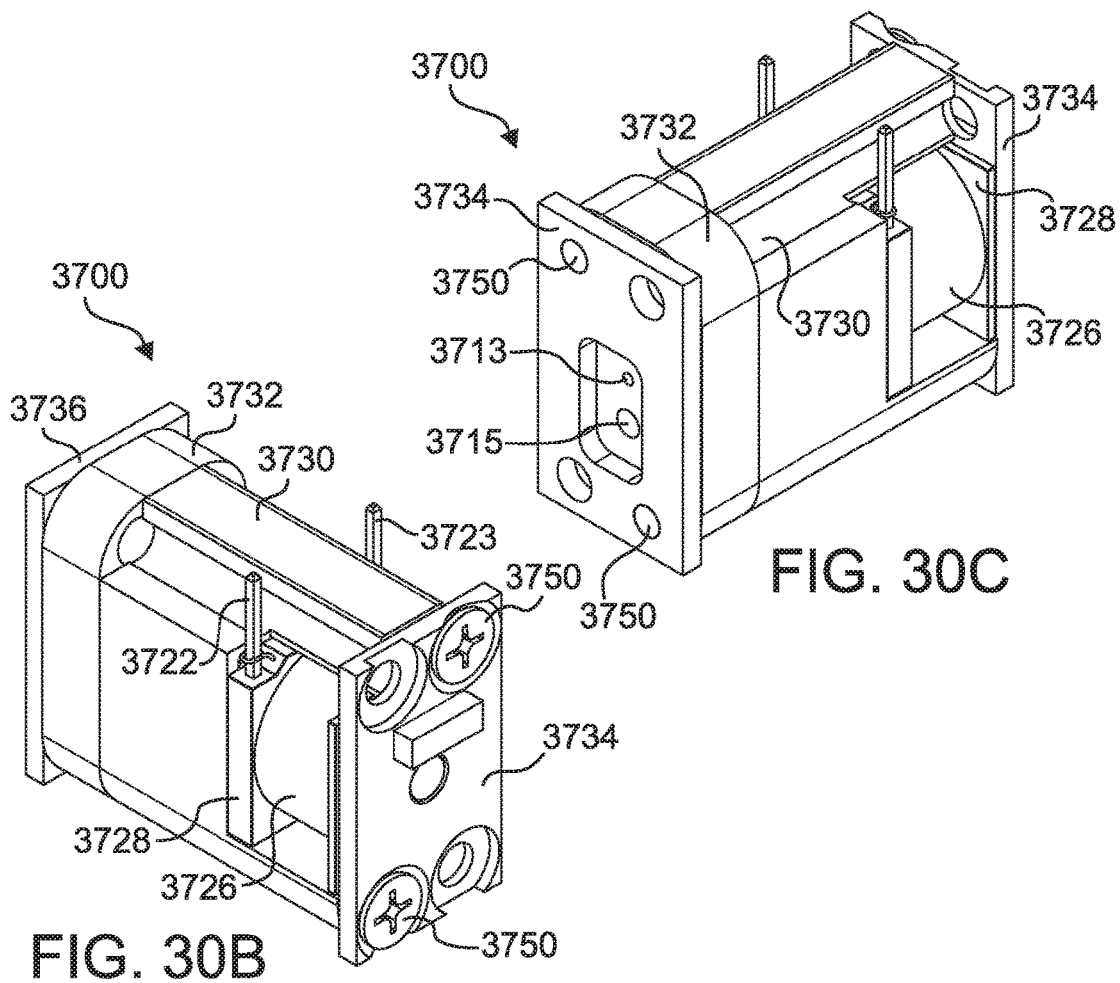
FIG. 30C
FIG. 30B

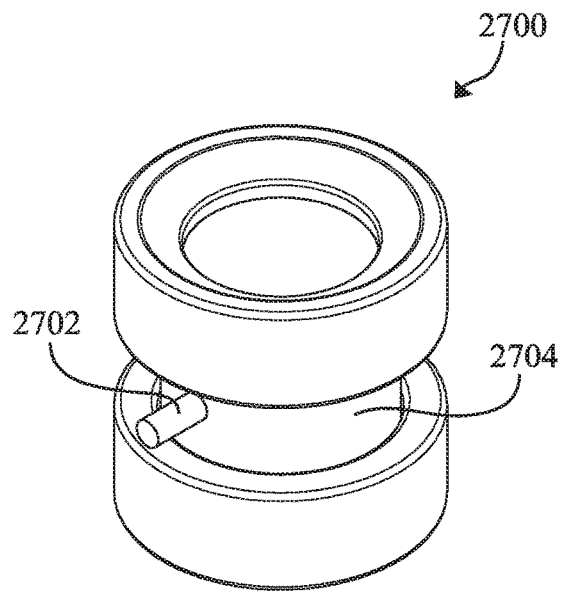
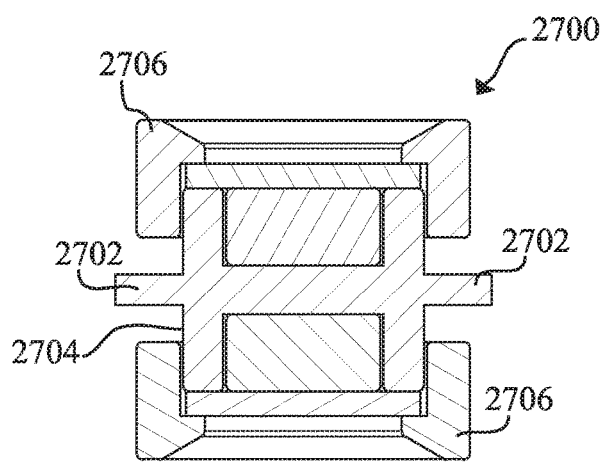
FIG. 32A
FIG. 32B
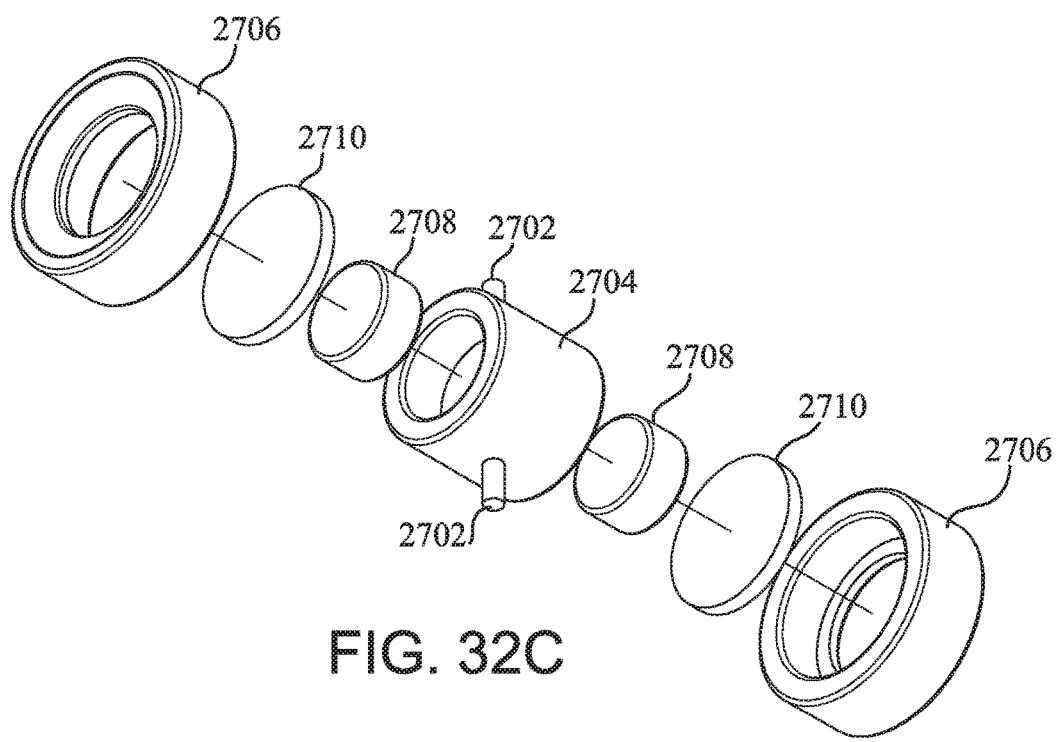
FIG. 32C

MODULAR VALVE APPARATUS AND SYSTEM

CROSS REFERENCE TO RELATED APPLICATIONS

This application is a divisional application of U.S. patent application Ser. No. 14/967,093, filed Dec. 11, 2015, entitled Modular Valve Apparatus and System and will be U.S. Pat. No. 10,613,553, issuing on Apr. 7, 2020, claiming the benefit of U.S. Provisional Application Ser. No. 62/091,351 filed Dec. 12, 2014 and entitled Modular Valve Apparatus and System, which is hereby incorporated herein by reference in its entirety.

U.S. patent application Ser. No. 14/967,093, filed Dec. 11, 2015, entitled Modular Valve Apparatus and System and will be U.S. Pat. No. 10,613,553, issuing on Apr. 7, 2020 is also a Continuation-in-Part of U.S. patent application Ser. No. 14/327,206 filed Jul. 9, 2014 and entitled Valve Apparatus and System, now U.S. Publication No. US-2015-0014558-A1, published Jan. 15, 2015, which claims the benefit of U.S. Provisional Application Ser. No. 61/844,202 filed Jul. 9, 2013 and entitled Valve Apparatus and System, each of which is hereby incorporated herein by reference in its entirety.

FIELD OF THE INVENTION

This application relates generally to fluid flow control valves or manifold valves, and more particularly to modular valved manifold systems.

BACKGROUND

Controlling the flow of a liquid may be accomplished by using a manifold connected to a pressurized fluid source—pneumatic or hydraulic—that distributes the pressurized fluid to a fluid-actuated liquid pumping or liquid flow control apparatus. Liquid flow valves or pumps (e.g., in medical devices) may be fluidically actuated in a selective manner—either hydraulically or pneumatically—through the use of controller-managed electromagnetic valves in a manifold assembly coupled to one or more fluid sources under positive or negative pressure. The manifold valves selectively direct positive or negative fluidic pressure to the liquid flow control apparatus.

A manifold assembly is typically custom-designed and assembled for the specific liquid flow control apparatus to which it is connected, and re-purposing the manifold for other applications (e.g. other pumping devices, or modified devices) is generally not feasible. ces.

Power consumption, heat generation and valve reliability can be a significant problem in valved manifolds, particularly in systems requiring the manifold valves to frequently change states. The manifold valves may require a constant source of current to maintain a particular position or state. In contrast, a bistable valve—stable in either of its positions or states—may only require energy input to change its state. However, integrating bistable valve assemblies into a pressure distribution manifold system may be overly complex and expensive.

Among some of the inventive improvements described herein: A modular manifold assembly is described that can be readily modified by the addition or subtraction of individual manifold modules in a concatenated manner, and may allow for rapid and convenient re-purposing of the manifold system. Manifold modules forming the building blocks for a manifold assembly are described that have standardized dimensions, inputs, outputs, and valve assemblies. Adding a standardized on-board controller to each module may additionally permit the manifold system to locally perform readily programmable and highly specialized functions in various pump/valve devices. A controller connected to a valved manifold is described that can be used to measure the amount of pressure delivered to or present in the liquid flow control apparatus, can control the rate of pressure delivery—either positive or negative, and can allow for the venting of fluidic pressure in the liquid flow control apparatus. Manifold modules are also described that can accommodate specialized bistable valve sets so that each valved manifold module (with or without an on-board controller) can operate without undue power consumption or heat generation, and allow for individual valve assemblies to be easily replaceable.

SUMMARY OF THE INVENTION

A manifold module comprises: a manifold base reversibly connectable to a pressure line containing pressurized fluid; a first valve assembly mounted to the manifold base; a controller mounted to the manifold base and connected to the valve assembly; the manifold base being configured to fluidically connect a pressure line inlet port of the manifold base to an inlet of the valve assembly, to fluidically connect a cavity of the valve assembly to a pressure sensing port of the manifold base, to fluidically connect an outlet of the valve assembly to an outlet of the manifold base, and to fluidically connect the pressure line inlet port to a pressure line outlet port of the manifold base. The first valve assembly is configured to be electrically actuated by the controller to either open or block communication between the inlet of the valve assembly and the cavity of the valve assembly, and the cavity of the valve assembly is in fluid communication with the outlet of the valve assembly. The controller comprises a pressure sensor mounted on a control board, the pressure sensor configured to form a reversible sealed connection with the pressure sensing port of the manifold base, the control board having one or more electrical output connectors for connection to an electromagnetic coil to actuate the valve assembly, and the control board having a first electronic communications connector for sending and receiving electronic communications to or from a communications bus on a first side of the manifold module, and having a second electronic communications connector for sending and receiving electronic communications to or from the communications bus on a second side of the manifold module. The manifold module is thereby configured to reversibly connect with a second manifold module via the first or second electronic communications connector and via the pressure line inlet port or the pressure line outlet port of the manifold base.

In another aspect, a modular manifold assembly comprises a plurality of concatenated manifold blocks, each manifold block having a flowpath connecting a pressure line inlet port on a first side of the manifold block to a pressure line outlet port on a second side of the manifold block via a fluidic bus in the manifold block, the pressure line outlet port of a first manifold block being connected to the pressure line inlet port of an adjacent second manifold block. The first and second manifold blocks are each reversibly connected to each other, and are each separately reversibly connected to a pressurized fluid line; each manifold block having a valve assembly receiving station for mounting a pre-determined number of valve assemblies; each valve assembly comprising an inlet configured to fluidically communicate with a respective fluidic bus port of the manifold block; each valve assembly configured to be electrically actuated to open or block fluid communication between a cavity of the valve assembly and the inlet of the valve assembly, the cavity of each valve assembly in fluid communication with a respective outlet of the manifold block and in fluid communication with a respective pressure sensing port of the manifold block; and each valve assembly having electrical contacts for actuating the respective valve assemblies, the electrical contacts configured to connect to a programmable controller board mounted on the manifold block. The controller board comprises pressure sensors configured to reversibly and sealably connect to respective sensing ports on the manifold block. And each of the plurality of manifold blocks is tasked by its programmable controller to control one of a plurality of pumps or valves of a liquid flow control apparatus.

In another aspect, a manifold module for controlling a pneumatically actuated diaphragm pump comprises: a manifold base reversibly connectable via a first pressure line inlet port to a first pressure line containing positively pressurized gas and a second pressure line inlet port to a second pressure line containing negatively pressurized gas; first, second, third and fourth valve assemblies, each mounted to a valve assembly receiving station on the manifold base; and a controller mounted to the manifold base and connected to the four valve assemblies. The manifold base is configured to fluidically connect the first pressure line inlet port of the manifold base to a first inlet respectively of the first, second and third valve assemblies, to fluidically connect the second pressure line inlet port of the manifold base to a second inlet respectively of the first, second and fourth valve assemblies, to fluidically connect a cavity of each of the third and fourth valve assemblies to a respective pressure sensing port of the manifold base, to fluidically connect an outlet of each of the valve assemblies to a respective outlet of the manifold base, and to fluidically connect the first and second pressure line inlet ports of the manifold base to respective first and second pressure line outlet ports of the manifold base. Each of the first and second valve assemblies is configured to be electrically actuated by the controller to establish fluid communication between the cavity of the first or second valve assemblies and the first inlet of the first and second valve assemblies, or establish fluid communication between the cavity of the first or second valve assemblies and the second inlet of the first and second valve assemblies. The third valve assembly is configured to be electrically actuated by the controller to open or close communication between the cavity of the third valve assembly and the first inlet of the third valve assembly. The fourth valve assembly is configured to be electrically actuated by the controller to open or close communication between the cavity of the fourth valve assembly and the second inlet of said fourth valve assembly. The first valve assembly is configured to fluidically connect to a first fluid inlet diaphragm valve of the diaphragm pump, the second valve assembly is configured to fluidically connect to a second fluid outlet diaphragm valve of the diaphragm pump, and the third and fourth valve assemblies are configured to fluidically connect to a control chamber of the diaphragm pump. The controller comprises first and second pressure sensors mounted on a control board, the pressure sensors configured to form a reversible sealed connection respectively with the pressure sensing ports of the manifold base connected to the cavities of the third and fourth valve assemblies. Thus the controller is configured to coordinate actuation of the four valve assemblies to open the inlet valve, close the outlet valve and generate a fill stroke in the diaphragm pump, or close the inlet valve, open the outlet valve and generate a deliver stroke in the diaphragm pump.

In another aspect, a manifold pressure measurement module comprises: a manifold base having a first pressure line inlet port for connection to a first pressure line containing positively pressurized gas, a second pressure line inlet port for connection to a second pressure line containing negatively pressurized gas, a third inlet port for venting to atmospheric pressure; and a fourth inlet port for connection to a control chamber of a pneumatically actuated diaphragm pump. There are first, second third and fourth valve assemblies, each mounted to a valve assembly receiving station on the manifold base. A controller is mounted to the manifold base and connected to the four valve assemblies. The manifold base is configured to fluidically connect the first pressure line inlet port to a first inlet of the first valve assembly, to fluidically connect the second pressure line inlet port to a first inlet of the second valve assembly, to fluidically connect the third inlet port to a first inlet of the third valve assembly, and to fluidically connect the fourth inlet port to a first inlet of the fourth valve assembly. The manifold base is also configured to connect valve cavities of each valve assembly to respective pressure sensing ports of the manifold base, and to connect each of the valve cavities to a reference reservoir of known volume. The first, second, third and fourth valve assemblies are configured to be selectively electrically actuated by the controller to open or close communication between the cavities of the valve assemblies and the first inlets of the valve assemblies. The controller comprises first, second, third and fourth pressure sensors mounted on a control board, the pressure sensors configured to form a reversible sealed connection respectively with the pressure sensing ports of the manifold base. The controller is thereby configured to operate the first, second, third and fourth valve assemblies to charge the reference reservoir with positive or negative pneumatic pressure, or to open the reference reservoir to atmospheric pressure, and to fluidically connect the reference reservoir with the control chamber of the diaphragm pump to equalize pressures between the control chamber and the reference reservoir, and to record pressures in one or more valve chambers before and after pressure equalization. This procedure allows the controller to calculate a volume of the pump control chamber (and thus a volume of the liquid in the pumping chamber) using one or more models based on the ideal gas laws.

In another aspect, a valve assembly comprises a shuttle within a valve cavity configured to move linearly from a first position blocking a first inlet of the valve cavity to a second position allowing the first inlet to fluidly communicate with the valve cavity, the movement of the shuttle being actuated electromagnetically, magnetically, or through a biasing force applied by a spring. A molded insert having an outer wall is configured to conform to an inner wall of the valve cavity, and has an inner wall configured to surround the shuttle and permit the shuttle to move from the first position to the second position. The molded insert has an inlet orifice configured to mate with the first inlet of the valve cavity and to be interposed between the first inlet of the valve cavity and a first face of the shuttle. The molded insert has an outlet orifice configured to fluidly communicate with a fluid outlet of the valve cavity. The first molded insert is manufactured from an elastomeric or plastic material that reduces acoustical noise generated by movement of the shuttle.

In another aspect, a fluid pumping system comprises a cassette having a flexible diaphragm; a system controller; and a manifold module. The manifold module comprises: a manifold base reversibly connectable to a pressure line containing pressurized fluid; a first valve assembly mounted to the manifold base; and a module controller mounted to the manifold base and connected to the valve assembly. The manifold base is configured to fluidically connect a pressure line inlet port of the manifold base to an inlet of the valve assembly, to fluidically connect a cavity of the valve assembly to a pressure sensing port of the manifold base, to fluidically connect an outlet of the valve assembly to an outlet of the manifold base, and to fluidically connect the pressure line inlet port to a pressure line outlet port of the manifold base. The first valve assembly is configured to be electrically actuated by the module controller to either open or block communication between the inlet of the valve assembly and the cavity of the valve assembly, and the cavity of the valve assembly being in fluid communication with the outlet of the valve assembly. The module controller comprises a pressure sensor mounted on a control board, the pressure sensor configured to form a reversible sealed connection with the pressure sensing port of the manifold base, the control board having one or more electrical output connectors for connection to an electromagnetic coil to actuate the valve assembly, and the control board has a first electronic communications connector for sending and receiving electronic communications to or from a communications bus on a first side of the manifold module. The control board also has a second electronic communications connector for sending and receiving electronic communications to or from the communications bus on a second side of the manifold module. The control board is configured to receive a summary command from the system controller, the control board is configured to generate, based on the summary command, at least one module command addressed to the first valve assembly, the at least one module command enabling selective application of pressure to the flexible diaphragm. The manifold module is thereby configured to reversibly connect with a second manifold module via the first or second electronic communications connector and via the pressure line inlet port or the pressure line outlet port of the manifold base.

In another aspect, a fluid flow control system for controlling a pump cassette comprises: a pump cassette including a diaphragm pump having an inlet valve and an outlet valve; a system controller; a manifold base reversibly connectable via a first pressure line inlet port to a first pressure line containing positively pressurized gas and a second pressure line inlet port to a second pressure line containing negatively pressurized gas; first, second, third and fourth valve assemblies, each mounted to a valve assembly receiving station on the manifold base; and an on-board controller mounted to the manifold base and connected to the four valve assemblies. The manifold base is configured to fluidically connect the first pressure line inlet port of the manifold base to a first inlet respectively of the first, second and third valve assemblies, to fluidically connect the second pressure line inlet port of the manifold base to a second inlet respectively of the first, second and fourth valve assemblies, to fluidically connect a cavity of each of the third and fourth valve assemblies to a respective pressure sensing port of the manifold base, to fluidically connect an outlet of each of the valve assemblies to a respective outlet of the manifold base, and to fluidically connect the first and second pressure line inlet ports of the manifold base to respective first and second pressure line outlet ports of the manifold base. Each of the first and second valve assemblies is configured to be electrically actuated by the on-board controller to establish communication between the cavity of said first or second valve assemblies and the first inlet of the first and second valve assemblies, or establish communication between the cavity of the first or second valve assemblies and the second inlet of the first and second valve assemblies. The third valve assembly is configured to be electrically actuated by the on-board controller to open or close communication between the cavity of the third valve assembly and the first inlet of the third valve assembly. The fourth valve assembly is configured to be electrically actuated by the on-board controller to open or close communication between the cavity of the fourth valve assembly and the second inlet of the fourth valve assembly. The first valve assembly is configured to fluidically connect to the inlet valve of the diaphragm pump, the second valve assembly is configured to fluidically connect to the outlet valve of the diaphragm pump, and the third and fourth valve assemblies are configured to fluidically connect to a control chamber of the diaphragm pump. The on-board controller comprises first and second pressure sensors mounted on a control board, the pressure sensors configured to form a reversible sealed connection respectively with the pressure sensing ports of the manifold base connected to the cavities of the third and fourth valve assemblies. And the on-board controller is configured to coordinate actuation of the four valve assemblies to open the inlet valve, close the outlet valve and generate a fill stroke in the diaphragm pump, or close the inlet valve, open the outlet valve and generate a deliver stroke in the diaphragm pump, with the system controller being configured to provide commands to the on-board controller that may include a start pumping command, a stop pumping command, or a command to pump a pre-determined quantity of liquid.

The details of one or more embodiments are set forth in the accompanying drawings and the description below. Other features and advantages will become apparent from the description, the drawings, and the claims.

BRIEF DESCRIPTION OF THE DRAWINGS

FIG. 4A is a perspective view of one embodiment of a shuttle showing radially-oriented magnets;

FIG. 4B is a cross-sectional view of the shuttle of FIG. 4A;

FIG. 10A is a perspective view of one embodiment of a valve apparatus and system arranged in an array;

FIG. 10B is a top view of a circuit board having multiple flat electromagnetic coils according to one embodiment;

FIG. 10C is a cross-sectional view of one embodiment of a valve apparatus and system arranged in an array;

FIG. 30A is a plan view of a valve assembly;

FIGS. 30B-C are perspective views of the valve assembly of FIG. 30A;

FIGS. 32A-32C are perspective, cross-sectional and exploded views of an example shuttle which includes a number of keyed alignment features;

Like reference symbols in the various drawings indicate like elements.

DETAILED DESCRIPTION

Bistable Valve Embodiments

Figure 1A:
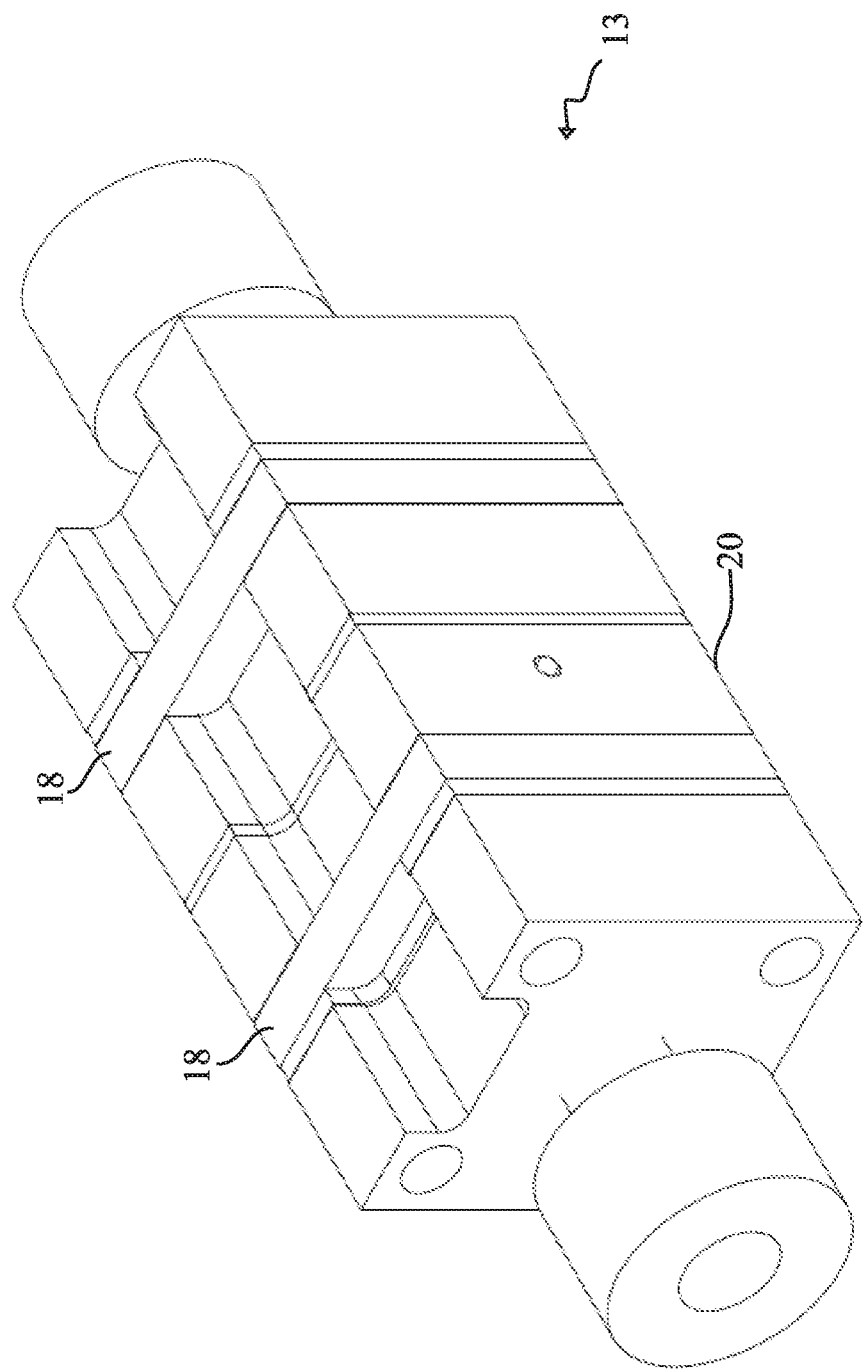
FIG. 1A is a perspective view of the one embodiment of a bistable valve.
Figure 1C:
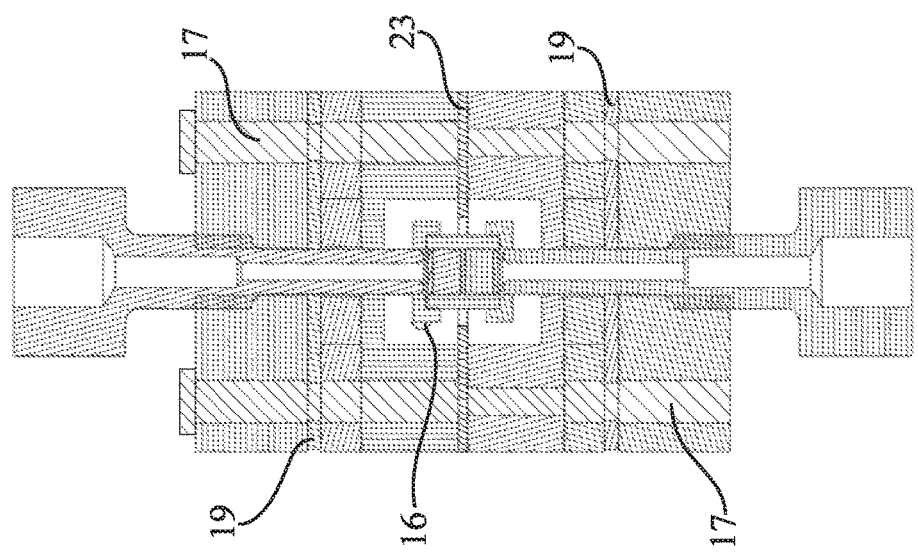
FIG. 1C is another cross-sectional view of the embodiment of FIG. 1A.
Figure 1B:
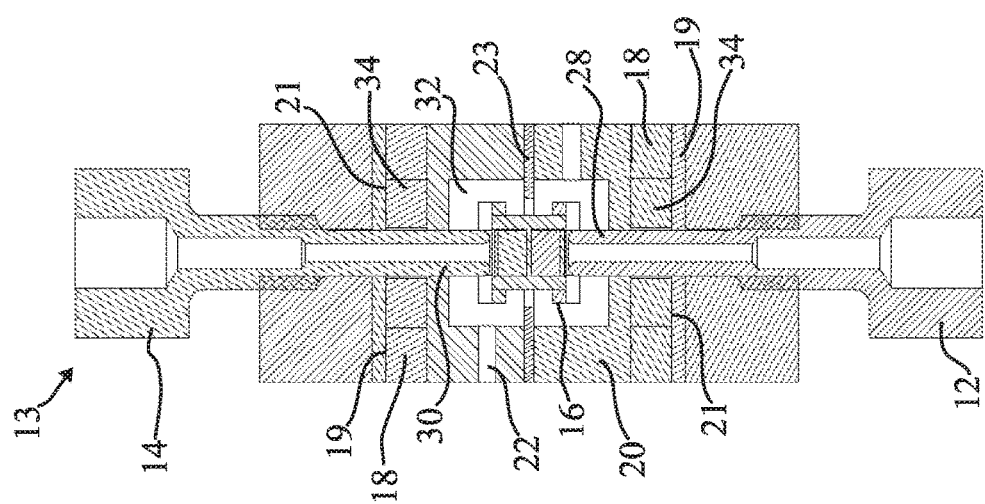
FIG. 1B is a cross-sectional view of one embodiment of a bistable valve with a shuttle capable of being actuated by electromagnets.
Figure 1E:
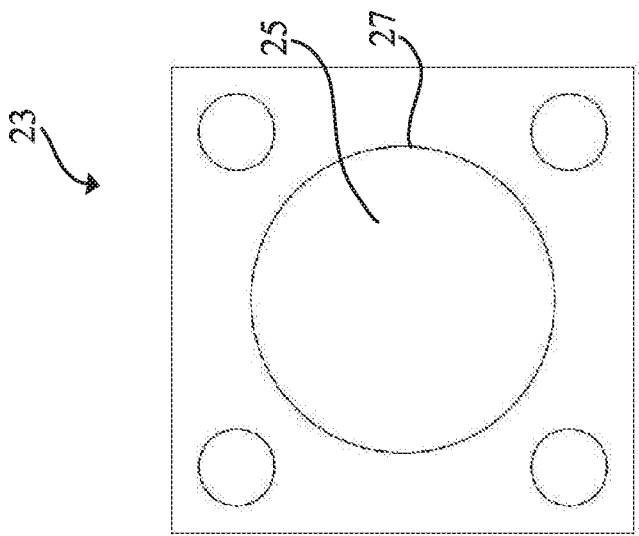
FIG. 1E is a top view of a ring plate according to one embodiment.
Figure 1D:
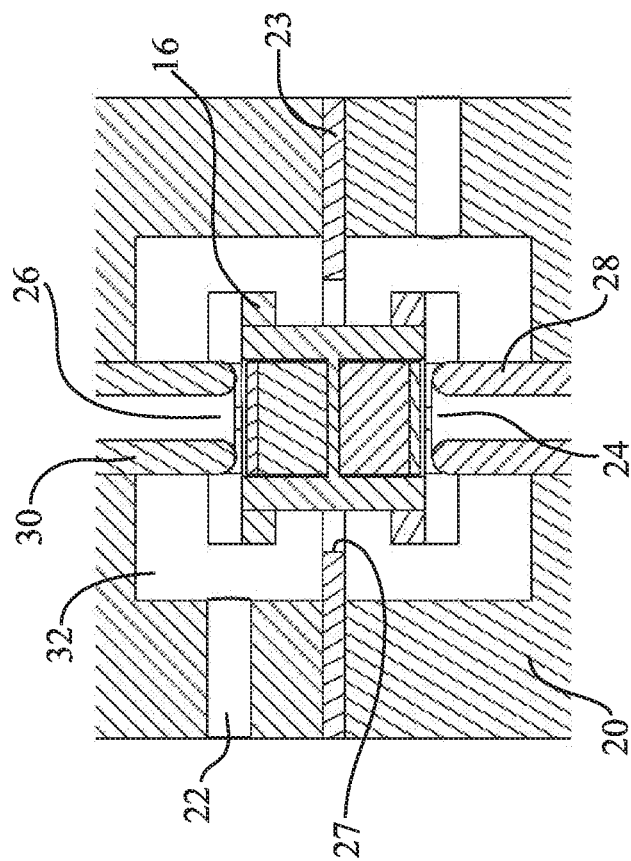
FIG. 1D is a partial cross-sectional view of the embodiment of FIG. 1A with a more detailed view of the shuttle.

One aspect of a valve apparatus and system is illustrated in FIGS. 1A-1E. This aspect of the bistable valve 13 includes a first pressure inlet 12, a second pressure inlet 14, a shuttle 16, circuit boards 18, each having an electromagnetic coil 34 to actuate the shuttle 16, a valve manifold 20 having an interior valve cavity 32, and a common output orifice 22 in fluid communication with the valve cavity 32.

The first pressure inlet 12 may have a hollow post portion 28 extending into the valve cavity 32. In some embodiments, this may be constructed of a ferrous material. Similarly, the second pressure inlet 14 has a hollow post portion 30 extending into the valve cavity 32 substantially opposite from the first pressure post 28, and may also be constructed of a ferrous material. In some aspects, the first pressure post 28 may include a first pressure orifice 24, which is in fluid communication with the first pressure inlet 12. Similarly, the second pressure post 30 may have a second pressure orifice 26 which may be in fluid communication with the second pressure inlet 14.

A first circuit board 18 having a first electromagnetic coil 34 is disposed around the first pressure post 28 such that, when energized, the first electromagnetic coil 34 supplies a magnetic charge to the first pressure post 28. Similarly, a second circuit board 18 having a second electromagnetic coil 34 is disposed around the second pressure post 30 such that, when energized, the second electromagnetic coil 34 supplies a magnetic charge to the second pressure post 30. An outer plate 19 constructed of a ferrous material may be disposed around each of the first pressure post 28 and the second pressure post 30, and abutting an insulating layer on the outer edge 21 of each of the circuit boards 18. In some aspects, each of the outer plates 19 may be connected to each other by way of fasteners 17 also constructed of a ferrous material. A ring plate 23 may be included, constructed of a ferrous material and having a central opening 25 defined by an inner edge 27, disposed in the valve manifold 20 such that the ring plate 23 is in contact with each fastener 17. The central opening 25 surrounds the shuttle 16 within the interior valve cavity 32. The outer plates 19 and fasteners 17 form a box of ferrous material surrounding the electromagnetic coils 34, the first pressure post 28, the second pressure post 30, the ring plate 23, and the shuttle 16. The outer plates 19, fasteners 17, ring plate 23, first pressure post 28 and second pressure post 30 may all be constructed of a ferrous material including, but not limited to, iron, stainless steel or a nickel-iron alloy such as mu metal or, more specifically, a 42 nickel-iron alloy, the composition of which contains approximately 42% nickel.

The shuttle 16 may be sealed against the first pressure orifice 24 in a first stable position such that the second pressure orifice 26 is in fluid communication with the interior valve cavity 32. One or more magnets (e.g., see magnets 38, FIG. 2B) may be mounted or attached to the shuttle 16 to provide an attractive force between the shuttle 16 and components surrounding the pressure orifice 24 or 26. Alternatively, the shuttle 16 may be sealed against the second pressure orifice 26 in a second stable position such that the first pressure orifice 24 is in fluid communication with the interior valve cavity 32. In each static sealing position, the shuttle 16 is held in place by a magnetic attraction from the shuttle 16 to either the first pressure post 28 or the second pressure post 30, whichever is being sealed.

To switch the position of the shuttle 16 from sealing against the first pressure orifice 24 to sealing against the second pressure orifice 26, the electromagnetic coils 34 disposed around each of the second pressure post 30 and the first pressure post 28 are energized such that the first pressure post 28 exerts a repellant force on the shuttle 16, while the second pressure post 30 exerts an attractive force on the shuttle 16. One or both forces may be sufficient to actuate movement of the shuttle 16. In one embodiment, both the attractive and repellant forces working together are enough to overcome the static magnetic force currently holding the shuttle 16 to the first pressure orifice 24. Once this occurs, the shuttle 16 moves linearly through the valve cavity 32 from sealing the first pressure orifice 24 to sealing the second pressure orifice 26. Once this switch occurs, the electromagnetic coils 34 cease to be energized and the shuttle 16 is retained against the second pressure orifice 26 through a static magnetic attraction.

Similarly, to switch the position of the shuttle 16 from sealing against the second pressure orifice 26 to sealing against the first pressure orifice 24, the electromagnetic coils 34 disposed around each of the first pressure post 28 and the second pressure post 30 are energized such that the second pressure post 30 exerts a repellant force on the shuttle 16, while the first pressure post 28 exerts an attractive force on the shuttle 16. Either or both forces may be sufficient to actuate movement of the shuttle. In an embodiment, both the attractive and repellant forces working together are enough to overcome the magnetic force statically holding the shuttle 16 to the second pressure orifice 26. Once this occurs, the shuttle 16 moves linearly through the valve cavity 32 from sealing the second pressure orifice 26 to sealing the first pressure orifice 24. Once this switch occurs, the electromagnetic coils 34 cease to be energized and the shuttle 16 is retained against the first pressure post 28 through a static magnetic attraction.

In an exemplary implementation, the electromagnetic coils 34 are both energized in series in one polarity to actuate the shuttle 16 in one direction. Similarly, to actuate the shuttle 16 in the opposite direction, both electromagnetic coils 34 are energized together in series in the opposite polarity.

Optionally, the coils 34 may be energized by discharging current from a charged capacitor. Once the capacitor is discharged, current ceases to charge the respective coil 34, and the shuttle 16 is held against either the first pressure post 28 or the second pressure post 30, by way of static magnetic attraction while the capacitor recharges. Use of a capacitor to charge the electromagnetic coils 34 may have certain safety-related advantages. It may help to limit the amount of continuous current flowing through the coils 34 to reduce the possibility of over-heating. It may also reduce the size, complexity and cost of the apparatus. In one example, a single capacitor may be used to energize multiple valves. In alternate embodiments, the electromagnetic coils 34 may be energized individually by separate sources of electrical current or separate charging devices.

In a yet simpler implementation, actuation of the shuttle 16 may only require activation of a single electromagnetic coil to move the shuttle 16 in either direction or sealing position.

To reduce the acoustic noise generated during displacement of a shuttle 16, the interior valve cavity 32 may be sized to minimize the travel distance of the shuttle 16 when actuated from one sealing position to another sealing position. Reduction of shuttle travel may help to increase the life of a valve, as less shuttle kinetic energy is used in operating the valve. A shorter shuttle 16 excursion may also reduce the possibility of misalignment with the valve seats during displacement. In an example, the shuttle 16 may be sized such that it need only displace ~5% or less of the length of the interior valve cavity to transition from one sealing position to another sealing position. More specifically, for example, the interior valve cavity 32 may measure about 0.200" long and the shuttle 16 may measure about 0.190" long.

Optionally, a shuttle for a bistable valve may include at least one elastomeric layer. An elastomeric layer may be present on the outward faces of the shuttle that seal the inlets to an interior valve cavity of a bistable valve. The thickness as well as the material comprising the elastomer layer(s) can vary. In some examples, the thickness of the elastomer layer may be between about 0.0010" and 0.0030 thick. More specifically, for example, the thickness of the elastomer layer may be about 0.0020" thick.

Figure 2B:
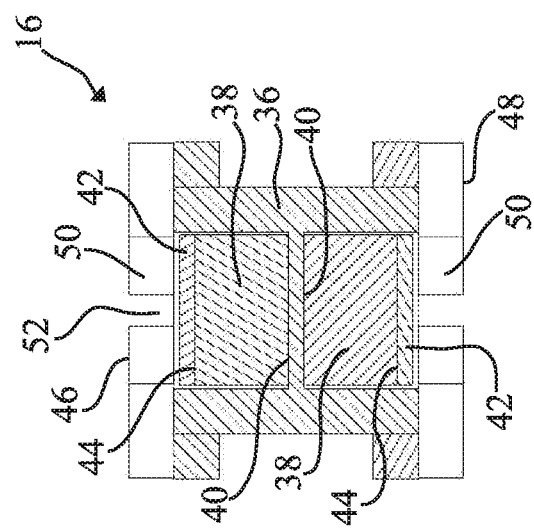
FIG. 2B is a cross-sectional view of the shuttle of FIG. 2A, showing two disk magnets oriented back-to-back.
Figure 2A:
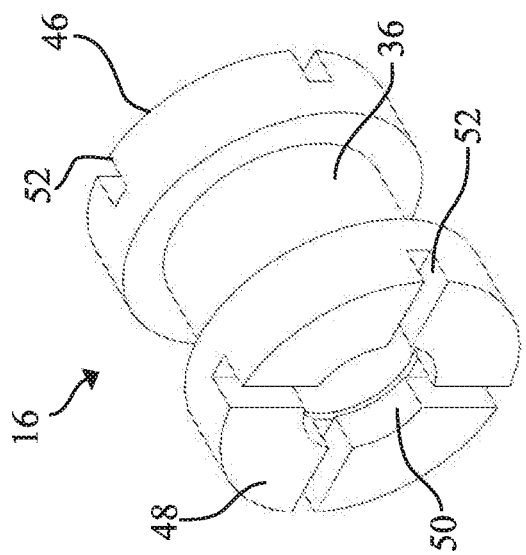
FIG. 2A is a perspective view of one embodiment of a shuttle.

Referring now also to FIGS. 2A and 2B, the shuttle 16 may include a carrier 36 and two magnets 38, aligned concentrically and oriented back-to back with their opposing faces 40 having the same polarity. As such, they will exhibit a repelling force against each other. The shuttle 16 may include an elastomer layer 42 disposed on each magnet's outward face 44 and can provide a seal when the shuttle 16 is actuated against either the first pressure orifice 24 or the second pressure orifice 26. The elastomer layer 42 may be constructed of a pliant material which may include, for example, silicone and/or polyurethane. Each elastomer layer 42 may be retained in the shuttle 16 mechanically, for example, by portions of the shuttle 16 that overlap the edge of each elastomer layer 42 and sandwich it to the corresponding magnet's outward face 44. In other implementations, each elastomer layer 42 may be retained in the shuttle 16 by an adhesive holding the elastomer to each magnet's outward face 44. Alternatively, the elastomer layers 42 may be secured to each magnet's outward face 44 by way of overmolding the entire magnet 38 with the elastomer material, or applying a two-part elastomer material to the magnet 38. For example, each elastomer layer 42 may be constructed by sandwiching each magnet 38 between two sheets of elastomer material and melting portions of the sheets to each other in order to create a pocket of elastomer in which each magnet 38 resides. Optionally, the elastomer layer on one side of the shuttle 16 may be thicker than the other side in order to decrease the sealing stability on the thicker side. This may be advantageous, for example, when a failsafe valve operation is desired, the thicker membrane allowing for easier disengagement of the shuttle from the port to be opened.

When a magnet is entirely overmolded by an elastomeric material, the magnet material optionally may first have the elastomeric material overmolded onto it before magnetizing the magnet material. In other examples, the elastomeric overmolded material may comprise a magnetic (e.g. ferrite filled) material.

In some examples, the seal between the first or second pressure orifice 24, 26 and the shuttle can be enhanced by the first or second pressure post 28, 30 having a flat surface with rounded edges surrounding the first pressure orifice 24 and the second pressure orifice 26. Alternatively, the shuttle 16 may seal against a pressure post having a conical geometry surrounding the first pressure orifice 24 and the second pressure orifice 26. Optionally, the conical geometry of the pressure post may terminate with a flat surface with a width of about 0.005 inches immediately surrounding both the first pressure orifice 24 and the second pressure orifice 26. In some embodiments, the shuttle 16 may seal against a pressure post having a hemispherical tip geometry surrounding both the first pressure orifice 24 and the second pressure orifice 26.

In some embodiments, the carrier 36 of the shuttle 16 may include a guide element 46 and/or 48 having a cavity 50 enclosing each elastomer layer 42 such that the guide cavity 50 envelopes a portion of both the first pressure post 28 or the second pressure post 30, depending on which is being sealed. In an exemplary embodiment, the guide elements may enclose or surround at least partially both pressure posts regardless of which is being sealed. This may be beneficial/desirable, for example, to maintain proper alignment of the shuttle 16 with each pressure post 28, 30. Optionally, the guide elements 46, 48 may also include a plurality of air flow notches 52 that enable fluid communication between the valve cavity 32 and either the first pressure orifice 24 or the second pressure orifice 26, whichever is not being sealed, by way of the corresponding guide cavity 50.

Optionally, the shuttle 16 magnets may be constructed to use the attractive magnetic force with each pressure post to maintain proper alignment. In some cases, this may obviate the need for guide elements 46 and/or 48.

In a shuttle having two magnets (such as that shown in FIG. 2A for example), the distance between the two magnets of the shuttle may vary. For example, the distance or gap between the magnets of the shuttle may be between about 0.0010" and 0.0110". In an exemplary embodiment, the distance or gap may be about 0.0040".

Figure 2C:
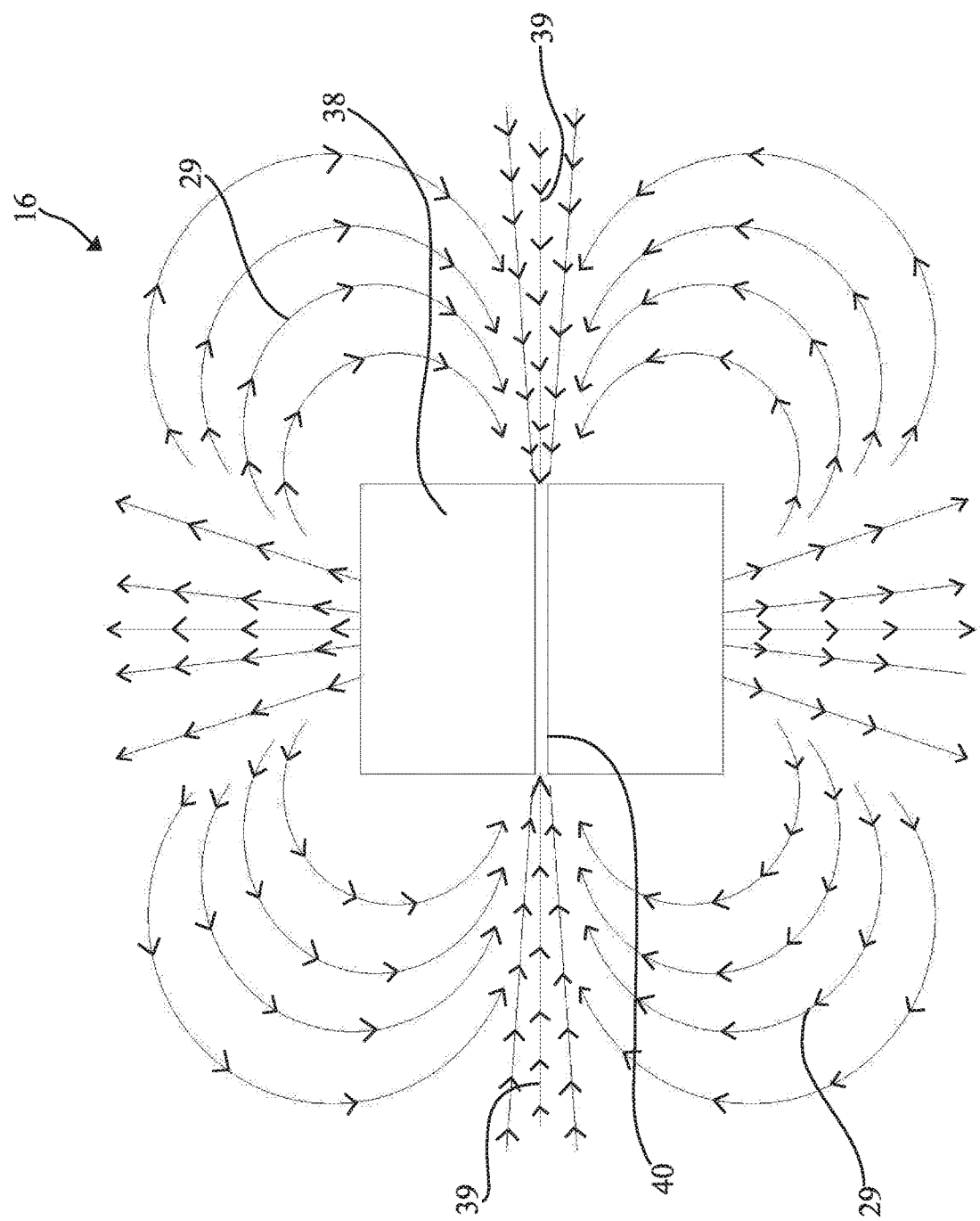
FIG. 2C is a view of the magnetization vector and magnetic flux path of one embodiment of a shuttle.
Figure 2D:
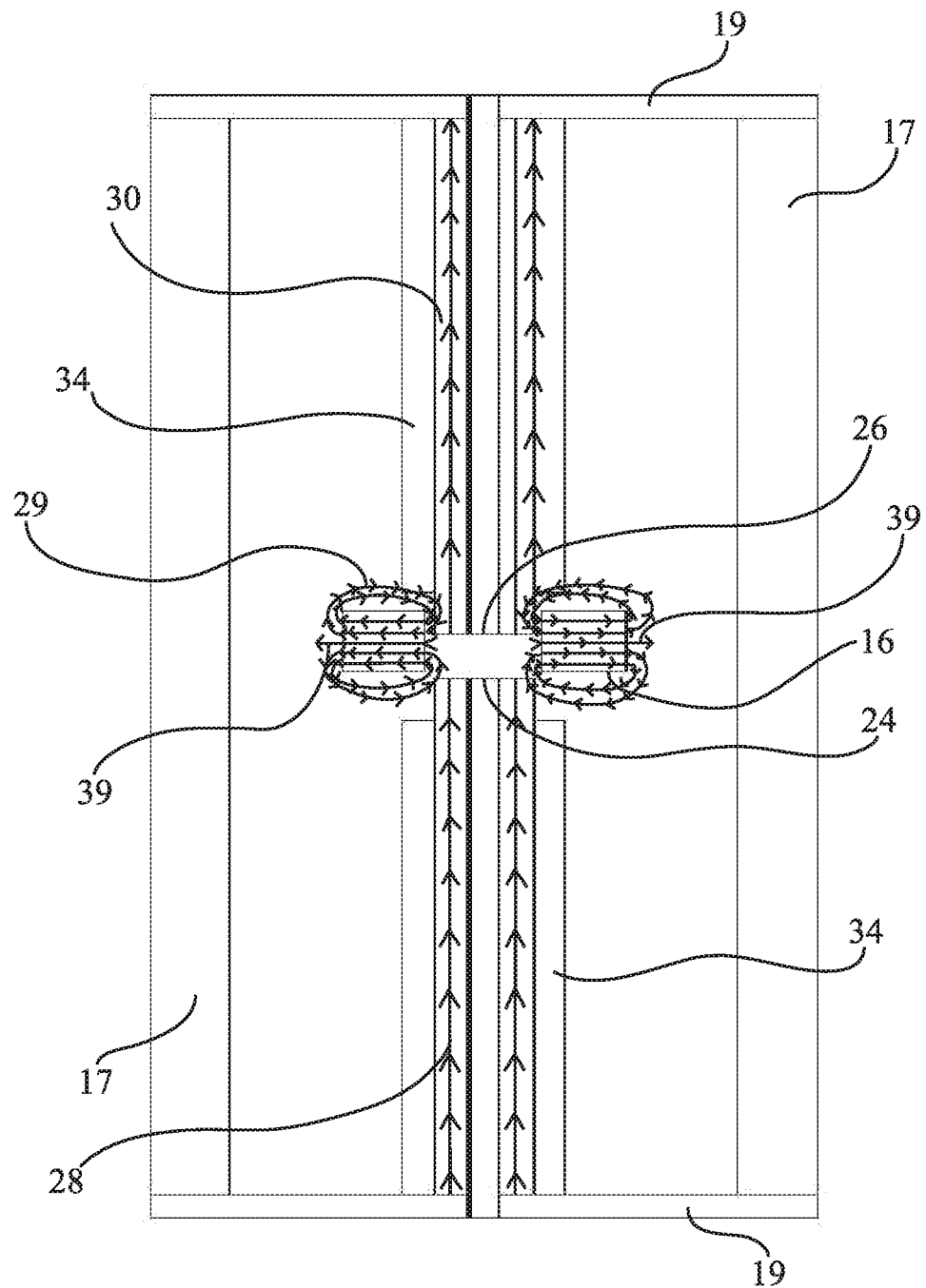
FIG. 2D is a view of the magnetic flux path of one embodiment when the shuttle is acted upon by an electromagnetic coil.

Referring now also to FIG. 2C, the magnetic flux path present in some embodiments of the shuttle 16 is shown. The magnets 38 may be oriented back-to-back with their opposing faces 40 having the same polarity, and as such, exhibit a repelling force against each other. When the magnets 38 are oriented in this manner, a radial magnetic vector 39 is created by the interaction of the magnets' respective flux leakage paths 29. These direct switching of the position of the shuttle 16 when the electromagnetic coils 34 are sufficiently energized, as shown in FIG. 2D. When the shuttle 16 is positioned against the second pressure orifice 26 and the electromagnetic coils 34 are energized such that they supply an attractive magnetic force to the first pressure post 28 and a repellant magnetic force to the second pressure post 30, the flux leakage paths 29 of the shuttle 16 will cause the attractive and repellant magnetic forces of the posts 28, 30 to repel the shuttle 16 away from the second pressure post 30 and attract it towards the first pressure post 28.

Similarly, when the shuttle 16 is positioned against the first pressure orifice 24 and the electromagnetic coils 34 are energized such that they supply an attractive magnetic force to the second pressure post 30 and a repellant magnetic force to the first pressure post 28, the flux leakage paths 29 of the shuttle 16 will cause the attractive and repellant magnetic forces of the posts to repel the shuttle 16 away from the first pressure post 28 and attract it towards the second pressure post 30, positioning it against the second pressure orifice 26.

Figure 2E:
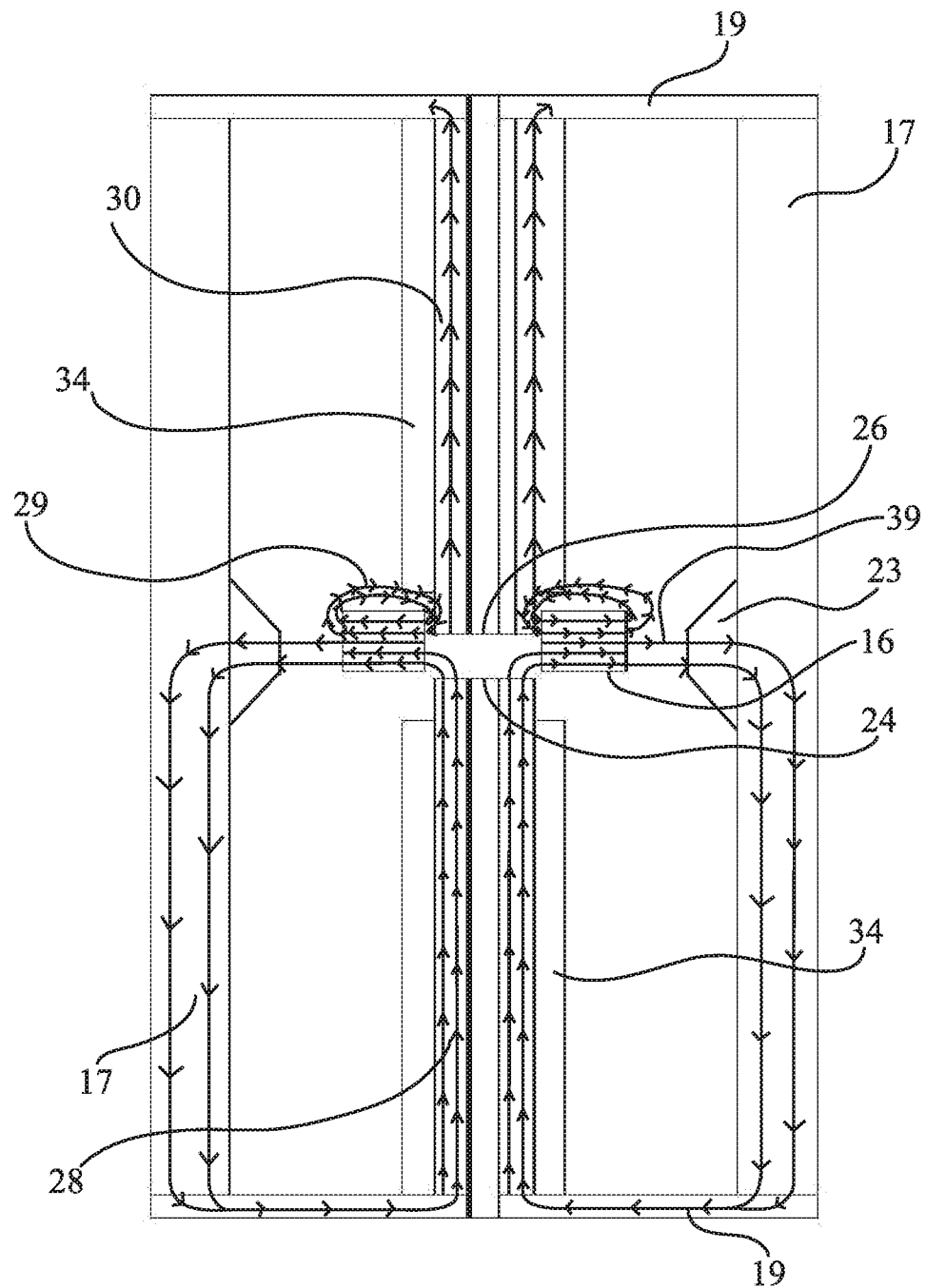
FIG. 2E is a view of the magnetic flux path of one embodiment, when the shuttle is acted upon by an electromagnetic coil in the presence of a ring plate.

Referring now also to FIG. 2E, a ring plate 23 may optionally be used to assist in switching the position of the shuttle 16. In an example, the ring plate 23 may be disposed around the shuttle 16 such that its inner edge 27 is in close proximity to the shuttle 16 in either sealing position. When the first pressure post 28 and the second pressure post 30 are energized such that they induce the shuttle 16 to switch sealing positions, the ring plate 23 may help to focus the magnetic flux from the first pressure post 28 and the second pressure post 30 more effectively through the fasteners 17 and the outer plates 19 to assist in attracting one side of the shuttle 16 and repelling the opposite side of the shuttle 16. This may assist in the shuttle 16 switching positions.

Figure 2G:
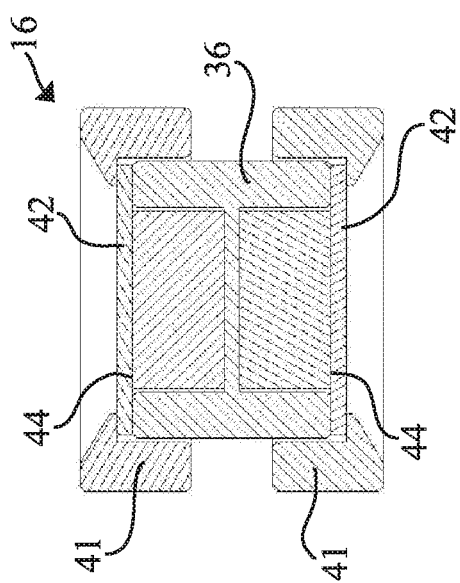
FIG. 2G is a cross-sectional view of the shuttle of FIG. 2F, showing mechanical retainers.
Figure 2F:
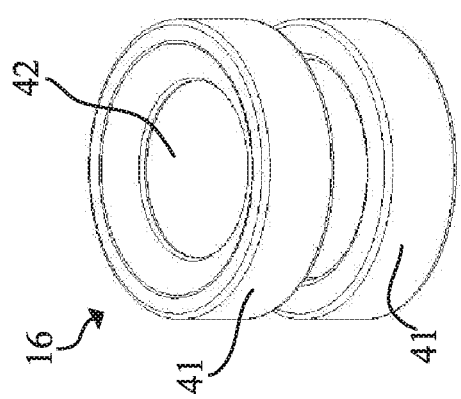
FIG. 2F is a perspective view of one embodiment of a shuttle having mechanical retainers.

Referring now to FIGS. 2F and 2G, the shuttle 16 may optionally include layers of elastomer 42, which in an example are retained to the magnet faces 44 through mechanical retainers 41. Magnetic force from each of the pressure posts may help to maintain alignment of the shuttle and may not require the use of any guide elements.

Figure 3B:
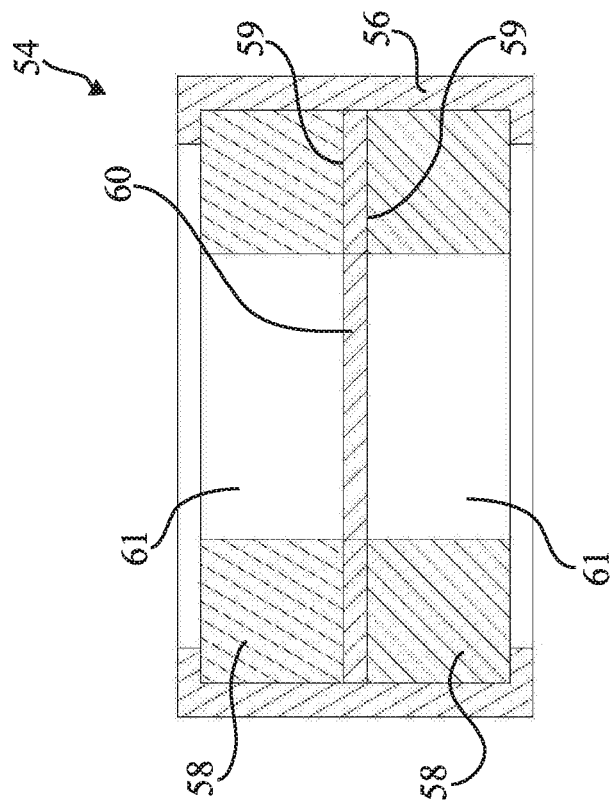
FIG. 3B is a cross-sectional view of the shuttle of FIG. 3A.
Figure 3A:
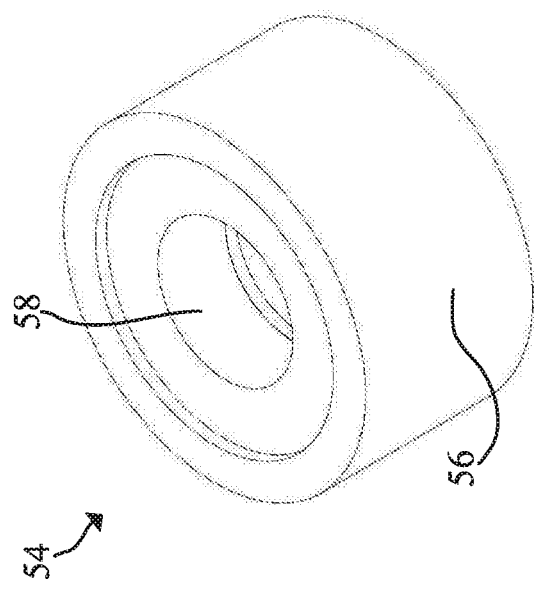
FIG. 3A is a perspective view of one embodiment of a shuttle showing two stacked ring magnets.

Referring now also to FIGS. 3A and 3B, the shuttle 54 may optionally include a carrier 56 and two ring magnets 58, aligned concentrically and oriented back-to back with their opposing faces 59 having the same polarity. As such, the two ring magnets 58 exhibit a repelling force against each other. A layer of elastomer 60 or other material may also be disposed between the two ring magnets 58, so that the central aperture 61 of one ring magnet is separated from the central aperture of the other.

Figure 4D:
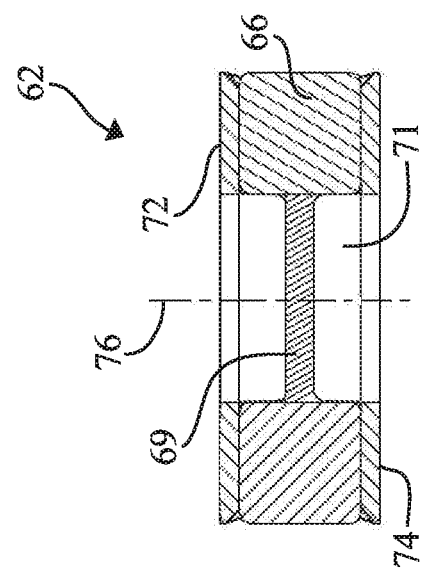
FIG. 4D is a cross-sectional view of one embodiment of a shuttle showing radially-oriented magnets.
Figure 4C:
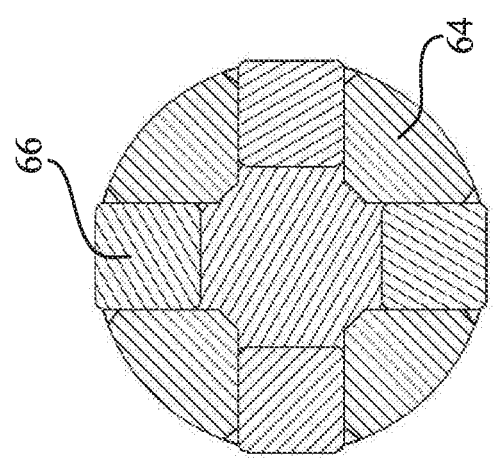
FIG. 4C is a top cross-sectional view of the shuttle of FIG. 4A.

Referring to FIGS. 4A and 4B, another example of the shuttle 62 may include a carrier 64, with a plurality of magnets 66 arranged radially around a central axis 76. Two central guide cavities 70 are aligned coaxially with the central axis 76, one extending to a top surface 72 and the other extending to a bottom surface 74. Each radially-oriented magnet 66 is arranged to have a magnetization vector through its thickness, giving the shuttle 62 an overall radial magnetization vector. Optionally, the shuttle 62 may further include a layer of elastomer 68 or other material disposed in each of the central guide cavities 70. In some embodiments, and as shown in FIG. 4D, two central guide cavities 70 may be formed by positioning a layer of elastomer 69 in a central channel 71 that extends through the entire thickness of the shuttle 62 such that the elastomer 69 bisects the channel 71 and fluidically separates the top surface 72 from the bottom surface 74.

Figure 5B:
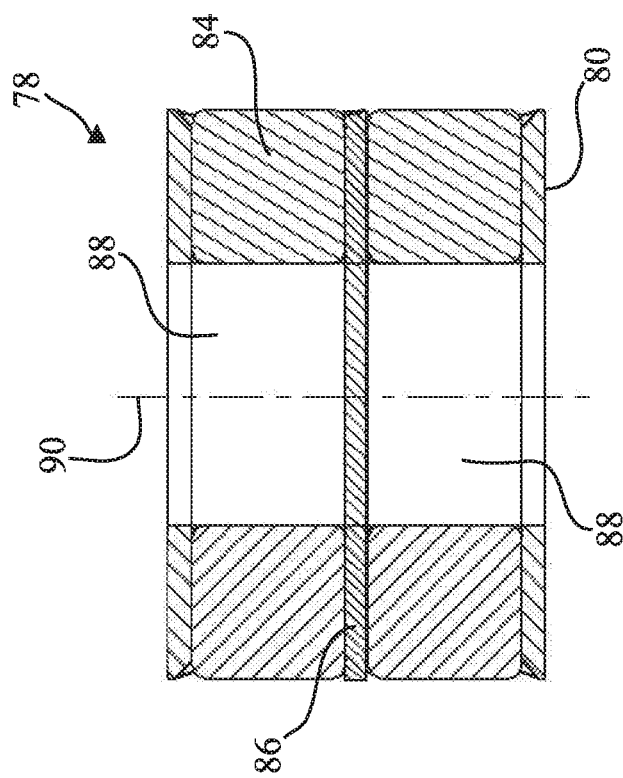
FIG. 5B is a cross-sectional view of the shuttle of FIG. 5A.
Figure 5A:
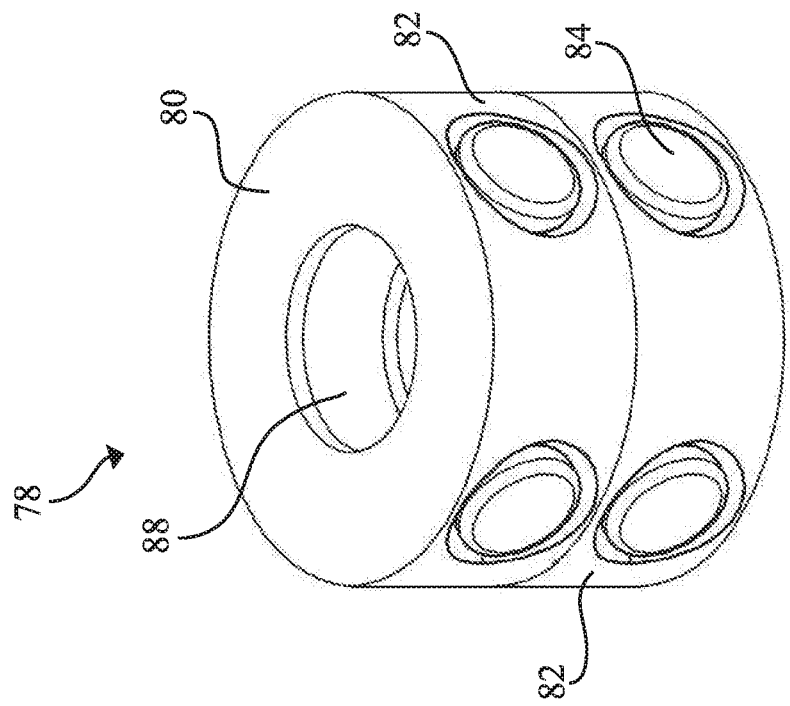
FIG. 5A is a perspective view of one embodiment of a shuttle showing radially-oriented magnets in a stacked pattern.

Referring to FIGS. 5A and 5B, in another example, the shuttle 78 may include a carrier 80, comprising two or more concentrically-stacked layers 82, each having a plurality of magnets 84 arranged radially around a central axis 90. Each radially-oriented magnet 84 is arranged to have a magnetization vector through its thickness, thereby giving the shuttle 78 an overall radial magnetization vector. The shuttle 78 may include a central cavity 88 disposed along the central axis 90 and extending through the entire thickness of each layer 82. Optionally, the shuttle 78 may include a layer of elastomer 86 positioned between each of the concentrically-stacked layers 82 and fluidically separating the central cavity 88 of one layer 82 from the central cavity 88 of another layer 82.

Figure 5C:
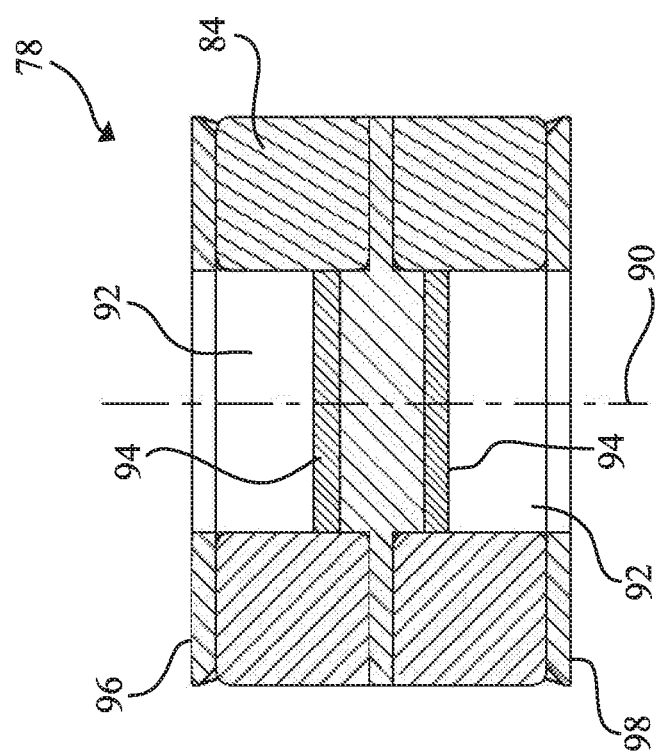
FIG. 5C is another cross-sectional view of the shuttle of FIG. 5A.

Referring now to FIG. 5C, in some examples, the shuttle 78 may include two central guide cavities 92, aligned coaxially with a central axis 90, one extending into a top surface 96 of the shuttle 78, and the other extending into a bottom surface 98 of the shuttle 78. Optionally, the shuttle 78 may also include a layer of elastomer 94 positioned in each of the two central guide cavities 92.

In an alternate example, the shuttle 78 shown in FIGS. 5A and 5B may comprise two shuttles 62 as shown in FIGS. 4A-4D that have been aligned coaxially and mated together.

Figure 6A:
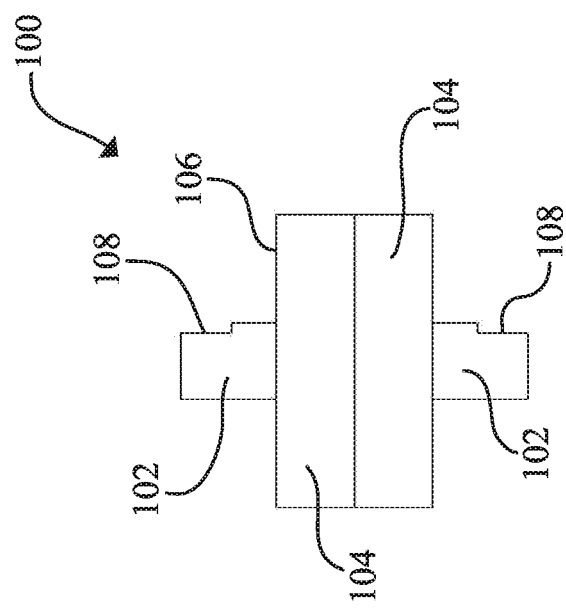
FIG. 6A is a front view of one embodiment of a shuttle having guide posts on either side of the shuttle.

Referring now to FIG. 6A, in another example, the shuttle 100 may include two magnets 104 oriented back-to-back and two posts 102 extending from the outward faces 106 of each magnet 104. Each post 102 is arranged so that when the bistable valve 13 is assembled, the posts 102 may be disposed in both the first hollow post portion 28 and the second hollow post portion 30. This may eliminate the need for guide elements in the shuttle. Optionally, each post 102 has a cutout 108 to facilitate fluid flow (pneumatic or hydraulic) from the unsealed orifice to the interior valve cavity.

Figure 6C:
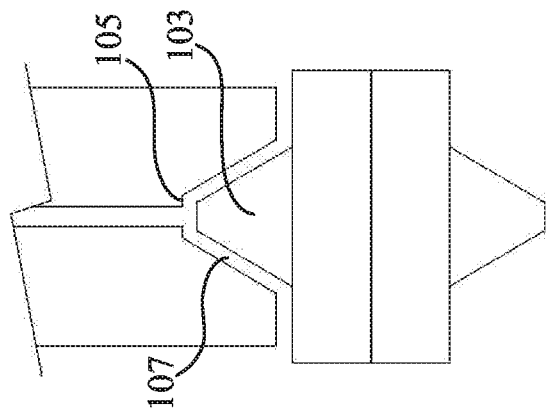
FIG. 6C is a cross-sectional view of one embodiment of a shuttle having conical elastomer guide posts.
Figure 6B:
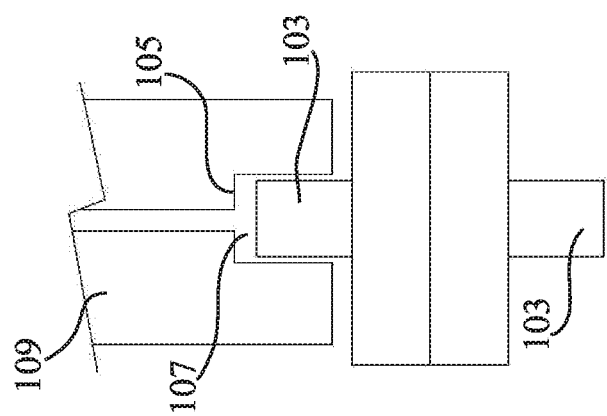
FIG. 6B is a cross-sectional view of one embodiment of a shuttle having elastomer guide posts.

As shown in FIGS. 6B and 6C, the post 103 may be constructed of an elastomer material and can seal against a shelf 105 within a cavity 107 of the applicable post 109. In another example, the elastomer post 103 shown in FIG. 6B may have a conical geometry, and seals against the shelf 105 within the cavity 107 which may be shaped to have a mating conical geometry as seen in FIG. 6C.

Figure 7:
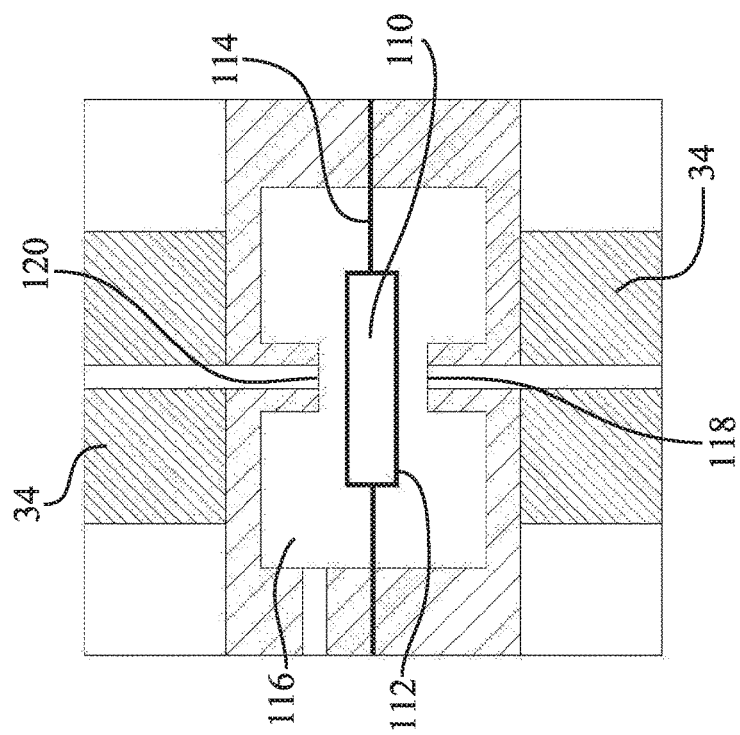
FIG. 7 is a cross-sectional view of one embodiment of a valve apparatus and system with the shuttle encased in a membrane.

Referring now to FIG. 7 in another example, the shuttle 110 may be encased in a flexible membrane portion 112 and suspended or held in place by a membrane portion 114 in an interior valve cavity 116. The membrane portion 114 optionally may be perforated or fenestrated to allow pressure equalization in the interior valve cavity 116. Alternatively, the membrane portion 112 encasing the shuttle 110 may not be perforated or fenestrated, and may act as a seal to prevent fluid communication between the interior valve cavity 116 and either a first pressure orifice 118 or a second pressure orifice 120. In an alternative construction, the membrane may be sandwiched between halves of the shuttle instead of enveloping the shuttle 110.

Figure 8:
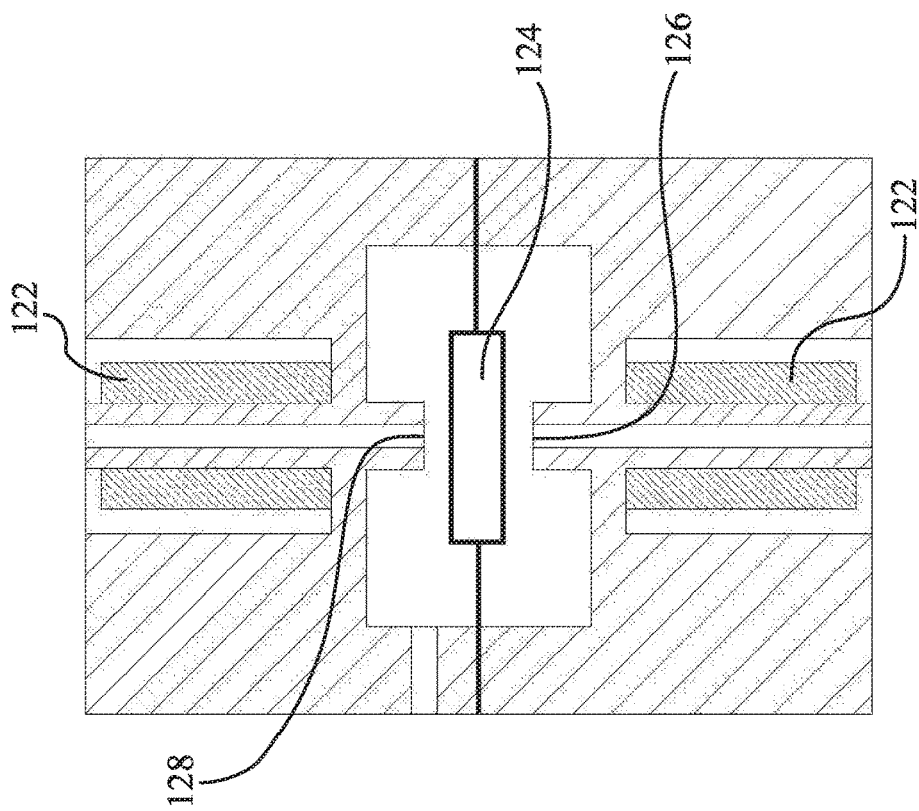
FIG. 8 is a cross-sectional view of one embodiment of a valve apparatus and system including stacked electromagnetic coil geometry.

Referring now to FIG. 8, a cross-sectional view showing another example of the shuttle 124 is shown. In this example, the shuttle 124 is actuated to seal either a first pressure orifice 126 or a second pressure orifice 128 through the use of traditional wound-coil electromagnets 122 instead of flat circuit board-based electromagnetic coils 34.

Figure 9C:
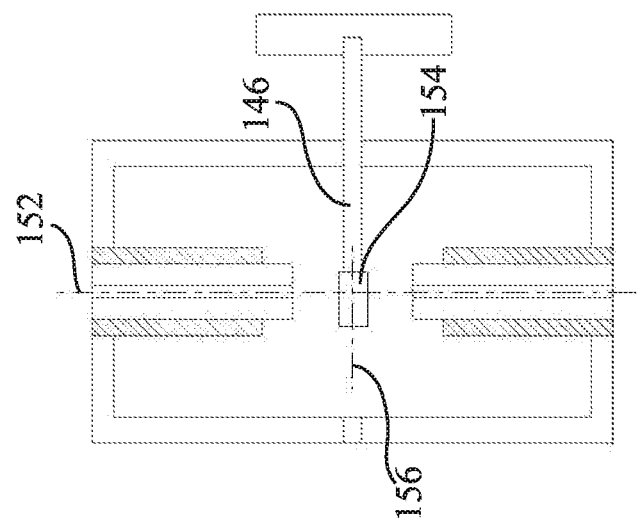
FIG. 9C is a cross-sectional view of another embodiment of a valve apparatus and system, using a radially-oriented magnet in conjunction with a cantilever armature.
Figure 9B:
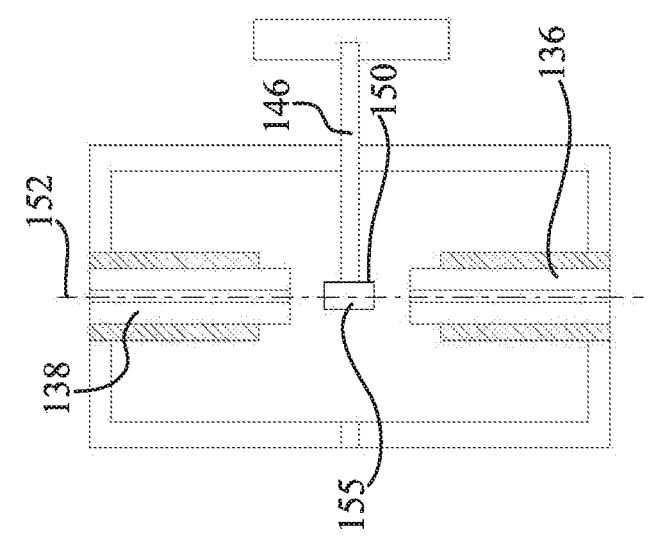
FIG. 9B is a cross-sectional view of one embodiment of a valve apparatus and system, using an axially-oriented magnet in conjunction with a cantilever armature.
Figure 9A:
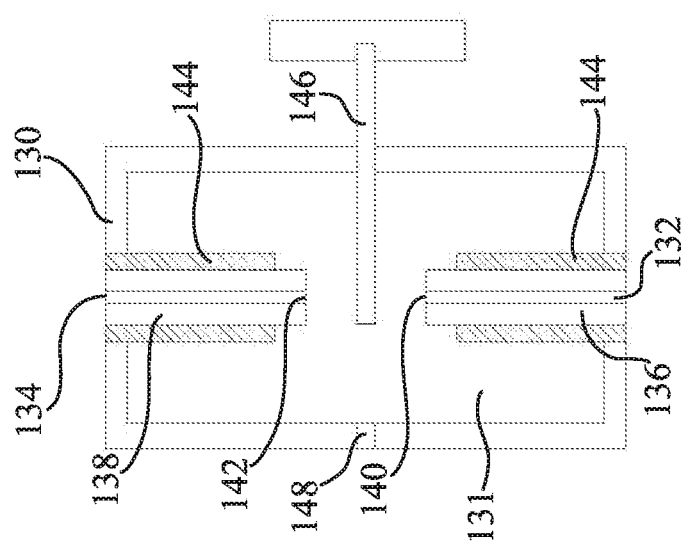
FIG. 9A is a cross-sectional view of one embodiment of a valve apparatus and system, utilizing a cantilever armature instead of a shuttle.

As shown in FIG. 9A, a valve manifold 130 may include an interior valve cavity 131, a first pressure inlet 132, a second pressure inlet 134, a cantilever armature 146 constructed of a ferrous or magnetic material, at least two electromagnetic coils 144, and a common output orifice 148. The first pressure inlet 132 may include a first pressure post 136, which optionally may be constructed of a ferrous material, and extends into the interior valve cavity 131, the interior wall of the first pressure post 136 defining a first pressure orifice 140. The first pressure post 136 may be hollow so that the first pressure inlet 132 is in fluid communication with the interior valve cavity 131 via the first pressure orifice 140. The second pressure inlet 134 may include a second pressure post 138, which optionally may be constructed of a ferrous material, and extends into the interior valve cavity 131 substantially opposite of the first pressure post 136, the interior wall of the second pressure post 138 defining a second pressure orifice 142. The second pressure post 138 may be hollow so that the second pressure inlet 134 is in fluid communication with the interior valve cavity 131 via the second pressure orifice 142. The cantilever armature 146 may extend into the interior valve cavity 131 so that it is disposed between the first pressure orifice 140 and the second pressure orifice 142.

A first electromagnetic coil 144 may be positioned around the first pressure post 136 so that when the coil 144 conducts a current, it energizes the first pressure post 136, exerting an attractive force on the cantilever armature 146. A second electromagnetic coil 144 may be positioned around the second pressure post 138 so that, when the coil 144 conducts a current, it energizes the second pressure post 138, exerting an attractive force on the cantilever armature 146.

The cantilever armature 146 may be either sealed against the first pressure orifice 140 in a first position, or sealed against the second pressure orifice 142 in a second position. In each sealing position, the armature 146 is held in place by a continuous magnetic attraction from the armature 146 to either the energized first pressure post 136 or the energized second pressure post 138, respectively, blocking fluid communication between the interior valve cavity 131 and the corresponding first pressure orifice 140 or the second pressure orifice 142. To switch the armature 146 from sealing against the first pressure orifice 140 to sealing against the second pressure orifice 142, the electromagnetic coil 144 positioned around the first pressure post 136 ceases to be energized and the electromagnetic coil 144 positioned around the second pressure post 138 is energized so that it applies a magnetic force to the second pressure post 138 sufficient to attract the armature 146 against the second pressure orifice 142. Similarly, to switch the armature 146 from sealing against the second pressure orifice 142 to sealing against the first pressure orifice 140, the electromagnetic coil 144 positioned around the second pressure post 138 ceases to be energized and the electromagnetic coil 144 positioned around the first pressure post 136 is energized so that it applies a magnetic force to the first pressure post 136 sufficient to attract the armature 146 against the first pressure orifice 140.

Referring now to FIG. 9B, the valve assembly shown in FIG. 9A further includes a magnet 150 disposed on the cantilever armature 146 with the magnetic force vector 155 substantially aligned with an axis 152 defined by the first pressure post 136 and the second pressure post 138. In an example, the valve system shown in FIG. 9B may function as a bistable valve so that the electromagnetic coils do not need to continuously energize the pressure post 136, 138 having the currently-sealed pressure orifice. The armature 146 is held against the sealed orifice 140, 142 through a static magnetic attraction with the magnet 150.

Referring now to FIG. 9C, the valve assembly shown in FIG. 9A further includes a magnet 154 disposed on the cantilever armature 146 with the magnetic force vector 156 substantially perpendicular to the axis 152. The arrangement in FIG. 9C may also function as a bistable valve.

In some embodiments, the valve may be actuated by passing a current through an electromagnetic coil, whose magnetic flux acts on a ferro fluid.

In various embodiments, the bistable valve may be actuated by a plurality of arrays in which a first array comprises a row of alternating polarity magnets, disposed adjacent to a second array comprising a row of alternating ferrous and non-ferrous material such that in one stable position, the ferrous material allows conductance of one polarity of the magnets, and in a second stable position, the arrays have shifted so the ferrous material allows conductance of the opposite polarity of the magnets. Depending on the magnetic polarity being conducted by the ferrous material, an adjacent ferrous or magnetic body is either pushed towards or pulled away from the plurality of arrays. It is this action on the ferrous body that causes a first stable position in the valve to occur or a second stable position in the valve to occur. By suspending the ferrous or magnetic body in an over-molded elastomer, a seal against one or more orifices can be obtained in either position. The arrays may be shifted by running a current through a plurality of piezoelectric crystals attached to each array. Alternatively, the arrays may be shifted by other means/mechanisms/devices such as, for example, one or more of the following: servos, motors, solenoids, hydraulic means, pneumatic means, and/or NITINOL wire.

Optionally, the action of the above magnetic body may be used to compress fluid in a closed system against a thin membrane that will then deform into a bubble-like geometry. This action may be used to actuate a valve by sealing the deformed membrane against an orifice in one position and allowing fluid communication through the orifice in another, non-deformed geometry.

In another example, the valve may be actuated using an electroactive polymer. When current is passed through the electroactive polymer, the polymer may expand in one direction while compressing in another direction and allow an attached seal to separate from a valve orifice. This separation allows fluid communication through the valve from that orifice. Terminating current flow through the electroactive polymer allows the electroactive polymer to return to its original shape, expanding in the direction in which it previously compressed, and causing the attached seal to return to the valve orifice, blocking fluid communication from that orifice. Energizing the electroactive polymer may be accomplished by overmolding electrodes into contact with the electroactive polymer. In some examples, the electroactive polymer may be energized through the use of etched or printed electrodes oriented flat against the electroactive polymer. Multiple layers of these electrodes may be used to achieve optimal control of the electroactive polymer.

FIG. 10A shows a perspective view of a plurality of bistable valves 13 arranged in an array 158, wherein a valve manifold 20 incorporates the plurality of bistable valves 10. FIG. 10B shows a top view of a circuit board 18 comprising multiple electromagnetic coils 34 for use in an arrangement of bistable valves 13 arranged in an array 158 as shown in FIG. 10A. FIG. 10C shows a cross-sectional view showing a plurality of bistable valves 13 arranged in a valve array 158 and utilizing a common valve manifold 20, wherein the valve manifold 20 includes multiple interior valve cavities 32.

Optionally, the electromagnetic coils 34 may be mounted in a flexible circuit board instead of a rigid circuit board. Each of the valve arrays may include two or more bistable valves.

Figure 11A:
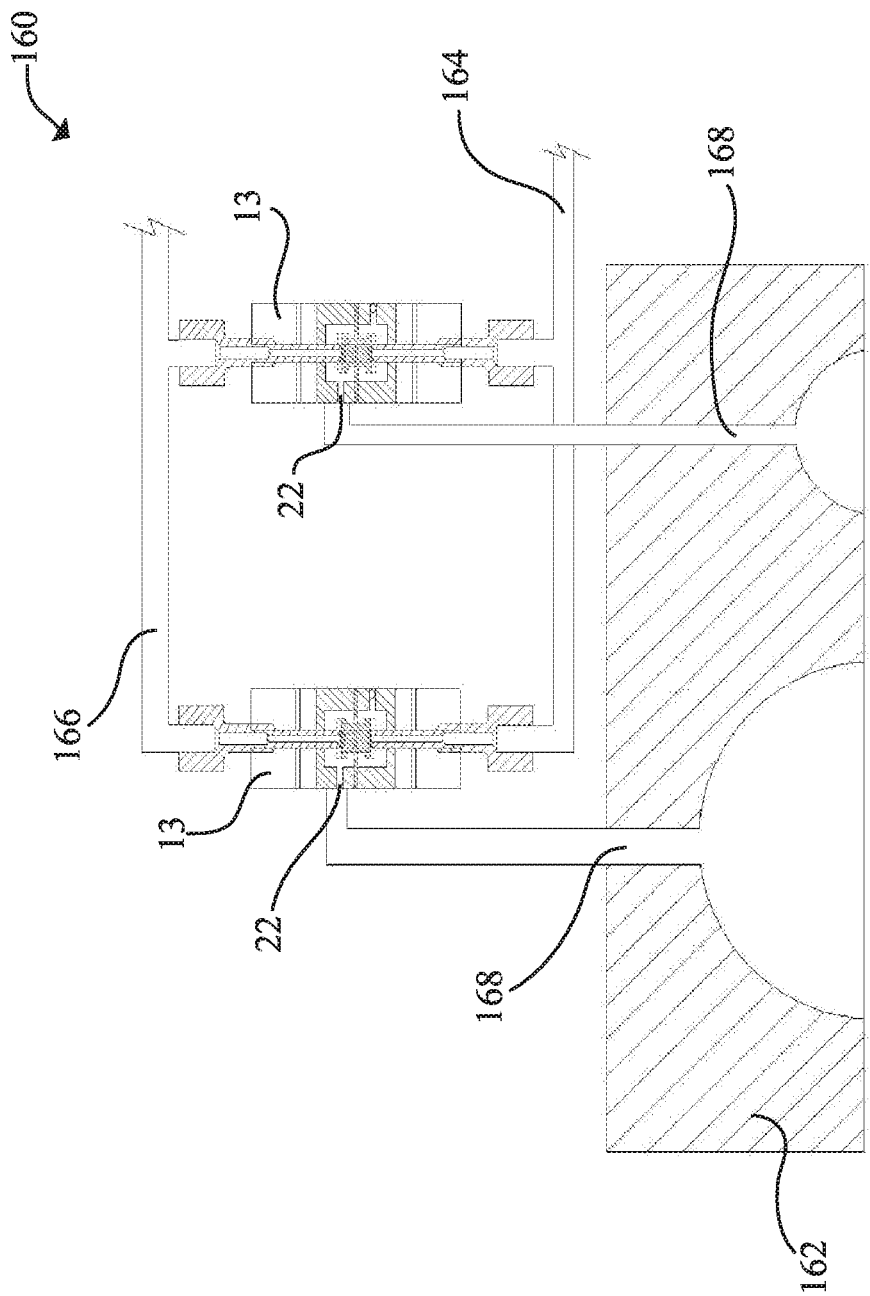
FIG. 11A is a cross-sectional view of one embodiment of a valve apparatus and system integrated into a pumping system.

Referring now to FIG. 11A, one or more bistable valves 13 may be integrated into a liquid flow control system 160. The bistable valve 13 may be connected to a system manifold 162 in a vertical orientation such that the common output orifice 22 is in fluid communication with the flow control system pressure input 168. The flow control system 160 is connected to a first pressure source 164 and a second pressure source 166 for use in the bistable valve 13, for example, as shown in FIGS. 1A-1D. The first pressure source 164 and the second pressure source 166 may be integrated into a system manifold 162, or may be standalone components to which the flow control system 160 can connect, or from which it can be disconnected. In an embodiment, either the first pressure source 164, the second pressure source 166, or both may provide a common source of pressure to a plurality of valves (e.g., bistable valves 13) integrated into a system manifold 162.

Figure 11B:
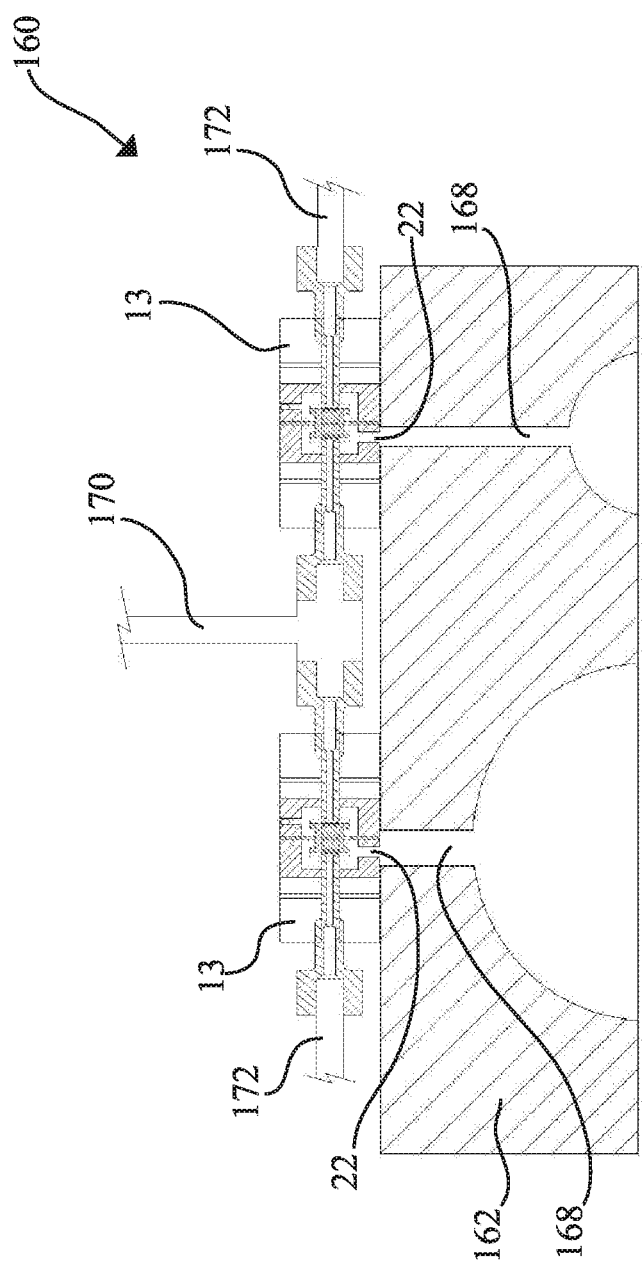
FIG. 11B is a cross-sectional view of another embodiment of a valve apparatus and system integrated into a pumping system.

As shown in FIG. 11B, at least one bistable valve 13 may be integrated into a liquid flow control system 160, or two or more bistable valves 13 may be integrated into the system 160. The bistable valve 13 may be positioned in a horizontal orientation and directly connected to the system manifold 162 so that the common output orifice 22 is in direct fluid communication with the liquid flow control system's pressure input 168. The system 160 may further include a first pressure source 170 and a second pressure source 172 for connection to the bistable valve 13 as shown in FIGS. 1A-1D. The first pressure source 170 and the second pressure source 172 may be integrated into the system manifold 162, or may be arranged as common lines to which individual valve modules or manifold modules can be connected. Either the first pressure source 170, the second pressure source 172, or both may serve as a common pressure source for one or a plurality of bistable valves 13 integrated into the system 160.

Figures 12A, 12B:
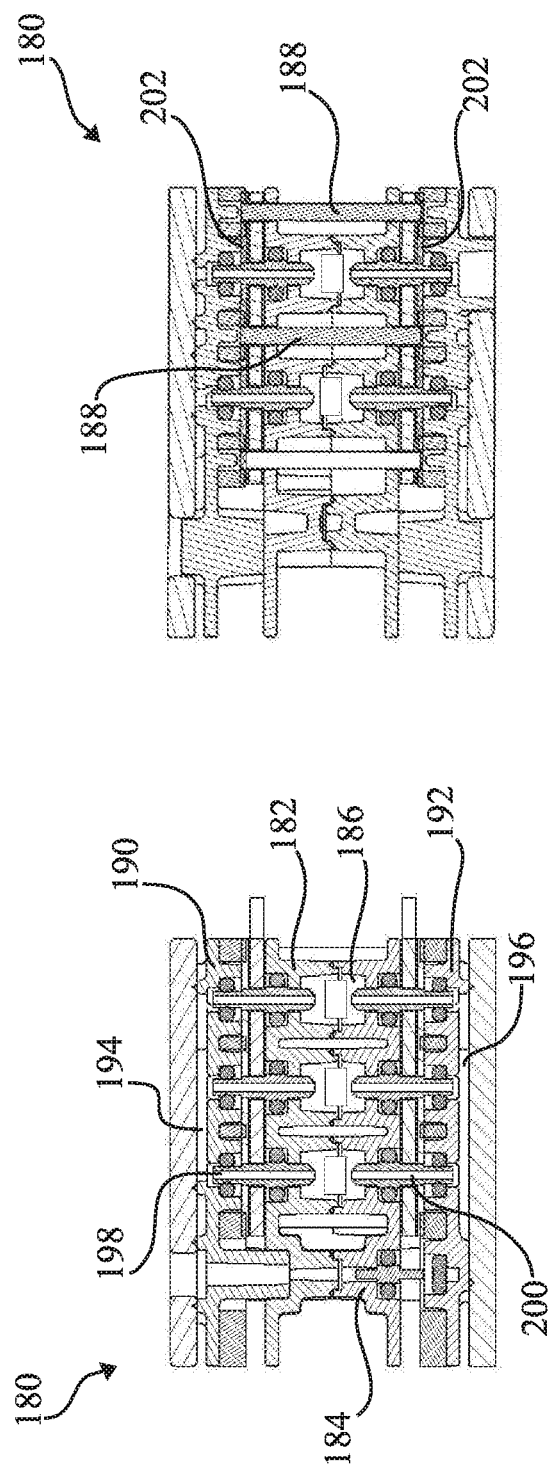
FIG. 12A is a cross-sectional view of one embodiment of a valve apparatus and system arranged in an array.
FIG. 12B is another cross-sectional view of one embodiment of a valve apparatus and system arranged in an array.

Referring now to FIGS. 12A and 12B, a plurality of bistable valves 13 may be arranged in an array 180. This array 180 utilizes common components between the plurality of bistable valves 13, such as a valve manifold comprising an first manifold half 182 and a second manifold half 184. The first and second manifold halves 182, 184 define multiple interior valve cavities 186, each interior valve cavity 186 corresponding to one bistable valve assembly. Other common components may include a first track 190 including a first track pressure rail 194 and a second track 192 including a second track pressure rail 196. The first track pressure rail 194 provides the same pressure input to each of the first set of pressure input posts 198, each such pressure input post 198 connecting to one of the plurality of bistable valves 13 in the array 180. Similarly, the second track pressure rail 196 provides the same pressure input to each of the second set of pressure input posts 200, each such pressure input post 200 connecting to one of the plurality of bistable valves 13 in the array 180. As seen in FIG. 12B, adjacent bistable valves 13 optionally may further share common fasteners 188 constructed of a ferrous material, the fasteners being integral to the magnetic return path in the function of each bistable valve 13 in the array 180.

In various embodiments, the first manifold half 182 and second manifold half 184 may be ultrasonically welded together, for example, to create an airtight union between the two. Similarly, each of the first track 190 and the second track 192 may be ultrasonically welded together to create an airtight union around the respective first track pressure rail 194 and second track pressure rail 196. The valve manifold and each of the first track 190 and second track 192 components may then be joined to each other using laser welding or other methods.

As seen in FIG. 12B, the assembly optionally may include an outer plate 202 constructed of a ferrous material. First and second outer plates 202 may be connected by a plurality of common fasteners 188, which also may comprise a ferrous material.

Figure 13:
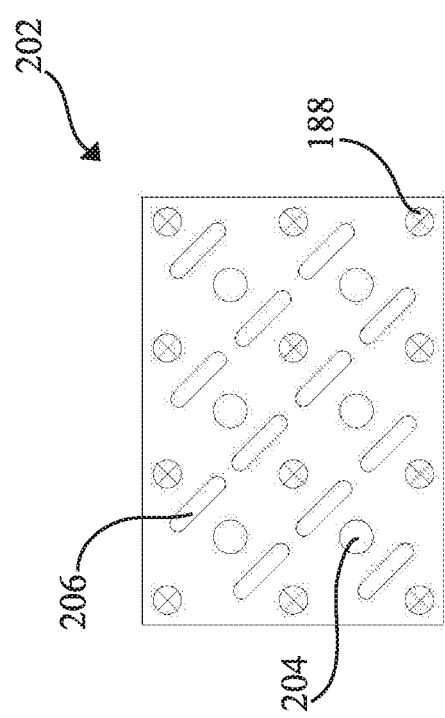
FIG. 13 is a top view of an outer plate for use in an array geometry embodiment.

Referring now to FIG. 13, an outer plate 202 optionally may be fastened to an array 180 of bistable valves. In the example shown, a plurality of fasteners 188 surrounds each pressure post 204 of each valve in the array. Optionally, each outer plate 202 may also include a plurality of directional slits 206. The directional slits 206 can be arranged so that the magnetic flux paths of two adjacent valves are directed towards different fasteners 188 to help isolate each valve's function when adjacent valves are actuated simultaneously. In an exemplary implementation, the actuation of adjacent valves can be staggered to optimize each valve's magnetic flux path flow.

Figure 14A:
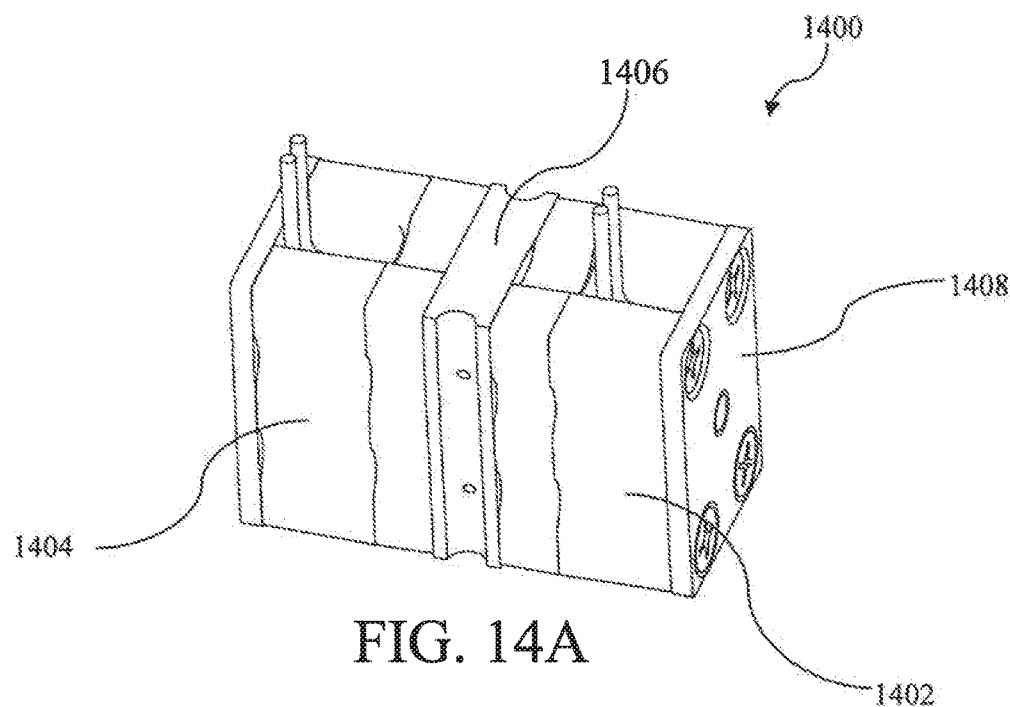
FIGS. 14A-14C are a perspective view and two cross-sectional views of an embodiment of a valve apparatus.
Figure 14B:
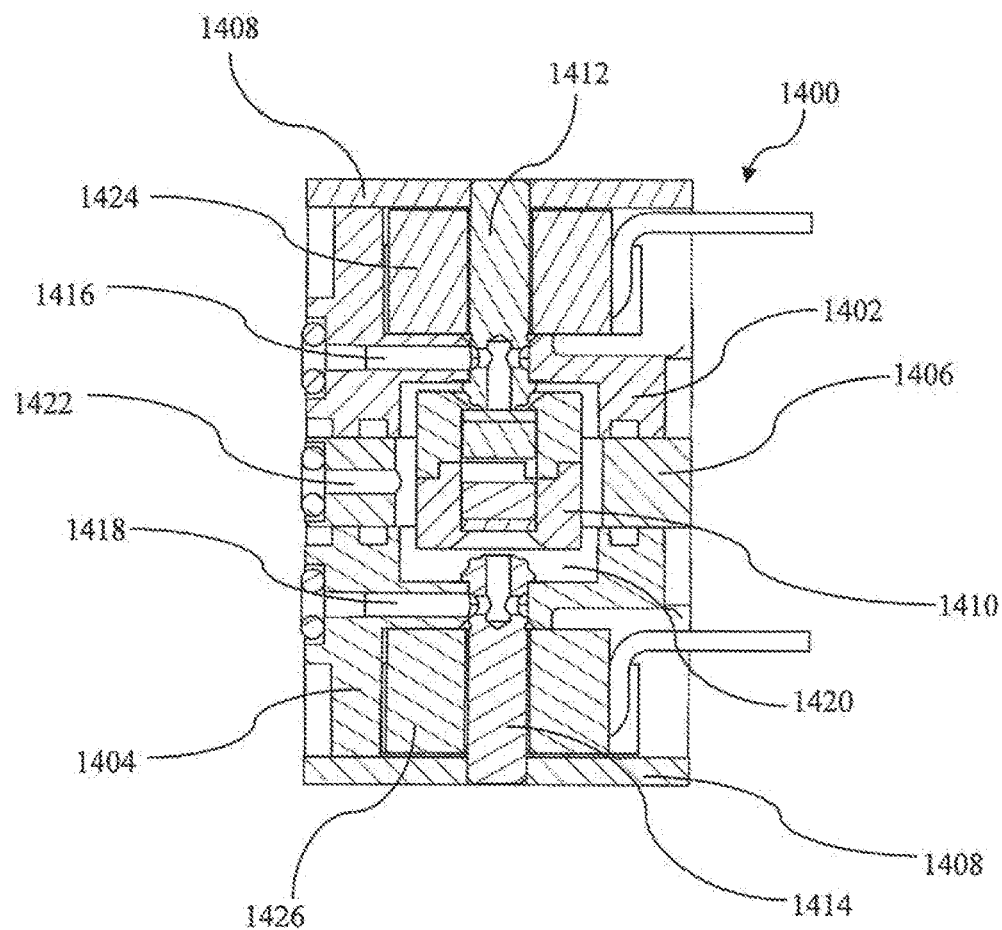
Figure 14C:
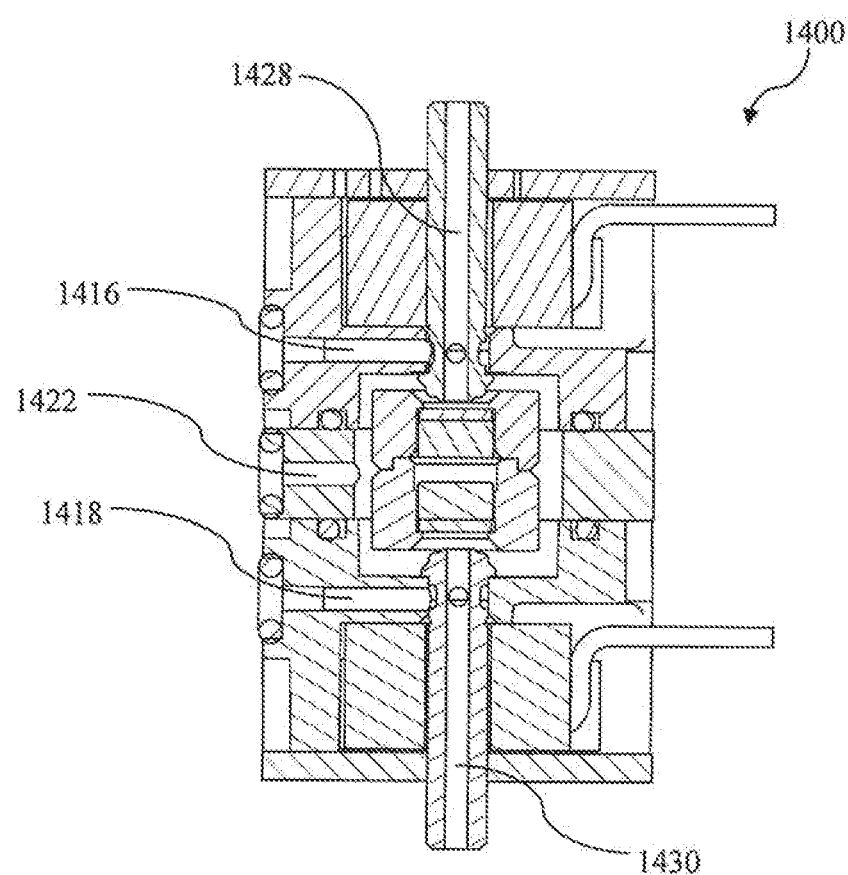

Referring now to FIGS. 14A-14C, another embodiment of a bistable valve 1400 structure is shown. The valve 1400 includes an interior valve cavity 1420 defined by a first housing 1402, a second housing 1404, and a midbody 1406. Additionally, the valve 1400 includes a plurality of end plates 1408, a shuttle 1410, a first post 1412, a second post 1414, first pressure inlet 1416, a second pressure inlet 1418, and a common output orifice 1422. Further, the bistable valve 1400 includes a first electromagnetic coil 1424 and a second electromagnetic coil 1426 disposed around the first and second posts 1412 and 1414, respectively. In one example, the electromagnetic coils 1424 and 1426 may be flat electromagnetic coils disposed in a printed circuit board (PCB), or they may be vertically-oriented wire coils with wire leads as shown in FIG. 14B. The common output orifice 1422 is in constant fluid communication with the valve cavity 1420, regardless of which position the valve is in. Conversely, the first and second pressure inlets 1416 and 1418 are either in fluid communication with the interior valve cavity 1420, and thus, the common output orifice 1422, or they are sealed from fluid communication with the interior valve cavity 1420 by the shuttle 1410. When one of the two pressure inlets 1416 and 1418 is in fluid communication with the interior valve cavity, the other pressure inlet is sealed by the shuttle 1410.

The first pressure inlet 1416 and the second pressure inlet 1418 may in one example extend through the same side of the valve 1400 as the common output orifice 1422, as shown in FIG. 14B. Moreover, the first and second posts 1412 and 1414 may each have an additional pressure inlet 1428 and 1430, respectively, as shown in FIG. 14C. The third pressure inlet 1428 may be in constant fluid communication with the first pressure inlet 1416, while the fourth pressure inlet may be in constant fluid communication with the second pressure inlet 1418. In some embodiments, the valve 1400 may feature a third pressure inlet 1428 and a fourth pressure inlet 1430, each extending through their respective first and second posts, without the additional first and second pressure inlets 1416 and 1418.

Figure 15A:
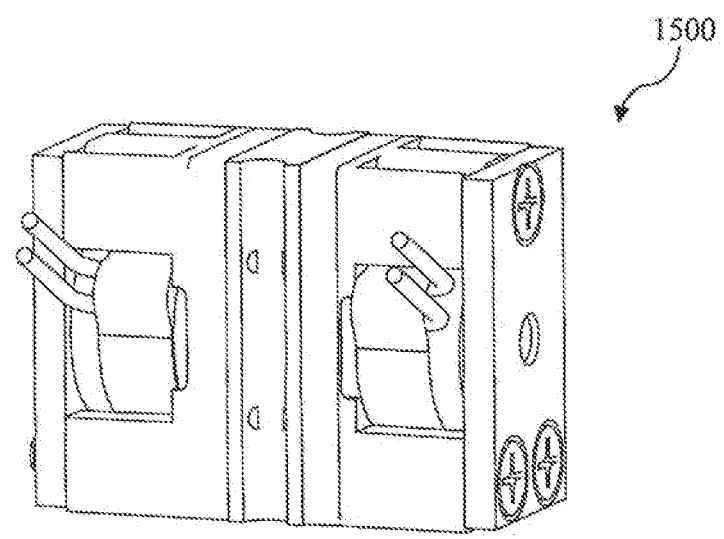
FIGS. 15A-15B are a perspective view and a cross-sectional view of an embodiment of a valve apparatus.
Figure 15B:
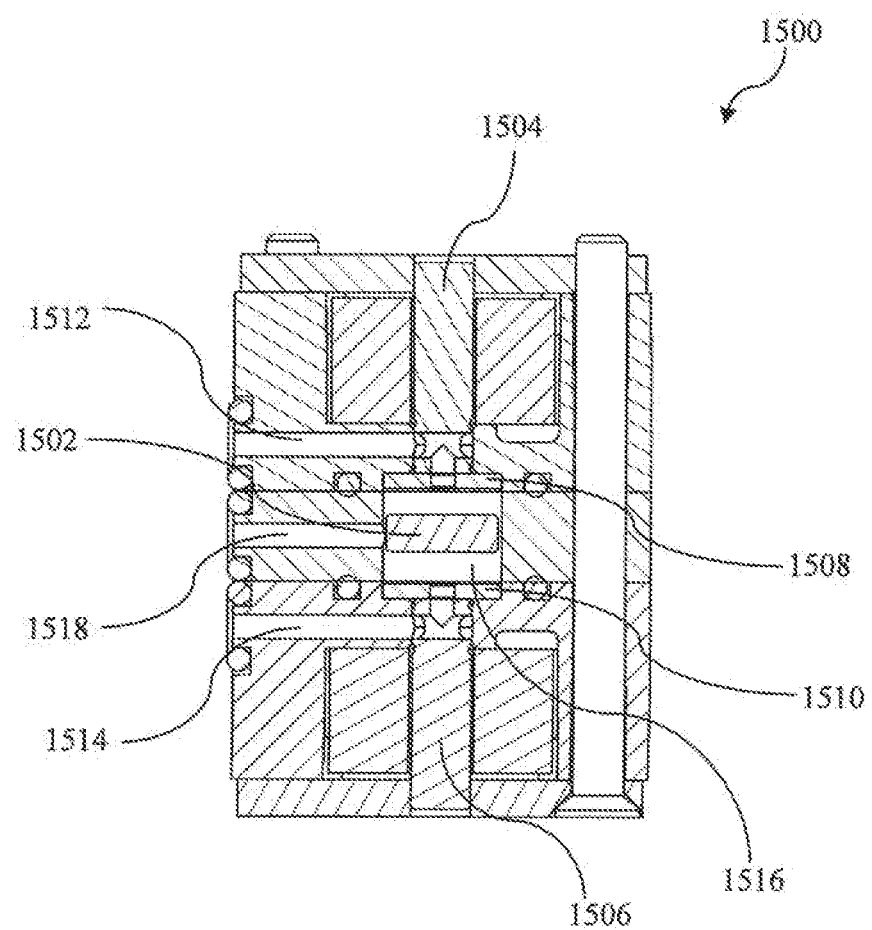

Referring now to FIGS. 15A-15B, in another example, a bistable valve 1500 may include a shuttle 1502 comprising a magnet. The valve 1500 may further include a first membrane portion 1508 abutting a first post 1504, and a second membrane portion 1510 abutting a second post 1506, the first and second membrane portions 1508 and 1510, as well as the shuttle 1502 being disposed in an interior valve cavity 1516. The first post 1504 and the first membrane portion 1508 may be configured to provide fluid communication from a first pressure inlet 1512 to the interior valve cavity 1516 when the shuttle 1502 is not sealed against the first membrane portion 1508. Similarly, the second post 1506 and the second membrane portion 1510 may be configured to provide fluid communication from a second pressure inlet 1514 to the interior valve cavity 1516 when the shuttle 1502 is not sealed against the second membrane portion 1510. A common output orifice 1518 is in constant fluid communication with the interior valve cavity 1516, regardless of which position the shuttle 1502 is in. Conversely, the first and second pressure inlets 1512 and 1514 are either in fluid communication with the interior valve cavity 1516, and thus, the common output orifice 1518, or they are sealed from fluid communication with the interior valve cavity by the shuttle 1502. When one of the two pressure inlets 1512, 1514 is in fluid communication with the interior valve cavity 1518, the other pressure inlet is sealed by the shuttle 1502.

Figure 16A:
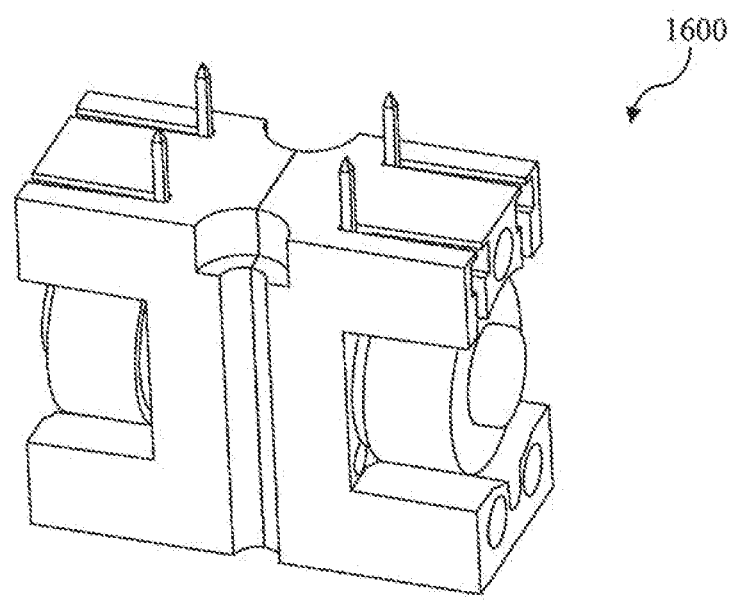
FIGS. 16A-16B are a perspective view and a cross-sectional view of an embodiment of a valve apparatus.
Figure 16B:
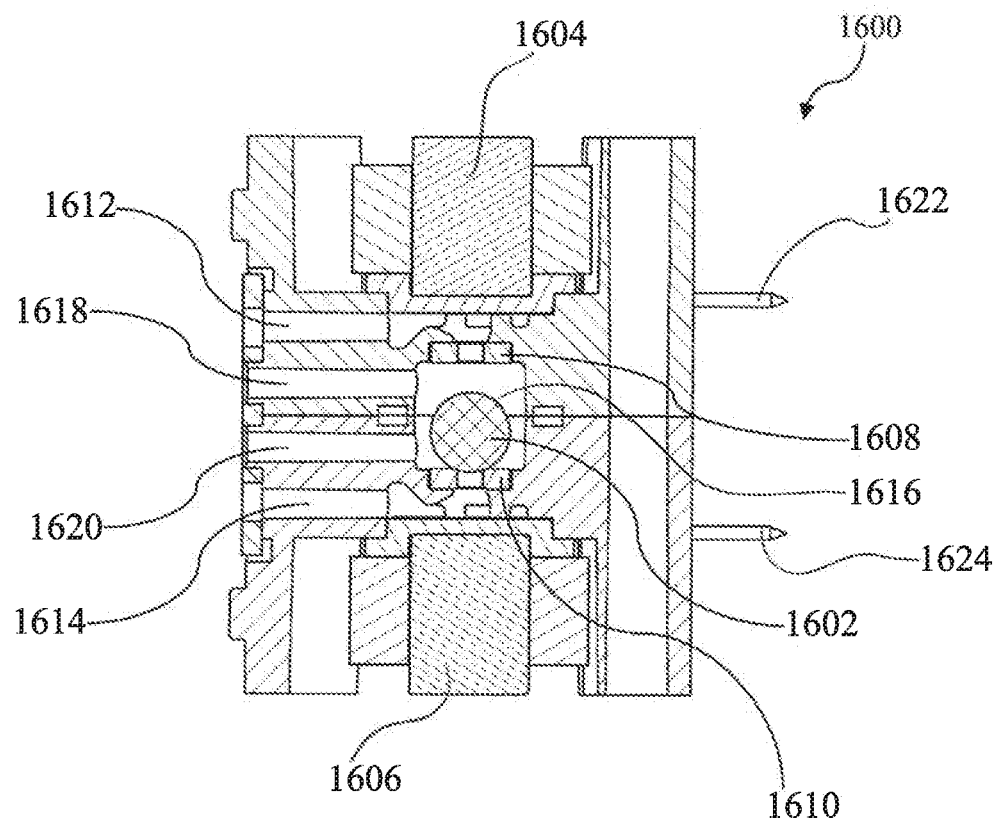

Referring now to FIGS. 16A-16B, in another example, a bistable valve 1600 may include a shuttle 1602 comprising ferrous metal. The first post 1604 and the second post 1606 are each magnets. The valve 1600 may further include a first membrane portion 1608 abutting a first post 1604, and a second membrane portion 1610 abutting a second post 1606, the first and second membrane portions 1608 and 1610, as well as the shuttle 1602 being disposed in an interior valve cavity 1616. The first post 1604 and the first membrane portion 1608 may be configured to provide fluid communication from a first pressure inlet 1612 to the interior valve cavity 1616 when the shuttle 1602 is not sealed against the first membrane portion 1608. Similarly, the second post 1606 and the second membrane portion 1610 may be configured to provide fluid communication from a second pressure inlet 1614 to the interior valve cavity 1616 when the shuttle 1602 is not sealed against the second membrane portion 1610. Output orifices 1618, 1620 are in constant fluid communication with the interior valve cavity 1616, regardless of which position the shuttle 1602 is in. Conversely, the first and second pressure inlets 1612 and 1614 are either in fluid communication with the interior valve cavity 1616, and thus, the output orifices 1618, 1620 or they are sealed from fluid communication with the interior valve cavity 1616 by the shuttle 1602. When one of the two pressure inlets 1612, 1614 is in fluid communication with the interior valve cavity 1616, the other pressure inlet is sealed by the shuttle 1602. In an exemplary implementation, as shown in FIG. 16B, the shuttle 1602 may be spherical or spheroidal and may be made from any material as described above with respect to various embodiments of the shuttle. The bistable valve 1600 may include contact terminals 1622, 1624. A spherical or spheroidal shuttle can optionally be suspended in the interior valve cavity by an elastomeric membrane similar to the embodiment shown in FIG. 7.

Referring now to FIGS. 17A-17E, a bistable valve 1700 in another example may include a shuttle 1702 comprising a magnet portion 1724. The shuttle 1702 may further include a first membrane portion 1708 configured to abut a first post 1704, and a second membrane portion 1710 configured to abut a second post 1706, the first and second membrane portions 1708 and 1710 attached to the magnet portion 1724, and the shuttle 1702 is disposed in an interior valve cavity 1716. The first and second membrane portions 1708, 1710 may be attached to the magnet portion 1724 using any type of adhesive, including, but not limited to, double sided tape, glue or other adhesive.

The first post 1704 and the first membrane portion 1708, which is attached to the magnet portion 1724, may be configured to provide fluid communication from a first pressure inlet 1712 to the interior valve cavity 1716 when the shuttle 1702 is not sealed against the first post 1704. Similarly, the second post 1706 and the second membrane portion 1710, which is attached to the magnet portion 1724, may be configured to provide fluid communication from a second pressure inlet 1714 to the interior valve cavity 1716 when the shuttle 1702 is not sealed against the second post 1706. Output orifices 1718, 1720 are in constant fluid communication with the interior valve cavity 1716, regardless of which position the shuttle 1702 is in. Conversely, the first and second pressure inlets 1712 and 1714 are either in fluid communication with the interior valve cavity 1716, and thus, the output orifices 1718, 1720 or they are sealed from fluid communication with the interior valve cavity by the shuttle 1702. When one of the two pressure inlets 1712, 1714 is in fluid communication with the interior valve cavity 1716, the other pressure inlet is sealed by the shuttle 1702. In an exemplary configuration, the shuttle 1702 may be cylindrical and may be made from any material as described above with respect to other versions of the shuttle. The bistable valve 1700 may include contact terminals 1721, 1722 as well as coils 1726, 1728, end bodies 1730, 1732, and end plates 1734, 1736 attached to the end bodies 1730, 1732.

Figure 17A:
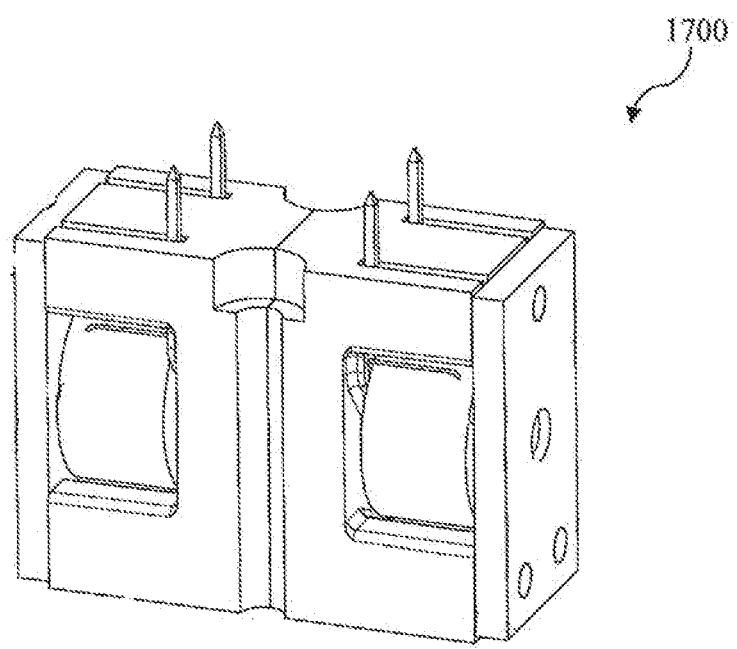
FIGS. 17A-17B are a perspective view and a cross-sectional view of an embodiment of a valve apparatus.
Figure 17B:
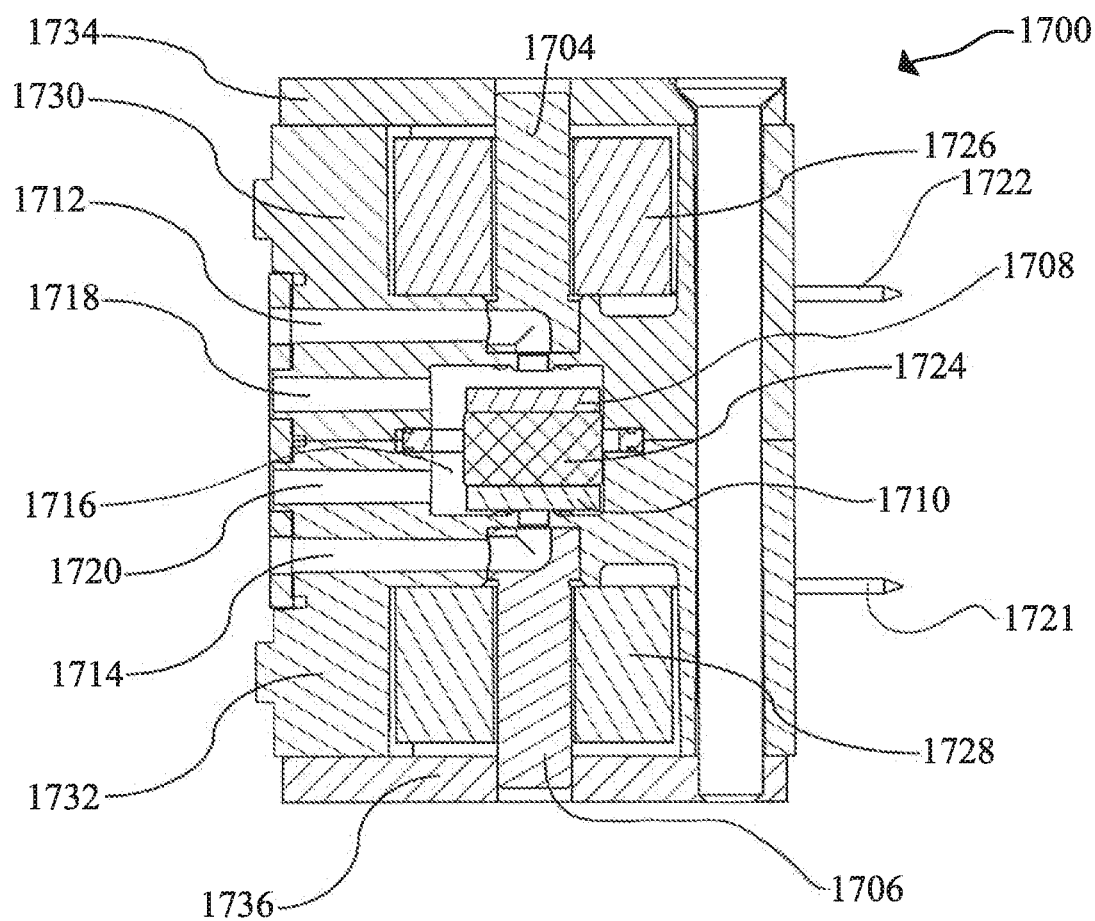
Figure 17C:
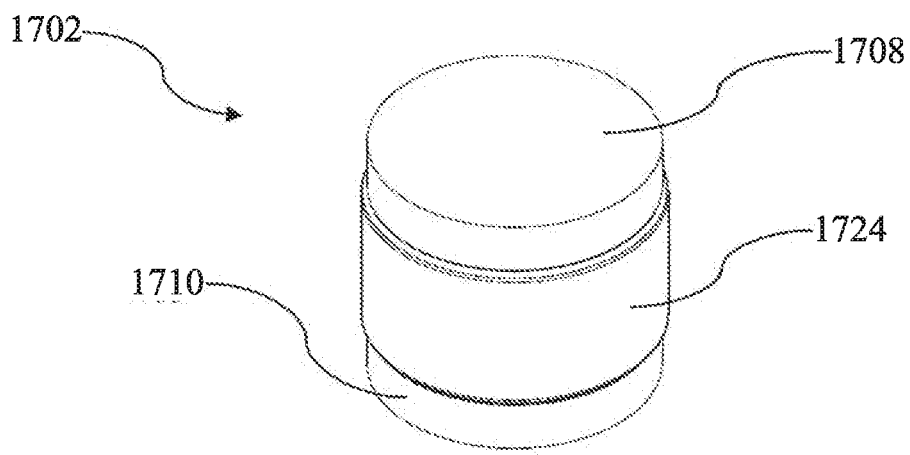
FIGS. 17C-17D are a perspective view and a cross-sectional view of a shuttle for the valve apparatus of FIGS. 17A-17B.
Figure 17D:
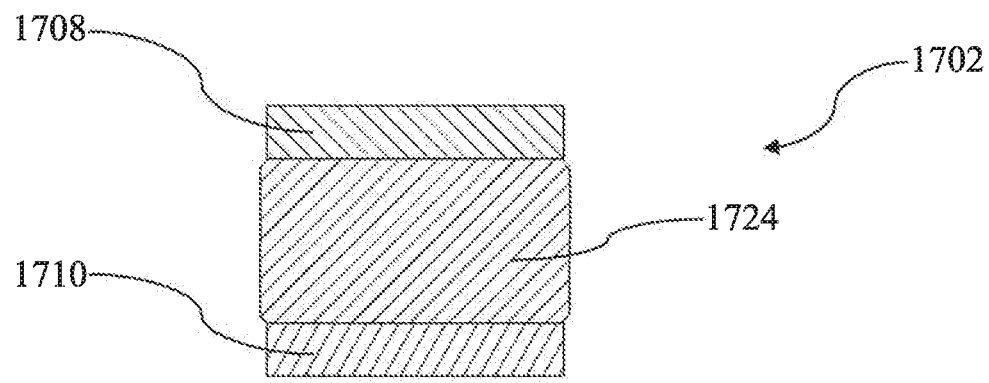
Figure 17E:
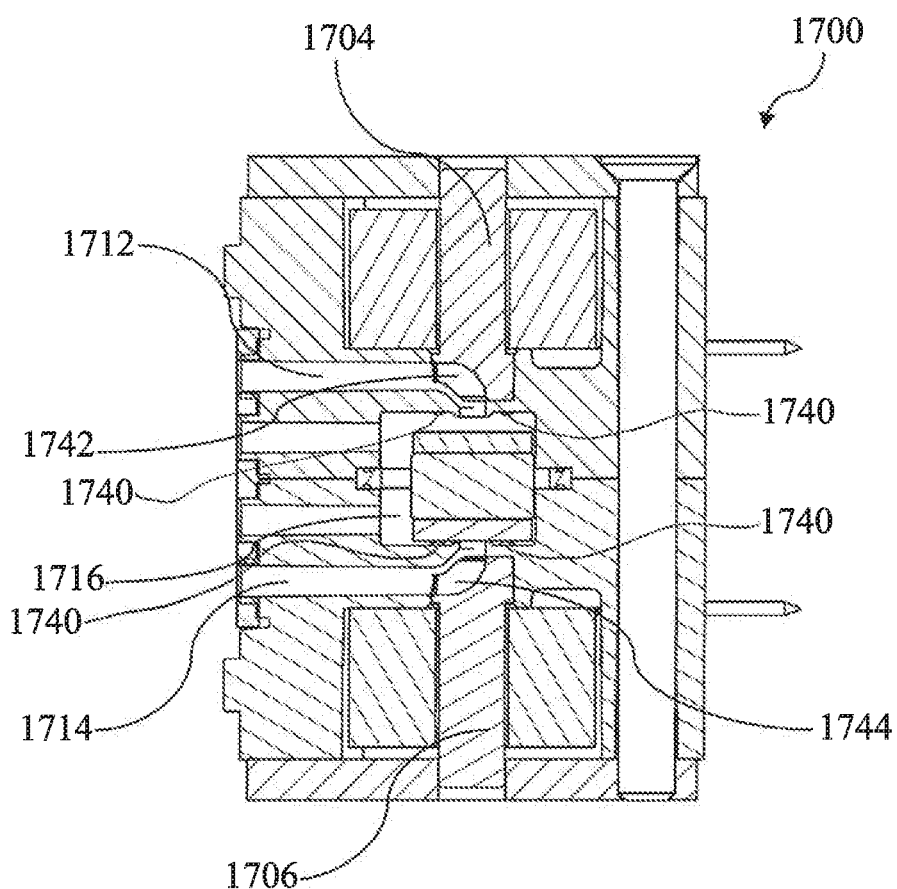
FIG. 17E is a cross-sectional view of the valve apparatus of FIGS. 17A and 17B.

The first and second posts 1704, 1706 shown in FIGS. 17B and 17E show two different configurations of pressure inlets 1712, 1714. In FIG. 17B, the first and second posts 1704, 1706 include a hole machined in, whereas, in FIG. 17E, the first and second posts 1704, 1706 include a machined groove, which is a slot and/or curve cut 1742, 1744.

Optionally, stabilizing features 1740 (FIG. 17E) may be added to the membrane and/or to the valve seat to assist in seating the shuttle properly on the valve seat. Stabilizing features may include, for example, bumps, nubs, posts, or other protuberances. Although not shown in all figures, stabilizing features may be included in any embodiment or version of a bistable valve assembly.

Figure 18A:
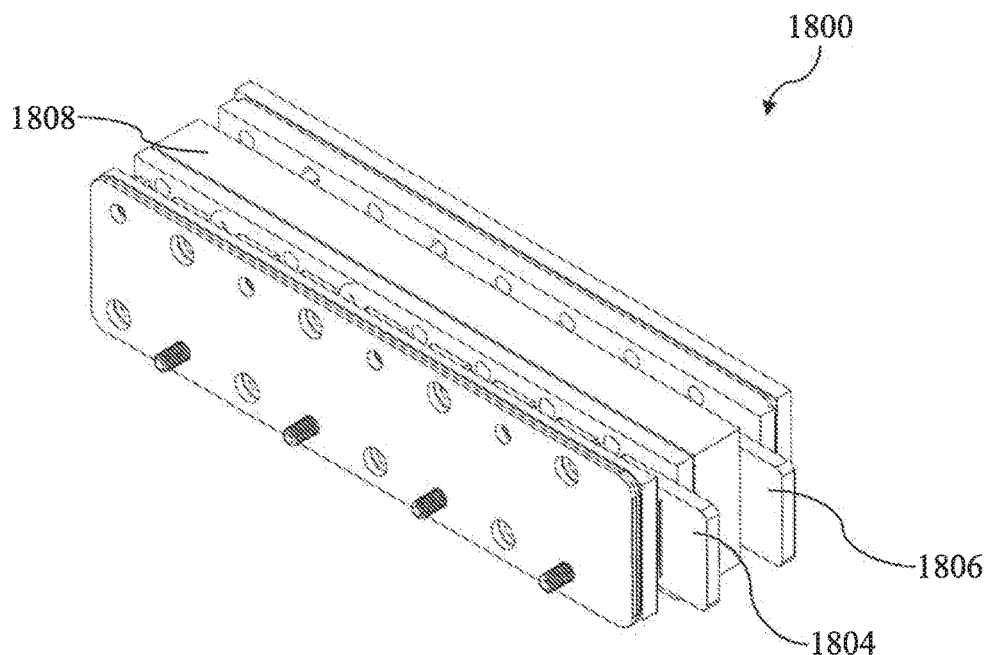
FIGS. 18A-18B are a perspective view and a cross-sectional view of an embodiment of a valve manifold.
Figure 18B:
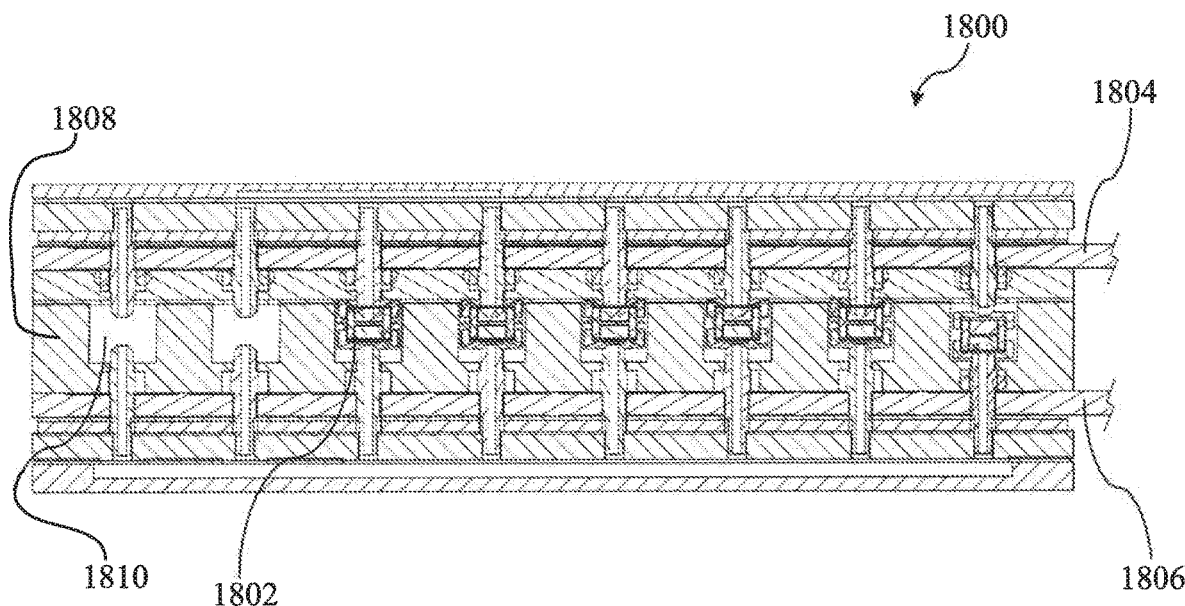

Referring now to FIGS. 18A-18B, a plurality of any of the various configurations of a bistable valve may be combined into an array in a manifold assembly 1800. The array 1800 includes one or more bistable valves having any of the shuttle 1802 configurations described herein. The manifold 1800 includes end plates 1804, 1806 and coil assemblies 1808, surrounding the shuttles 1802 within the interior valve cavities 1810.

A manifold assembly comprising bistable valves or valve systems according to the various embodiments described may be used in many different applications in which fluidic pressure (pneumatic or hydraulic) is used to drive pumps and/or valves in a device. Examples include any liquid pumping apparatus such as a blood pump, hemodialysis machine, peritoneal dialysis machine, intravenous pump, or any liquid flow control device used in medical or industrial fields. Other uses include inflatable devices, such as a seat cushion. For example, a manifold assembly comprising bistable valves or valve systems can be used to inflate a seat cushion in a powered wheelchair, air bladders in a prosthetic device or other inflatable devices. A bistable valve or valve system according to the various embodiments described may be used in any application requiring the employment of a traditional standalone pneumatic or electronically-actuated valve.

The electromagnetic activation features described above may be applied to a monostable valve as well. Instead of the shuttle having a first and a second pressure position, the monostable valve is configured to have an on and an off position with respect to one pressure source.

Figure 19A:
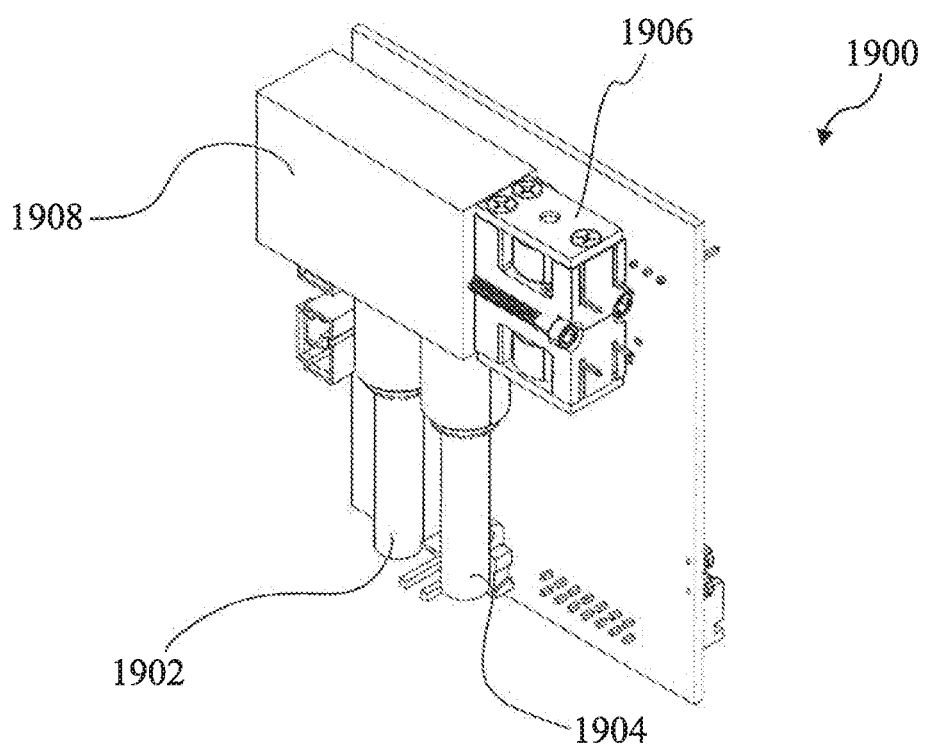
FIGS. 19A-19B are a perspective view and a cross-sectional view of an embodiment of a valve assembly configured as a pressure regulator.
Figure 19B:
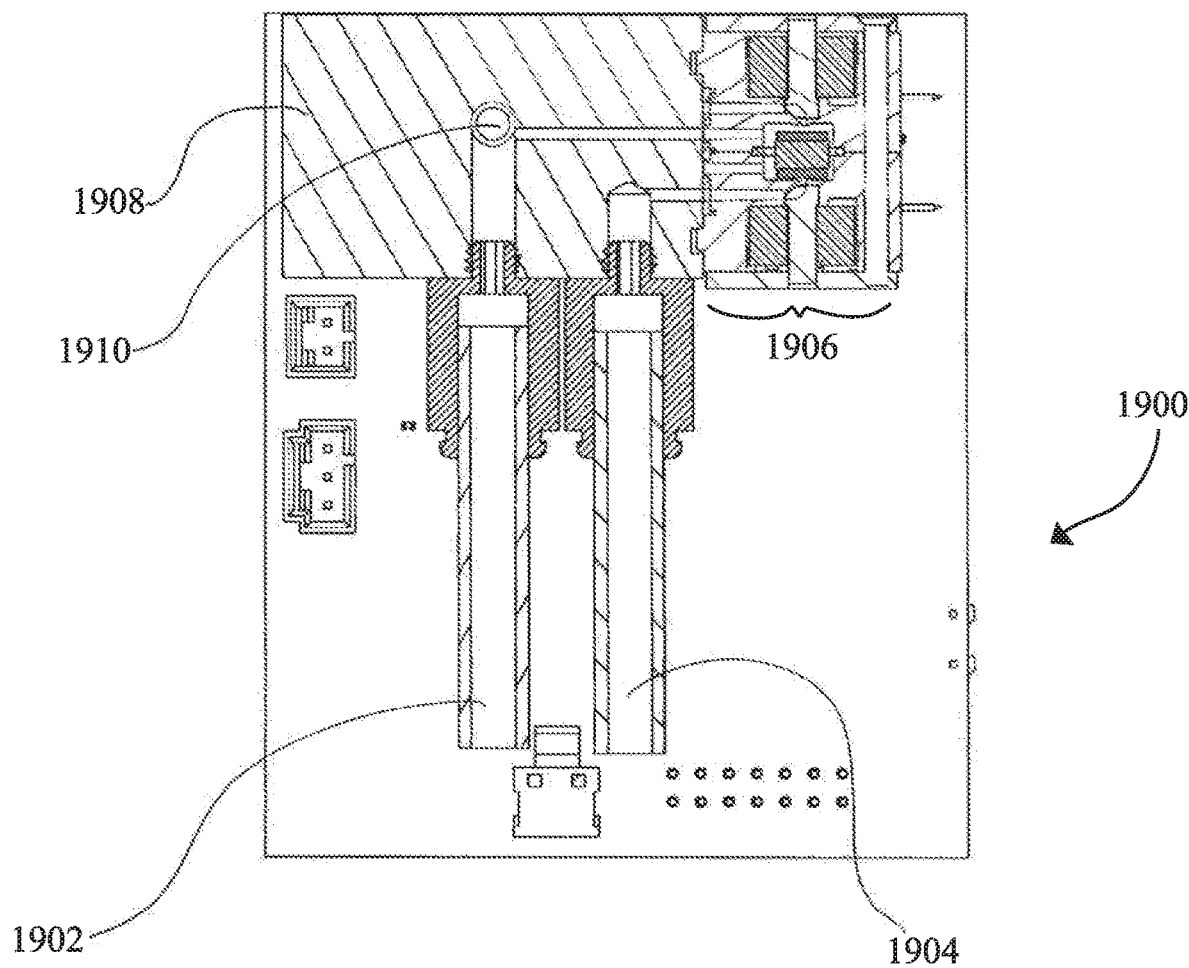

Referring now to FIGS. 19A-19B, various configurations of a bistable valve may be integrated into various assemblies. In the example shown in FIGS. 19A-19B, a bistable valve 1906 is integrated into a regulator for a medical device, for example, a hemodialysis machine. A regulator PCB 1900 is connected to the bistable valve 1906, and the apparatus includes outlet tubing 1902, inlet tubing 1904, a pressure sensor 1910 and a PCB valve adapter block 1908. In practice, one pressure inlet to the valve cavity is blocked and the pressure between the inlet tubing 1904 and the outlet tubing 1902 is regulating by operation of the valve to make or break a connection between the two.

Figure 20A:
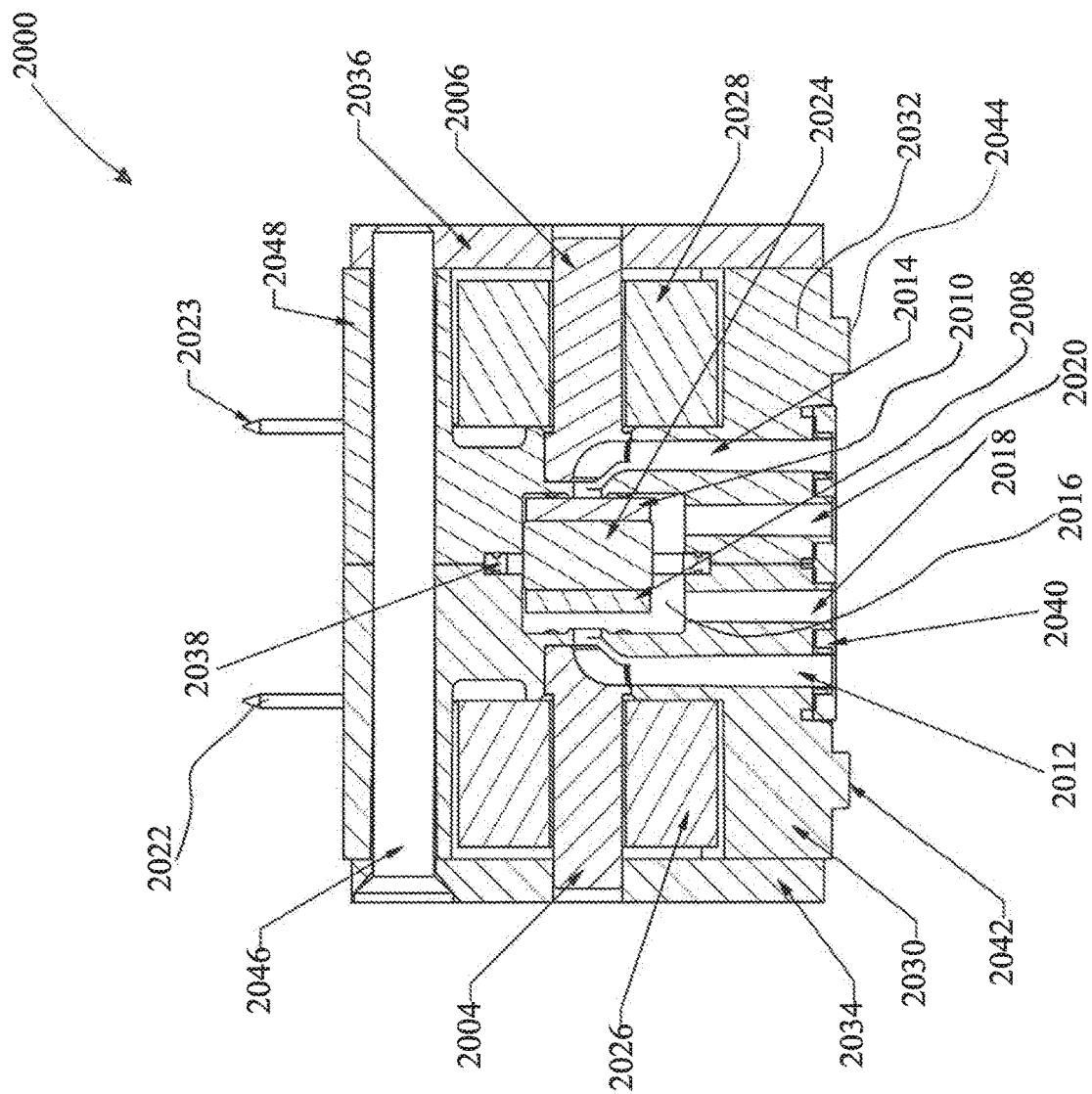
FIGS. 20A-20C are a cross-sectional view and perspective views of an embodiment of a valve apparatus.
Figure 20B:
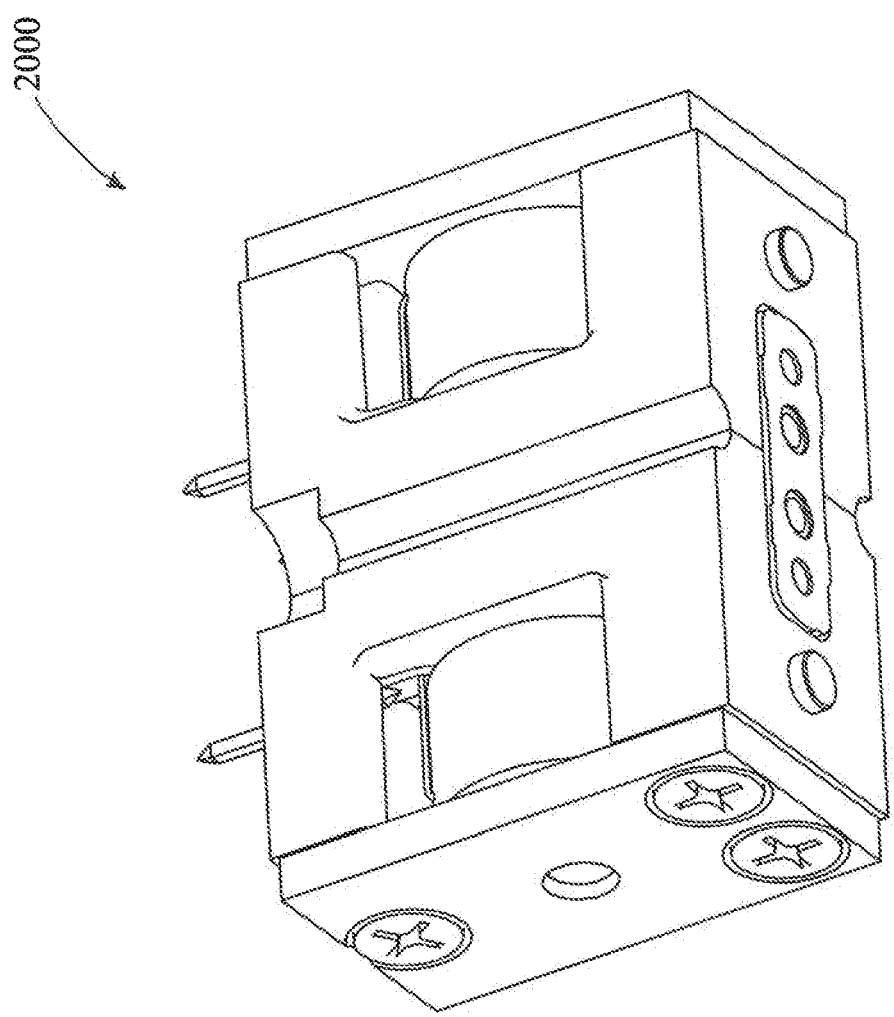
Figure 20C:
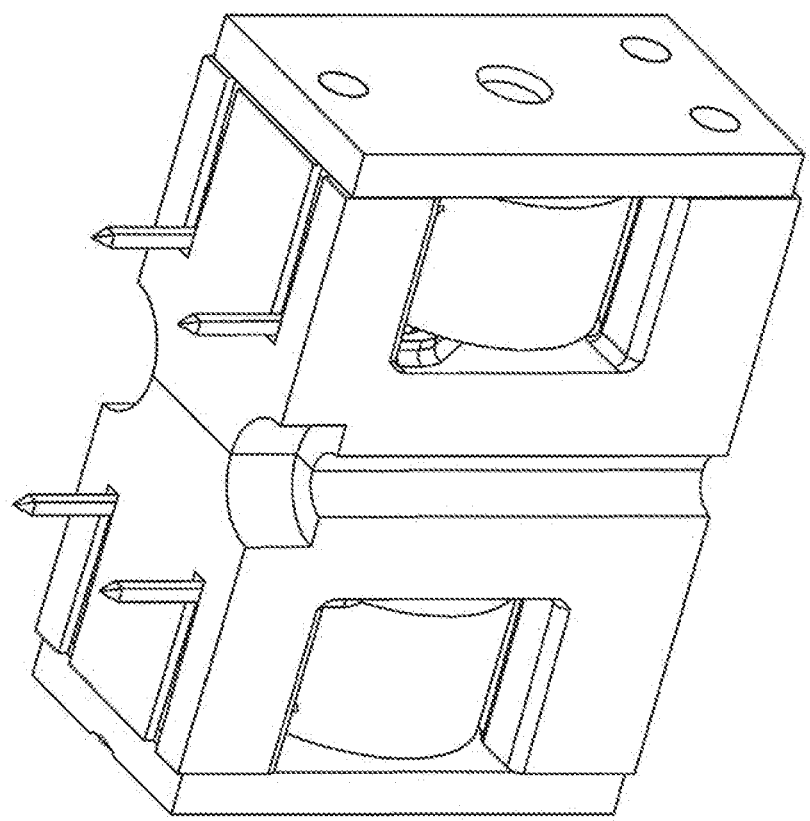

Referring now also to FIGS. 20A-20C, a bistable valve 2000 may include a shuttle comprising a magnet portion 2024. The shuttle may further include a first membrane portion 2008 which will abut a first post 2004, and a second membrane portion 2010 which will abut a second post 2006, the first and second membrane portions 2008 and 2010 attached to the magnet portion 2024, with the shuttle being disposed in an interior valve cavity 2016. The first post 2004 and the first membrane portion 2008, which is attached to the magnet portion 2024, may be configured to provide fluid communication from a first pressure inlet 2012 to the interior valve cavity 2016 when the shuttle is not sealed against the first post 2004. Similarly, the second post 2006 and the second membrane portion 2010, which is attached to the magnet portion 2024, may be configured to provide fluid communication from a second pressure inlet 2014 to the interior valve cavity 2016 when the shuttle is not sealed against the second post 2006. Output orifices 2018, 2020 are in constant fluid communication with the interior valve cavity 2016, regardless of which position the shuttle is in. Conversely, the first and second pressure inlets 2012 and 2014 are either in fluid communication with the interior valve cavity 2016, and thus, the output orifices 2018, 2020 or they are sealed from fluid communication with the interior valve cavity 2016 by the shuttle. When one of the two pressure inlets 2012, 2014 is in fluid communication with the interior valve cavity 2016, the other pressure inlet is sealed by the shuttle. In an example, the shuttle may be cylindrical and made from any of the materials described above. The bistable valve 2000 may include contact terminals 2022, 2023 as well as coils 2026, 2028, end bodies 2030, 2032, and end plates 2034, 2036 attached to the end bodies 2030, 2032. Optionally, the bistable valve 2000 may also include at least one gasket seal 2038 and at least one face seal 2040. Optionally, the bistable valve 2000 may also include locating pins 2042, 2044 as well as a tie bar/screw 2046 and an end body housing 2048. In some embodiments, the tie bar/screw 2046 attaches the end plates 2034, 2036 to the end body housing 2048. Other methods of attachment may be used including adhesive, bolts, screws, pins, etc.

Figure 21A:
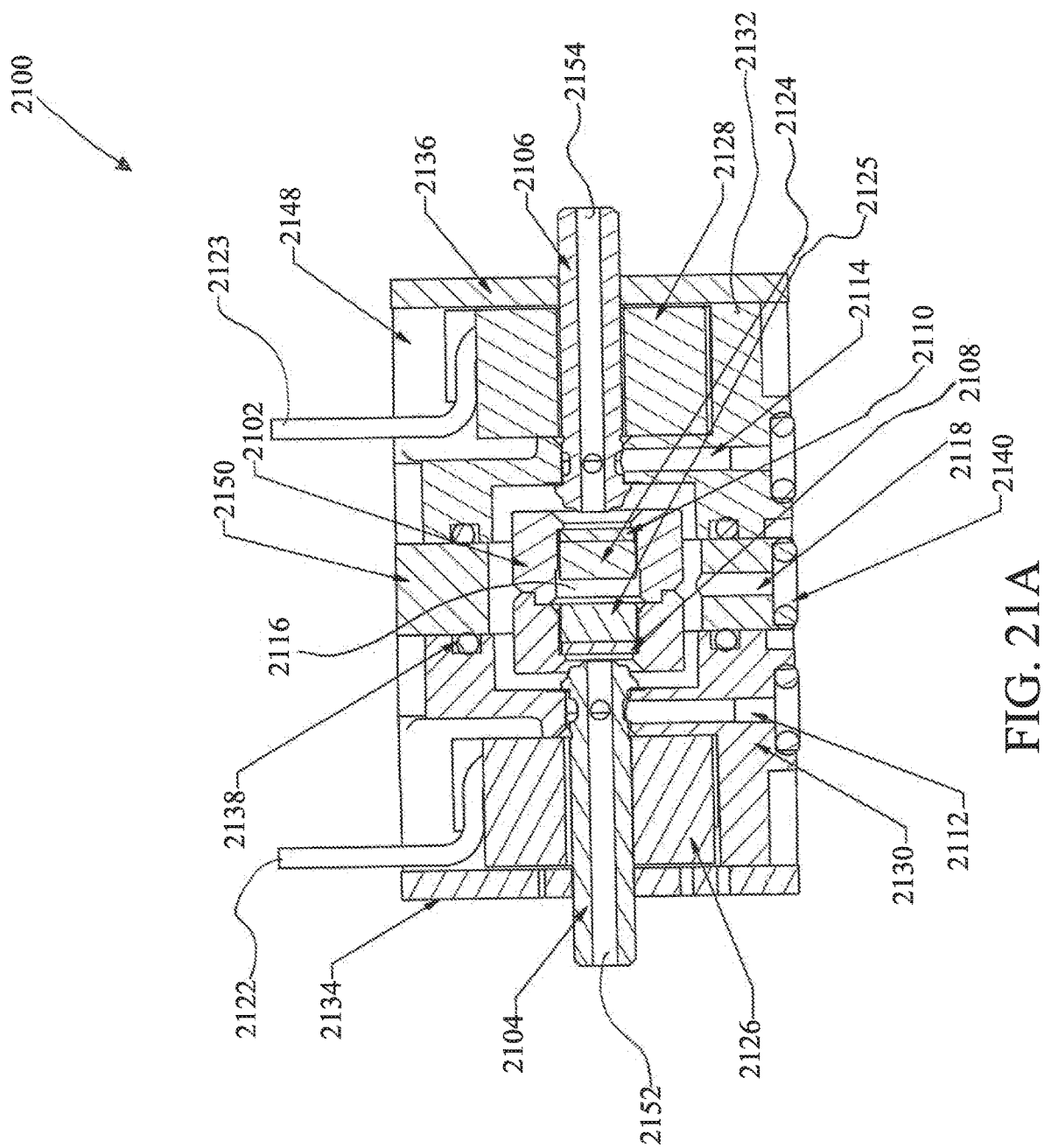
FIGS. 21A-21C are a cross-sectional view and perspective views of an embodiment of a valve apparatus.
Figure 21B:
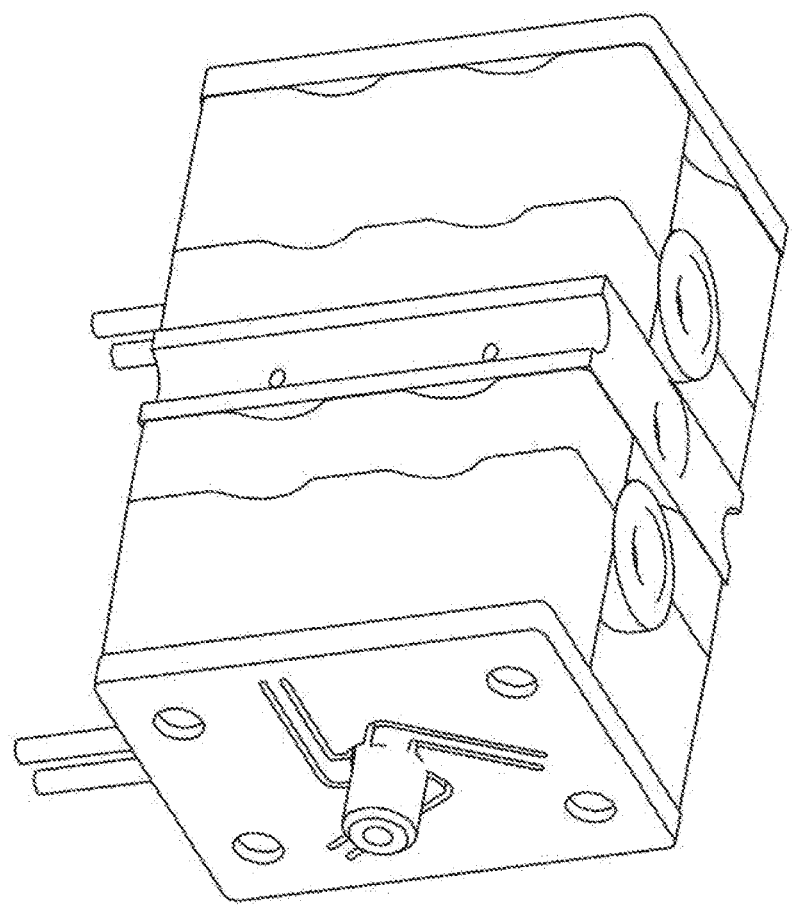
Figure 21C:
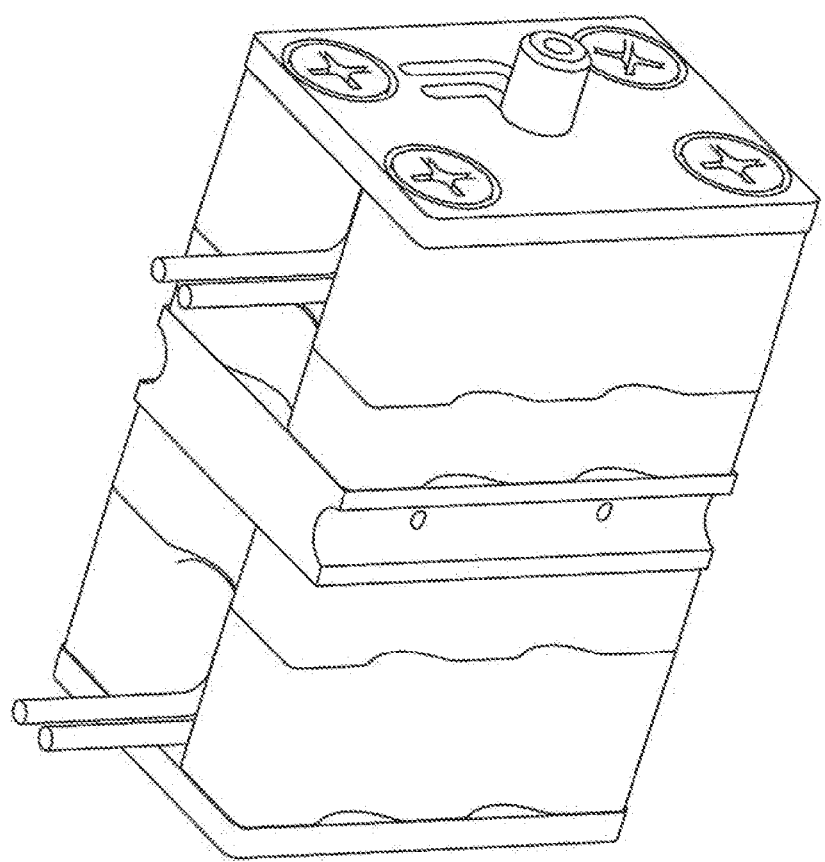

Referring now also to FIGS. 21A-21C, A bistable valve 2100 may include a shuttle 2102 comprising two opposing magnet portions 2124, 2125. The shuttle 2102 may further include a first membrane portion 2108 attached to the first magnet portion 2125 configured to abut a first post 2104, and a second membrane portion 2110 attached to the second magnet portion 2124 configured to abut a second post 2106. The shuttle 2102 is disposed in an interior valve cavity 2116. The first post 2104 and the first membrane portion 2108, which is attached to the first magnet portion 2125, may be configured to provide fluid communication from a first pressure inlet 2112 to the interior valve cavity 2116 when the shuttle 2102 is not sealed against the first post 2104. Similarly, the second post 2106 and the second membrane portion 2110, which is attached to the second magnet portion 2124, may be configured to provide fluid communication from a second pressure inlet 2114 to the interior valve cavity 2116 when the shuttle 2102 is not sealed against the second post 2106. The first post 2104 and second post 2106 optionally may each include a pneumatic port 2152, 2154. Output orifice 2118 is in constant fluid communication with the interior valve cavity 2116, regardless of which position the shuttle 2102 is in. Conversely, the first and second pressure inlets 2112 and 2114 are either in fluid communication with the interior valve cavity 2116, and thus, the output orifice 2118 or they are sealed from fluid communication with the interior valve cavity 2116 by the shuttle 2102. When one of the two pressure inlets 2112, 2114 is in fluid communication with the interior valve cavity 2116, the other pressure inlet is sealed by the shuttle 2102. In one example, the shuttle may be cylindrical and made from any of the materials described above with respect to various shuttles. The bistable valve 2100 may include contact terminals 2122, 2123 as well as coils 2126, 2128, end bodies 2130, 2132, and end plates 2134, 2136 attached to the end bodies 2130, 2132. Optionally, the bistable valve 2100 may also include at least one gasket seal 2138 and at least one face seal 2140. In an exemplary configuration, the bistable valve 2100 may also include locating pins as well as a tie bar/screw (not shown) and an end-body housing 2148. The tie bar/screw attaches the end plates 2134, 2136 to the end body housing 2148. Other methods of attachment may also be used including adhesive, bolts, screws, pins, etc.

Any of the magnets shown as part of the shuttle may comprise stacked magnets: more than one magnet forms the magnetic portion of the shuttle. Various sizes, shapes and thicknesses of the magnet may alter its magnetic force, whether opposing or attracting.

Figure 22:
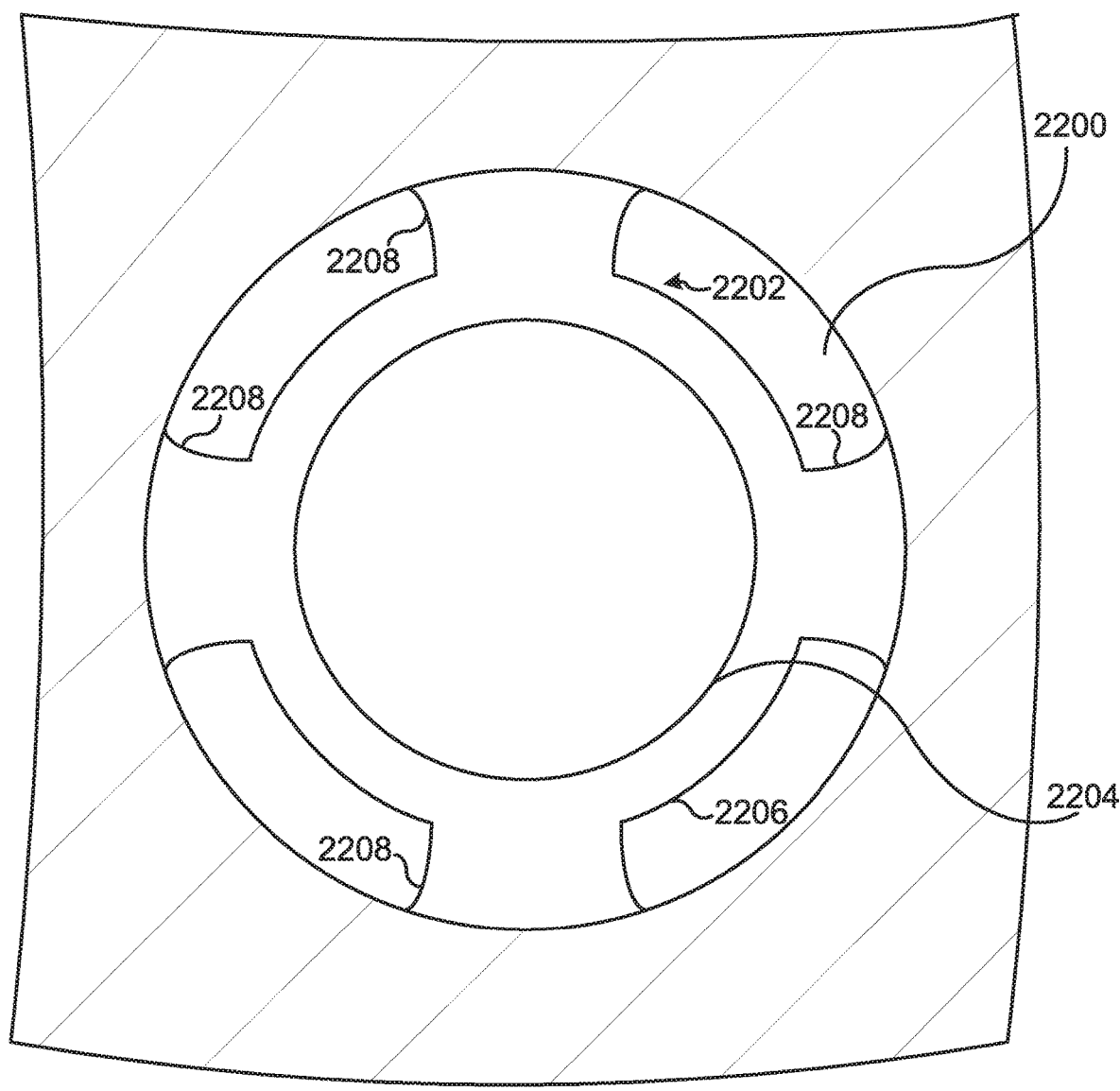
FIG. 22 depicts a representational view of an interior cavity of an example bistable valve apparatus.

FIG. 22 depicts a representational view of an interior cavity 2200 of an example bistable valve. As shown, a shuttle 2202 is positioned in the interior cavity 2200. The shuttle 2202 includes a magnet 2204 which is overmolded with an elastomeric material 2206. In some configurations, multiple magnets may be enveloped by the overmolded elastomeric material 2206. Any of the shuttles such as any of those described in FIGS. 2A-5C may be similarly overmolded.

The elastomeric material 2206 also includes a number of radial arms or offshoots 2208 which extend from the magnet 2204 to the walls of the interior cavity 2200. These radial offshoots 2208 may serve to hold the magnet 2204 substantially along the central axis of the interior cavity 2200 and may inhibit rotation of the magnet 2204. The radial offshoots 2208 may also act as a damper during actuation of a valve, which may help to minimize the acoustic noise generated as the shuttle 2202 is displaced or toggled back and forth.

In the example embodiment, the elastomeric radial offshoots 2208 roughly resemble the arms of a cross, though they may be of any convenient shape and/or any number. For example the radial offshoots 2208 may be spoke-like. The amount of open space between each of the radial offshoots 2208 may also vary. In an exemplary manufacturing process, the radial offshoots 2208 may be laser cut out of a larger piece of elastomeric material. In an alternate arrangement, instead of radial offshoots 2208, the magnet 2204 may be kept in place by a web-like diaphragm. Such a diaphragm may include a number of generally concentric rings of elastomeric material connected to a number of radial offshoots extending outwardly from the magnet 2204. In such an embodiment, pressure would be allowed to equalize on each side of the shuttle 2202 through the openings in the web-like diaphragm.

In various embodiments of the various bistable valves described herein, the coil may be PCB-based flat coils (i.e., coils on a printed circuit board) or wire wound coils. The coils may be potted into a valve assembly. Any suitable potting material, such as a low Q material may be used. This may help to reduce acoustic noise generated during operation of a valve. It may also help to make the magnetic coil reliability more robust.

Wound wire coils may have an air core. Optionally, the coils may be wound around a supporting structure. This may help to simplify manufacture and assembly of a coil and a valve. Any suitable supporting structure may be used, such as a spool, reel, or bobbin. The supporting structure may also have one or more coupling or engagement features that help to simplify installation of the coil into a bistable valve. For example, a supporting structure may include a snap fit feature or a guide feature which interacts with a complementary feature of the bistable valve. Such interaction may ensure that a coil is seated in a desired or prescribed orientation in the valve assembly. The support structure may also be dimensioned and/or made of a material which helps to generate a desired magnetic flux path.

Figure 23:
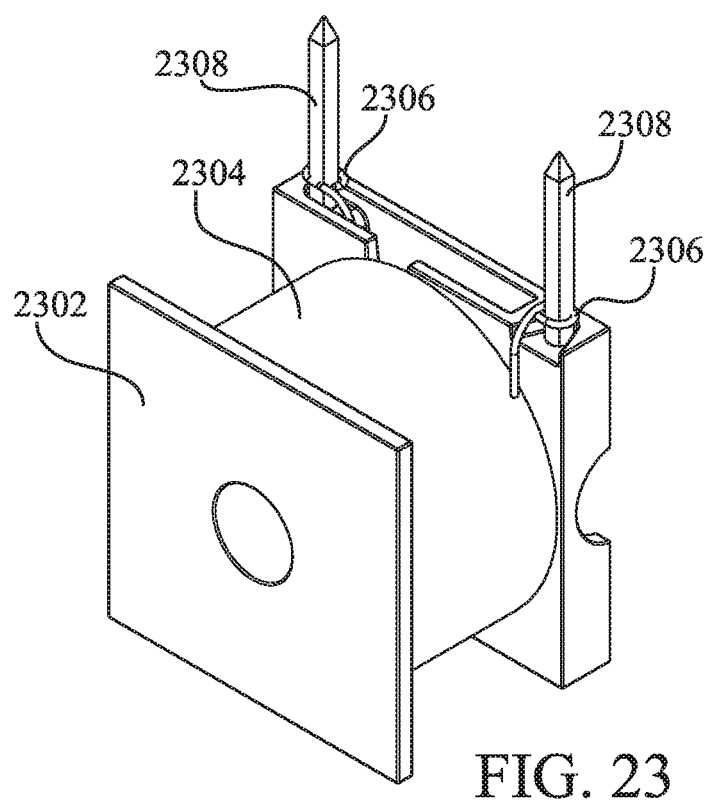
FIG. 23 is a perspective view of an example coil assembly for a bistable valve assembly.

An example coil assembly 2300 is shown in FIG. 23. The coil assembly 2300 includes a bobbin 2302. The bobbin 2302 may be made from any suitable material and may, for example, be a molded part made from injection molded plastic. The coil may be wound around the bobbin 2302 so that a magnetic field is created when current passes through the wire. Two leads 2306 which are attached to respective contacts 2308 are also shown in FIG. 23. The contacts 2308 may be contact pins as shown, or the contacts 2308 may include a pad or strip that allows for greater tolerances when assembling a bistable valve.

Figure 24:
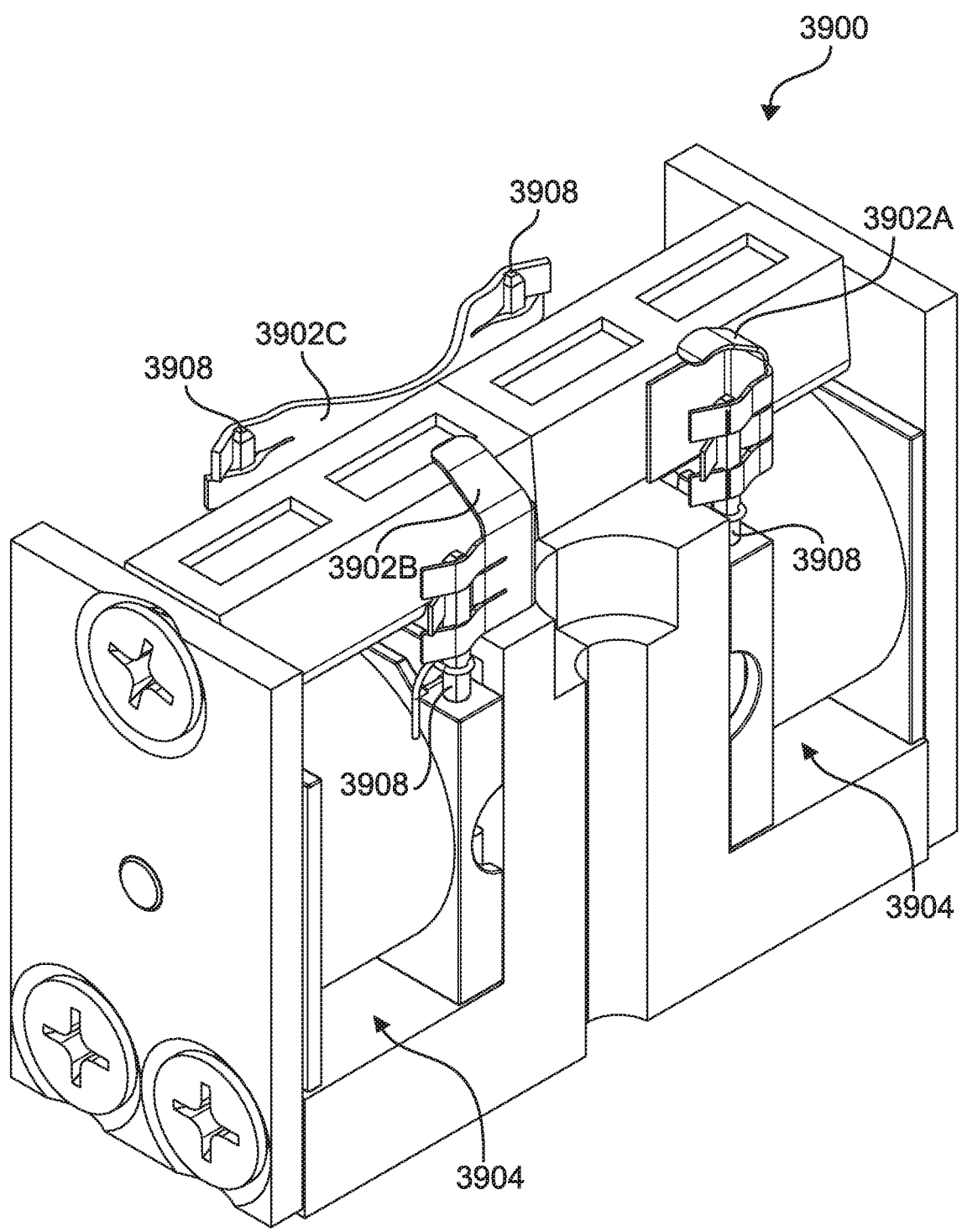
FIG. 24 is a perspective view of an valve assembly showing connectors attached to coil assembly terminals.

FIG. 24 depicts an example embodiment of a bistable valve 3900. As shown, the bistable valve 3900 includes optional conductive or metal strips 3902A-C which may be placed or crimped onto the contacts 3908. Alternatively, the metal strips may be attached (e.g soldered) or integral with the contacts 3908. The metal strips 3902A-C may allow a larger contact area/patch when placing a current source into communication with the valve 3900. This may obviate the need to align pin contacts with a connector on the current source, simplifying assembly and allowing for larger tolerances. As shown, one of the metal strips 3902C connects a contact 3908 from one coil assembly 3904 to a contact on another coil assembly 3908. The other two metal strips 3902A, B may act as positive/negative terminals for the coils depending on the desired direction of current flow through the coil assemblies 3904. The metal strips 3902A-C may be made of any suitable material such as, for example, copper.

Figure 25A:
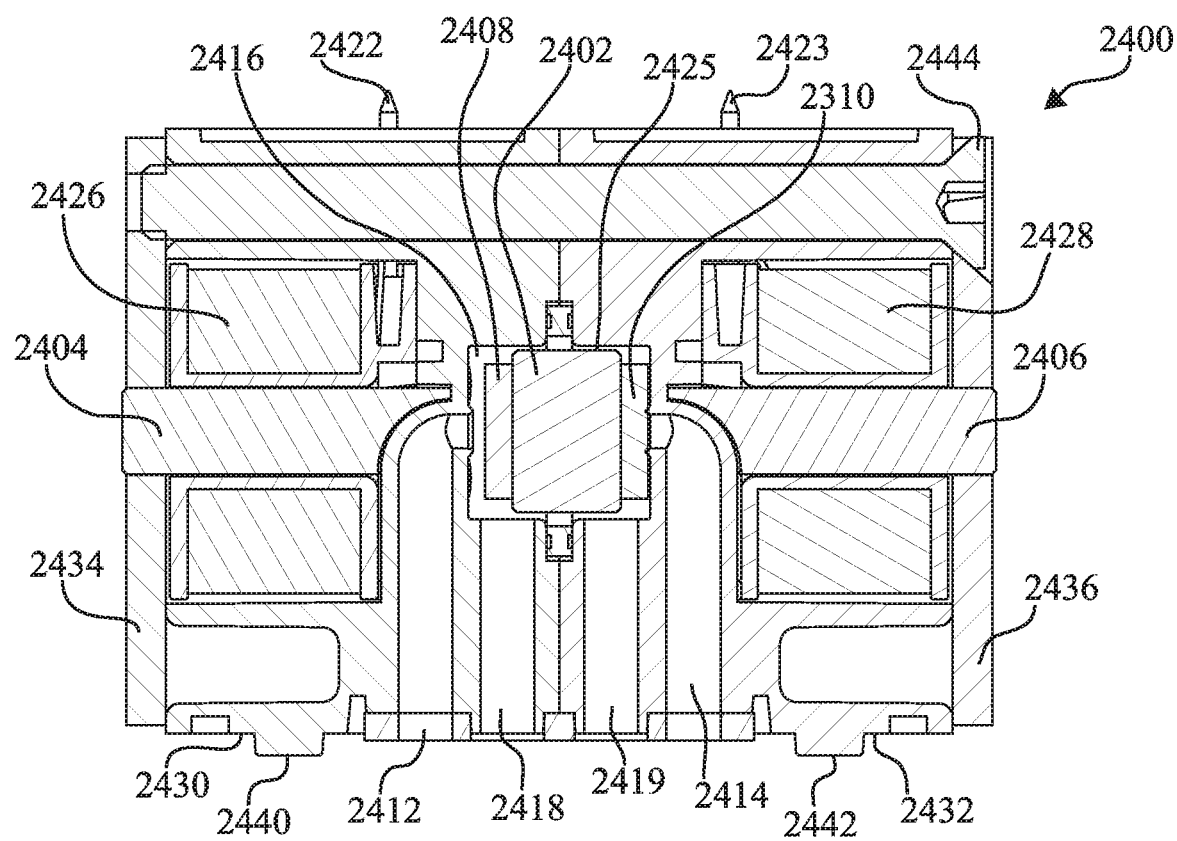
FIG. 25A-C are a cross-sectional view and perspective views of an embodiment of a valve apparatus.
Figure 25B:
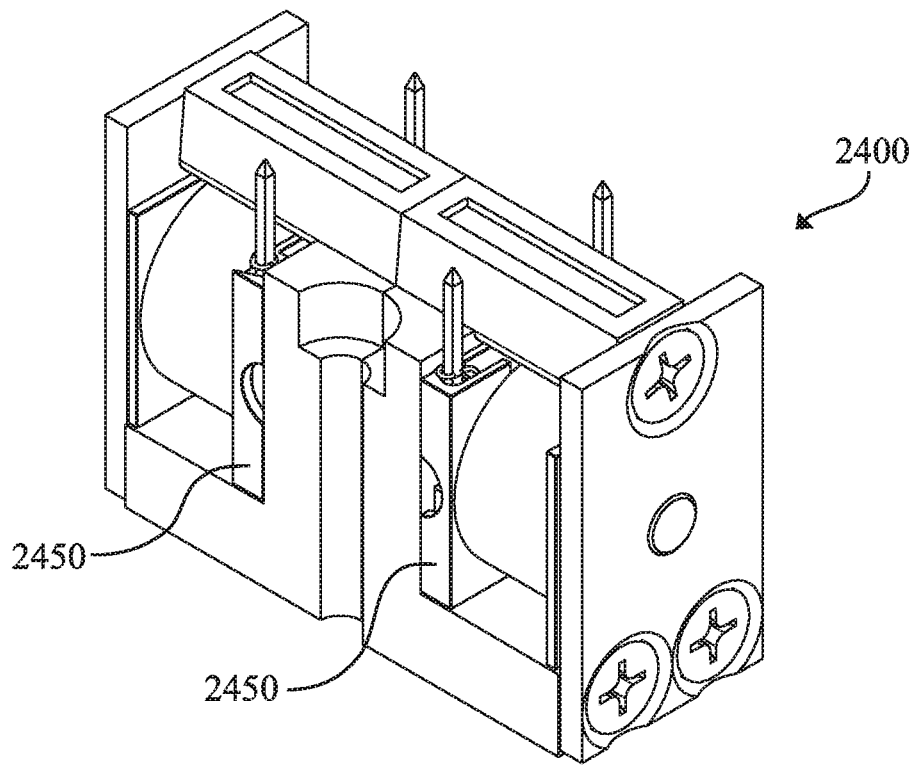
Figure 25C:
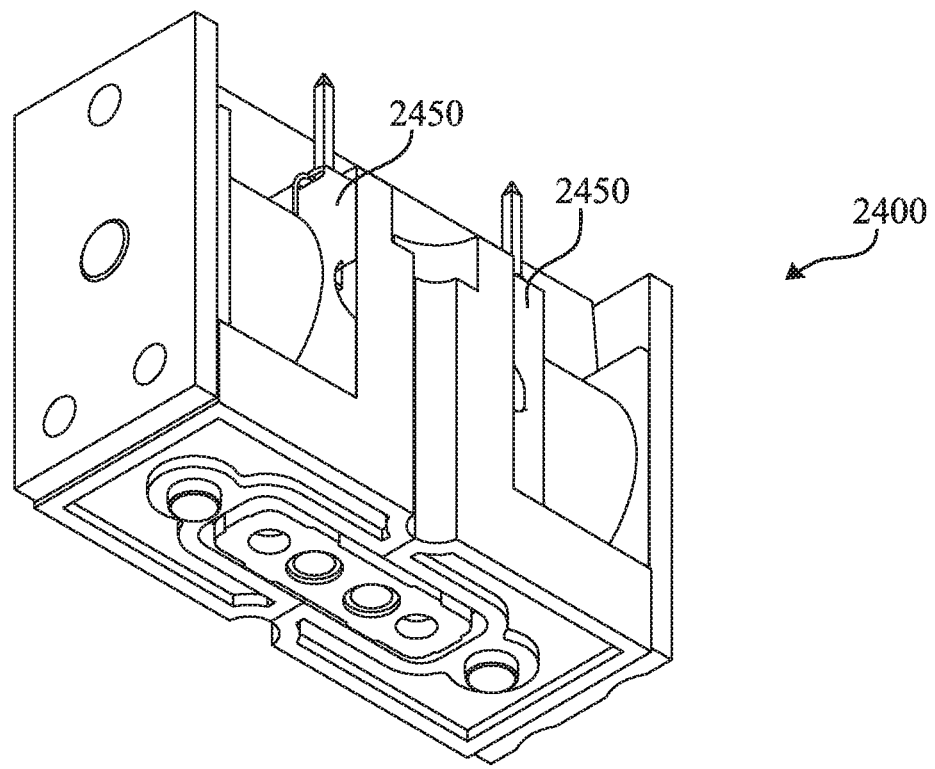

Referring now to FIGS. 25A-25C, in some embodiments, a bistable valve 2400 may include a shuttle 2402 comprising a magnet 2425. The shuttle 2402 may further include a first membrane portion 2408 attached to a first face of the magnet 2425. The shuttle 2402 may also include a second membrane portion 2410 attached to a second face of the magnet 2425 which is opposite the first face. The shuttle 2402 is disposed in an interior valve cavity 2416. The bistable valve 2400 also includes a first post 2404 and a second post 2406. The first post 2404 and second post 2406 may act to direct magnetic flux pathways within the bistable valve 2400. The first post 2404 and second post 2406 may also act as cores for the electromagnetic coils 2426, 2428 of the bistable valve 2400. The first post and second post may be made from a material with a desired magnetic permeability.

The example embodiment in FIGS. 25A-25C includes a plurality of output orifices. As shown, the bistable valve 2400 embodiment includes a first output orifice 2418 and a second output orifice 2419. When the shuttle 2402 is sealing over a first pressure inlet 2412, the first output orifice 2418 and second output orifice 2419 are placed into fluid communication with a second pressure inlet 2414 through the interior valve cavity 2416. When the shuttle 2402 is sealing over the second pressure inlet 2414, the first output orifice 2418 and second output orifice 2419 are placed into fluid communication with the first pressure inlet 2412. When one of the two pressure inlets 2412, 2414 is in fluid communication with the interior valve cavity 2416, the other pressure inlet is sealed by the shuttle 2402. In various embodiments, the shuttle 2402 may be cylindrical and may be made from any material as described above with respect to various embodiments of the shuttle. The first output orifice 2418 and second output orifice 2419 may connect to a common fluid line or may each be connected to separate and isolated fluid lines in various embodiments. In the example embodiment, the pressure inlets 2412, 2414 are not included in or part of the first and second posts 2404 and 2406. This may help to simplify manufacturing of the bistable valve 2400.

In various embodiments, a bistable valve 2400 may include valve bodies 2430, 2432. These valve bodies 2430, 2432 may be coupled together to form the various flow paths and cavities of the bistable valve 2400. The valve bodies 2430, 2432 may be molded parts which include voids for the pressure inlets 2412, 2414, the interior valve cavity 2416, and the output orifices 2418, 2419. The valve bodies 2430, 2432 may be coupled together in any suitable manner which creates sealed flow paths for fluid passing through the bistable valve 2400.

In various embodiments, a bistable valve 2400 may include contact terminals 2422, 2423 as well as coils 2426, 2428. As shown, the coils 2426, 2428 may be included on a coil assembly 2450 which is placed into a receiving structure in the valve bodies 2430, 2432 during assembly. In the example embodiments, the coils 2426, 2428 are included on bobbin-like coil assemblies 2450 similar to that depicted in FIG. 23.

The bistable valve 2400 shown in FIGS. 25A-C also includes end plates 2434, 2436 which are attached to the valve bodies 2430, 2432. One or more fastener 2444 may pass through or couple into the end plates 2434, 2436, and may help to hold the valve bodies 2430, 2432 together. As described elsewhere, any suitable type of fastener may be used. For example, the fastener may be a bolt, screw, rivet, etc. In various embodiments, the bistable valve 2400 may also include at least one gasket or sealing member which may be any type of seal. In various embodiments, the bistable valve 2400 may also include locating pins 2440, 2442.

Figure 26A:
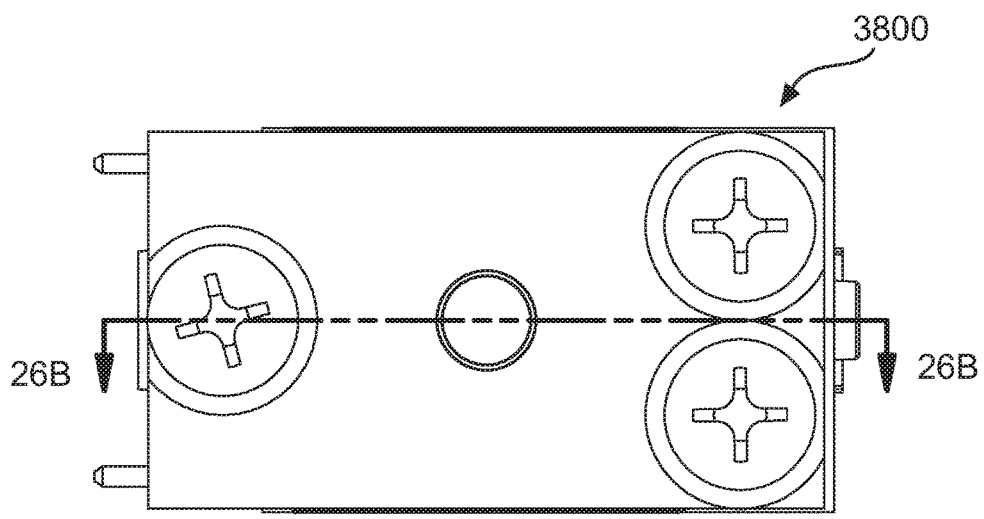
FIG. 26A is a plan view of a valve assembly.
Figure 26B:
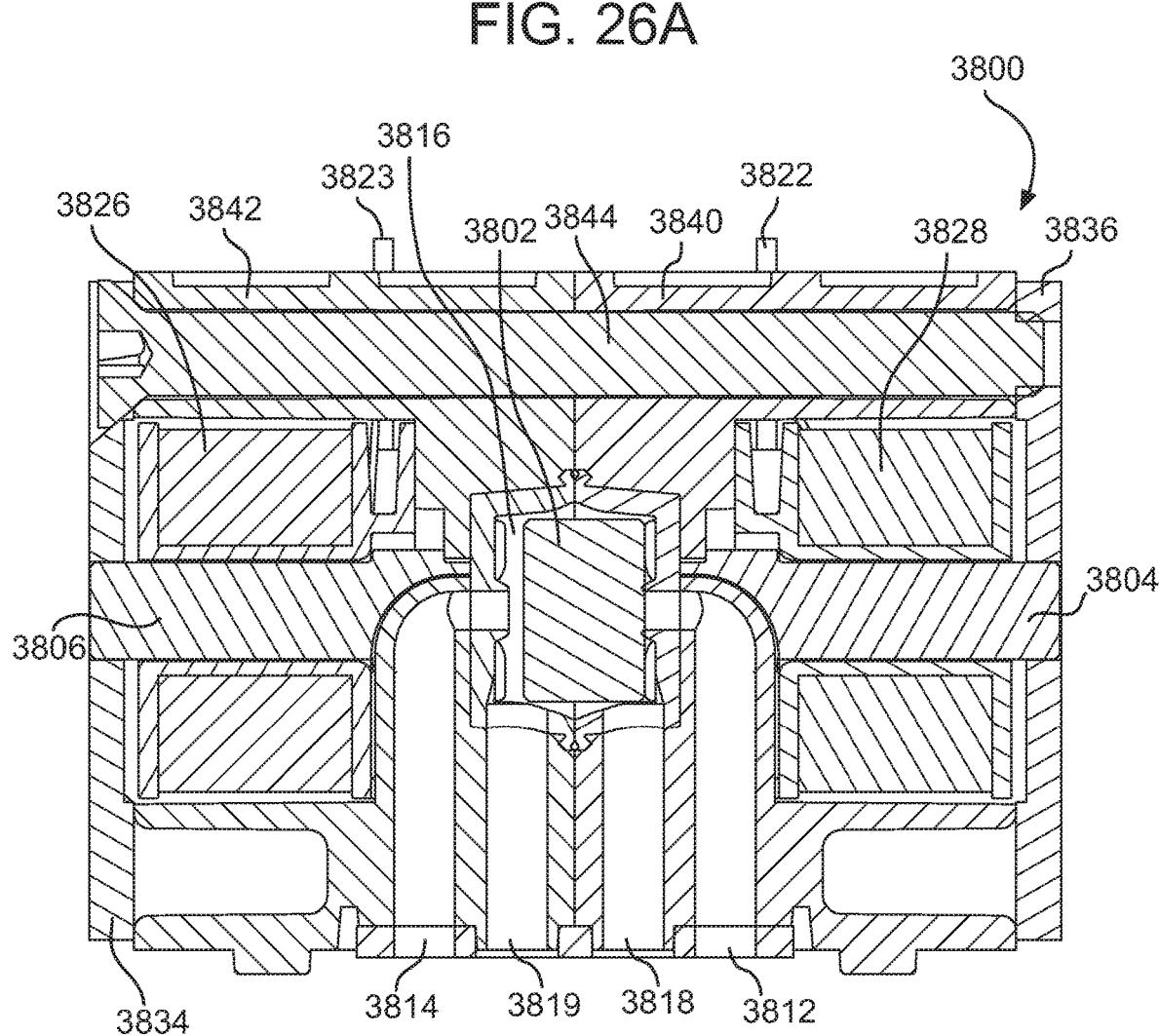
FIG. 26B is a cross-section view of the valve assembly of FIG. 26A
Figure 26C:
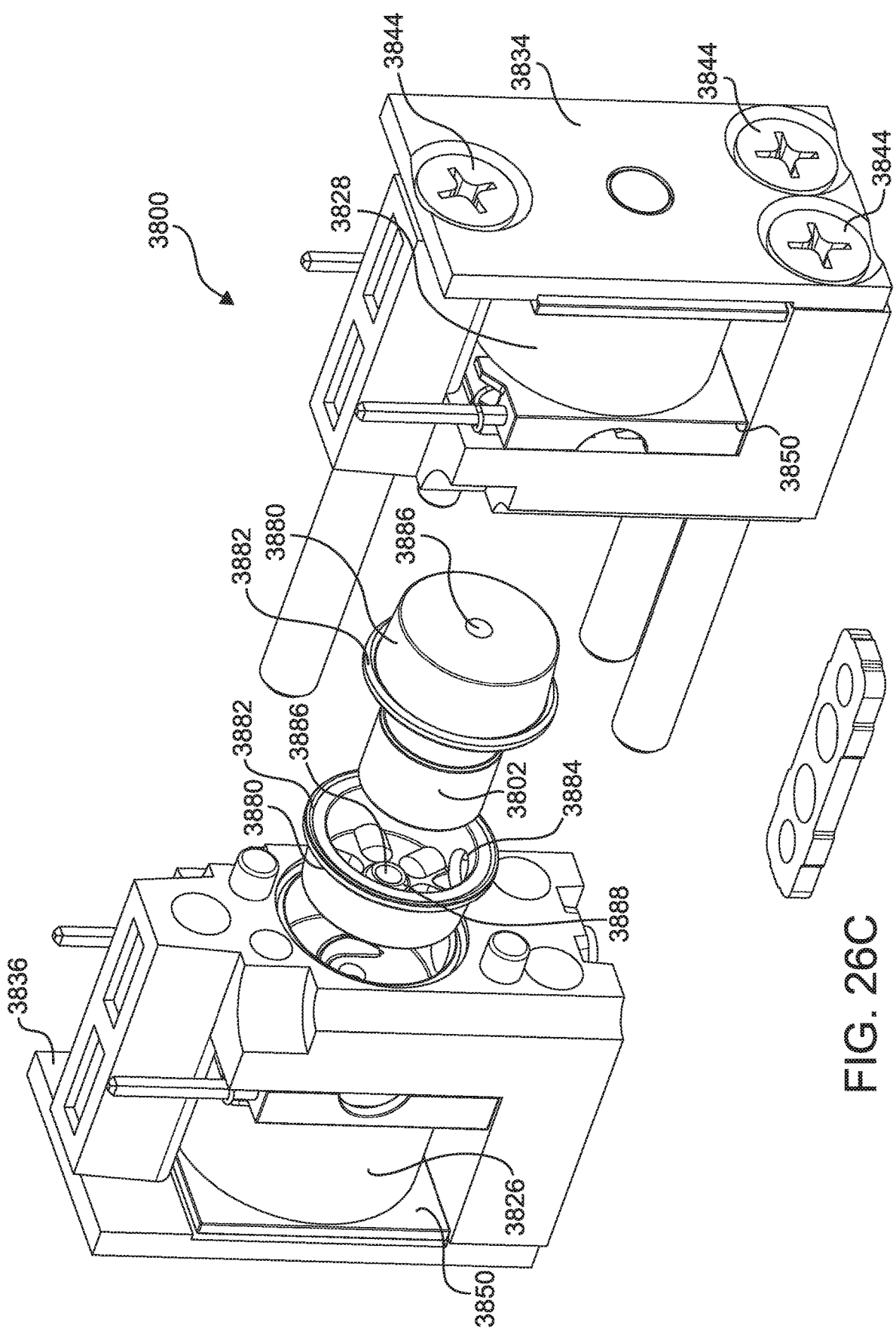
FIG. 26C is an exploded view of the valve assembly of FIGS. 26A and 26B.

FIGS. 26A-26C depict another embodiment of a bistable valve assembly 3800. The bistable valve assembly 3800 includes a shuttle 3802 made of a magnetized material. The shuttle 3802 is disposed in an interior valve cavity 3816. The bistable valve 3800 includes a first post 3804 and a second post 3806. The first post 3804 and second post 3806 are configured to direct magnetic flux pathways within the bistable valve 3800. The first post 3804 and second post 3806 may also act as cores for the electromagnetic coils 3826, 3828 of the bistable valve 3800.

As best shown in FIG. 26C, two inserts 3880 may be included in a bistable valve assembly 3800, or in any other type of valve assembly in which a moving shuttle is used to mechanically block or open communication between an inlet of the valve assembly and the valve cavity. When assembled, these inserts 3880 surround the shuttle 3802 and fit within the interior valve cavity 3816. In an exemplary construction, the inserts 3880 have a substantially cup-like shape.

The inserts 3880 may be made of an elastomeric or other soft or compliant material. For example, the inserts 3880 may be made of Viton® or a similar material. The inserts may also be molded from sound-absorbing plastics that, when formed and solidified, provide both soundproofing qualities as well as structural support to withstand repeated movement of a shuttle within the insert. The inserts 3880 may help to dampen any noise generated as the valve toggles between positions and may allow for better sealing of the shuttle 3802 over pressure inlets 3812, 3814. Thus the inserts may eliminate a need for a separate flexible or elastomeric membrane on either the shuttle face or the valve seat to achieve a seal between the valve seat and the surface of the shuttle.

Each of the inserts 3880 may include a sealing flange 3882. When assembled, the sealing flanges 3882 abut and compress against each other. The valve bodies 3840, 3842 can be coupled together to form the bistable valve 3800 by means of one or more fasteners 3844 passing through end plates 3834 and 3836. As best shown in FIG. 26B, mating or mutual compression of the flanges 3882 may fluidically seal the interior valve cavity 3816 as the two valve bodies 3840, 3842 of the bistable valve 3800 are joined together.

The example embodiment in FIGS. 26A-26C includes one or more pressure inlets 3812, 3814 and output orifices 3818, 3819. The pressure inlets 3812, 3814 and output orifices 3818, 3819 are formed as part of the valve bodies 3840, 3842. As shown, the bistable valve assembly 3800 includes a first output orifice 2418 and a second output orifice 2419. It also includes a first pressure inlet 3812 and a second pressure inlet 3814. The inserts 3880 include fluid pathways 3884, 3886 which extend through the inserts 3880. First pressure inlet 3812 and second pressure inlet 3814 align with fluid pathways 3886 of their respective inserts 3880. The first fluid output orifice 3818 and second fluid output orifice 3819 align with fluid pathways 3884 of their respective insert 3880. Each insert 3880 may also include a valve seat 3888 against which the shuttle 3802 may form a seal.

When the shuttle 3802 is sealing the valve seat 3888 of first pressure inlet 3812, the first output orifice 3818 and second output orifice 3819 are placed into fluid communication with a second pressure inlet 3814 through the interior valve cavity 3816. When the shuttle 3802 is sealing the valve seat 3888 of the second pressure inlet 3814, the first output orifice 3818 and second output orifice 3819 are placed into fluid communication with the first pressure inlet 3812. When one of the two pressure inlets 3812, 3814 is in fluid communication with the interior valve cavity 3816, the other pressure inlet is sealed by the shuttle 3802. In some examples, the shuttle 3802 is cylindrical and may be made from any material as described above with respect to other examples of the shuttle. The first output orifice 3818 and second output orifice 3819 can be configured to connect to a common fluid line or may each be connected to separate and isolated fluid lines, depending on the desired application. Optionally, the pressure inlets 3812, 3814 are not included in or part of the first and second posts 3804 and 3806. This may help to simplify manufacturing of the bistable valve assembly 3800. Optionally, the inserts 3880 may include an asymmetric feature that allows the inserts 3880 to be installed in the bistable valve 3800 in only a particular orientation. The asymmetric feature may for example ensure that the inserts 3880 are installed in a manner in which fluid pathways 3884, 3886 align with the pressure inlets 3812, 3814 and output orifices 3818, 3819, helping to simply assembly of the bistable valve 3800.

A bistable valve assembly 3800 may include contact terminals 3822, 3823 as well as coils 3826, 3828. As shown, the coils 3826, 3828 may be mounted on a coil assembly 3850 that can be placed into a receiving structure in the valve bodies 3840, 3842 during assembly. In the example shown, the coils 3826, 3828 are wound on bobbin-like coil assemblies 3850 similar to that depicted in FIG. 23.

FIGS. 27A-27D depict another embodiment of a bistable valve 4000. The bistable valve 4000 may include a shuttle 4002, that can be made of a magnetized material. The shuttle 4002 is disposed in an interior valve cavity 4016. The bistable valve 4000 may also include a first post 4004 and a second post 4006. The first post 4004 and second post 4006 may act to direct magnetic flux pathways within the bistable valve 4000. The first post 4004 and second post 4006 may also act as cores for the electromagnetic coils 4026, 4028 of the bistable valve 4000. In an exemplary configuration, a bistable valve 4000 may include contact terminals 4022, 4023 connected to coils 4026, 4028. As shown, the coils 4026, 4028 may be included on a coil assembly 4050 which is placed into a receiving structure in the valve bodies 4040, 4042 during assembly. In the example shown, the coils 4026, 4028 are wound on bobbin-like coil assemblies 4050 similar to that depicted in FIG. 23.

Figure 27A:
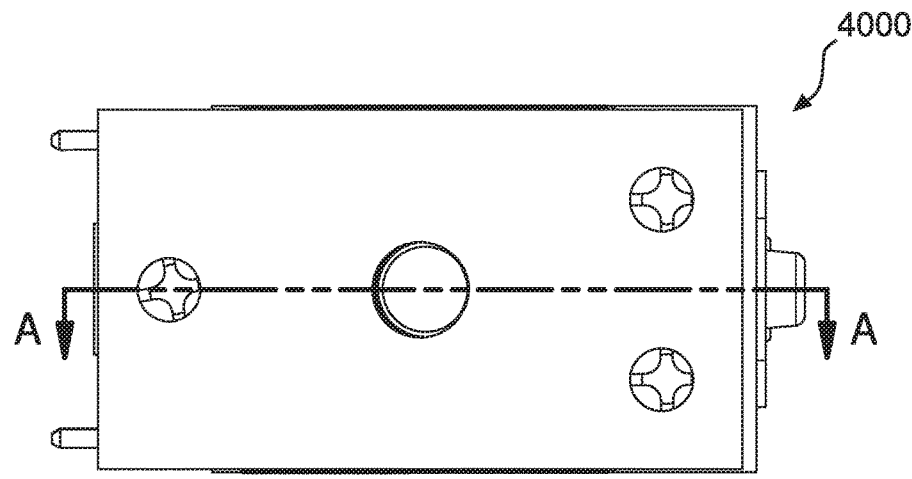
FIG. 27A is a plan view of a valve assembly.
Figure 27B:
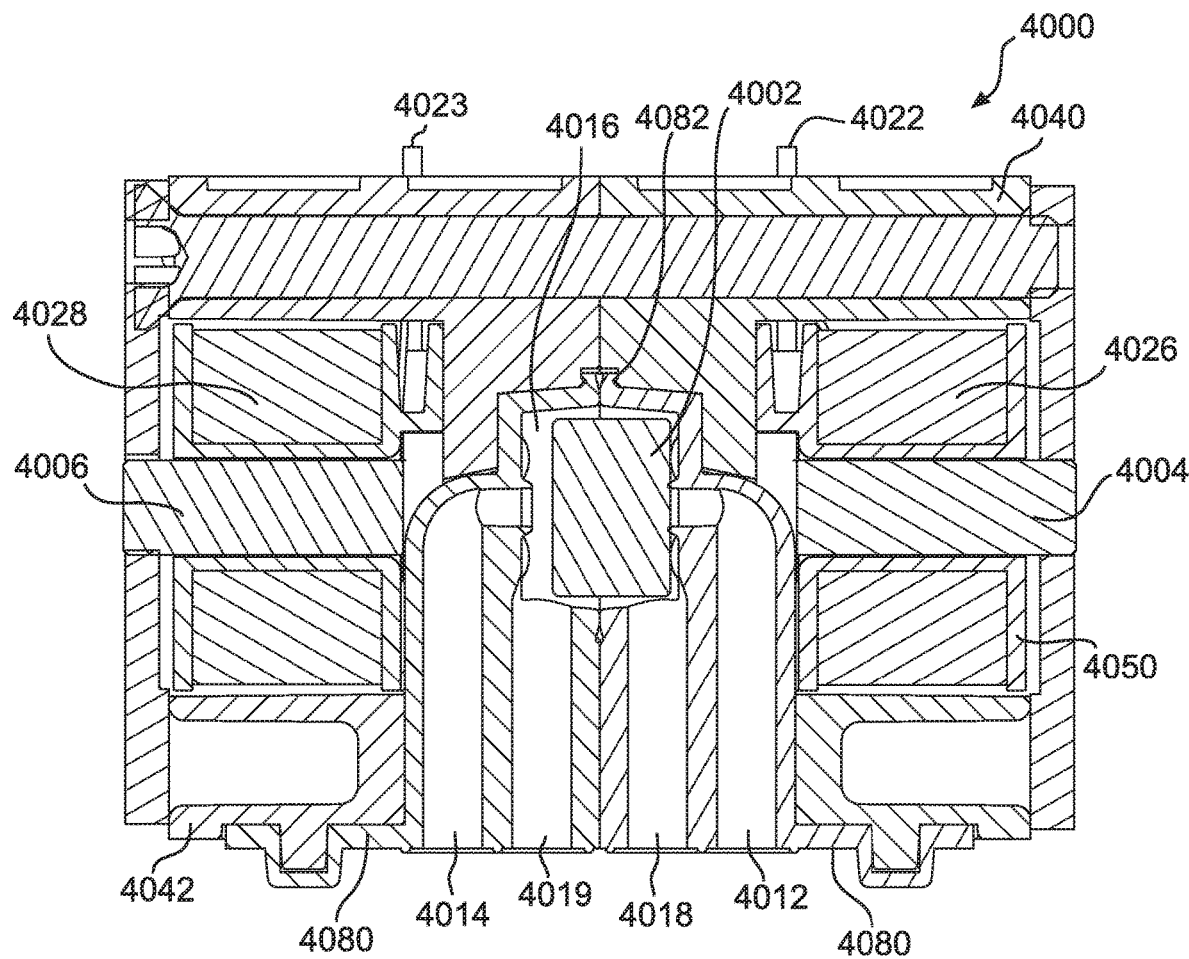
FIG. 27B is a cross-sectional view of the valve assembly of FIG. 27A.
Figure 27C:
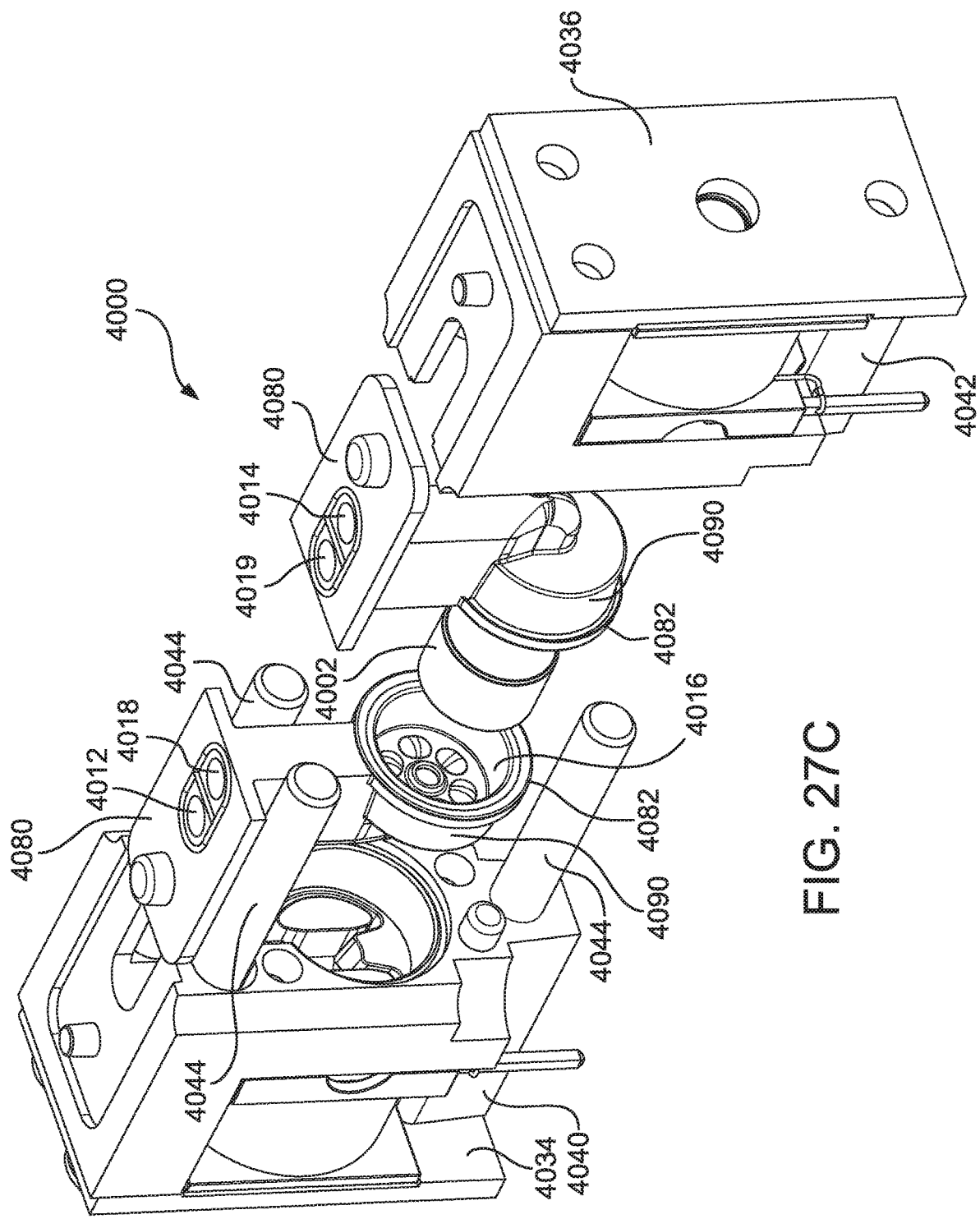
FIG. 27C is an exploded view of the valve assembly of FIGS. 27A and 27B.

As best shown in FIG. 27C, two inserts 4080 may be included in a bistable valve 4000. The inserts 4080 include a cavity portion 4090. When assembled, the cavity portion 4090 of each insert 4080 may cooperatively surround the shuttle 4002 and define the interior valve cavity 4016. The inserts 4080 may be made of an elastomeric or other compliant material such as Viton or comparable material. This type of material may allow the inserts 4080 to dampen noise generated as the valve toggles back and forth, and may allow for better sealing of the shuttle 4002 over pressure inlets 4012, 4014. In the example embodiment, the inserts 4080 also include the pressure inlets and outlets for the valve 4000, which tends to simplify manufacturing of the valve assembly. As shown, pressure inlets 4012, 4014 and output orifice 4018, 4019 are molded as part of each insert 4080. All inserts 4080 can be designed to have uniform dimensions and features, allowing them to be manufactured using the same mold.

Each of the inserts 4080 may include a sealing flange 4082. When assembled, the sealing flanges 4082 can abut and compress against each other. The valve bodies 4040, 4042 can be coupled together to form the bistable valve assembly 4000 by using one or more fasteners 4044 passing through end plates 4034, 4036. As best shown in FIG. 27B, abutment and/or mutual compression of the flanges 4082 may fluidically seal the interior valve cavity 4016 as the two valve bodies 4040, 4042 of the bistable valve 4000 are joined together.

Figure 27D:
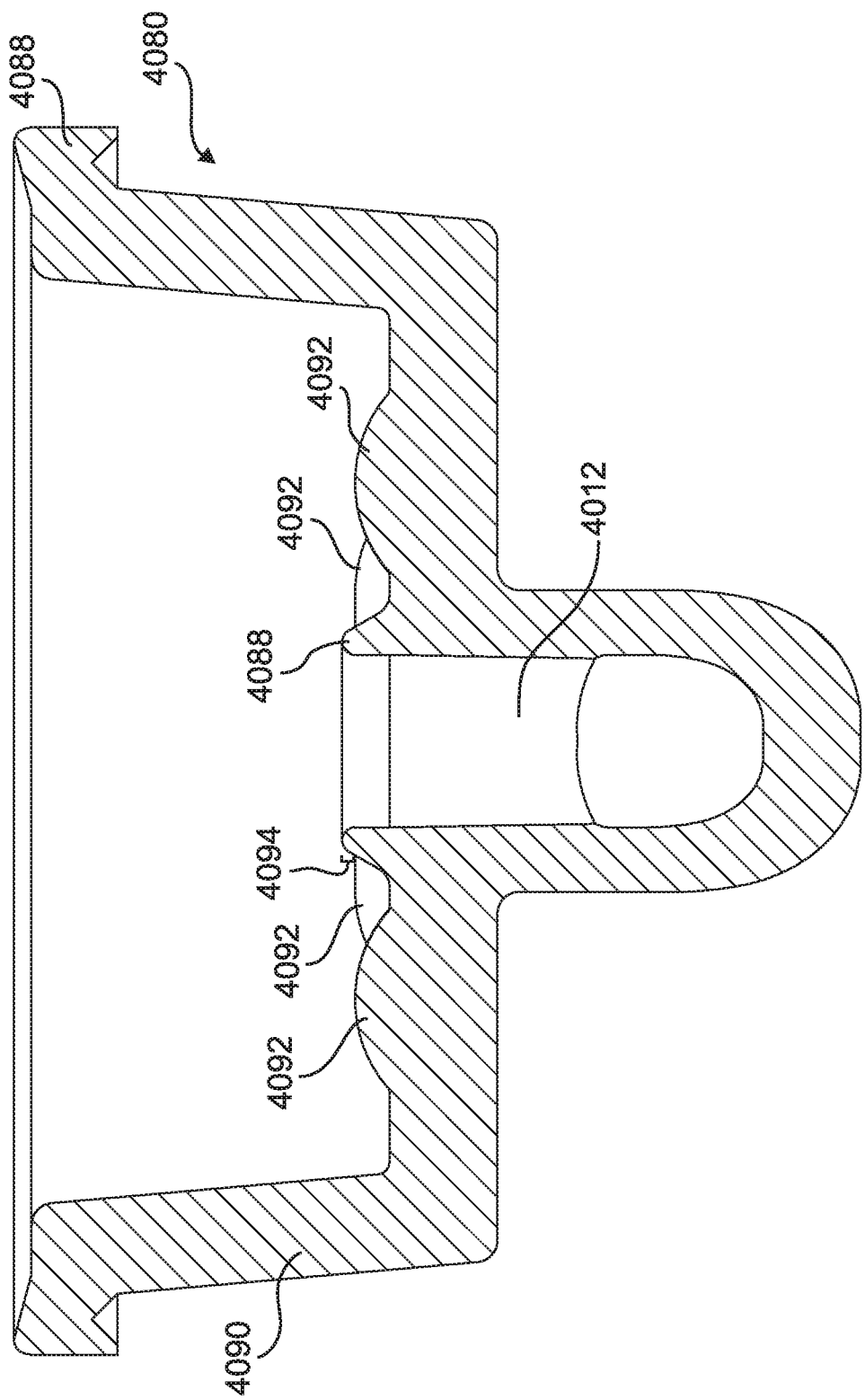
FIG. 27D is a cross-sectional view of a portion of an insert for a valve assembly.

FIG. 27D depicts a cross sectional view taken through the cavity portion of an insert 4080. As shown, the insert includes a valve seat 4088 surrounding the first pressure inlet 4012. Surrounding the valve seat 4088 are a number of raised elements 4092. The raised elements 4092 can be arranged to circumferentially surround the valve seat 4088 (e.g. continuously or at spaced angular intervals). The valve seat 4088 is slightly proud of the raised elements 4092. When the shuttle 4002 is in a sealing position over the valve seat 4088, the shuttle 4002 may be retained in that position via magnetic attraction. This magnetic attraction may cause some compression of the valve seat 4088 material. The height difference between the valve seat 4088 and the raised elements 4092 can be chosen so that the expected compression of the valve seat 4088 places it at substantially even height with the raised elements 4092. As a result, the shuttle 4002 can rest on both the valve seat and the surrounding raised elements 4092. The raised elements 4092 may help to support the edges of the shuttle 4002 and encourage it to sit flat against the valve seat 4088, helping optimize the seal created.

Referring back to FIG. 27B, when the shuttle 4002 is positioned against the valve seat 4088 of first pressure inlet 4012, the first output orifice 4018 and second output orifice 4019 are placed into fluid communication with a second pressure inlet 4014 through the interior valve cavity 4016. When the shuttle 4002 is positioned against valve seat 4088 of the second pressure inlet 4014, the first output orifice 4018 and second output orifice 4019 are placed into fluid communication with the first pressure inlet 4012. When one of the two pressure inlets 4012, 4014 is in fluid communication with the interior valve cavity 4016, the other pressure inlet is sealed by the shuttle 4002.

FIGS. 28A-28D depict another embodiment of a bistable valve assembly 4100. The bistable valve assembly 4100 includes a shuttle 4102 preferably made of a magnetized material. The shuttle 4102 is disposed in an interior valve cavity 4116. The bistable valve assembly 4100 also includes a first post 4104 and a second post 4106. The first post 4104 and second post 4106 act to direct magnetic flux pathways within the bistable valve assembly 4100. The first post 4104 and second post 4106 also act as cores for the electromagnetic coils 4126, 4128 of the bistable valve assembly 4100. An exemplary bistable valve assembly 4100 may include contact terminals 4122, 4123 connected to coils 4126, 4128. As shown, the coils 4126, 4128 may be included on a coil assembly 4150 which is placed into a receiving structure in the valve bodies 4140, 4142 during assembly. In the example embodiments, the coils 4126, 4128 are wound on bobbin-like coil assemblies 4150 similar to that depicted in FIG. 23.

The example embodiment in FIGS. 28A-28D includes a plurality of output orifices. As shown, the bistable valve assembly 4100 includes a first output orifice 4118 and a second output orifice 4119. When the shuttle 4102 is positioned over a first pressure inlet 4112, the first output orifice 4118 and second output orifice 4119 are placed into fluid communication with a second pressure inlet 4114 through the interior valve cavity 4116. When the shuttle 4102 is positioned over the second pressure inlet 4114, the first output orifice 4118 and second output orifice 4119 are placed into fluid communication with the first pressure inlet 4112. When one of the two pressure inlets 4112, 4114 is in fluid communication with the interior valve cavity 4116, the other pressure inlet is sealed by the shuttle 4102. An exemplary shuttle 4102 may be cylindrical and may be made from any material as described above with respect to various configurations of the shuttle. The first output orifice 4118 and second output orifice 4119 may connect to a common fluid line, or may each be connected to separate and isolated fluid lines, depending on the desired application. In the example shown, the pressure inlets 4112, 4114 are not included in or part of the first and second posts 4104 and 4106, which may help to simplify manufacturing of the bistable valve assembly 4100.

Figure 28A:
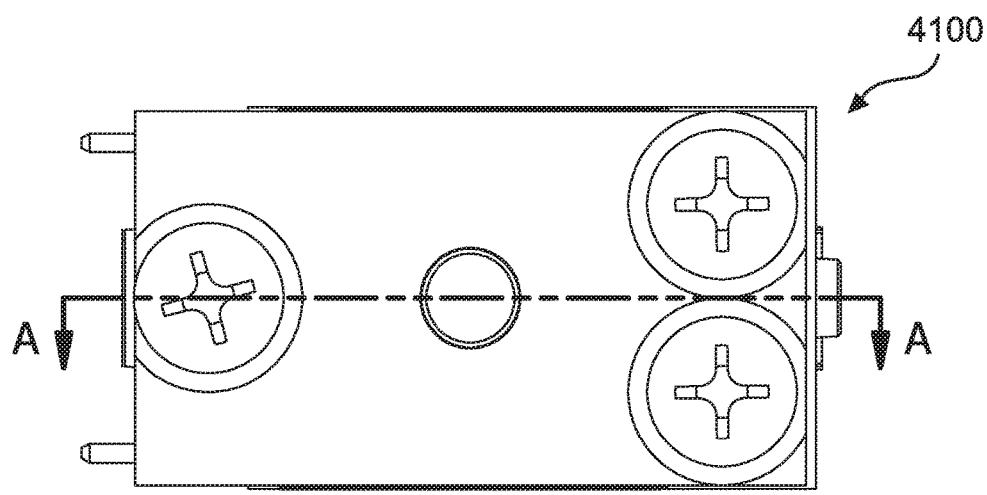
FIG. 28A is a plan view of a valve assembly.
Figure 28B:
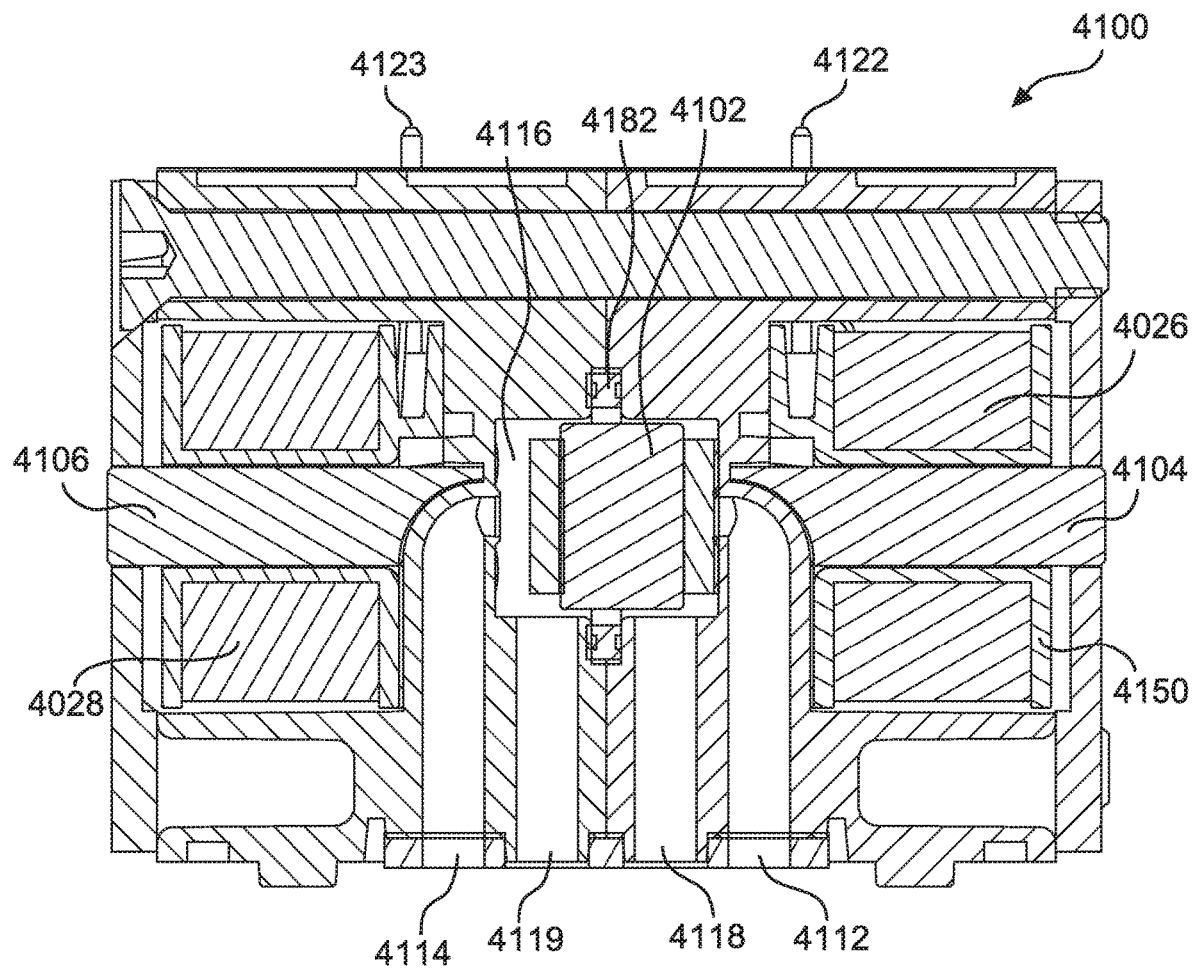
FIG. 28B is a cross-sectional view of the valve assembly of FIG. 28A.
Figure 28C:
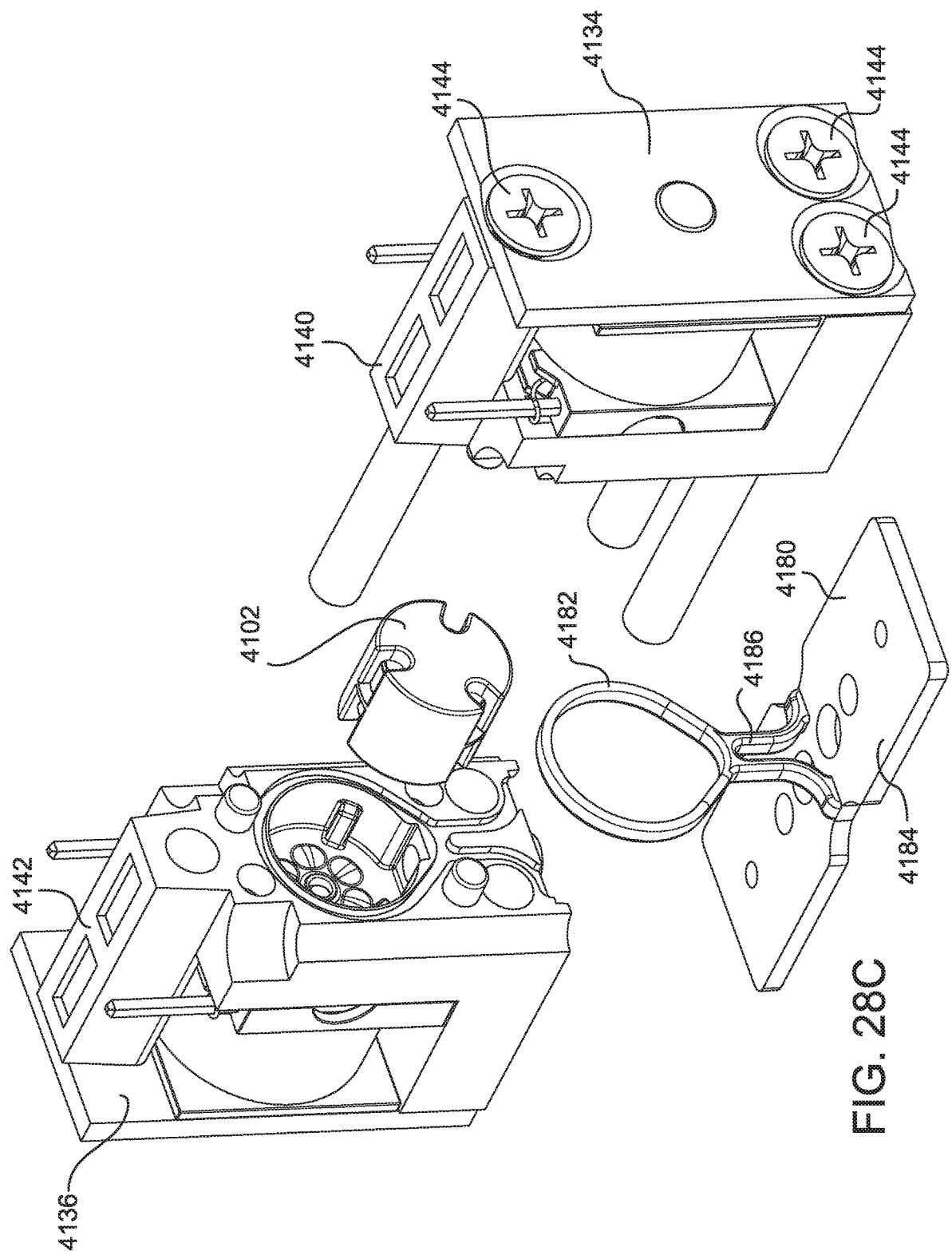
FIG. 28C is an exploded view of the valve assembly of FIGS. 28A and 28B.
Figure 28D:
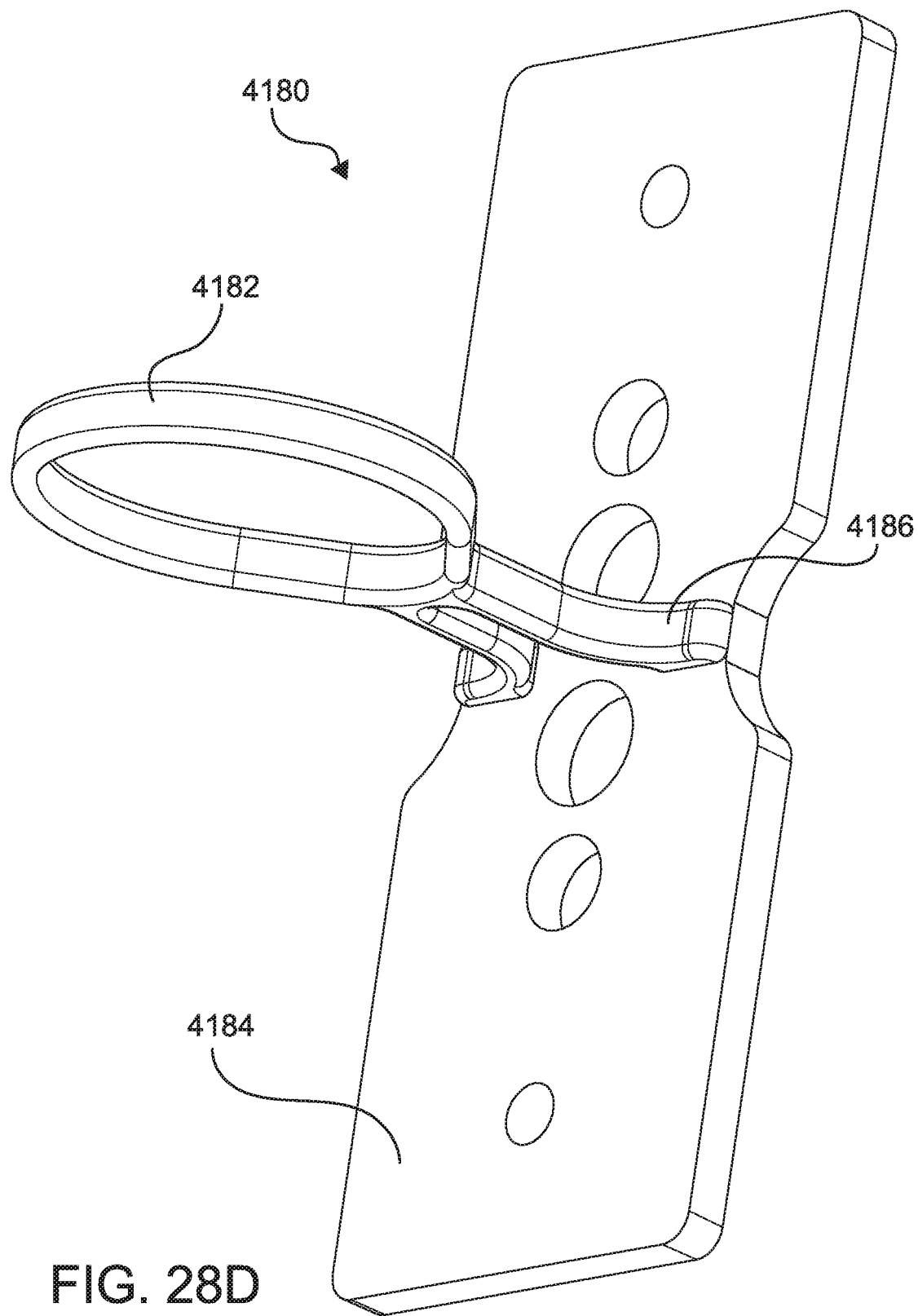
FIG. 28D is a perspective view of a monolithic valve gasket which may be included in a bi-stable valve assembly.

As best shown in FIG. 28C, a valve assembly such as the bistable valve assembly 4100 may use a monolithic gasket 4180 to simplify construction of the valve assembly. The monolithic gasket 4180 is shown in greater detail in FIG. 28D. The monolithic gasket 4180 includes a loop portion 4182 which is coupled to an input/output seal portion 4184 by a connecting region 4186. During assembly the valve bodies 4140, 4142 are coupled together to form the bistable valve assembly 4100 by passing one or more fasteners 4144 through end plates 4134. As best shown in FIG. 28B, compression of the loop portion 4182 may fluidically seal the interior valve cavity 4116 as the two valve bodies 4140, 4142 of the bistable valve 4100 are joined together. The loop portion 4182 may differ in shape depending on the geometry of the shuttle 4102 and other internal components, with the shape additionally being chosen based on the cross-sectional dimension of the interior valve cavity 4116. The input/output seal portion 4184 is configured to seal against a manifold into which the valve assembly 4100 is installed. By molding each sealing member together as a monolithic gasket 4180, part count can be reduced and manufacturing/assembly is simplified.

Figure 29A:
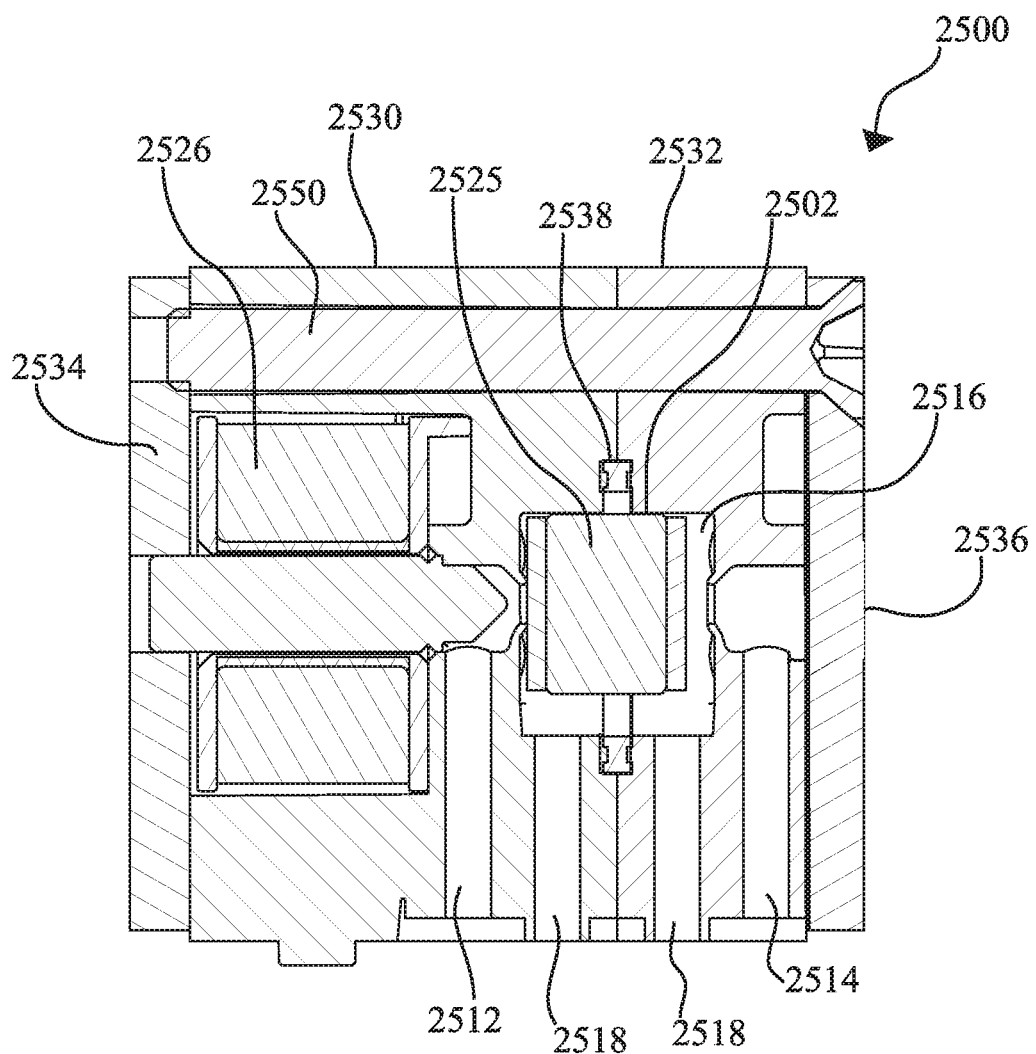
FIGS. 29A-D are cross-sectional and perspective views of an embodiment of a valve apparatus.
Figure 29B:
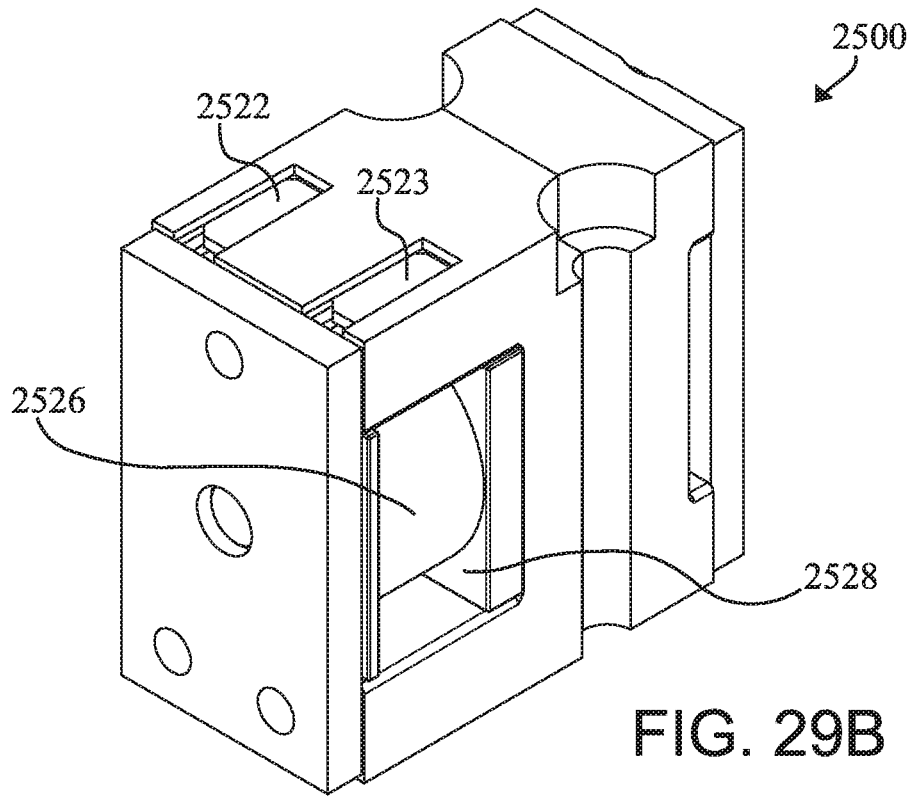
Figure 29C:
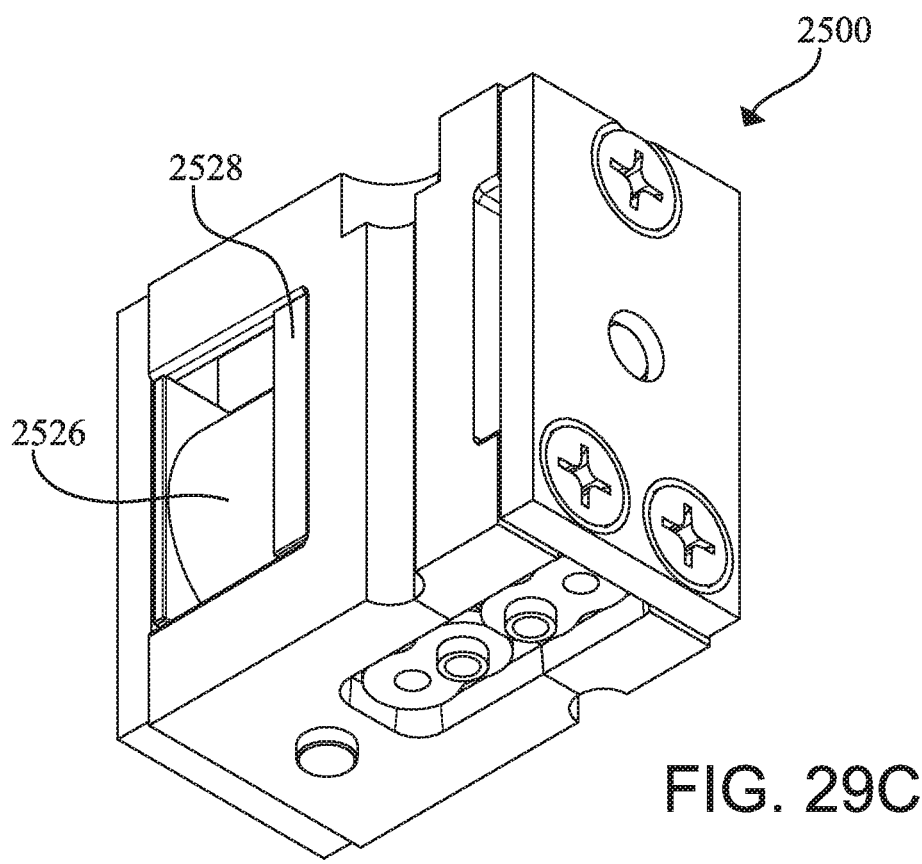

In some embodiments, a bistable valve such as or similar to any of those described herein may be modified to create a mono-stable valve. FIGS. 29A-29C depict an example mono-stable valve 2500 embodiment. As shown, the mono-stable valve 2500 includes a shuttle 2502 comprising a magnet 2525. The shuttle 2502 may further include a first membrane portion 2508 attached to a first face of the magnet 2525. The shuttle 2502 may also include a second membrane portion 2510 attached to an opposite, second face of the magnet 2525. The shuttle 2502 is disposed in an interior valve cavity 2516. The example embodiment shown in FIGS. 29A-C includes a first post 2104 only a single electromagnetic coil 2526. The coil 2526 may be supported on a bobbin-like support structure 2528 as best shown in FIGS. 29B-C.

Various embodiments, a mono-stable valve 2500 may include contact terminals 2522, 2523 (best shown in FIGS. 29B-C). In the example, the contact terminal 2522, 2523 are pad-like which as mentioned above, may allow for more forgiving tolerances. The example mono-stable valve includes two valve bodies 2530, 2532 similar to those shown in FIGS. 25A-C. End plates 2534, 2536, attached to the valve bodies 2530, 2532 are also included. A fastener 2550 may be used to couple the valve bodies 2530, 2532 and end plates 2534, 2536 together. In various other embodiments, any suitable method of attachment or coupling may be used in place of a fastener 2550 including adhesive, chemical bonding, RF welding, etc.

In a first position (shown in FIG. 29A) of the shuttle 2502, the first membrane portion 2508, which is attached to the magnet 2525, may be configured to create a seal over a first pressure inlet 2512. In this position, fluid communication from the first pressure inlet 2512 to the interior valve cavity 2516 is blocked. In the first position, fluid communication from a second pressure inlet 2514 into the interior valve cavity 2116 may occur. In a second position, the magnet 2525 may be configured to seal over the second pressure inlet 2514. In this position, fluid communication from the second pressure inlet 2514 into the interior valve cavity 2516 is blocked. In the second position, fluid communication from the first pressure inlet 2512 into the interior valve cavity 2516 may occur. As described elsewhere herein, fluid may be communicated from the interior valve cavity 2516 to one or more output orifice 2518.

Figure 29D:
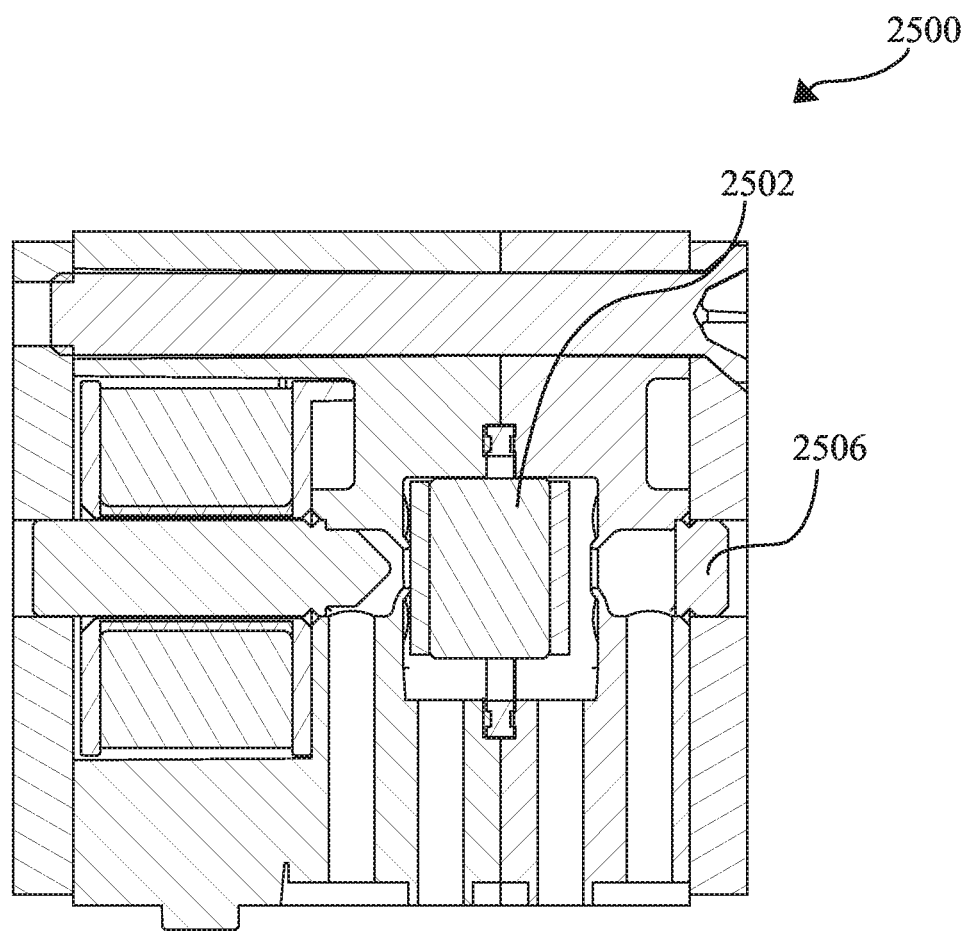

In the example embodiment, the shuttle 2502 is stable in the first position. In the first position, the shuttle 2502 is held in place by static magnetic attraction. To transition the mono-stable valve 2500 from the first position to the second position, the coil 2526 may be appropriately energized to repel the magnet 2525 in the shuttle 2502 such that the shuttle 2502 displaces from a sealing position over the first inlet 2512 to a sealing position over the second inlet 2514. A holding current may be supplied to the coil to keep the shuttle 2502 sealed against the second inlet 2514. Current may then be passed through the coil 2526 in the opposite direction to attract the shuttle 2502 such that the shuttle 2502 displaces back to the first position. In an alternative embodiment shown in FIG. 29D, a second post 2506 may be included. The second post 2506 may help to lower the holding current necessary to hold the shuttle 2502 in the second position. Such an embodiment may also generate less heat during operation.

Figure 30D:
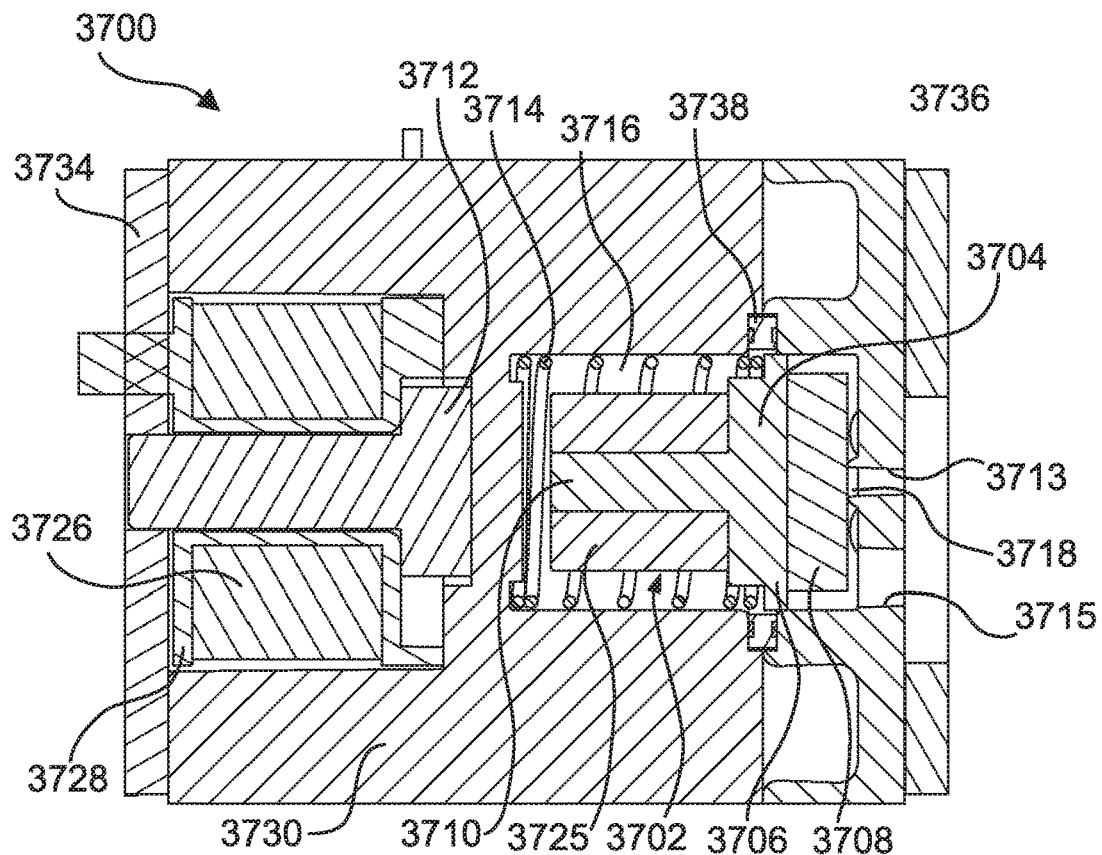
FIGS. 30D-E are cross-sectional views of the valve assembly of FIGS. 30A-C.
Figure 30E:
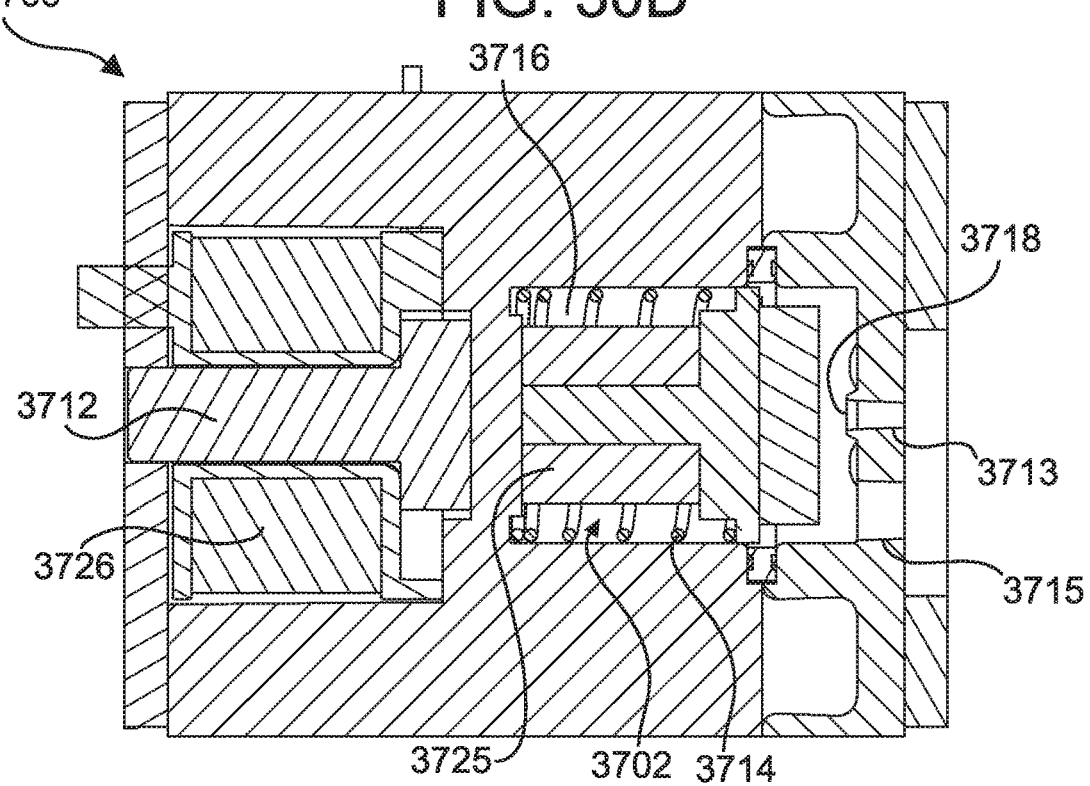

FIGS. 30A-30E depict an example of a bi-stable 2 way valve assembly 3700. Such a valve 3700 may not require a holding current when operated. The example embodiment shown in FIGS. 30A-30E includes a first post 3712 and an electromagnetic coil 3726. The coil 3726 may be supported on a bobbin-like support structure 3728 as shown in FIGS. 30B and 30C. The valve assembly 3700 may include contact terminals 3722, 3723 (best shown in FIG. 30B) for supplying current to the electromagnetic coil 3726 from an external source.

The example valve assembly 3700 includes a valve body 3730, an input/output body 3732 and end plates 3734, 3736. A fastener 3750 may be used to couple the valve body 3730, input/output body 3732 and end plates 3734, 3736 together. Rather than a fastener 3750, other methods of coupling may include use of an adhesive, chemical bonding, RF welding, etc. A sealing gasket 3738 may be compressed between the valve body 3730 and the input/output body 3732 when the valve 3700 is assembled.

As shown, the valve assembly 3700 includes a shuttle 3702 that includes a magnet 3725. The shuttle 3702 is disposed in an interior valve cavity 3716. The shuttle 3702 may further include a membrane portion 3708, in addition to a shuttle body 3706. The shuttle body 3706 has a shuttle face 3704 to which the membrane portion 3708 is attached. The membrane portion 3708 may be attached in any suitable manner. For example, the membrane portion 3708 may be overmolded to the shuttle face 3704. The shuttle body 3706 may also include a shuttle stem 3710. The magnet 3725 may be ring or O shaped with a substantially central opening sized so that the magnet 3725 may be slid over the shuttle stem 3710 and attached to the shuttle body 3706.

A biasing member 3714 may also be included in the interior valve cavity 3716. The biasing member 3714 in the example shown is a compression spring. The biasing member 3714 is seated against a wall of the interior valve cavity 3716 opposite the valve seat 3718 and contacts a surface of a flange 3724 on the shuttle body 3706. The biasing member 3714 applies a biasing force on the shuttle 3702 to a first position within the interior valve cavity 3716.

In a first position (shown in FIG. 30D) of the shuttle 3702, the first membrane portion 3708, is configured to press against and create a seal over a valve seat 3718. In this position, fluid communication from a pressure inlet 3713 to the interior valve cavity 3716 is blocked. In the first position, a pressure outlet 3715 is in fluid communication with the interior valve cavity 3716. In a second position, the shuttle 3702 is displaced away from the valve seat 3718. In this position, fluid communication between the pressure inlet 3715 and the pressure outlet 3715 via the interior valve cavity 3716 is established.

In the example shown, the shuttle 3702 is stable in the first position due to the biasing force exerted by the biasing member 3714. Optionally, the shuttle may be stabilized in the first position by the addition of a magnet to provide magnetic attraction between the shuttle 3702 and the input/output body 3723 and/or end plate 3736. To transition the valve 3700 from the first position to the second position (FIG. 30E), the coil 3726 can be energized to attract the magnet 3725 in the shuttle 3702 so that the shuttle 3702 is no longer in a sealing position over the valve seat 3718. The electromagnetic attraction is sufficient to overcome the biasing force of the biasing member 3714. The shuttle 3702 can then be retained in the position against the restoring force of the bias member 3714 by the magnet's 3725 magnetic attraction with the first post 3712. Thus a holding current is not necessary to hold the shuttle 3702 in either the first or second positions. Current may be passed through the coil 3726 in the opposite direction to repel the shuttle 3702 such that the shuttle 3702 displaces back to the first position.

Shuttle Constraining Features

In some embodiments, a bistable valve such as, though not limited to any of those described herein may include one or more feature(s) which serve to constrain the shuttle about one or more degrees of freedom. This may help to ensure that a magnet of the shuttle has its poles oriented in a prescribed manner. It may help to ensure that the shuttle will repeatedly and reproducibly make a proper seal on the fluid inlets to an interior valve cavity. Additionally, a constraining feature may help simplify assembly of a bistable valve since a constraining feature may help to ensure that a shuttle can only be installed in the valve in a proper orientation. In some specific embodiments, all but one degree of freedom of the shuttle may be substantially constrained. For example, all of the shuttle's rotational degrees of freedom may be constrained while all but one of the shuttles translational degrees of freedom may be constrained. The translational degree of freedom which is not constrained may be a degree of freedom which allows the shuttle to displace about the axis of the interior valve cavity.

In some embodiments, a shuttle may have one or more keyed alignment features that serve as a constraining feature. Each of the one or more keyed alignment features cooperate with the interior valve cavity to constrain the shuttle to the desired degrees of freedom. A keyed alignment feature may take any of a variety of forms. For example, the cross sectional shape of a shuttle may be chosen to inhibit motion about unwanted degrees of freedom. A shuttle may be polygonal, ovoid, or irregularly shaped and may displace within a cooperatively shaped interior valve cavity. Alternatively, the interior valve cavity may include one or more guide projection which extends from the wall of the interior valve cavity into the volume of the interior valve cavity. Each guide projection may fit into a respective corresponding recess in the shuttle and serve to constrain the shuttle from undesired movement. The guide projection may or may not be dovetailed depending on the embodiment. The keyed alignment feature used may be selected so as to provide suitable magnetic flux paths within a bistable valve. Alternatively, the keyed alignment feature may not be a continuous part of the magnet of the shuttle. For example, the keyed alignment feature may be a non ferrous or non-magnetic insert or attachment which is coupled into, onto, or around the magnet. Such an insert or attachment may be made of any suitable metal of plastic. In embodiments with a plurality of magnets, the keyed alignment feature may be included on a piece of material which is captured or retained between two of the magnets of the shuttle. Alternatively, the piece of material including the keyed alignment feature may as serve to retain the magnets of the shuttle. The keyed alignment feature may or may not extend through the entire thickness of the shuttle.

Figure 31:
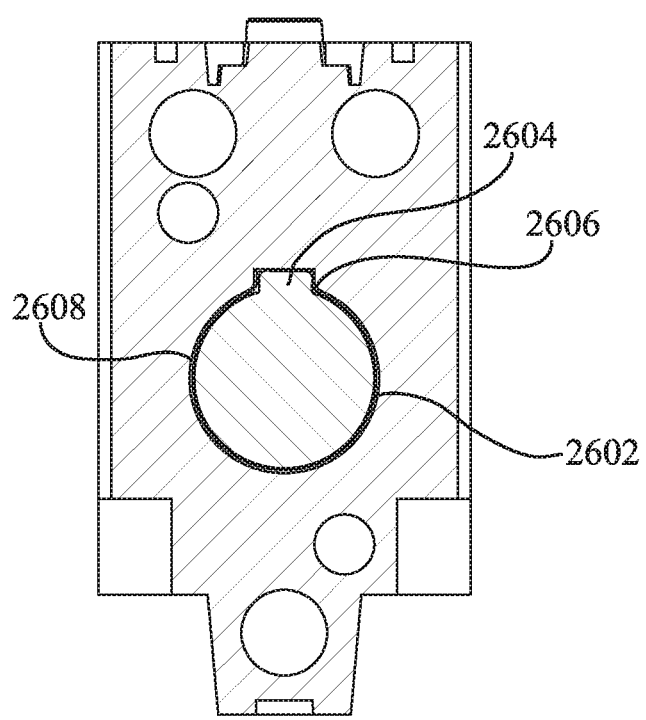
FIG. 31 is a cross-sectional view of an interior cavity of a bi-stable valve in which the shuttle includes a keyed alignment feature.

In other embodiments, such as the embodiment depicted in FIG. 31, the shuttle 2602 of a bistable valve 2600 may include a guide or tab projection 2604. This projection 2604 may fit into a corresponding recess 2606 in the side wall of the interior valve cavity 2608. The recess 2606 may include rollers or ball bearings (not shown) in some embodiments to minimize friction. As mentioned above, this guide tab or projection 2604 may be dovetailed although in the example embodiment, a dovetailed feature is not present. As shown, the guide tab or projection 2604 would substantially prevent yawing of the shuttle 2602. The footprint of the interior valve cavity 2608 is only slightly larger than the footprint of the shuttle 2602. Due to the thickness of the shuttle 2602, the interior valve cavity 2608 will substantially prevent roll and pitching of the shuttle 2602. The footprint of the interior valve cavity 2608 will also substantially prevent translational displacement of the shuttle 2602 in directions other then the axial direction of the interior valve cavity 2608.

FIGS. 32A-32C depict an example shuttle 2700 which includes a number of keyed alignment features 2702. As shown, the keyed features 2702 are small pegs which project outwardly from a magnet retaining structure 2704 of the shuttle 2700. As best shown in FIG. 32C, two crown members 2706 may be placed over the ends of the magnet retaining structure to hold the magnets 2708 in place in the magnet retaining structure 2704. The crown members 2706 may also each capture a piece of pliant material 2710 against the magnet retaining structure 2704 when the shuttle 2700 is assembled. The crown members 2706 may be held in place by any suitable means. For example, the crown members 2706 may be solvent bonded, glued, high frequency welded, ultrasonically welded, etc. onto the magnet retaining structure 2704. The pegs extend outwardly from the magnet retaining structure 2704 such that the width of the shuttle 2700 is greatest at the location of the pegs. Thus the shuttle 2700 may ride along peg receiving tracks in an interior valve cavity and be substantially restrained from undesired movement. In alternate embodiments, it should be noted that the keyed feature may be a projection from any other part of a shuttle. For example, the keyed feature may be a projection on one or both of the crown members 2706 of a shuttle.

Figure 33A:
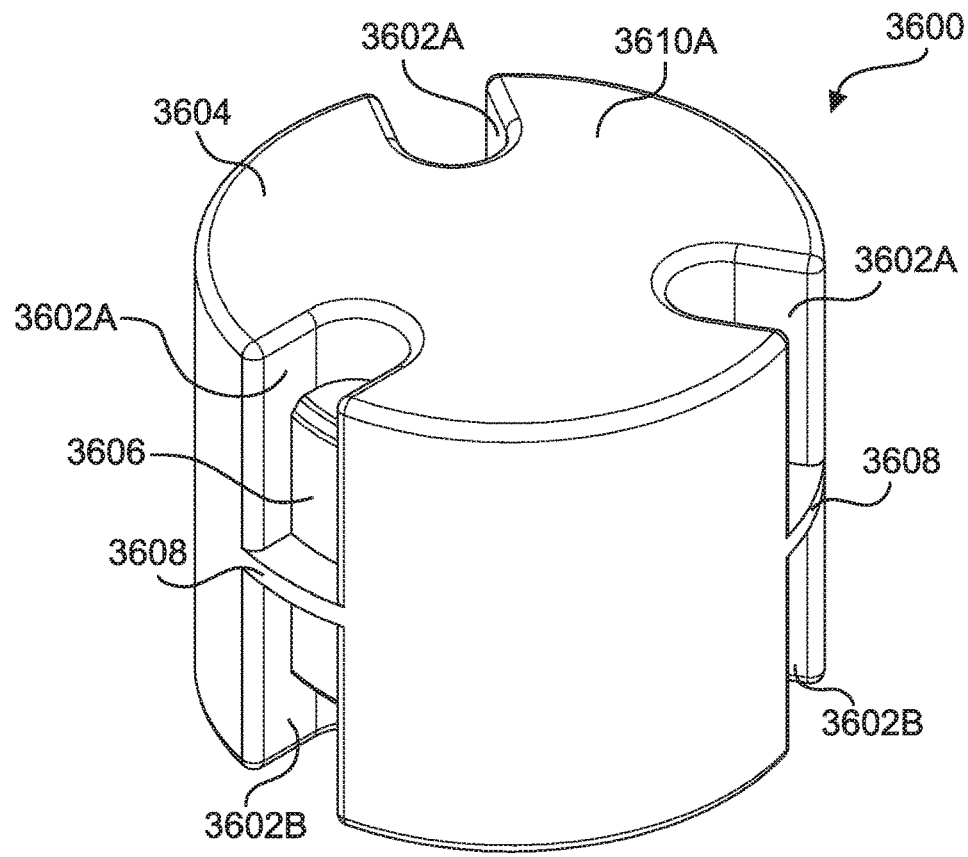
FIGS. 33A-33B are perspective views of an example shuttle.
Figure 33B:
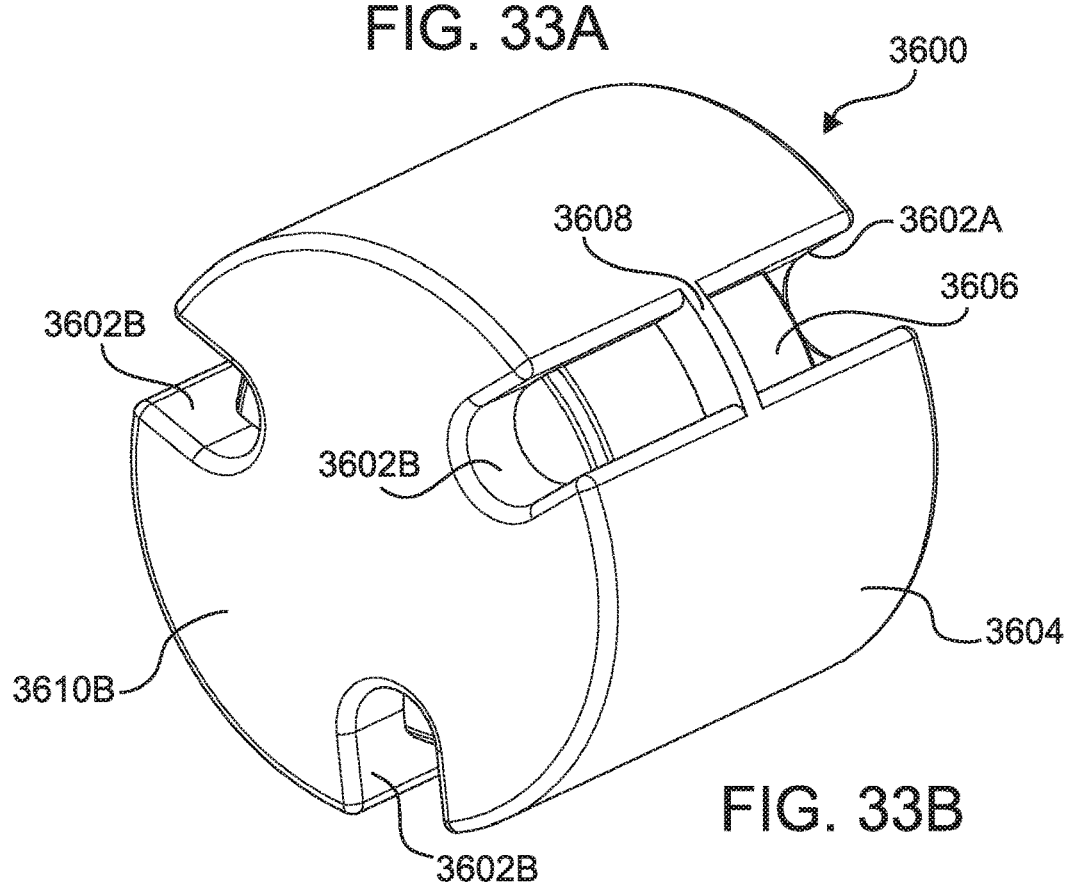
Figure 33C:
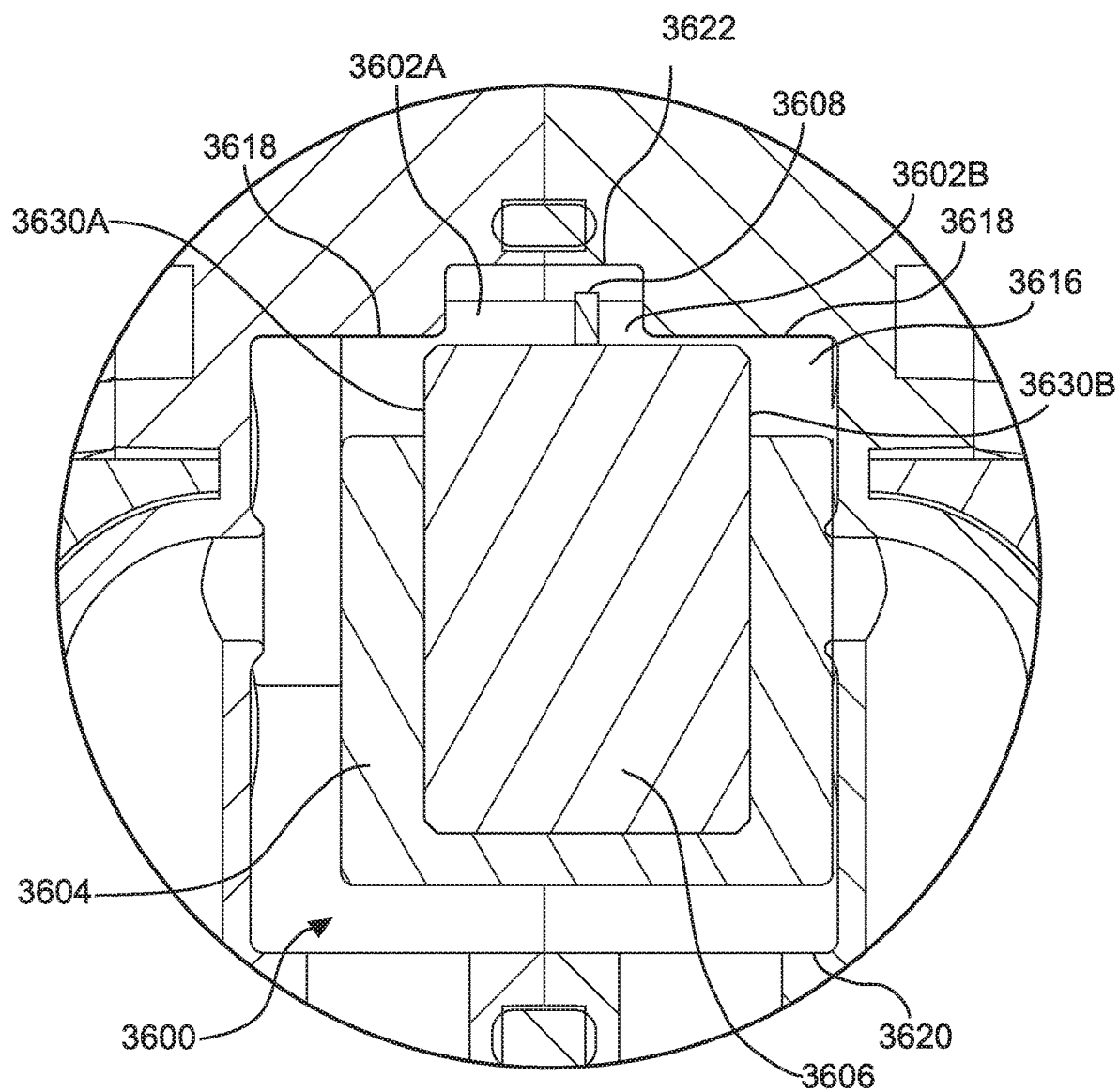
FIG. 33C is a cross-sectional view of an exemplary valve cavity in which the shuttle of FIGS. 33A-B is positioned.

FIGS. 33A-33C depict an example embodiment of shuttle 3600 including a number of notches 3602A, B which act as constraining features. The notches 3602A, B may be formed in an overmolded coat 3604 which covers a magnetic or metal body 3606 of the shuttle 3600. The overmolded coat 3604 optionally, either in whole or in part, is made of an elastomeric material which may further help to ensure that a proper seal is made over valve seats of a valve as it is toggled between positions. As shown the notches 3602A, B are included in aligned pairs which are separated by ridges 3608. A first set of notches 3602A extend toward the ridges 3608 from a first face 3610A of the shuttle 3600. The second set of paired notches 3602B extends toward the ridges 3608 from a second, opposing face 3610B of the shuttle 3600. Though the notches 3602A, B are aligned in the example embodiment, in other embodiments, notches 3602A can be angularly offset from notches 3602B.

Referring now primarily to FIG. 33C, a cross section is shown depicting the shuttle 3600 in an example interior valve cavity 3616. The notches 3602A, B cooperate with one or more guide structures 3618 which extend from the interior wall 3620 of the interior valve cavity 3616 toward the shuttle 3600. The guide structures 3618 may be dimensioned so as to be received in the notches 3602A, B when a valve is assembled. The ridges 3608 may also act as constraining features. The ridges 3608 may extend into tracks 3622 within the interior valve cavity 3616 of a valve. In some embodiments, the length of the tracks 3622 may serve to limit travel of the shuttle 3600 within the interior valve cavity 3616. As the shuttle 3600 is displaced, it may move, for example, until it is inhibited by the ridges 3608 abutting an end of their receiving tracks 3622 in the interior valve cavity 3616.

As best shown in FIG. 33C, the portion of the overmolded coat 3604 over the faces 3630A, B of the magnetic of metal body 3606 optionally is thicker than those covering the sides of the metal body 3606. In one example, the portion of the overmolded coat 3604 over the faces 3630A, B is about 20-30% (e.g. 25%) the thickness of the metal body 3606. In a specific example, the portion of the overmolded coat 3604 over the faces 3630A, B is about 0.03" thick.

Valve/Controller Manifold Modules

Figure 34A:
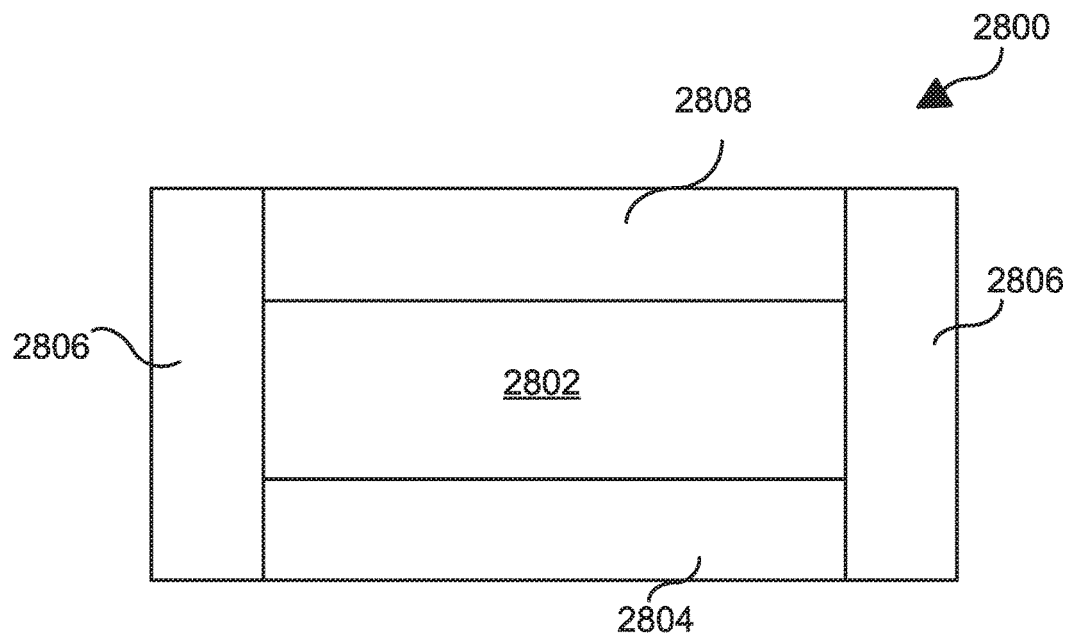
FIG. 34A depicts an abstracted block diagram of a valve module.

Valves such as binary valves, vari-valves, or any of the valves described herein may, in some embodiments, be supplied as modular that can be plugged into a manifold frame or base to provide pneumatic, hydraulic or electrical control of external devices, such as fluid flow control devices, heaters, motors, or hydraulic or pneumatic devices. An abstracted block diagram of such a valve module or valve manifold module 2800 is shown in FIG. 34A. Each valve module 2800 may comprise one or more valves 2802. Additionally, each valve module 2800 may include electronic components necessary to operate the valves 2802 included in the valve module 2800. These can include an electronic controller equipped to perform a number of programmed commands to the valves to allow the valve module 2800 to actuate or control an external device in at least a partially autonomous manner. A valve module 2800 may thus be an assembly of one or more valves 2802 connected to one or more on-board PCBs (printed circuit or electronic control boards) populated with electronic components 2808 suitable for operating the valves autonomously or semi-autonomously with respect to a main or central controller. This may help to offload some of the computing resources necessary to run the valves 2802 from a main processor of a device. The main processor may then only need to send a valve module 2800 higher level commands. These high level commands may include, for example, start commands, stop commands, pause/resume commands, commands to perform a measurement, commands to reverse liquid flow in an associated flow control device, commands to properly sequence the operation of on-board valves, commands to coordinate valve actions among a local group of modules, and commands to perform template functions pre-programmed on the PCB 2808. Once a higher level control program has been received, the PCB 2808 may command a valve module 2800 perform a valve function (e.g., opening or closing a port in a prescribed sequence or at a prescribed rate) in an autonomous manner without further input from an external controller. Alternatively, the PCB may be programmed to operate a valve module 2800 to perform a valve function in an entirely autonomous manner without any input from an external controller.

In embodiments in which a valve manifold module 2800 includes a plurality of valve assemblies 2802, the PCB 2808 may be configured such that all of the valves 2802 in the module 2800 may be operated using a common power source or bus. Additionally, in embodiments in which a module 2800 includes multiple valve assemblies 2802, each of the valve assemblies 2802 may be mounted on a modular manifold base 2804 which includes or is connected to manifold fluidic (hydraulic or pneumatic) flow paths (fluid buses) for those valves 2802. An integrated manifold assembly comprising a plurality of concatenated valve manifold modules 2800 can thus be assembled (attached or connected together, for example by fasteners), and configured for control or operation of an external device, such as a liquid flow control device (e.g. pump and valve device for transfer of a liquid). A modular valve/manifold assembly constructed in this manner can permit maintenance, repair or replacement of individual valve modules 2800 by plugging in or unplugging the valve module 2800 from the manifold. Also, within each valve module 2800 are a bank of valve assemblies 2802 whose ports and electrical connections (as well as housing dimensions) can be sufficiently identical to be interchangeable among the designated receptacles in the module 2800. A particular valve manifold module 2800 can also be readily re-configured for operation of an external device having different features or functions (e.g., a different array of fluid flow control pumps and valves, or a system with additional electronic, electrical, hydraulic or pneumatic functions).

Each PCB 2808 may include, for example, a pressure sensor which is configured to read the pressure of a fluid volume in the module. In some embodiments, the pressure sensors may read the pressure from wells in the module manifold or block 2804 which fluidically communicate with the fluid pathways in the module block 2804. O-rings, gasketing, or another suitable seal may be included to provide a seal between the volume of the wells in the module block 2804 and the ambient environment. In some embodiments, one of more o-rings or gaskets may be compressed to create the seal as the PCB 2808 is coupled to a module block 2804. In other embodiments, the pressure sensors of the PCB 2808 may communicate with the interior valve cavities of respective valves 2802 via any suitable fluid path. In the representational embodiment shown, the PCB 2808 pressure sensors may for example be in fluid communication with the interior valve cavities directly through a fluid path in each of the respective valves 2802. Alternatively, the PCB 2808 pressure sensors may be in communication with the flow paths leading from the valve 2802 outlets via a flow path through the end blocks 2806 on the ends of the module 2800. Other arrangements may also be used.

Other sensors may also be included on the PCB 2808. Such sensors may include current sensors. These current sensors may be configured to sense the current running through the electromagnetic coils of a valve 2802 for example. Data provided by these current sensors may allow for a determination to be made about whether or not a valve 2802 is functioning properly. The PCB 2808 may also be equipped to receive electronic signals from remote sensors, and to convert these signals to digital form using any suitable A/D converter mounted to the PCB. Such signals may be derived from remote pressure sensors, conductivity sensors, temperature sensors, air-in-line sensors, fluid level sensors, flow sensors, as well as other types of sensors depending on the application to which the application to which the valve/controller module is directed.

Additionally, a processor or processing components may be included on the PCB 2808 and may allow a valve module 2800 to autonomously carry out or execute various valve-related applications. Thus a module 2800 may require little or no direction from an external processor included in the device in which the module 2800 is installed. The processor or processing components of the PCB 2808 may make use of and analyze data collected from other components (e.g. pressure sensors) of the PCB 2808 to meet the needs of a particular application.

There may be different modules 2800 for different valve applications that are populated with different electronic components suitable for a particular application. Additionally or alternatively, modules 2800 may be programmed in a variety of different ways depending on intended application. Some individual modules 2800 may be programmed such that they may perform a multiplicity of tasks. In some specific embodiments, the valve(s) 2802, the PCB 2808, and other components of the valve module 2800 may be overmolded together such that all of the components of the module 2800 are physically attached to one another and form a single unit. In some applications, a valve/control module may be permanently programmed to perform basic functions (e.g. coordinating the opening and closing of inlet and outlet valves while driving a pump, regulating the flow or pumping rate of the pump, detecting aberrant flow conditions, etc.), but may be automatically assigned more specific or detailed tasks upon connection of the valve/control module to a particular location on a communications control bus, such as a controller area network ('CAN') bus.

Figure 34B:
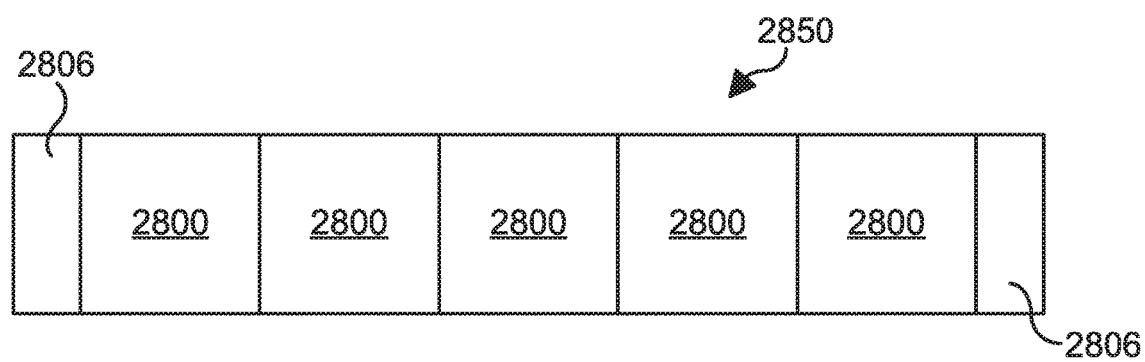
FIG. 34B depicts an abstracted block diagram of a manifold comprising a number of valve modules.

Referring now also to the representational embodiment shown in FIG. 34B, each module 2800 may be configured such that it may be connectable to another module 2800. This would allow a user to easily assembly a manifold 2850 which will suit a particular desired application. To facilitate such interaction, the valve modules 2800 may be arranged such that fluid pathways of each module 2800 may be connectable or coupleable to fluid pathways of another module 2800. End blocks 2806 may be placed on the ends of the manifold 2850 to allow an assembled manifold 2850 to interface with other components such as a pressure reservoir or bus of a device, and electronic communication bus of a device, and/or a power bus of a device. An o-ring, gasket, or seal may be provided to ensure integrity of the fluid paths within the manifold 2850.

When connected together, the electronic components of each connected module 2800 may be placed into communication with one another. This allows for a number of connected modules 2800 to utilize power from a single source (e.g. a device power bus). Communication also allows for sharing of valve state/pressure data between valves 2802 and facilitates module to module synchronization. Additionally, this may allow for some modules 2800 to be made with fewer or less complex electronic components making it more economical to build up a manifold 2850 out of a number of valve modules 2800. Module-to-module and system or main controller to module communication may be accomplished with any suitable communication scheme, including, in some specific embodiments, a CAN-bus. It may be desirable to utilize a CAN-bus communication scheme as it is low power and is of relatively low complexity. Each module 2800 may include a terminating resistor which can be switched on and off to terminate the manifold 2850 if the module 2800 is at the end of the manifold 2850 (and/or at the end of the CAN-bus communications chain).

A manifold 2850 of one or more valve modules 2800 may communicate with other components of a device wirelessly or via wired connection to a device communication bus. In embodiments in which a manifold 2850 of one or more valve module(s) 2800 is controlled remotely or wirelessly, intermodular communication within the manifold 2850 optionally may also be wireless.

In some embodiments, each valve module 2800 may be configured as specializable, but without a preset assigned functionality. That is, the module 2800 may have the hardware capability to perform a full set of valve-related tasks or applications. Tasks may include, but are not limited to, synchronization of inter-modular operations, functioning as master module for a multi-module manifold 2850, functioning as a pumping module by supplying pressure to a pneumatically or hydraulically driven fluid pump, functioning as a pneumatic or hydraulic valve controller by supplying pressure to a pneumatic/hydraulic valve interface, etc. In some specific implementations, tasks may include supplying pressure to an interface for a pumping cassette to effect pumping of fluid in the pumping cassette, supplying pressure to an interface for a pumping cassette to actuate valves of the pumping cassette, supplying pressure to an interface for a pumping cassette to direct fluid flow through the pumping cassette, etc.

As modules 2800 are added onto a manifold 2850 carrying hydraulic or pneumatic supply lines, the modules 2800 may be specialized to particular tasks or applications, which in an embodiment may be automatically determined by the location of the module along an interconnected chain of modules on a communications bus, such as a CAN-bus. Further specialization may also be imposed during operation by a system controller as required by particular applications. For example, a module 2800 specialized to act as a pumping module may be further programmed to pump at a specific pressure or flow rate.

By making each valve module 2800 specializable, manifolds 2850 assembled from the interconnection or concatenation of such modules 2800 would be easily scalable. Such a module 2800 would allow for custom manifolds 2850 to be easily built up and assembled with reduced development effort. Additionally, modules 2800 would be easily swappable due to their interchangeability, thus facilitating replacement of a module 2800 within a pre-existing multi-module manifold 2850. In an embodiment, the specific task assigned to a replaced module may be automatically assigned to the new module by (1) its location along the chain of modules on the communications bus, and/or (2) by a system controller that has been alerted to the presence of the new module (e.g. by a unique identifier) and its location on the communications bus or along the manifold assembly.

In some embodiments, modules 2800 may be self-enumerating and may be assigned a unique identifier after a module 2800 has been installed onto a manifold 2850. A processor included on a PCB 2808 of a master module may take a census of the modules 2800 connected to one another in a manifold 2850. As mentioned above, any module 2800 may be assigned as the master module. This census may be updated as additional modules 2800 are added to the manifold 2850 or as modules 2800 are removed from the manifold 2850. The processor of the master module may also assign one or more specialization(s) to each module 2800 forming the manifold 2850. The specialization assigned may depend on the physical position of a module 2800 within the manifold 2800. In one example implementation, when the census of the manifold 2850 modules 2800 is taken, each module 2800 may be assigned a unique identifier (e.g. module 1, 2 . . . n). The census may also determine the spatial arrangement of modules 2800. For example, a processor of the master module may determine, during the census, that module 2 is adjacent side A of module 1 and also adjacent side B of module 3. This spatial arrangement data aids in automatic assignment of module 2800 tasks. In some embodiments, spatial arrangement may be implied from identities of the modules 2800 after they are given their identifier. This may be an effect of the manner in which the modules are assigned identifiers. Alternatively, automatic enumeration of modules 2800 in a manifold 2850 need not be orchestrated by a master module, but may be accomplished by each module 2800 determining its own identity in the manifold 2850 (described later in the specification).

In some embodiments, new modules 2800 which are added to a manifold 2850 either as replacements for old modules 2800 or to expand the size of the manifold 2850 may be automatically enumerated. As an example, if module 2 has a fault and needs to be replaced with a new module 2800, the processor of the master module may detect when the new module 2800 has been installed and automatically assign it as module 2. Alternatively, the new module 2800 may determine its own identity. The new module 2800 may then assume the identity and task set of the original module 2, executing commands issued for module 2 and communicating with other modules 2800 the same as the previous module 2.

Fault conditions may be communicated in an intermodular manner within a multi-module 2800 manifold 2850. This may allow a manifold 2850 to adapt to certain faults depending on the manifold 2850 configuration. A processor of a master module may command that the manifold 2850 operate in a "limp home" mode in the event of particular fault conditions. For example, in the event that the manifold 2850 includes two pumping modules and one has a fault, the processor of the master module may determine the most efficient manner to continue pumping with the remain pumping module and command the modules 2800 of the manifold 2850 to operate in that manner.

In a scenario in which a communications bus of a manifold 2800 has a fault and is interrupted, but the power bus remains functional, modules 2800 of the manifold 2850 may identify the fault and switch to operation in a fail safe mode. Fluid valves may, for example, be commanded to automatically close. Any other desirable fail safe mode could also be implemented. For example, a module 2800 could be programmed to continue pumping of fluid at a previously programmed or commanded flow rate. In this way, the failure of one module in the manifold assembly may result in loss of communications to the downstream modules, but some of the modules may be allowed to operate in an autonomous manner until the system is wound down in an orderly manner. For example, a blood pump module could be allowed to continue to operate for a designated period of time if a dialysate pump module were to fail in a hemodialysis system.

In some embodiments, modules 2800 may also be able to detect and reacted to various conditions of interest. For example, in embodiments where at least one of the modules 2800 of a manifold 2850 is a pumping module, a processor of a module 2800 may be able to detect flow condition related information. In the event that an abnormal flow condition is detected (e.g. a reduced or no flow condition), the module 2800 may arrange for and/or perform troubleshooting or may request that the processor of the master module command troubleshooting be performed. This troubleshooting may determine, for example, if an occlusion exists. The manifold 2850 may then cease pumping and signal that an error condition exists if an occlusion is detected.

Figure 34C:
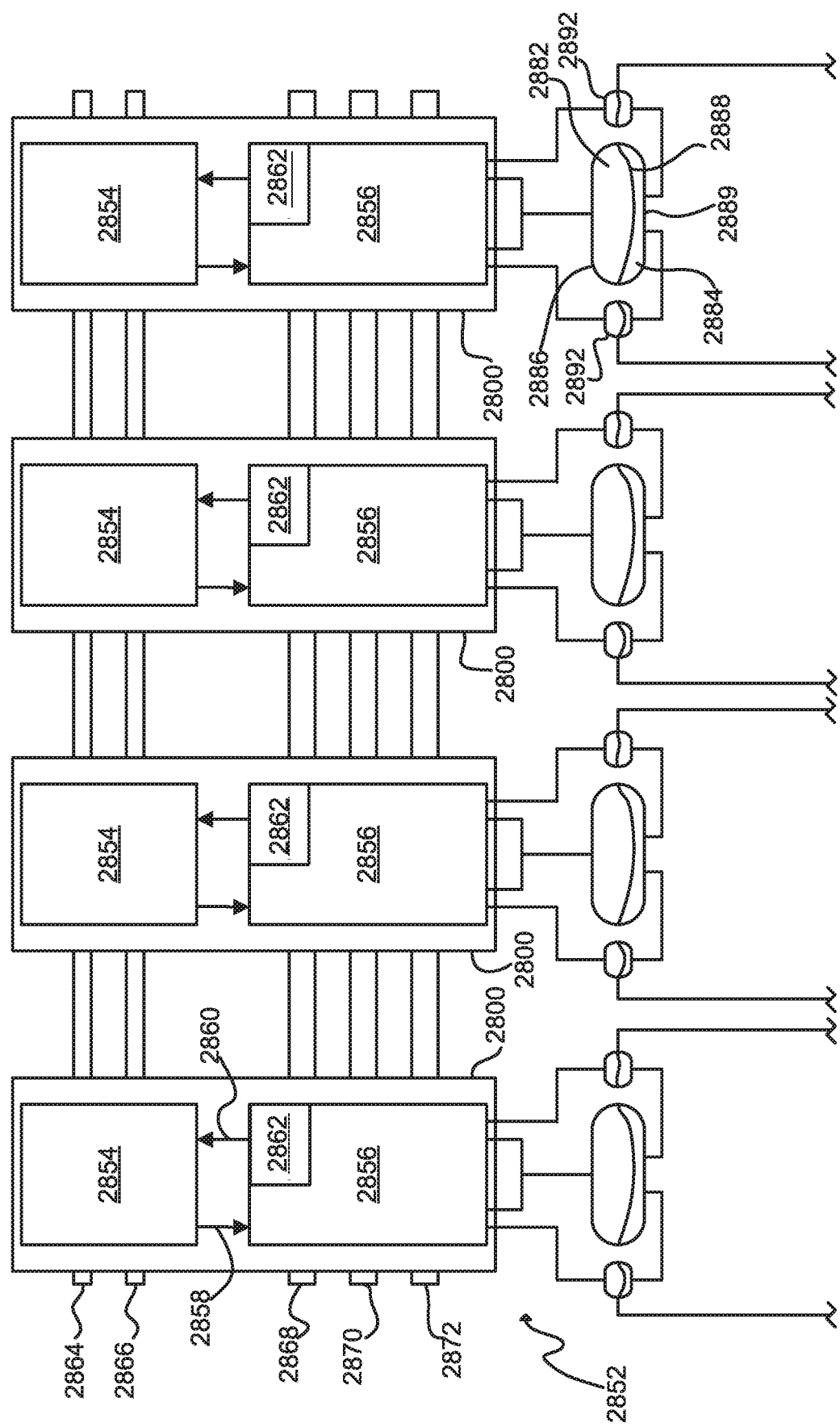
FIGS. 34C-34G depict a number of representational block diagrams of pneumatic pump/valve systems controlled by modular manifold assemblies.

FIG. 34C depicts a representational example diagram of a number of valve modules 2800 installed in a pneumatic system 2852. Each module 2800 includes a controller 2854 which may be included on a PCB of a module 2800 as described above. Each module 2800 also includes a pneumatic block 2856. The pneumatic block 2856 may include various pneumatic components of a module 2800 such as one or more valves 2802 (see, for example, FIG. 34A), a module block 2804 (see, for example, FIG. 34A) including fluid flow paths, and an end block 2806 (see, for example, FIG. 34A) if the module 2800 is at the end of a multi-module manifold.

Each module 2800 may connect to various buses of a device. As shown in the example in FIG. 34C, a data/communications bus 2864 and power bus 2866 are depicted. The data/communications bus 2864 may allow for data or commands to be communicated from module 2800 to module 2800 within a multi-module manifold. This allows for synchronization and coordination of module 2800 activities in a multi-module manifold. Additionally, commands and data may be conveyed to or from the manifold to an external board or processor via the data/communications bus 2864. The power bus 2866 may supply power to the various modules 2800 in a manifold. This power may pass to the manifold via the power bus 2866 from a source external of the manifold. The data/communication bus 2864 and the power bus 2866 may interface with a connector on a PCB 2808 (see, for example, FIG. 28A) of a module 2800.

A first pneumatic bus 2868, second pneumatic bus 2870, and third pneumatic bus 2872 are also shown. The first, second, and third pneumatic buses 2868, 2870, 2872 may each be connected to a pressure reservoir which is at a different pressure. Pneumatic buses 2868, 2870, 2872 may interface with a connector on an end block 2806 (see, for example FIG. 28A) of a multi-module manifold. Alternatively, pneumatic buses 2868, 2870, 2872 may interface with a connector anywhere on a pneumatic block 2856 of a module 2800. This module 2800 to bus connection may be accomplished in a plug and play fashion. Once a module 2800 is connected to the appropriate buses, an identity for the module 2800 may be determined and the module 2800 will be ready for operation.

As represented by the buses of the FIG. 34C running through each module 2800 and on to the next, each bus may be conveyed through the modules 2800 of a multi-module manifold. Electrical power and data communication may be conveyed through a module to module connector on a PCB 2808 (see, for example, FIG. 34A) of each module 2800. Pneumatic buses 2868, 2870, 2872 may be conveyed through bus flow paths in the pneumatic block 2856 which align with bus flow paths on the pneumatic block 2856 of an adjacent module 2800. Alternatively, each module 2800 in a manifold may be individually connected to each bus. In certain embodiments, some pneumatic buses 2868, 2870, 2872 may only be in fluid communication with selected modules 2800 of a manifold. Some modules 2800 may have occludable ports to the pneumatic block, or may be constructed with a limited array of ports.

As shown, the controller 2854 of each module 2800 may issue valve commands 2858 to control the valve(s) 2802 (see, for example, FIG. 34A) of that module 2800. The controller 2854 may also receive pressure data 2860 from one or more pressure sensor(s) 2862 in a module 2800 which sense the pressure of flow paths within the pneumatic block 2856. The pressure data 2860 may be used by the controller 2854 to inform control of the valve(s) 2802. In the example diagram, each module 2800 is shown as a pumping module which the controller 2858 may control to cause fluid to pumped by the pneumatic system 2852.

A first variable volume 2882 and a second variable volume 2884 are included for each module 2800 in the example pneumatic system 2852. A change in volume of the first variable volume 2882 may in turn cause a change in volume of the second variable volume 2884. An increase in volume of the first variable volume 2882 may cause a corresponding decrease in volume of the second variable volume 2884. A decrease in volume of the first variable volume 2882 may cause an increase in volume of the second variable volume 2884. Two pneumatically driven inlet/outlet valves 2892 for the second variable volume 2884 are included and may be actuated to allow for the variable volumes 2882, 2884 to change in volume.

As shown, the first variable volume 2882 and two inlet/outlet valves 2892 are connected to the outputs of their respective modules 2800. The valves 2802 (see, for example, FIG. 34A) of each module 2800 may be actuated to increase or decrease the volume of the first variable volume 2882. When the volume of the first variable volume 2882 is decreased, one inlet/outlet valve 2802 is open, and the other inlet/outlet valve 2892 is closed, fluid will be drawn into the second variable volume 2884. When the volume of the first variable volume 2882 is increased, one inlet/outlet valve 2892 is closed, and the inlet/outlet valve 2892 is open, fluid will be forced out of the second variable volume 2884. As would be appreciated by one skilled in the art, pumping of fluid in either direction may be accomplished by appropriate actuation of the inlet/outlet valves 2892.

The first and second variable volumes 2882, 2894 may be configured in any suitable arrangement which would allow a change in volume in one to be tied to a change in volume of the other. For example, the first variable volume 2882 may surround or be surrounded by the second variable volume 2884. The first variable volume 2882 may be separated from the second variable volume 2884 by a displaceable intermediary structure which acts on the second variable volume 2884 as the first variable volume 2882 increases or decreases in volume. The intermediary structure may be any suitable structure such as a piston, arm or lever, etc. The first and second variable volume 2882, 2884 may also be separated from one another by a displaceable wall 2888 such as a diaphragm or a membrane made of a flexible material.

In some embodiments, there may be greater number of variable volumes. In such embodiments, a change in volume of the first variable volume 2882 may cause a change in volume of a plurality of other variable volumes. Likewise, change in volume of a plurality of variable volumes may cause a change in volume of one or more additional variable volumes.

In the representational diagram depicted in FIG. 34C, the first variable volume 2882 is defined by a fixed wall 2886 and a displaceable wall 2888. The second variable volume 2884 is adjacent the first variable volume 2882 and is defined by a second fixed wall 2889 and the displaceable wall 2888. As the volume of the first variable volume 2882 increases, the displaceable wall 2888 is pushed toward the second fixed wall 2889. As the volume of the first variable volume 2882 decreases, the displaceable wall 2888 is pulled toward the first fixed wall 2886.

Figure 34D:
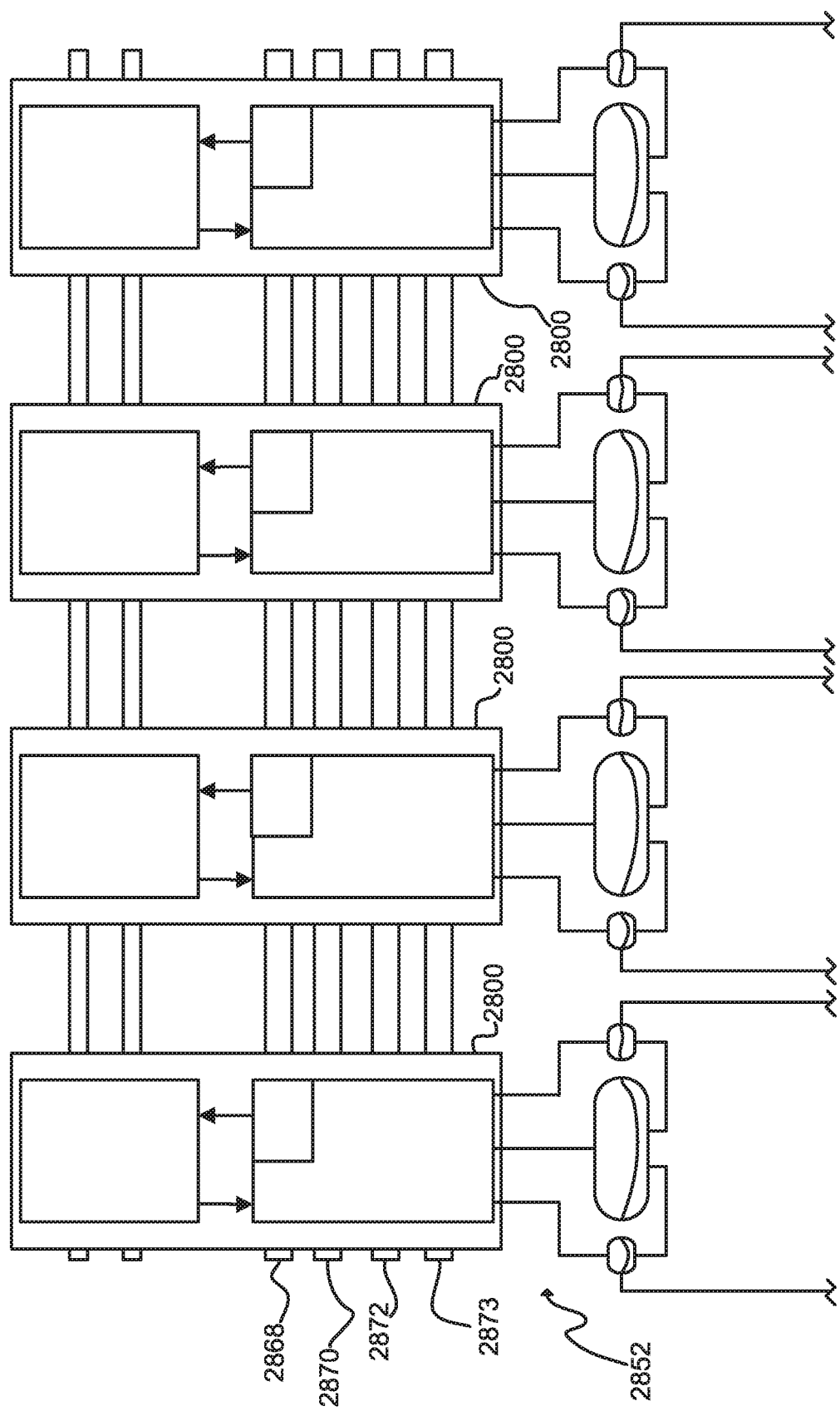

Another example pneumatic system 2852 is depicted in the representational diagram in FIG. 34D. The example pneumatic system 2852 is similar to that depicted in FIG. 34C, however, a fourth pneumatic bus 2873 is included. The fourth pneumatic bus 2873 may be connected to a vent reservoir such as the atmosphere. The other three pneumatic buses 2868, 2870, 2872 may be connected to pressure reservoirs. For example the first pneumatic bus 2868 may be connected to a negative pressure reservoir, the second pneumatic bus 2870 may be connected to a low positive pressure reservoir, and the third pneumatic bus 2872 may be connected to a high positive pressure reservoir. Including a vent or atmospheric bus may be desirable as it may help to minimize the amount of pumping necessary to maintain reservoirs for the other buses 2868, 2870, 2872. For example, when switching a volume from positive pressure to a negative pressure or vice versa, it may be desirable to vent the volume to ambient pressure. This would avoid excessive depletion of the pressure reservoirs as it lowers the pressure difference between the volume and the reservoir. It should be appreciated that any other number of pneumatic buses may be included in various embodiments. Additionally, the number of electrical buses may vary as well.

Figure 34E:
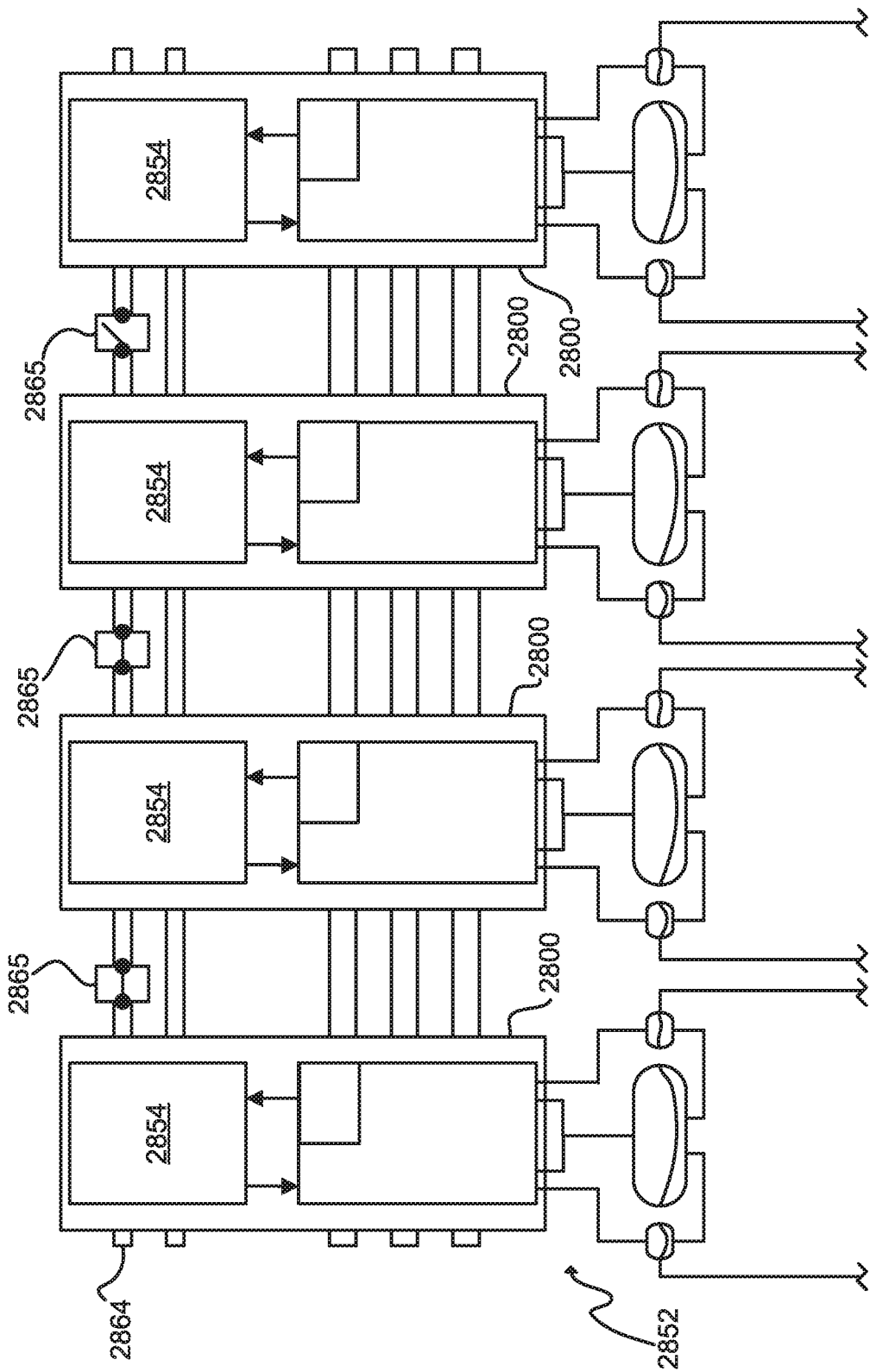

Another example pneumatic system 2852 is depicted in the representational diagram in FIG. 34E. The example pneumatic system 2852 is similar to that depicted in FIG. 34C, however, module to module connectors 2865 are depicted on the data/communication bus 2864 in FIG. 34E. The module to module connectors 2865 may consist of cooperating pieces of hardware on each module 2800 which serve to create an electrical communication pathway from module 2800 to module 2800 in a multi-module manifold.

As shown the module-to-module connectors 2865 may allow for the connection established to be interruptible in response to commands from the controller 2854 of each module 2800. This is signified by a switch in each of the module-to-module connectors 2865. This may be particularly desirable when a manifold is being auto-enumerated or when a new module 2800 is being installed in the manifold as a replacement. In a specific embodiment, a module 2800 may interrupt communications coming from one side of the manifold. That is, the module may interrupt communications in a first direction while leaving communications in a second direction enabled. In the example diagram shown, the third module 2800 from the left has interrupted communications to and from modules 2800 to its right or downstream side. This may be a default configuration of each module 2800 upon installation into a manifold. When communication has been interrupted, a terminating resistor on the module 2800 may also be switched in.

Each message sent on the data/communication bus 2864 may be uniquely marked according to the module 2800 from which it originated. After interrupting communications, a module 2800 may then poll modules 2800 on the portion of the manifold that the module 2800 is still in communication with. These modules 2800 may respond to the new module 2800 and the new module 2800 will determine its identity or function based upon the responses received. For example, if the module 2800 only receives responses from modules 1 and 2, the new module 2800 will determine that it must be module 3. Messages addressed with the unique marker for module 3 may then be received and acted upon by the new module 2800. Communication with the rest of the manifold may be reestablished and the next module 2800 may repeat the process to determine its identity or function, and so on. When communications are reestablished, a terminal resistor included on newly enumerated module 2800 may also be switched off.

Alternatively, after a module 2800 interrupts communications to one side of the manifold, the module 2800 may wait for a period of time and receive messages sent across the data/communication bus 2864. The module 2800 may then determine its identity or function based upon the unique markers of the messages sent across the data/communication bus 2864. If the new module 2800 only receives messages from module 1 and 2, the new module 2800 may then determine that it must be module 3. As above, communication with the rest of the manifold may be reestablished and this process may repeat until each module 2800 in a manifold has auto-enumerated. A terminal resistor which may be switched in and out may be included on each module 2800 and operate as described above.

As would be appreciated by one skilled in the art, any other scheme involving interruption of the communication bus to facilitate auto-enumeration of modules 2800 in a multi-module manifold may also be used. Also as mentioned above, this process need not be performed by each individual module 2800 in the manifold. In some embodiments, the process may be conducted or coordinated by a master controller in the manifold.

Figure 34F:
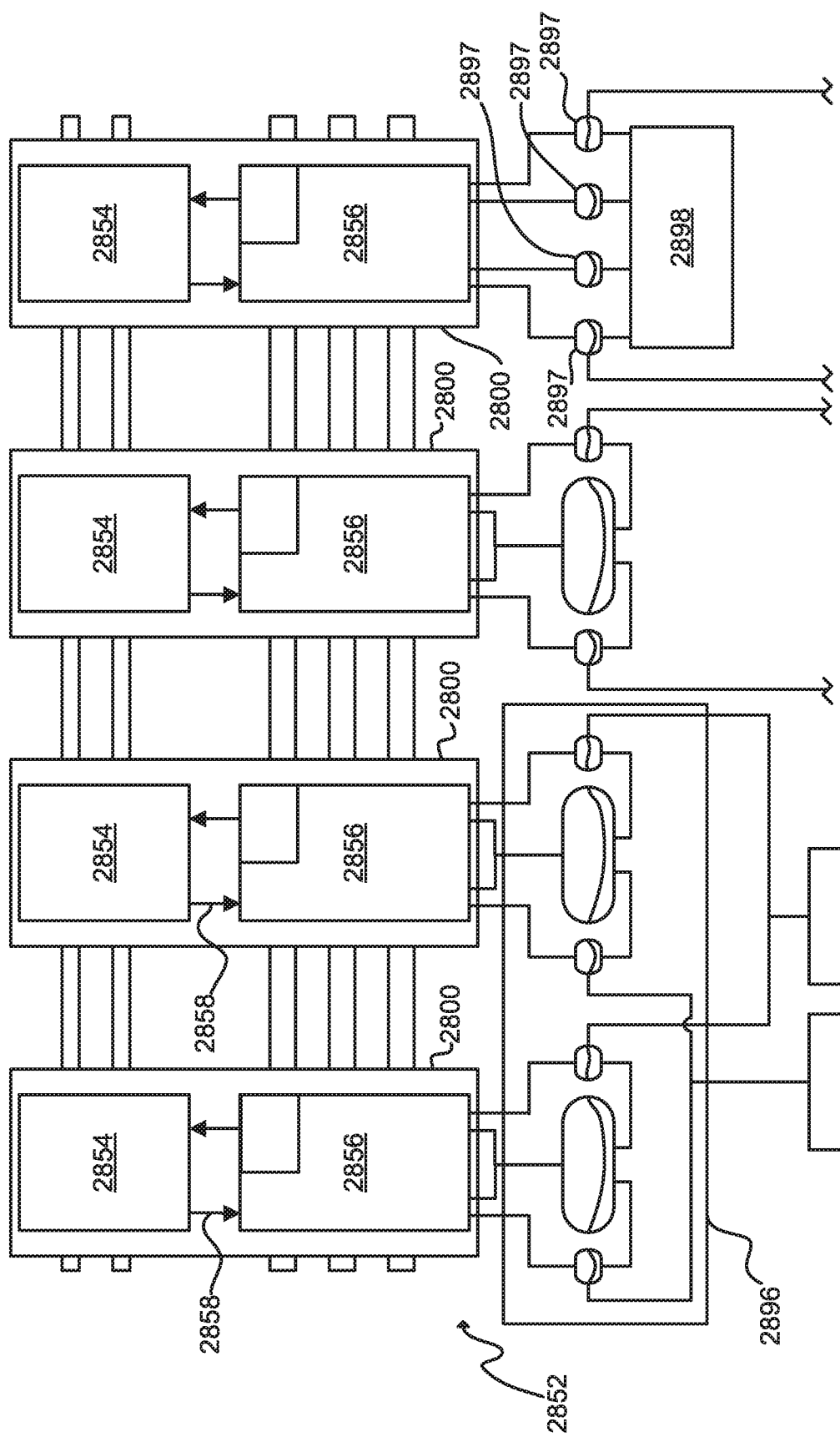

FIG. 34F depicts another example pneumatic system 2852 similar to that depicted in FIG. 34C. As shown, the example pneumatic (or hydraulic) system 2852 in FIG. 34F, includes a number of modules 2800 which are arranged to perform a plurality of different valve related tasks. It should be appreciated that the tasks shown are only exemplary.

The third module 2800 from the left is arranged as a pumping module similar to those shown in FIG. 34C. The two left-most modules 2800 are arranged to control a two chamber fluid pump 2896. The controllers 2854 of the two left most modules 2800 may operate in tandem, coordinating or synchronizing pumping operations between one another to optimize fluid throughput or achieve substantially continuous pumping, for example. The controllers 2854 may communicate over the data/communication bus 2864 to synchronize with one another. Each controller 2854 may also send commands 2858 to their respective pneumatic blocks 2856 in order to effect pumping of fluid in each module's 2800 respective chamber of the fluid pump. In one synchronization scheme, the controller 2854 of one module 2800 may be synchronized such that it commands filling of its associated chamber while the other commands delivery of its associated chamber. Thus fluid may be pumped to one of a first or second reservoir 2890, 2895 in a substantially continuous fashion from the other reservoir. Modules 2800 may similarly coordinate to synchronize operations between a greater number of fluid pumping chambers as well. For example, a three chamber fluid pump may be controlled by three modules 2800 which communicate over a data/communication bus 2864 to synchronize pumping.

Figure 34G:
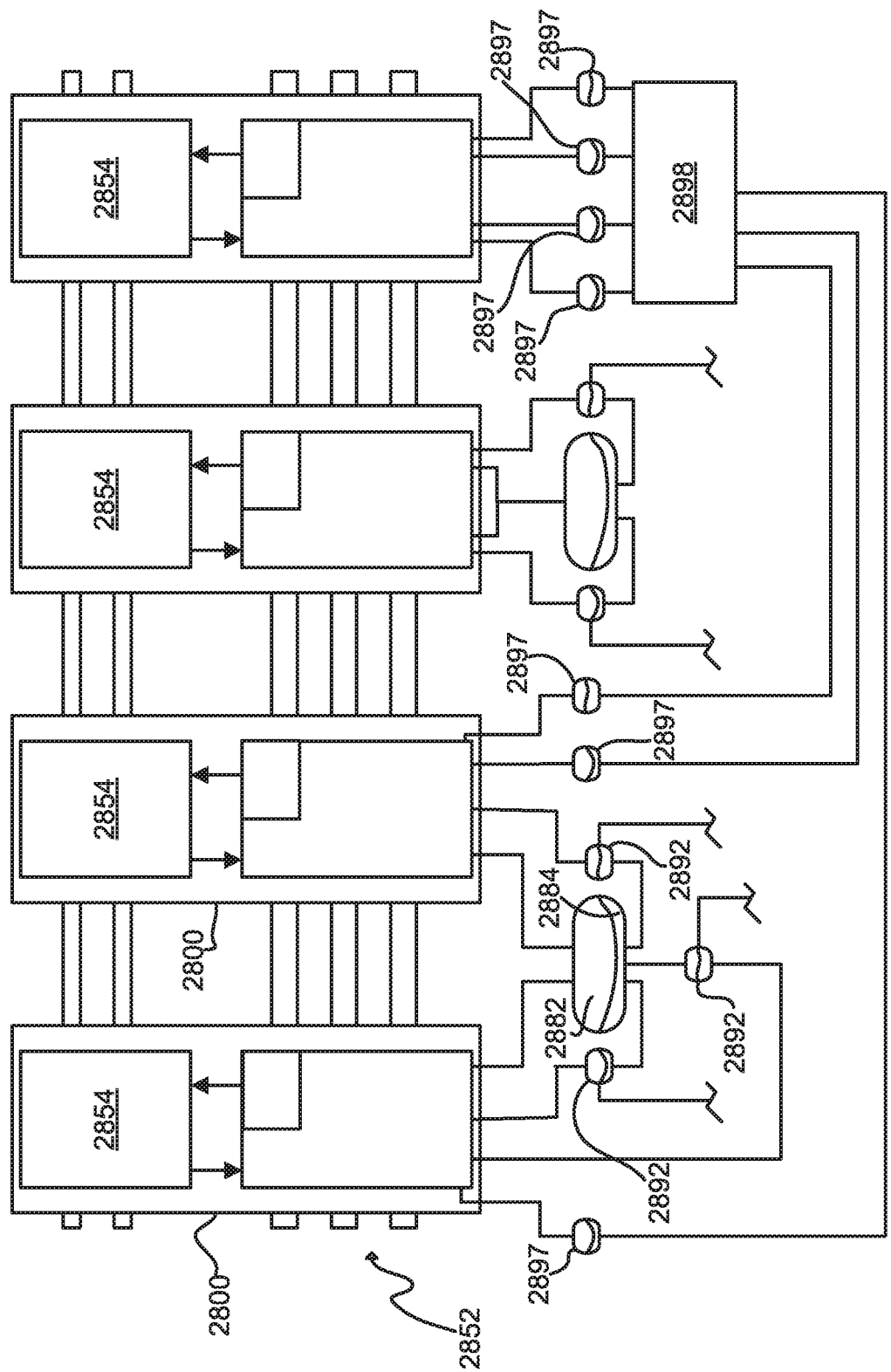

The rightmost module 2800 is configured as a pneumatic (or, in other systems, hydraulic) valve module and controls only valves in the example diagram shown in FIG. 34G. As shown, the outputs of the module 2800 are connected to a number of fluid valves 2897 which control fluid communication to various fluid pathways 2898 in the pneumatic system. The number of fluid valves 2897 may be greater or less than the number shown. Depending on the number of valves included in a module 2800, the amount of fluid valves 2897 the module is capable of controlling independently will differ.

FIG. 34G depicts another example pneumatic system 2852 similar to that depicted in FIG. 34C. As shown, the example pneumatic system 2852 in FIG. 34G, includes a number of modules 2800 which are arranged to perform a plurality of exemplary valve related tasks including fluid pumping and pneumatic fluid valve 2897 actuation. As in FIG. 34F, the fluid valves are shown controlling communication to various flow paths 2898 in the pneumatic system 2852. Also as shown in FIG. 34F, the third module 2800 from the left is shown controlling a fluid pump.

The leftmost and second leftmost module 2800 are depicted as cooperatively controlling a single fluid pump. Having a plurality of modules 2800 cooperatively controlling a single fluid pump may allow for manifolds to be made smaller and may allow for manifolds to operate more efficiently depending on the scenario. Additionally, such cooperative control may allow for a greater range of pressures to be used while pumping. For example, a first module 2800 may provide fluid at a first negative pressure and a second negative pressure while a second module may provide fluid at a first positive pressure and a second positive pressure. Another benefit of cooperative control is that it allows for control of a fluid pump requiring a greater number of valves 2802 than a single module includes.

As shown in the specific example, the leftmost module 2800 controls the state of two inlet/outlet valves 2892 of the second variable volume 2884 of fluid pump. The leftmost module 2800 also controls a pressure input to the first variable volume 2882 of the fluid pump. The other module 2800 controls another pressure input to the first variable volume 2882 as well as another inlet/outlet valve 2892 of the second variable volume 2884. To coordinate pumping operations for the fluid pump, the processor 2854 of each cooperating module 2800 may synchronize valve activity related to the fluid pump over the data/communication bus 2864. This allows a manifold assembled from modules 2800 each including four valves 2802 to run a fluid pump requiring five valves 2802.

While the above description relates to use of modules 2800 to control various pneumatic components (e.g. pneumatically driven pumps and/or valves), it should be recognized that such modules 2800 may be easily modified to control a wide range of components or devices. A similar arrangement may be used to control hydraulically actuated pumps and/or valves, with the manifold valve module 2800 making a hydraulic connection to one or more pressurized hydraulic lines in a system. Such a connection may be made using, for example, quick-connect fittings to allow for ready replacement of manifold valve modules 2800 in need of maintenance or repair, or replacement with manifold valve modules 2800 configured for different combinations of pumps or valves.

Figure 34H:
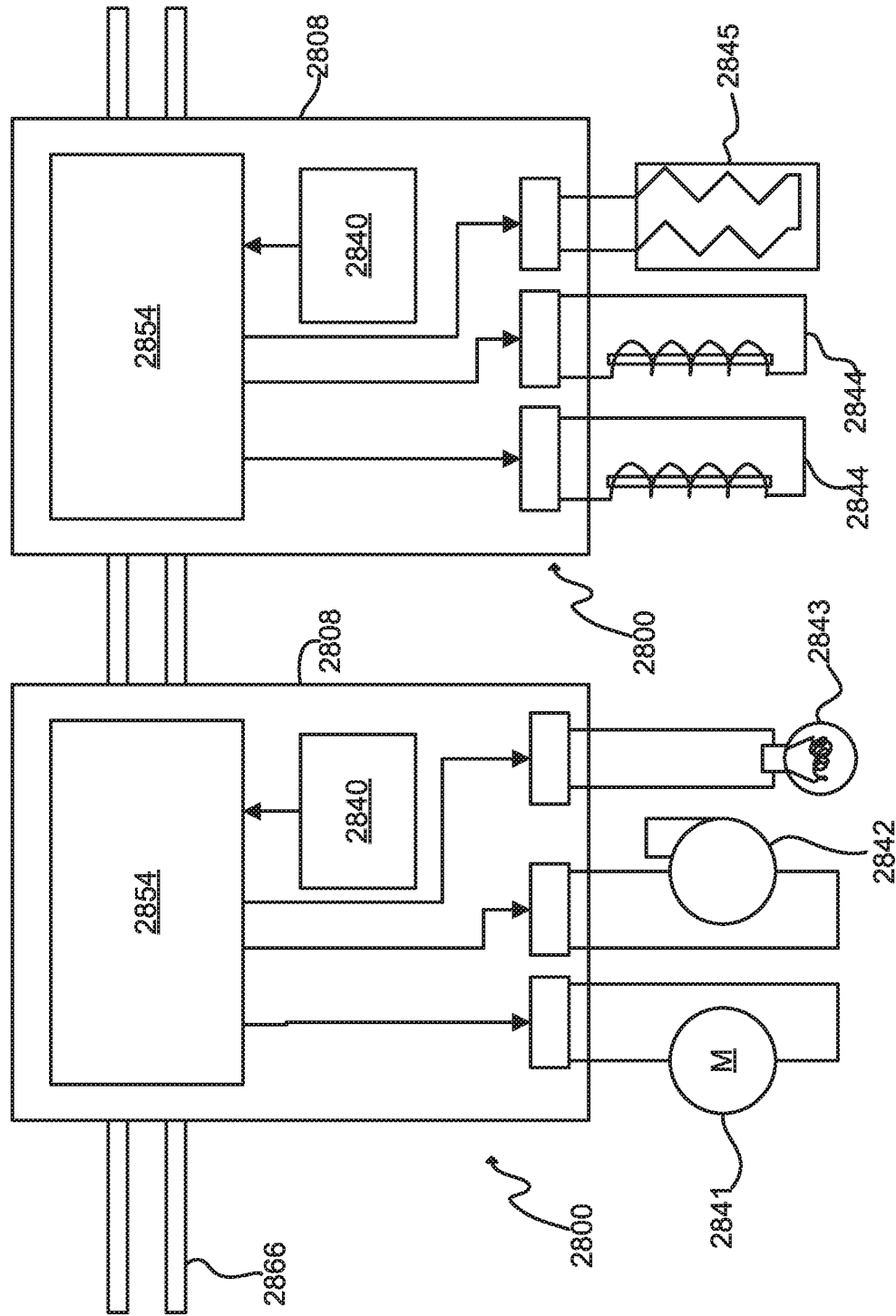
FIG. 34H depicts a representational block diagram of a modular manifold assembly controlling a variety of electrical or electronic components or devices.

As illustrated in the representation diagram in FIG. 34H, a module 2800 may include a PCB 2808 with a processor 2854 which is programmed to self sufficiently command operation of one or more motors 2841. The PCB 2808 may include electrical outputs to each winding of the motor 2841. In some embodiments, the motor 2841 and PCB 2808 may be included as a single package and the PCB 2808 may be overmolded onto a portion of the motor 2841. Similarly a module 2800 may be modified to self sufficiently control operation of one or more pump 2842. The PCB 2808 of the module 2800 may include electrical outputs which interface with the pump. In some configurations, the pump 2842 and PCB 2808 may be included as a single package and the PCB 2808 may be overmolded onto a portion of the pump 2842. A module 2800 may be programmed to control illumination of one or more light emitters 2843 as well.

Modules 2800 may be configured such that the PCB 2808 includes a controller 2854 which is programmed to control operation of one or more electromagnets 2844 based on a pre-defined program. The PCB 2808 may include an electrical output which interface with the contacts of the electromagnets 2844 to energize the electromagnets 2844 in any desired fashion. Additionally, modules 2800 may be modified to self sufficiently control operation of one or more heater elements 2845. In such embodiments, a module 2800 may include a PCB 2808 with a controller 2854 that is capable of switch current flow through the heater element 2845 on and off in any desired manner. Again, this may be accomplished based upon a pre-defined program or based on high level commands from an external main controller. For example, the main controller may command that the heater element 2845 warm a surface to a temperature set point. The module 2800 may then execute all of the necessary control functions to get the surface to the commanded temperature set point using the heater element 2845 and feedback signals from a suitably located temperature sensor. The on-board module controller 2854 may be configured to provide analog control of the heater element 2845, or digital control through, for example, application of pulse-width-modulated current to the heater element 2845. In some embodiments, a module 2800 may not directly mediate current flow through the module 2800 to the heater element 2845. Instead, the module 2800 may control a relay making or breaking a connection between a current source and a heater element 2845. This may be desirable in scenarios in which the heater element 2845 is run at high voltages (e.g. mains voltage). Modules 2800 may control relays used in other applications as well. Such relays may comprise high speed digital devices, such as thyristors, TRIACS, or silicon controlled rectifiers.

A module 2800 may include a PCB 2808 with any of a variety of sensors 2840 suited for particular applications. For example, modules 2800 may be populated with current sensors, temperature sensors, pressure sensors, encoders, optical sensors, magnetic sensors, inertial sensors, or any other sensor as required by the module 2800 application.

As described above, modules 2800 used for control of other devices or components can be configured to share power transmitted through a shared power bus 2866. Such modules are also able to coordinate or synchronize operation via a shared data/communication bus 2864. This coordination may be between similar or dissimilar devices or components. For example, such coordination may help to limit or manage peak power loads among other benefits.

Figure 35A:
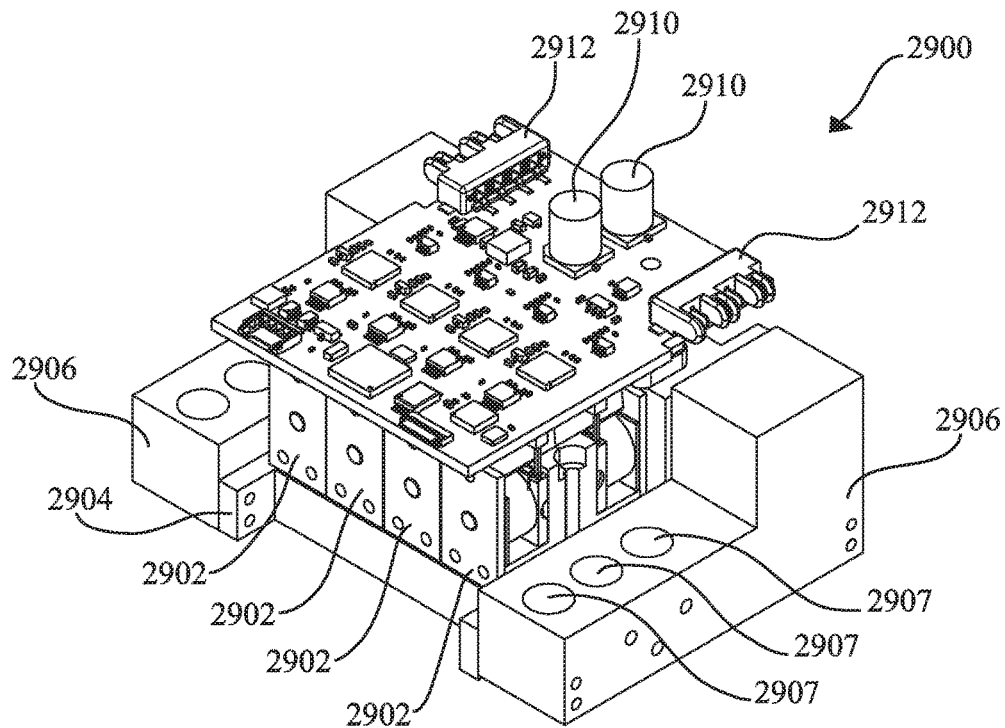
FIG. 35A is a perspective view of a programmable valved manifold module.

FIG. 35A depicts a specific example embodiment of a valve module 2900. As shown, the example embodiment includes four valve assemblies 2902. In other embodiments, a valve module 2900 may include any suitable number of valve assemblies. The valves 2902 may be any of a variety of types of valves including binary valves, variable valves, or bi-stable valves such as any of the embodiments described herein. The valves 2902 can be mounted on a manifold module base or block 2904 as shown. The module block 2904 includes a number of fluid channels or flow paths which interface with the fluid inlets and outlets of each valve 2902. The module block 2904 may thus form a manifold for the valve assembly 2902. In embodiments comprising bi-stable valves such as those described herein, one of the inlet ports for one or more valve assemblies in the module 2900 can be blocked. This may allow the bi-stable valve to effectively function as a two-way valve. Additionally, a module base or block 2904 may include one or more fluid buses—flow paths which can convey pressurized fluid (e.g. pneumatic or hydraulic) from a pressurized fluid source line to a series of interconnected manifold modules. Any number of manifold modules can be concatenated or connected in series, each having a fluid bus connecting a pressure line inlet port on one side of the module to a pressure line outlet port on another side of the module. Modules can be connected together by standard fasteners, with inlet and outlet ports joined via gaskets or O-rings, for example. Thus in a pneumatic system, one or more pneumatic buses can be assembled in a manifold assembly from module 2800 to module 2800 in a multi-module manifold assembly.

Figure 35B:
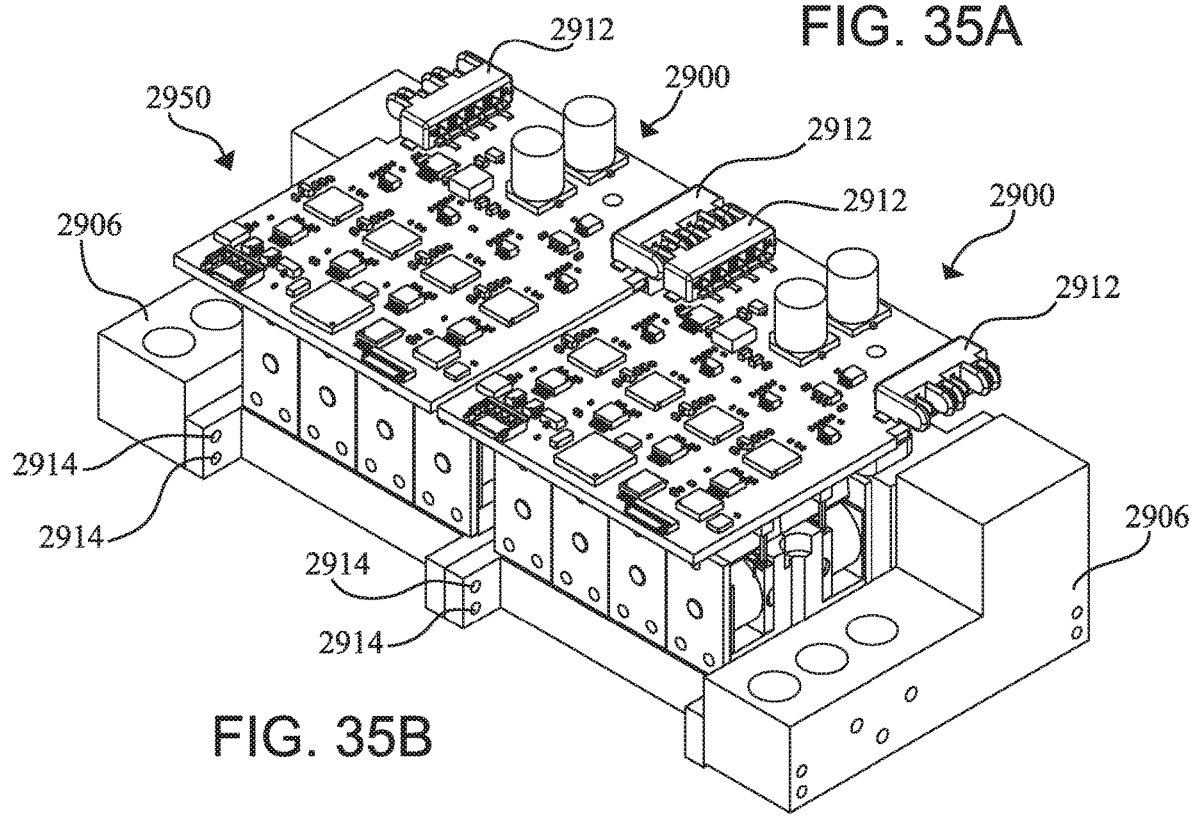
FIG. 35B is a perspective view of two connected or concatenated programmable valved manifold modules.

Also shown in FIG. 35A are manifold module end blocks 2906. The end blocks 2906 may be attached to the ends of a manifold assembly assembled from a number of valve modules 2900. The end blocks 2906 may include connection ports 2907 connecting one or more pressure line inputs or outputs to corresponding pressure line input or output ports of the valved module(s) 2900 making up a manifold. For example, the connection ports 2907 may connect to pressurized fluidic components such as pneumatic lines or buses from one or more positive pressure sources or reservoirs, negative pressure reservoirs, a vented source or reservoir (e.g. atmosphere), or other reservoir. Any suitable connector fitting may be incorporated into the connection ports 2907, including, for example quick-connect fittings. If not all of the connection ports 2907 of a module 2900 are to be used, the unused connection ports 2907 may be plugged, blocked, or otherwise sealed off. In the example embodiment shown, three connection ports 2907 are included. In other embodiments, the number of connection ports 2907 may differ. For example, some embodiments, may only include two connection ports 2907 (FIG. 35E). The module end blocks may function as a terminal block in a series or bank of connected modules, in which case the connection ports are closed or blocked. Alternatively, the terminal block connection ports may be connected to one or more fluid lines leading to an end block forming an input block of another bank of manifold modules in a larger manifold assembly. In some embodiments, an assemblage of module banks may be stacked as shown in FIG. 35E, allowing input end blocks to be interconnected to supply each bank of modules with one or more pressurized fluid lines. In this case, the connection ports of the terminal blocks of each bank of modules can be sealed closed or blocked.

An exemplary on-board controller board (PCB) 2908 is included in the module depicted in FIG. 35A. As shown, the example PCB 2908 of the valve module 2900 includes capacitors 2910. FIG. The capacitors 2910 may be selected to have a capacitance sufficient to power the valves 2902 to a known or desired state in the event that power to the valve module 2900 is lost. If the electrical power and/or communications bus voltage of a device sensed by the PCB 2908 of the valve module 2900 drops below a predetermined level, valve(s) 2902 may be transitioned to a preferred or predetermined configuration (i.e. a valve state that closes a specified fluid port or opens a specified fluid port). This could, for example, represent a fail-safe configuration for the apparatus controlled by the module (e.g. a fluid flow control device such as a pump and/or valves in a medical device). In the event that power from the device is unavailable, the capacitors 2910 of the valve module 2900 may be relied upon to transition the valve(s) 2902 to the preferred default configuration.

A number of processing components are included on the PCB 2908 as well. These processing components may include, for example, FGPAs (field programmable gate arrays), microprocessor chips, etc., or a combination thereof. Preferably, the processing components are capable of performing signal processing of data provided at a relatively high sampling rate (e.g. pressure data from on-board pressure sensors 2918 connectable to ports 2916 on the module block communicating with the valve cavities of the individual valve assemblies). The PCB controller can thus control the valve(s) 2902 or electrical outputs in the module 2900 more accurately or at a correspondingly high rate.

The PCB 2908 may include a number of connectors 2912. In the example embodiment, only two connectors 2912 are shown. In other embodiments there may be a greater or smaller number of connectors 2912 included in a valve module 2900. Referring now also to FIG. 35B, the connectors 2912 allow a valved module controller 2908 to be connected to additional neighboring or adjacent valved module controllers 2908 to interconnect valved manifold modules 2900 into a manifold 2950 of any desired size or complexity. The connectors 2912 allow for a communications and/or electrical power bus to be assembled in a bank of manifold modules, allowing for communication of power and/or data between various valve modules 2900 comprising a manifold assembly 2950. Additionally, the connectors 2912 may allow for electronic communication (power and/or data) between valve modules 2900 in a manifold assembly 2950 and an external (e.g. main or system) controller (not shown) included in a device in which the manifold assembly 2950 is installed.

Each module block 2904 may include one or more coupling features which may facilitate connecting modules 2900 together to form a bank of modules or manifold assembly 2950. In the example embodiment shown in FIG. 35A-B, the module blocks 2904 include a number of holes 2914 through which a suitable fastener (not shown) may be placed to couple the module blocks 2904 together. The fastener may be any suitable variety of fastener. A suitable fastener may also be used to couple the end blocks 2906 of a manifold 2950 to the valve modules 2900 at the ends of the manifold 2950. As mentioned above, where various fluid pathways between the valves 2902, module blocks 2904, and/or end blocks 2906 interface with one another, a sealing member such as an o-ring, gasket, or the like may be used to ensure leak-free connections. In a typical assembly procedure, module bases or blocks are first mated side-to-side, aligning the pressure line input ports and pressure line output ports of adjacent blocks. The blocks are fastened together, using gaskets or O-rings as appropriate to form a seal between the input and output ports. One or more valve assemblies may also be installed in each module, either before or after the modules are concatenated. Valve assemblies are positioned over designated receiving stations on the manifold base or block, aligning the inlets of the valve assemblies with pressure ports communicating with the appropriate fluidic pressure bus in the module block, and aligning the outlet of each valve assembly with a port on the module block that fluidly communicates with an outlet of the module block. A gasket (see, e.g. gasket 4602 in FIG. 40, or gasket 4184 in FIG. 28C) having appropriately located ports or holes may be interposed between the face of the valve assembly and the mating receiving face of the module block. In some embodiments, the gasket may not have ports communicating with all fluidic pressure buses passing through the module block. Once the module blocks are interconnected and the valve assemblies are installed, the controller board may be mounted on the module and valve assemblies. Alternatively, each controller board can be installed on a valved module block before the individual modules are interconnected, resulting in externally uniform, programmable valved manifold modules that can be readily assembled together, forming an expandable manifold assembly having standardized fluidic and electronic inputs, outputs, valve mating dimensions and similar controllers that can be programmed for various tasks. In installing the electronic control board, pressure sensors mounted on the board are aligned with pressure sensing ports or wells on the module block that communicate with the cavity of the valve assembly. If electromagnetic coils are mounted on the valve assembly, electrodes on the electronic control board are also aligned with corresponding receptacles or electrodes connected to the coils. The valve assemblies may be securely fastened to the module block, and the control board may be securely fastened to the module block using standard methods, such as screws, for example. In the examples shown, a typical module has four valve receiving stations onto which a controller board positions four pressure sensors—one for each installed valve. Modules can be constructed to have fewer receiving stations without necessarily compromising the expandability of the manifold module system. A greater number of valve assembly receiving stations may necessitate changes in the module block and control board to accommodate the additional valve assemblies, and may also require modifications to any rack or mounting frame used to assemble banks of manifold modules.

In many applications, a four-valve manifold module can function independently to operate a single pump. For example, a liquid inlet valve and outlet valve of the pump can each be assigned and connected to the output of a separate manifold valve, which can toggle between a positive fluidic pressure bus and negative fluidic pressure bus in the module to either close or open the inlet/outlet pump valve. A third manifold valve can be arranged to toggle on or off a connection of the positive pressure bus to the pump control chamber to perform a pump deliver stroke, and a fourth manifold valve can be arranged to toggle on or off a connection of the negative pressure bus to the pump control chamber to perform a pump fill stroke. The pump control manifold valves can be converted to two-way valves (on/off) by installing them on the module block using a modified gasket having no port to the positive pressure bus if used as a fill control valve, or having no port to the negative pressure bus if used as a deliver control valve. The on-board controller can be programmed to independently operate the liquid pump/valve unit by coordinating the inlet and outlet pump valves to permit filling the pump chamber with liquid and then expelling the liquid from the pump chamber in the direction assigned by the program. The controller can also receive pressure data from the pump control chamber to determine rate of fluid volume movement and end-of-stroke conditions. It can also be programmed to vary the rate or amount of pressure delivered to the pump control chamber. The on-board controller can also receive command sets locally from other manifold module controllers, or from an external main or system controller.

Figure 35C:
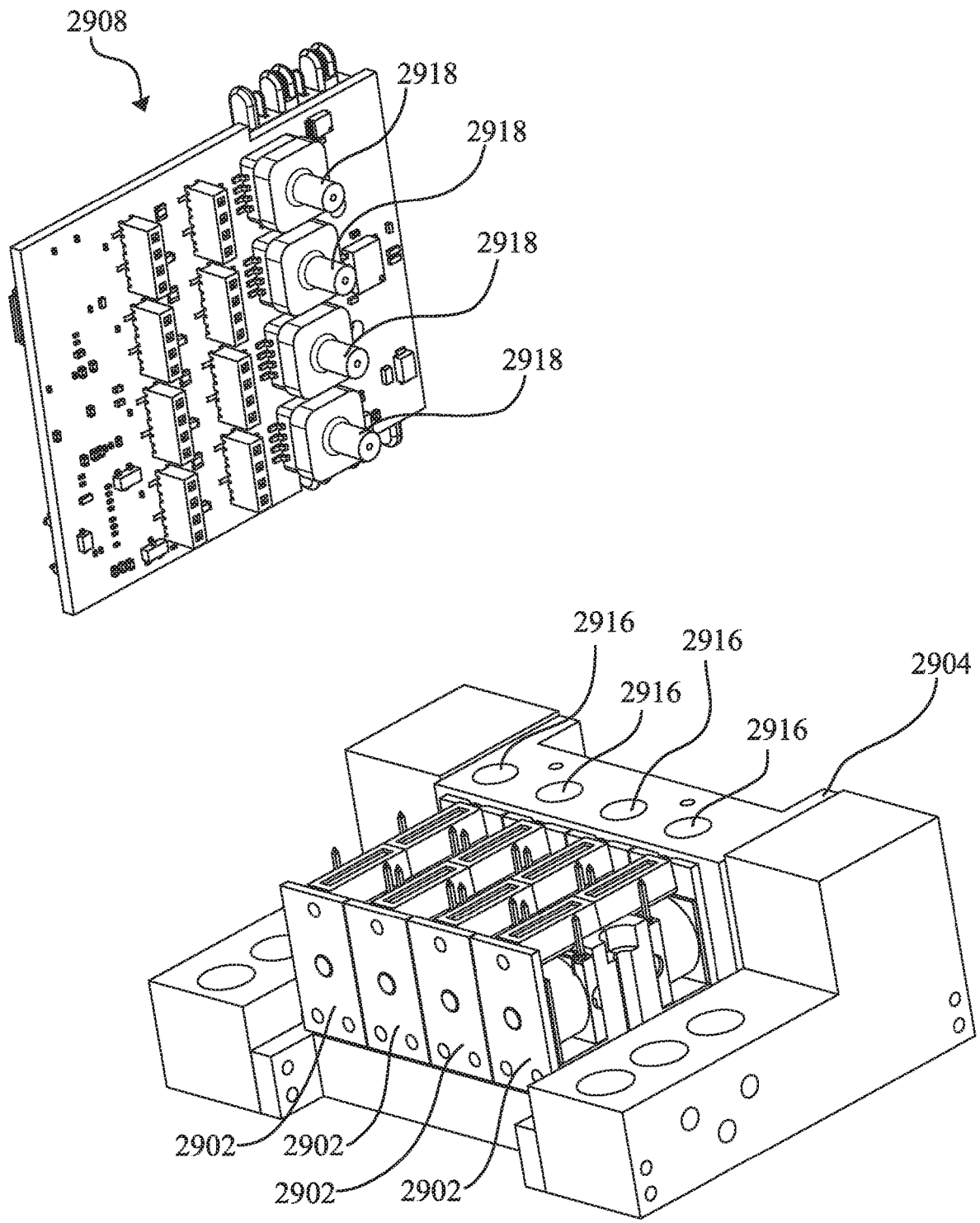
FIG. 35C shows a programmable valved manifold module of FIG. 35A with the controller board disconnected from the valve assemblies and the module base.

FIG. 35C depicts a partially exploded view of the example valve module 2900 depicted in FIGS. 35A-B. As shown, the PCB 2908 includes a number of pressure sensors 2918. In the example embodiment, the number of pressure sensors 2918 is equal to the number of valves 2902 included in the valve module 2900. In other embodiments, the number of pressure sensors 2918 may vary. When the PCB 2908 is attached to the module base or block 2904, the pressure sensors 2918 are disposed in respective sensing wells or ports 2916 included as a part of the module base or block 2904. As mentioned above, o-rings, gaskets, or any other suitable sealing member may be used to seal the sensing wells 2916 from the ambient environment.

Each of the sensing wells 2916 is in fluid communication with the interior valve cavity of one of the valves 2902. The sensing wells 2916 may thus allow for the pressure sensors 2918 on the on-board PCB 2908 to sense the pressure of the interior cavity of the valves 2902. The collected pressure data may be supplied to the processing components or controller included on the PCB 2908 for signal processing. The valve cavity pressure may be measured periodically or monitored in real time, acquired and stored by the on-board controller, and used by the on-board controller to control the valves 2902 of a valve module 2900 to execute particular tasks, such as selected delivery of one or another pressurized fluid (e.g. air) to a controlled device, such as a pump and/or valve in a liquid flow control apparatus. If the valve controls a single pressure line, or if it is configured to be able to simultaneously block more than one pressure line, then the on-board controller can receive pressure data that represents the pressure present in the controlled device (the valve cavity being in fluid communication with a control chamber, for example, of a controlled membrane pump). Using the specific example of a valve module 2900 which is assigned the task set of a pumping module, the pressure data may be used to determine, among other things, an amount of liquid transferred and a flow rate of the liquid being transferred in the liquid flow control apparatus. Pressure data may also be used, for example, during troubleshooting.

As shown in FIG. 35B, a series of interconnected (or bank) of manifold modules 2900 causes the on-board controllers to be interconnected 2912 on a communications and/or power bus. This allows each manifold module 2900 to be assigned a specific task or set of tasks by an external main or system controller, or additionally or alternatively allows a bank of on-board controllers to establish a 'master-slave' or primary-secondary hierarchical relationship. Through the transmission of identifying data to or from each module controller, any or all of the module controllers can detect the presence of and/or function of any other module in the bank or in an entire manifold assembly 2950. If a controlled device has a plurality of functions or plurality of pump/valve combinations, a primary module controller can be assigned, which can then coordinate or synchronize the functions of a group of secondary modules with respect to the controlled device. In some cases, a linked control group of modules may only be a subset of a plurality of manifold modules in a bank or manifold assembly.

Figure 35D:
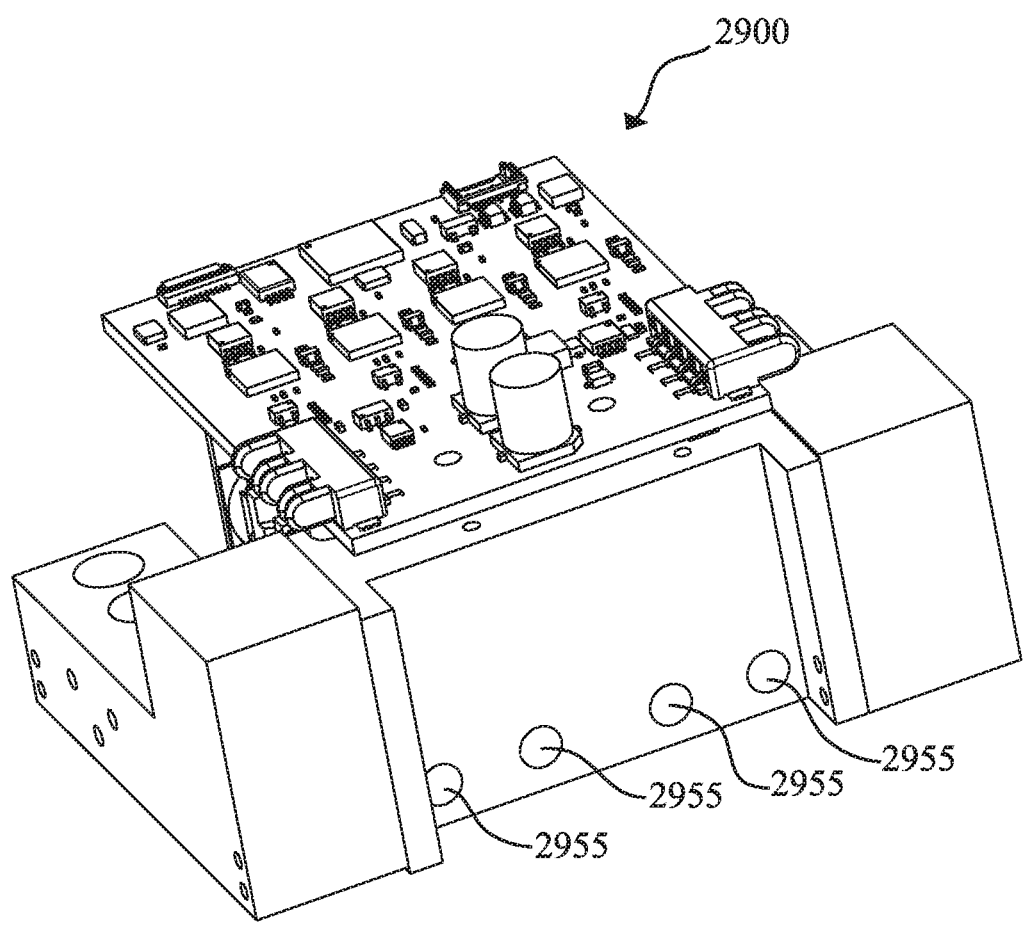
FIG. 35D is a perspective view of the programmable valved manifold module of FIG. 35A showing pneumatic output lines of the module.
Figure 35E:
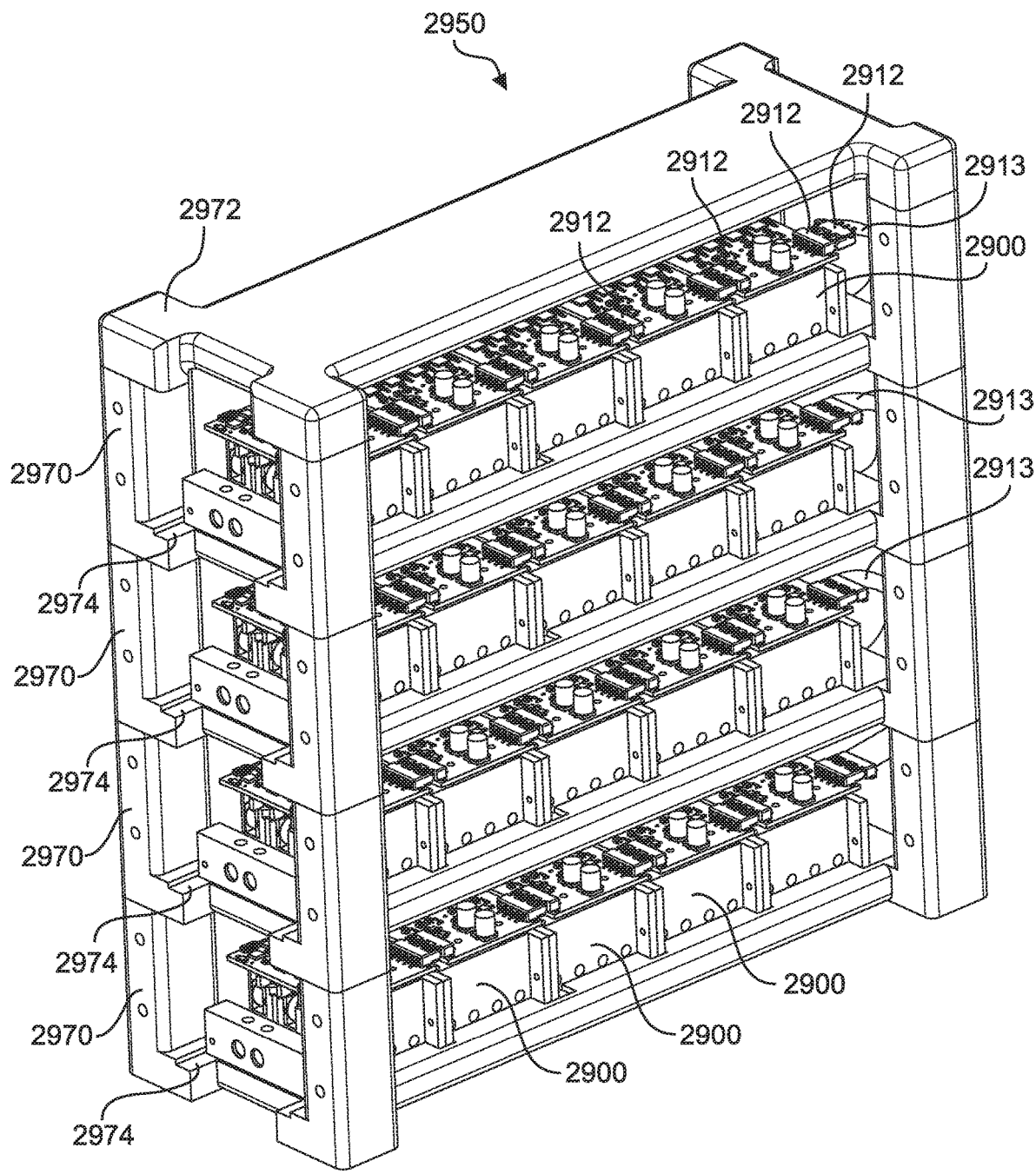
FIG. 35E is a perspective view of manifold assembly comprising a stack of four banks of grouped or concatenated programmable valved manifold modules.

FIG. 35D depicts a top, back, left perspective view of the example module 2900 shown in FIG. 35A. As shown, the example module includes a number of output ports 2955. These output ports 2955 may allow for tubing to be connected to the module 2900. This tubing may then run to a destination for the module's 2900 outputs. In various embodiments, the destination may, for example, be a fluid pump, pneumatic valve, fluid reservoir, etc. Any suitable connector fitting may be included as part of the output ports 2955. If not all output ports 2955 of a module 2900 are to be used, the unused output ports 2955 may be plugged, blocked, or otherwise sealed off.

FIG. 35E shows a perspective view of a number of modules 2900 that have been incorporated together to form a manifold assembly 2950. Banks of modules 2900 are placed on a number of individual module racks or frames 2970. The module racks or frames 2970 each hold a group or bank of modules 2900. In the example shown, each group includes four modules 2900 though alternative racks or frames 2970 may hold any desired number of modules 2900. Each rack 2970 may include mating or coupling features that allow it to be easily stacked upon another rack 2970, forming a rack or frame assembly. For example, a first side of each rack 2970 may include a pin or projection. A second side of each rack 2970 opposite the first side may include a receiving structure which can retain the projection from the first side of an adjacent rack 2970 connecting the two racks 2970 together. A cap 2972 optionally may be placed on the top or terminal rack 2970.

Each rack may include tracks 2974 or a frame in which modules 2900 may be retained. These tracks 2974 may be designed such that modules 2900 may be easily slid in and out of a rack 2970 during assembly of an integrated manifold 2950. In some embodiments, the tracks 2974 ensure that modules 2900 may only be installed in one orientation to ensure that all modules 2900 face the same direction. The tracks 2974 may also aid in alignment of connectors 2912 as a manifold 2950 is assembled. In an embodiment, the end blocks 2906 shown in FIGS. 35A-E can be modified to form at least part of the supporting structure of a rack or frame 2970. Any individual track 2974 can accommodate any number of manifold modules in a bank, each module having a slot in the rack or frame into which it can be placed. Individual modules can be concatenated in a bank by mating the pressure line inlet port of one module with pressure line outlet port of an adjacent module to form the fluidic pressure bus, and by installing the module control boards so that they interconnect via adjacent electronic communications connectors to form the communications/power bus. Thus a manifold assembly 2950 formed from a stack of modules can be readily modified to accommodate any number or combination of manifold modules 2900, depending on the complexity or needs of the device being fluidically or electrically controlled by the manifold assembly.

A communications/power bus extension line 2913 may extend between modules 2900 on one rack 2970 to modules on the next rack 2970. This may allow for the same communication/power bus to be used for all of the modules 2900 in the manifold assembly 2950. In some aspects, the communications/power bus extension line 2913 may be integrated in each rack 2970. As modules 2900 are installed in the rack 2970 they may connect to a communications/power bus which is housed within the rack 2970 structure. As racks 2970 are stacked upon one another, the integral communications/power bus lines for each rack 2970 may be placed into communication or connected with one another. This connection may be automatically established when the racks 2970 are properly attached to one another. This may help to allow for rack 2970 to rack 2970 communication to be easily established when assembling a manifold 2950.

Similarly, pneumatic (or in other systems, hydraulic) communication between modules 2900 on different racks 2970 may be established with pneumatic distribution lines housed or integrated within each rack 2970 (e.g. via modified end blocks 2906). The modules 2900 may connect and draw from these lines when installed in each rack 2970. Additionally, as racks 2970 are stacked, fluidic (e.g. pneumatic) communication from rack 2970 to rack 2970 may be automatically established. The connections may be made, for example, by press-fit plug/receptacle pairs having suitable leak-proof contact surfaces (such as, e.g., elastomeric gaskets or O-rings). Alternatively, pneumatic lines may run individually to each rack 2970 of a manifold. This may be desirable in some embodiments, as it may allow for different groups of modules 2900 of a manifold 2950 to draw from a variety of different pressure sources.

Figure 35F:
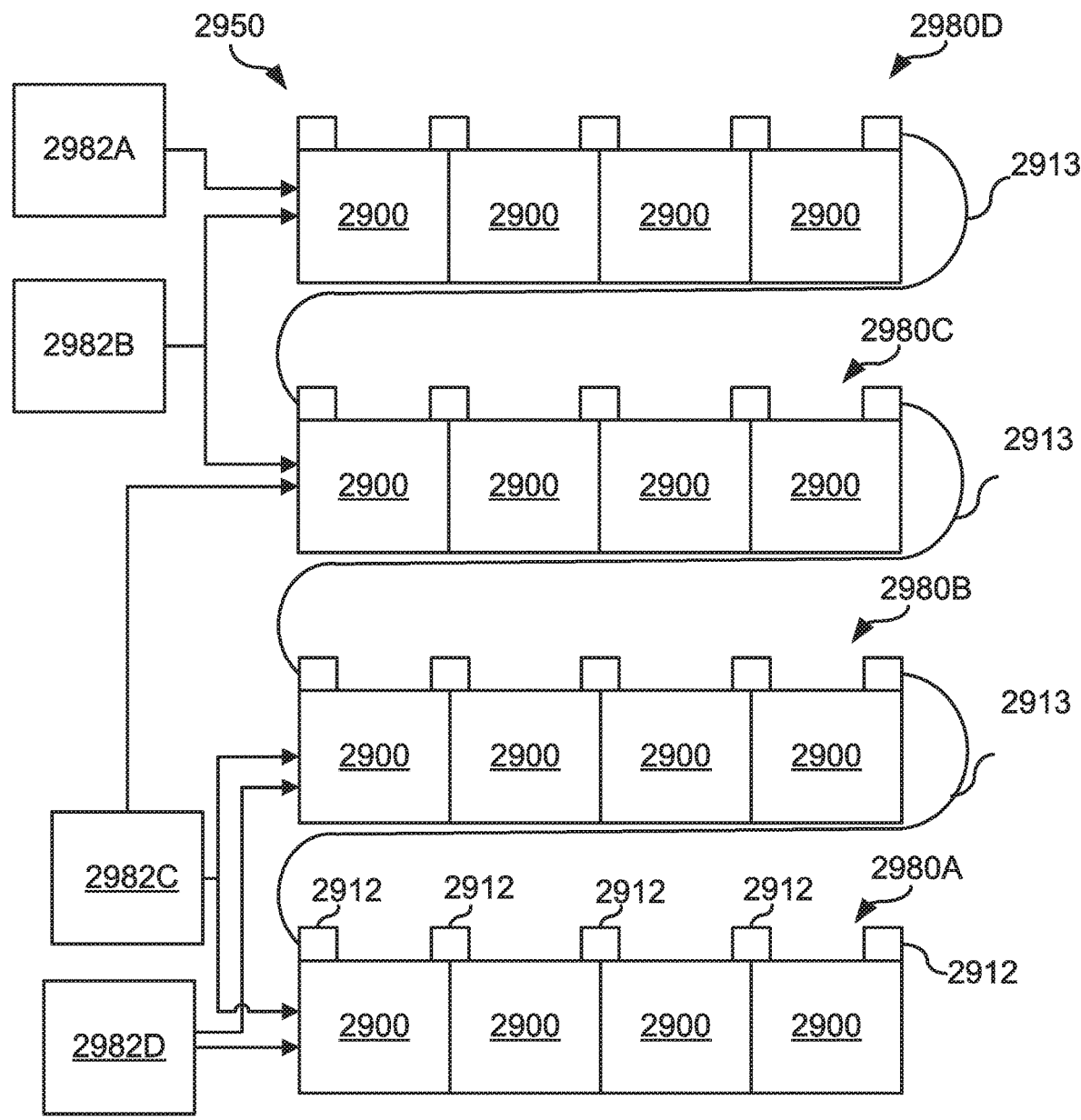
FIG. 35F depicts a block diagram of the connections of a manifold assembly comprising a stack of four banks of grouped or concatenated programmable valved manifold modules.

Referring now to FIG. 35F a representational diagram showing a number of modules 2900 arranged in a manner similar to that shown in FIG. 35E. The modules 2900 are split into a number of groups 2980A-D. Each module 2900 is connected by connectors 2912 and each group is connected by a communications/power bus extension line 2913 so that all modules may be connected on the same communications/power bus. In the example embodiment in FIG. 35F, the groups of modules 2900 of the manifold 2950 draw from different pressure sources 2982A-D. Groups 2980A and 2980B draw from pressure sources 2982D and 2982C. Group 2980C draws from pressure sources 2982B and 2982C. Group 2980D draws from pressure sources 2982A and 2982B. Such an arrangement may, for example, allow for module manifold blocks 2904 (FIG. 29C) to be simplified as the number of fluid pathways required in each manifold block 2904 (FIG. 29C) can be reduced. One group 2980A-D may, for example, be connected to a first positive pressure line. Modules 2900 within that group 2980A-D may be assigned as pump chamber controlling modules 2900. Another group 2980A-D may be connected to a second, higher positive pressure line. Modules 2900 within that group 2980A-D may be assigned as fluid valve controlling modules 2900.

Figure 36:
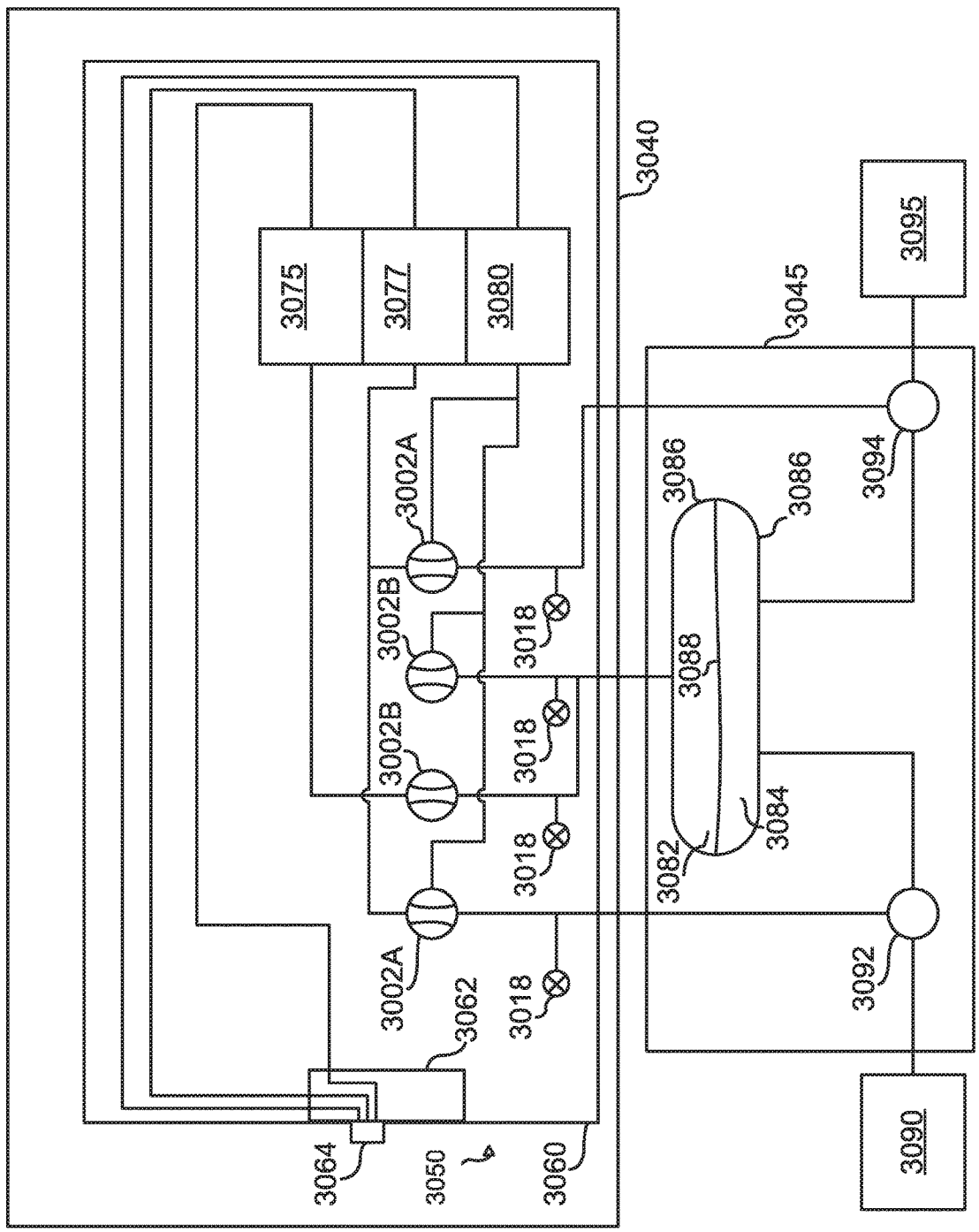
FIG. 36 depicts a pneumatic schematic diagram of a valve manifold module controlling a pump/valve unit.

An example schematic of a pneumatic pumping system 3000 including a manifold 3050 consisting of a single valve module 3060 is shown in FIG. 36. In the specific example shown, the valved module 3060 is configured as a pumping module and is similar to the valved module 2900 depicted in FIG. 35A. The example module 3060 shown in FIG. 36 includes four valves 3002A, 3002B. The valves 3002A, 3002B may be any suitable type of valves, such as any of the bi-stable valves described herein, binary valves, or even variable aperture valves. Each of the valves 3002A, 3002B (or more specifically valve cavities or valve outlet ports) can be placed in fluid communication with a pressure sensor 3018. The valves 3002A, 3002B of the module 3060 are commanded by a controller (which may be an on-board controller, or optionally an external controller), and the pressure sensors 3018 are configured to communicate with the controller. The controller may command the valves 3002A, 3002B to particular valve states based upon data collected by the pressure sensors 3018.

A first variable volume 3082 separated from a second variable volume 3084 by a movable barrier 3088 are included in the example pneumatic system 3000. A change in volume of the first variable volume 3082 correspondingly causes a change in volume of the second variable volume 3084. An increase in volume of the first variable volume 3082 causes a corresponding decrease in volume of the second variable volume 3084. A decrease in volume of the first variable volume 3082 causes an increase in volume of the second variable volume 3084. The first variable volume 3082 may be referred to herein as a control chamber. The second variable volume 3084 may be referred to herein as a pumping chamber.

The first and second variable volumes 3082, 3094 may be configured in any suitable arrangement which would allow a change in volume in one to be tied to a change in volume of the other. In the example schematic depicted in FIG. 36, the first variable volume 3082 is defined by a fixed wall 3086 and a displaceable barrier 3088. The second variable volume 3084 is adjacent the first variable volume 3082 and is defined by a second fixed wall 3089 and the displaceable barrier 3088. As the volume of the first variable volume 3082 increases, the displaceable barrier 3088 is pushed toward the second fixed wall 3089. As the volume of the first variable volume 3082 decreases, the displaceable barrier 3088 is pulled toward the first fixed wall 3086. The displaceable barrier 3088 may be a membrane or diaphragm, which in some embodiments may be constructed of one or more pieces of flexible or elastic sheeting.

As shown, the pneumatic system 3000 includes a first positive pressure input 3075, a second positive pressure input 3077 (which may be at a higher positive pressure than the first positive pressure source 3075), and a negative pressure input 3080. The positive and negative pressure inputs 3075, 3077, 3080 are connected to the manifold assembly 3050. By actuating the valves 3002B in an appropriate manner, positive or negative pressure may be supplied to a first variable volume 3082 of an external fluid flow control device. Additionally, valve 3092 and valve 3094 communicating with the second variable volume 3084 may also be controlled by actuating the respective valves 3002A.

When the first variable volume 3082 is connected to positive pressure and raised to a positive pressure, the first variable volume 3082 increases, displacing liquid present in the second variable volume 3084. When the first variable volume 3082 is connected to a negative pressure and lowered to a negative pressure, the first variable volume 3082 decreases in volume, allowing the second variable volume 3084 to draw in liquid via a liquid flowpath. The first variable volume 3082 may be in communication with at least one pressure sensor 3018 so that the pressure of the first variable volume 3082 can be monitored. Optionally, the inlet valve 3092 and outlet valve 3094 connected to the second variable volume 3084 may also be in communication with one or more pressure sensors 3018 so that their pressures may also be monitored.

The change in volume of the second variable volume 3084 in response to the change in volume of the first variable volume 3082 may be used to pump fluid out of the second variable volume 3084 in a controlled manner. As shown, the second variable volume 3084 is connected to a first fluid reservoir 3090. Depending on the configuration of the liquid flow paths, the second variable volume 3084 may be connected to a plurality of fluid reservoirs in some examples. For exemplary purposes, in a medical device, the first fluid reservoir 3090 may contain a liquid such as dialysate. It should be appreciated that the first fluid reservoir 3090 may contain any type of liquid or fluid. By opening valve 3092 and connecting the first variable volume 3082 to a negative pressure, fluid may be drawn into the second variable volume 3084 from the first fluid reservoir 3090. The second variable volume 3084 is also connected to a second fluid reservoir 3095. By closing valve 3092, opening valve 3094 and connecting the first variable volume 3082 to positive pressure, fluid may be pumped out of the second variable volume 3084 to the second fluid reservoir 3095. By opening and closing valves 3092 and 3094 in the opposite manner, fluid may be pumped in the opposite direction.

The magnitude of the pressure supplied to the first variable volume 3082 may have an effect on the rate of fluid transfer into or out of the second variable volume 3084. Increasing the magnitude of the pressure in the first variable volume 3082 may cause the rate of fluid transfer to increase.

As the pressure in the first variable volume 3082 controls how fluid will be transferred through the pumping system 3000, the first variable volume 3082 can be referred to herein as a control chamber. Since the fluid transferred is transferred into or out of the second variable volume 3084, the second variable volume 3084 may be referred to herein as a pumping chamber.

A fill stroke of the pumping chamber occurs when negative pressure is supplied to the control chamber 3082 such that the volume of the pumping chamber 3084 increases from a starting volume (e.g. substantially its minimum volume) to a designated volume, or alternatively to substantially its maximum volume. A delivery stroke of the pumping chamber occurs when positive pressure is supplied to the control chamber 3082 such that the volume of the pumping chamber 3084 decreases from a starting volume (e.g. substantially its maximum volume) to a designated volume, or alternatively to substantially its minimum volume. The term "stroke" is used to generically refer to supplying pressure to the control chamber 3082 to cause fluid transfer to or from the pumping chamber 3084. Stroke displacement refers to the amount of volume change that occurs in one of the variable volumes at any given point in a stroke. The end-of-stroke is meant to signify when a pumping stroke has completed and the pumping chamber 3084 is at substantially its maximum volume or minimum volume. In some applications, the pumping chamber may be included in a fluid handling cassette and the control chamber may be included as part of a cassette interface of a base unit to which a manifold assembly 3050 or manifold module of the manifold assembly is arranged to supply pressure.

Figure 37:
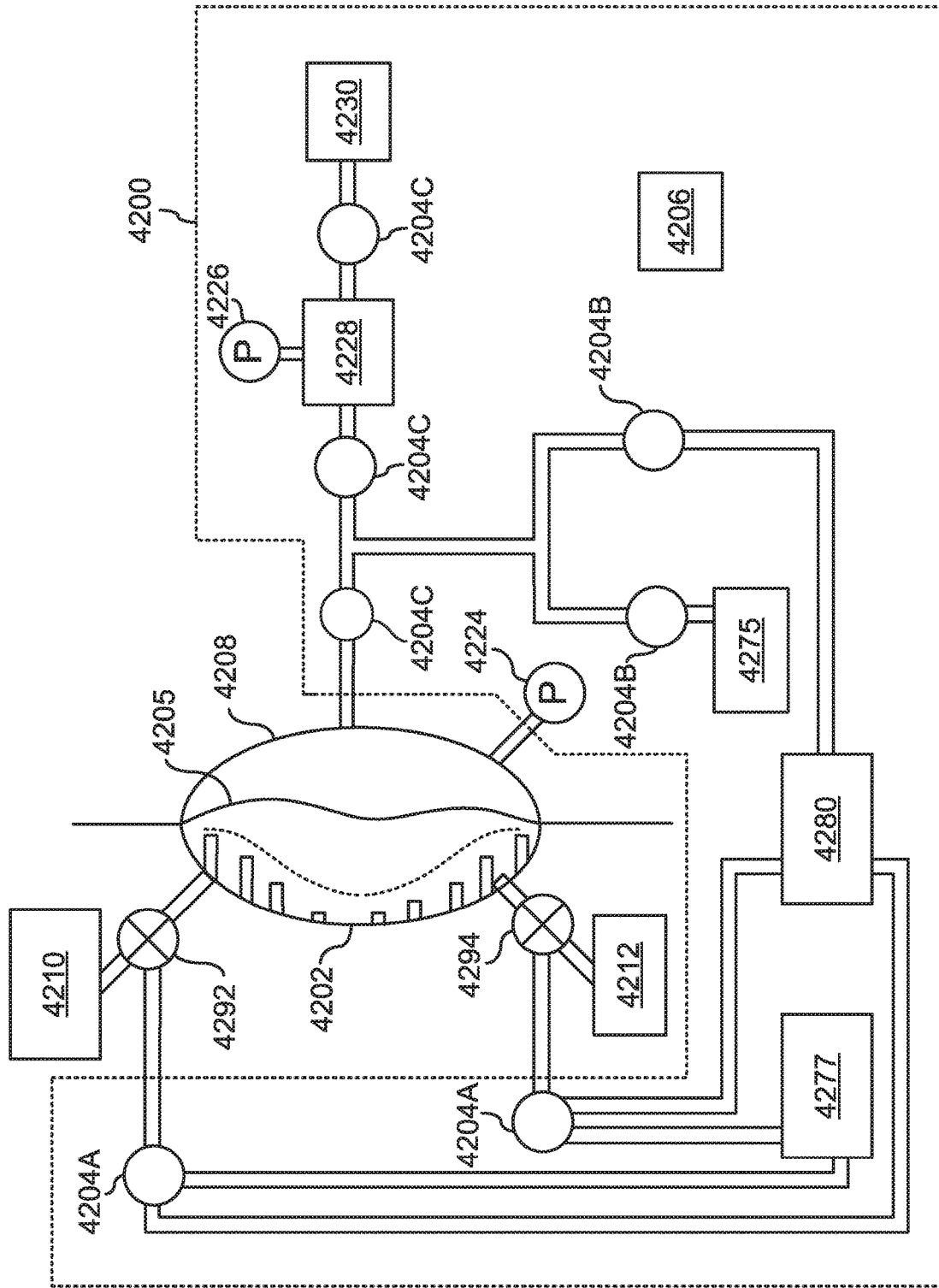
FIG. 37 depicts a block diagram of the pneumatic connections of a pressure measurement valved manifold module.

FIG. 37 depicts a schematic diagram of a module 4200 which is arranged to pump liquid from a pumping chamber 4202 and make a measurement of the volume of liquid pumped. The example module 4200 shown in FIG. 37 includes seven valves 4204A, 4204B, 4204C. The valves 4204A, 4204B, 4204C may be any suitable type of valves, such as any of the bi-stable valves described herein, a binary valve or a variable orifice valve. The valves 4204A, 4204B, 4204C of the module 4200 are controlled by a controller 4206. The controller 4206 commands the valves 4204A, 4204B, 4204C to particular valve states. The schematic diagram also includes a pumping chamber 4202 and control chamber 4208 separated by a displaceable barrier 4205 similar to those described elsewhere in the specification (such as, e.g. a flexible diaphragm or membrane). The pumping chamber 4202 may be bounded by a flexible membrane and can be part of a removable or disposable fluid pumping cassette, and the control chamber 4208 may be part of a pneumatic pumping device (a base unit) configured to deliver pneumatic pressure to the cassette (or hydraulic pressure in some embodiments).

As shown, a first positive pressure input 4275, a second positive pressure input 4277 (which may be at a higher positive pressure than the first positive pressure source 4275), and a negative pressure input 4280 are included. By actuating the valves 4204B in an appropriate manner, positive or negative pressure may be supplied to the control chamber 4208. Additionally, valve 4292 and valve 4294 to the pumping chamber 3084 may also be controlled by appropriately actuating the valves 4204A. Thus fluid may be pumped from a source reservoir 4210 to a destination reservoir 4212, or vice versa.

Pressure sensors (not shown) may be used to measure or monitor pressure associated with valves 4204A, B as described above with reference to FIG. 36. Pressure sensors 4224, 4226 may be used to measure or monitor pressure associated with valves 4204C. A first pressure sensor 4224 may be associated with the control chamber 4208 to monitor or measure the pressure of the control chamber 4208. Its specific location is arbitrary as long as it can fluidly communicate with the control chamber. A second pressure sensor 4226 may be associated a with reference chamber 4228 to monitor the pressure of the reference chamber 4228. The reference chamber 4228 is designed to be a chamber of fixed or known volume. The reference chamber 4228 optionally may be attached to or located on a manifold block 2804 (FIG. 34A) of a module 4200.

The controller 4206 receives and processes pressure data generated by pressure sensors 4224 and 4226. Data from pressure sensors 4224 and 4226 may be used to determine the volume pumped or displaced over a pumping stroke. In an embodiment, before the stroke begins, a valve 4204C is operated to isolate the control chamber 4208 from the reference chamber 4228. The reference chamber 4228 is pressurized, preferably to a desired pressure. For example, the reference chamber 4228 may be placed in fluid communication with a vent 4230 by actuating a valve 4204C. The pressure in the control chamber 4208 and reference chamber 4228 are measured with respective pressure sensors 4224 and 4226. The control chamber 4208 and reference chamber 4228 are placed in fluid communication with one another by opening two valves 4204C, and their pressures may be allowed to equalize. The equalized pressure is then measured using pressure sensors 4224 and 4226. Since the volume and pressure of the reference chamber 4228 is known and the pressure of the control chamber 4208 is known, the change in pressure upon equalization can be used to determine using ideal gas laws the volume of the control chamber 4208. The gas laws may be modeled, for example, to provide a reasonable approximation of the change in volume of the control chamber (and therefore also the pumping chamber). The controller 4206 records the pre-stroke volume of the control chamber 4208. The controller 4206 then commands the stroke to be performed. The controller then determines the post-stroke volume of the control chamber 4208. The post stroke control chamber 4208 pressure change is used to determine the pre-stroke to post-stroke control chamber volume change. This change in volume will be a measurement of the amount of liquid pumped during the stroke. The on-board controller may be programmed to compute the volume of liquid pumped, and optionally this measurement may be reported by the on-board controller via a communications bus to a master module or main controller. Alternatively, an external main or intermediate controller may be tasked with performing the volume calculations by receiving pressure data via the on-board controller.

Other methods of measuring a volume of fluid pumped by a pump chamber may also be used. For example, such methods may include those described in U.S. patent application Ser. No. 14/732,571, filed Jun. 5, 2015, and entitled Medical Treatment System and Methods Using a Plurality of Fluid Lines, or U.S. patent application Ser. No. 14/723,237, filed May 27, 2015, and entitled Control System and Method for Blood or Fluid Handling Medical Device, which are incorporated by reference herein in their entireties.

Figure 38A:
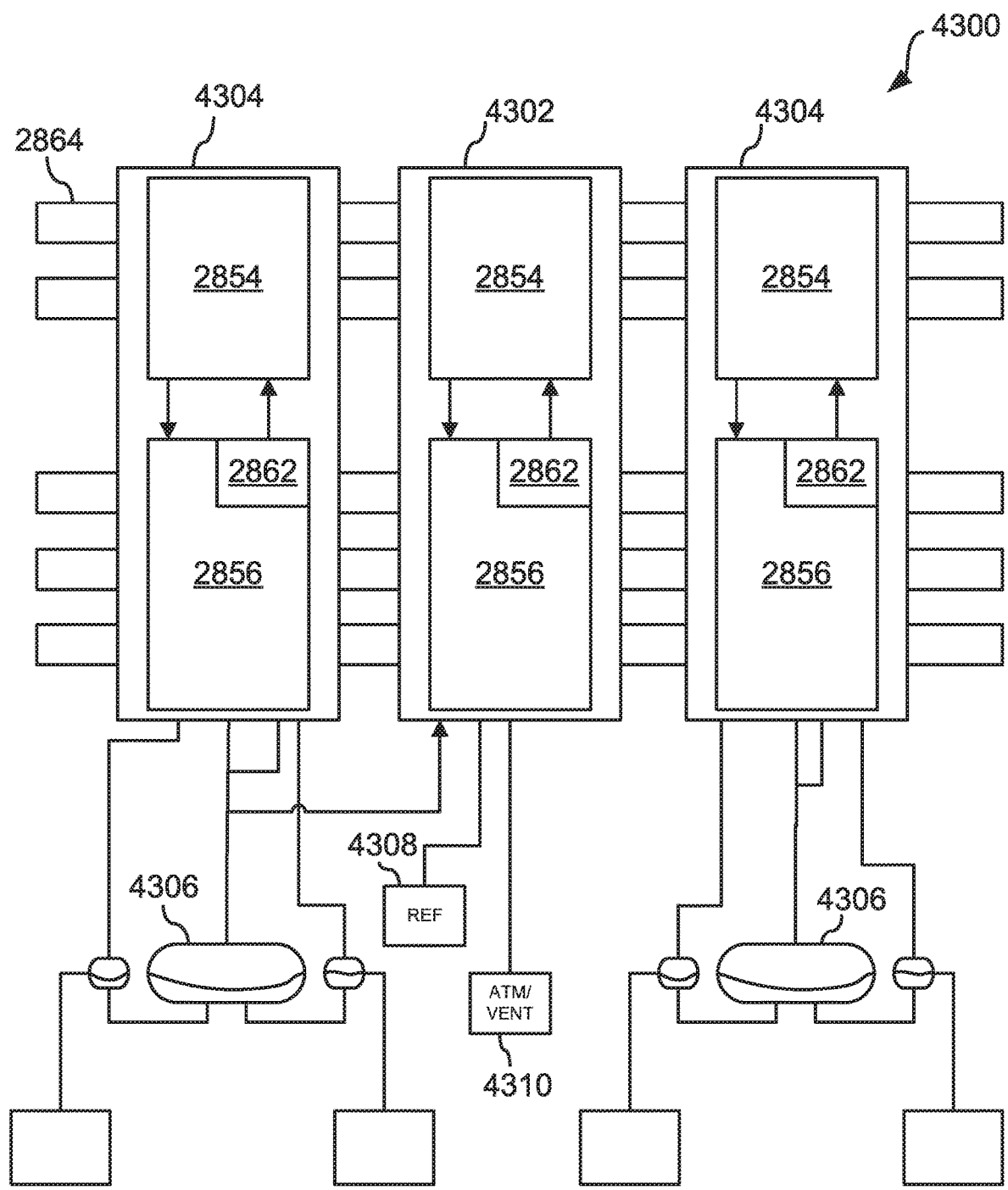
FIG. 38A depicts a block diagram of a pumping valved manifold module that is paired with a fluid pressure measurement valved manifold module.

Referring now to FIG. 38A, in some embodiments, an individual valved manifold module 4302 may be dedicated to fluid volume measurement in a fluid pumping system 4300. As shown, a single such module 4302 may be configurable to allow volume measurements of at least one fluid pump. Use of such a dedicated measurement module 4302 may be desirable when relatively precise measurements of pumped volumes are needed. A dedicated measurement module avoids having to alter the construction of the valved manifold modules 4304 dedicated to controlling a pump, for example. Alternatively, and as shown in FIG. 37 a valved manifold module 4304 dedicated to operating a pump may include the hardware required for volume measurement, and the controller 2854 of that module may perform both pumping and volume measurement operations.

A measurement valved manifold module 4302 may be paired with one or more pumping modules 4304. The measurement module 4302 may coordinate operation with each paired pumping module 4304 and provide access to a reference chamber and to a vent to measure fluid volumes pumped by the paired pumping module(s) 4304. The pumping modules 4304 may be similar to those described above with reference to FIG. 34C, for example. The pumping module(s) 4304 controller 2854 can be configured to communicate with the measurement module 4304 controller 2854 over a communication bus 2864. This communication may allow a pumping module 4304 controller 2854 to signal the measurement module controller 4304 when it is time to take a measurement (e.g. before and after a stroke). Pressure sensors 2862 of the measurement module 4302 may be in fluid communication with the control chambers 4306 under the control of the paired pumping modules 4304. Additionally, pressure sensors 3862 of the measurement module 4302 may be in communication with at least one reference volume or chamber 4308. The at least one reference volume or chamber 4308 is of a known volume and may, for example, be disposed within or attached to a module block 2804 (FIG. 34A) of the measurement module 4302. The at least one reference volume or chamber 4308 may also be located external to and connected with the module 4302.

The pneumatic block 2856 of the measurement module 4302 may include various pneumatic components of a module 2800 such as one or more valves 2802 (FIG. 34A). The pneumatic block 2856 of the measurement module 4302 may be commanded by the measurement module 4302 controller 2854 to place each of the at least one reference volumes 4308 into fluid communication with a vent 4310 or an associated control chamber 4306. The pneumatic block 2856 of the measurement module 4302 may be also commanded by the measurement module 4302 controller 2854 to isolate each of the at least one reference volumes 4308. Volume measurements may be made as described above.

In some embodiments the pneumatic block 2856 may also be controlled to connect the control chamber 4306 to the vent 4310. This may be done to bring the pressure of a control chamber 4306 closer the pressure which will be used to perform the next stroke. For example, if a fill stroke was just performed, the control chamber 4306 may be at a negative pressure. The pressure may be vented, for example, to ambient, before a deliver stroke at a positive pressure is performed. This may help to reduce depletion of pressure reservoirs feeding the modules.

Figure 38B:
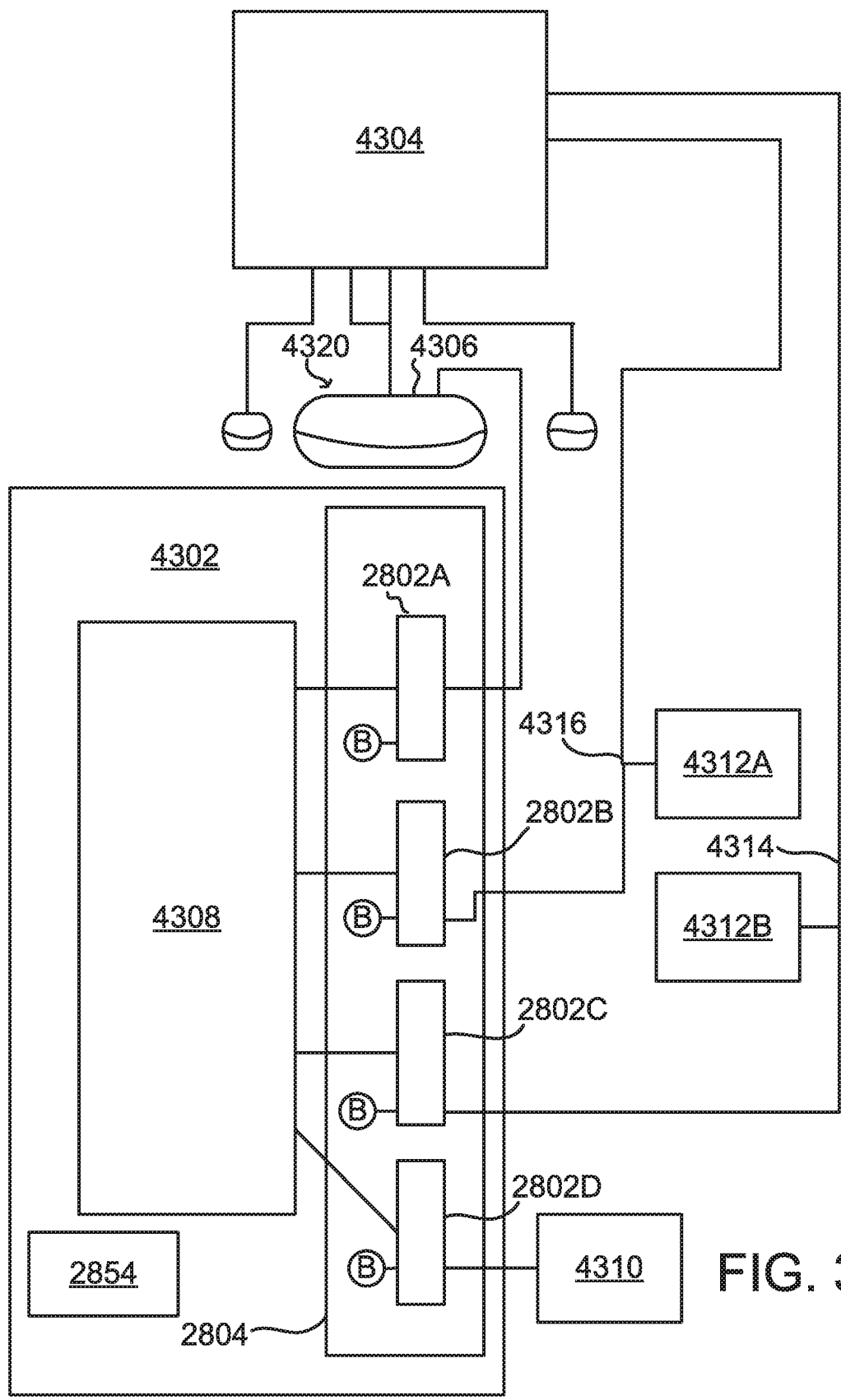
FIG. 38B shows a block diagram of a pressure measurement valved manifold module connected to a reference reservoir and a pump control chamber.

Referring now to FIG. 38B, a detailed schematic of a measurement module 4302 which is paired with a pumping module 4304 is shown. As mentioned above, the measurement module 4302 may be incorporated into a manifold and used to generate relatively precise measurements of pumped volumes moved by the pumping module 4304. The module may include a manifold base 2804 which includes a number of inlet ports. The inlet ports may connect to both a positive pressure line or bus 4316 and a negative pressure line or bus 4314. The positive and negative pressure lines 4316, 4314 may supply pressure to the modules 4304, 4302, from pressurized gas reservoirs 4312A, 4312B. The inlet ports may also be connected to atmosphere 4310 and the control chamber 4306 of a diaphragm pump 4320 controlled by the pumping module 4304. The module is thus arranged to charge a reference reservoir with positive or negative pressure, or to set its pressure to atmosphere, and to provide a valved connection to a control chamber of a pump whose volume is to be measured using one or more models based on the ideal gas laws.

The measurement module 4302 may include a first, second, third, and fourth valve assembly respectively labeled 2802A, 2802B, 2802C, 2802D. Each of the valve assemblies may be mounted to a receiving station on the manifold base 2804. The measurement module 4302 may also include a controller 2854 which is in electrical communication with the valve assemblies 2802A-D and configured to selectively actuate the valves 2802A-D. The manifold base 2804 may include a fluid pathway which fluidically connects the manifold inlet port communicating with the positive pressure bus 4316 to an inlet port of valve assembly 2802B. The manifold base 2804 may include a fluid pathway which fluidically connects the manifold inlet port communicating with the negative pressure bus 4314 to an inlet port of valve assembly 2802C. The manifold base 2804 may include a fluid pathway which fluidically connects the manifold inlet port communicating with atmosphere to an inlet port of valve assembly 2802D. The manifold base 2804 may also include a fluid pathway which fluidically connects the manifold inlet port in communication with the control chamber 4306 to an inlet port of valve assembly 2802A. The manifold base 2804 may also connect the valve cavities of each valve 2802A-D to respective sensing ports or wells in the manifold base 2804 as well as to a reference volume, chamber or reservoir 4308 of known volume. The controller 2854 may actuate the valves to selectively open or close communication between the valve cavities of each valve 2802A-D and the inlets of each valve 2802A-D.

The controller 2854 may include a number of pressure sensors 3018 (FIG. 36), for example a first, second, third, and fourth pressure sensor. During assembly of the measurement module 4302, the pressure sensors may form a reversible sealed connection with respective sensing ports in the manifold base 2804. The controller 2854 may actuate or operate the valve assemblies 2802A-D to charge the reference chamber 4308 to a pre-charge pressure, for example with positive of negative pressure for pressure lines 4314, 4316. The controller may actuate or operate the valve assemblies 2802A-D to open the reference chamber or reservoir 4308 to atmosphere 4310. The controller 2854 may actuate the valve assemblies 2802A-D to fluidically connect the reference volume 4308 to the control chamber 4306 of the diaphragm pump 4320 to equalize pressure between the control chamber 4306 and the reference chamber or reservoir 4308. The controller 2854 may also monitor the pressure from the pressure sensors in communication with the valve cavity of one or more valve assemblies 2802A-D. The controller 2854 may record pressures from the monitored pressure sensors before and after equalization. The pressure change may be used to determine the volume of liquid pumped by the pump via the pumping module 4304 by calculating an initial and final volume through the pressure measurements of the reference chamber and control chamber of the pump.

The valve assemblies 2802A-D may be any suitable type of valve assemblies. In the example, the valve assemblies 2802A-D are bi-stable three-way valves similar to many of those described elsewhere herein. As shown, only one inlet port for each of the valves assemblies 2802A-D is used. The other of the inlet ports is blocked off or occluded as indicated by the encircled "B" connected to an inlet port of each of the valve assemblies 2802A-D in FIG. 38B. The outlets of the valve assemblies 2802A-D are in fluidic connection with the reference reservoir or chamber 4308.

Figure 39:
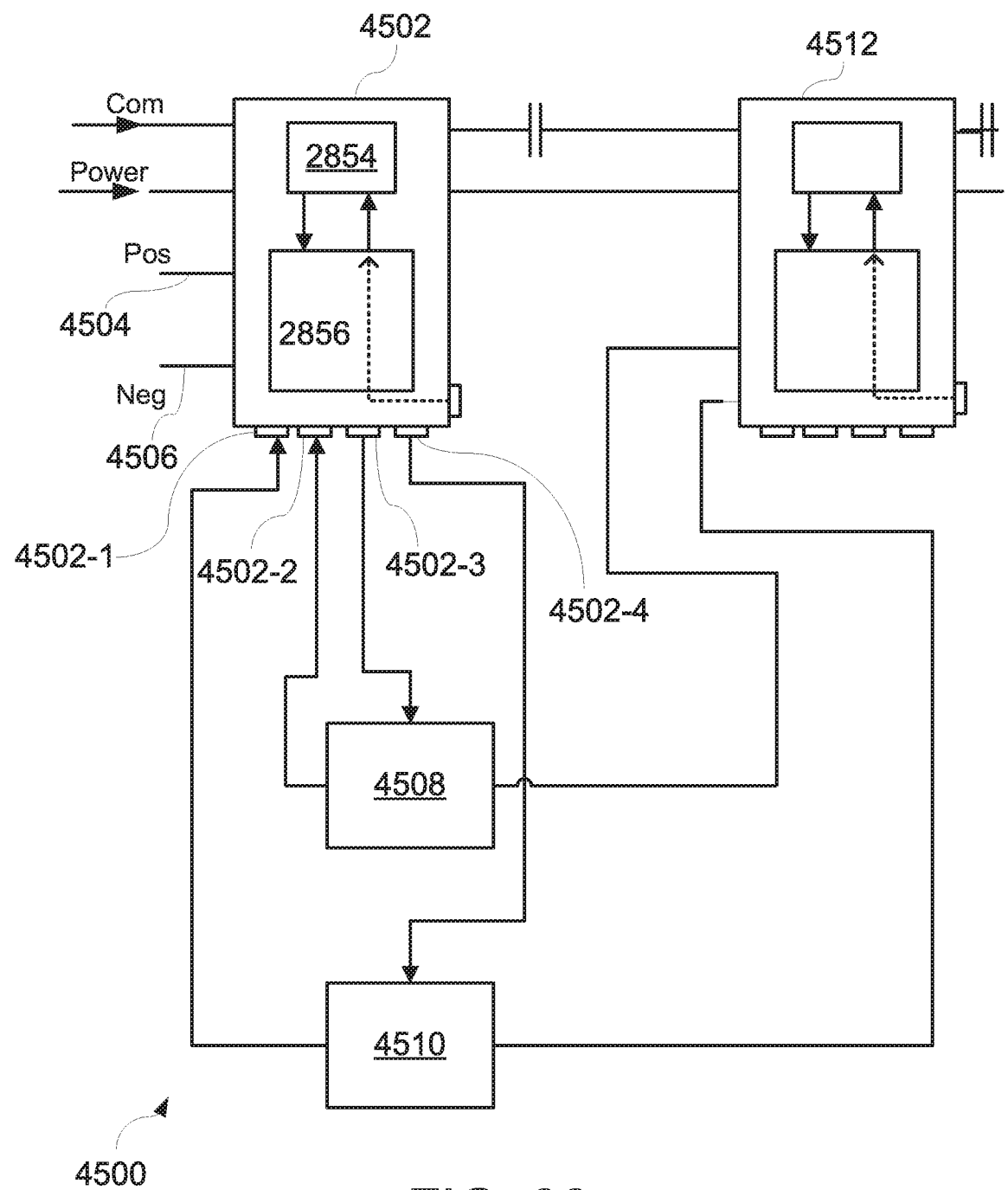
FIG. 39 depicts a block diagram of a regulator valve manifold module with pressure reservoirs or accumulators.

Referring now to FIG. 39, a portion of a manifold 4500 including a regulator module 4502 is depicted. A regulator module 4502 may regulate the pressure of a pneumatic bus to a second or regulated pressure which is different from that of the pneumatic bus. This may be accomplished by toggling a valve in the pneumatic block 2856 of the regulator module 4502 which separates the pressure bus from a separate chamber or an accumulator 4508, 4510. The pressure of the accumulator 4508, 4510 may be sensed by a pressure sensor 3018 (FIG. 36) which is monitored by the controller 2854 of the regulator module 4502. The controller 2854 may toggle the valve using data from the pressure sensor. For example, the controller 2854 may command the valve to toggle to place an accumulator 4508, 4510 in communication with the pressure bus when the sensed pressure of the accumulator 4508, 4510 falls below a first predetermined value. The controller 2854 may command that the valve close off communication between the pressure bus and the accumulator 4508, 4510 when the sensed pressure of the accumulator 4508, 4510 is above a second predetermined value.

In the example embodiment, the regulator module 4502 is in communication with a positive pressure bus 4504 and a negative pressure bus 4506. The regulator module 4502 may regulate the pressure of the positive pressure bus 4504 to a lower positive pressure. The regulator module 4502 may regulate the pressure of the negative pressure bus 4506 to a weaker negative pressure. In the example shown, ports 4502-1 and 4502-3 of the regulator module 4502 are in communication with positive pressure accumulator 4508. Ports 4502-2 and 4502-4 of the regulator module 4502 are in communication with negative pressure accumulator 4510.

The accumulators 4508, 4510 may be any suitable reservoir. In some embodiments, the accumulators 4508, 4510 may be identical. The accumulators may, for example, be rigid plastic or metal tanks and may have an interior volume between 500 ml and 2 L (e.g. 1 L).

Port 4502-3 may be an outlet port for a valve of the pneumatic block 2856 controlling fluid communication between the positive pressure bus 4504 and the positive pressure accumulator 4805. Port 4502-4 may be an outlet port for a valve of the pneumatic block 2856 controlling fluid communication between the negative pressure bus 4506 and the negative pressure accumulator 4510. The valves associated with ports 4502-3 and 4502-4 may be toggled by the regulator module 4502 controller 2854 based on the sensed pressure of their respective accumulators 4508, 4510 as described above.

In the example embodiment, ports 4502-1 and 4502-2 are not associated with valves. Instead, the pneumatic block 2856 may include pneumatic isolation members or assemblies in association with these ports 4502-1, 4502-2. The pneumatic isolation members or assemblies are further described later in the specification and in the example embodiment may pneumatically isolate the pressure buses 4504, 4506 from ports 4502-1, 4502-2. These ports 4502-1, 4502-2 may be connected to a fluid volume such that the pressure sensors 3018 (FIG. 36) associated with the ports 4502-1, 4502-2 may monitor the pressure of the fluid volume. In the example embodiment, port 4502-1 is connected to the negative pressure accumulator 4510 to periodically measure or monitor the pressure of the negative pressure accumulator. Port 4502-2 is connected to the positive pressure accumulator 4508 to periodically measure or monitor the pressure of the positive pressure accumulator.

Additional modules 4512 of the manifold 4500 may draw from the pressure accumulators 4508, 4510 and operate at the regulated pressure of the accumulators 4508, 4510. This may be desirable, for example, if portions of a fluid circuit controlled by a manifold 4500 operate at different pressures. In embodiments in which the fluid circuit includes at least one fluid handling cassette, the fluid valves of the cassette may be operated at greater pressures than the pump chambers of the cassette. Additionally, pump chambers of a cassette or of a number of different cassettes in a fluid circuit may be operated at different pressures. Modules 4512 controlling portions of the fluid circuit which operate at greater pressure may be disposed upstream of the regulator module 4502 and modules 4512 which operate at lesser pressures may be disposed downstream of the regulator module 4502. Additionally, some embodiments may include a plurality of regulator modules 4502 allowing for a fluid circuit to be operated at more than two sets of pressures.

Figure 40:
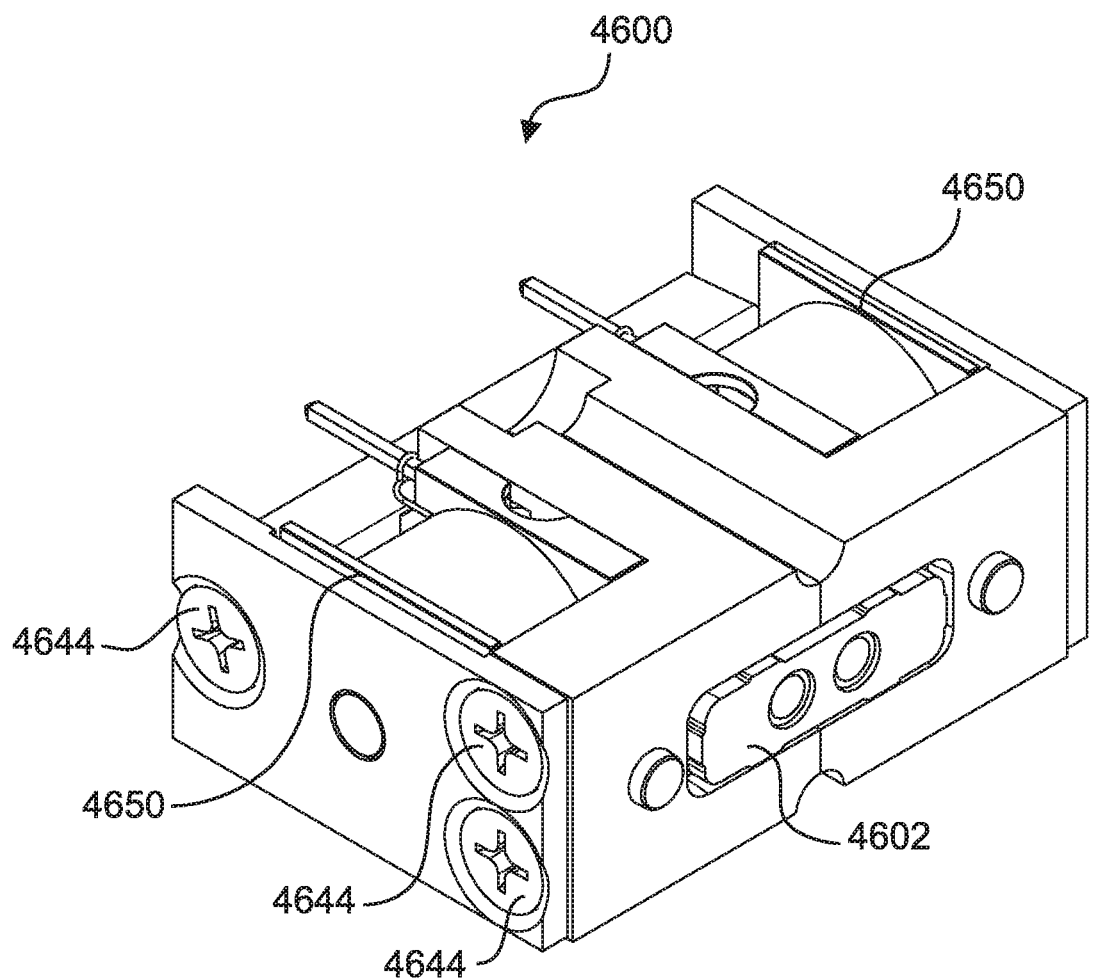
FIG. 40 is a perspective view of an example of a pneumatic isolation assembly mountable to a valve slot of a valved manifold module.

FIG. 40 depicts an example embodiment of a pneumatic isolation assembly 4600 which may be included in the pneumatic block 2856 of a module, for example, a regulator module 4502 (FIG. 39). As mentioned above, a pneumatic isolation assembly 4600 may isolate a pressure bus or buses communicating with the module from the port with which the pneumatic isolation assembly 4600 is associated. Such a pneumatic isolation assembly 4600 may be associated with a port of any module if it is desired that that port be used, for example, for sensing purposes. In the example shown, the pneumatic isolation assembly 4600 is a modified fluid valve. The pneumatic isolation assembly 4600 includes a gasket member 4602. The gasket member 4602 does not include pressure inlets or ports (see, e.g. 4112, 4114 of FIGS. 28A-28C). As a result, the gasket member 4602 serves to block and isolate any pressure buses feeding into the pneumatic isolation assembly 4600 from the module port associated with the pneumatic isolation assembly 4600.

In other embodiments, a pneumatic isolation assembly 4600 may not be a modified valve. Any suitable means of isolating the pneumatic buses from a module port may be used. For example, a block of gasketing material may be attached to a module in place of a valve. Plugs or a similar structure may be coupled into the module or a fixative or glue may be used to seal off pneumatic ports. Alternatively, although a pneumatic isolation assembly 4600 may resemble a valve, certain components of the valve may be absent. Components which are related to toggling of the valve may be removed. For example, coil assemblies 4650 may not be included in a pneumatic isolation assembly 4600. Additionally, posts (see, e.g. 4104, 4106 of FIGS. 28A-28C), a shuttle (see, e.g. 4102 of FIGS. 28A-28C), and an interior valve cavity (see, e.g. 4116 of FIGS. 28A-28C) may be absent. A pneumatic isolation assembly 4600 may also be constructed from different materials as magnetic flux paths within a pneumatic isolation assembly 4600 are not a concern. In some embodiments, fasteners 4644 may not be included. Instead, a pneumatic isolation assembly may be a single block of material or may include a number of pieces of material which may be snap fit, friction fit, solvent bonded, etc. together.

Figure 41A:
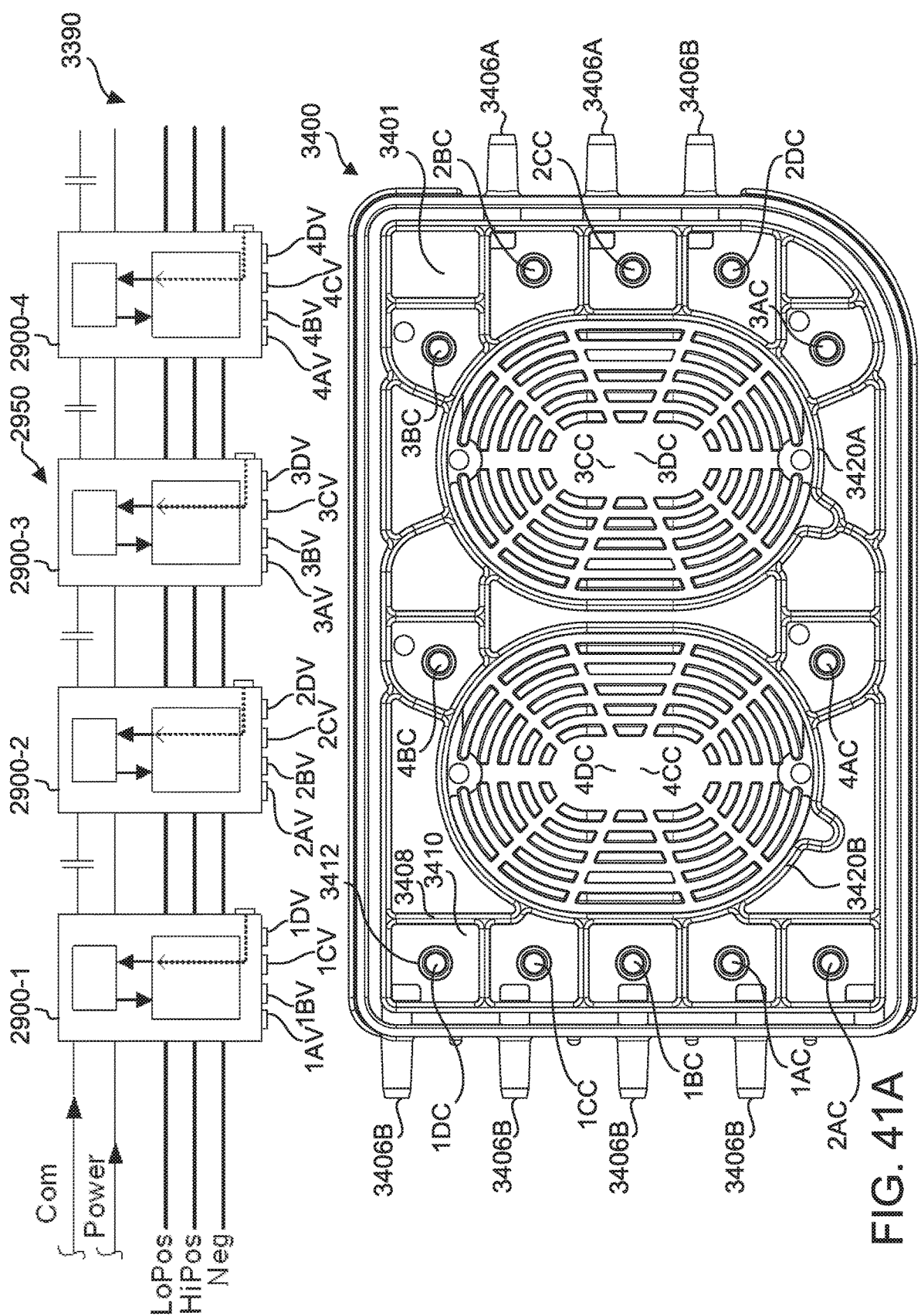
FIGS. 41A-B depict a schematic representation of a group of valved manifold modules configured to control pumping of fluid through a fluid handling cassette.
Figure 41B:
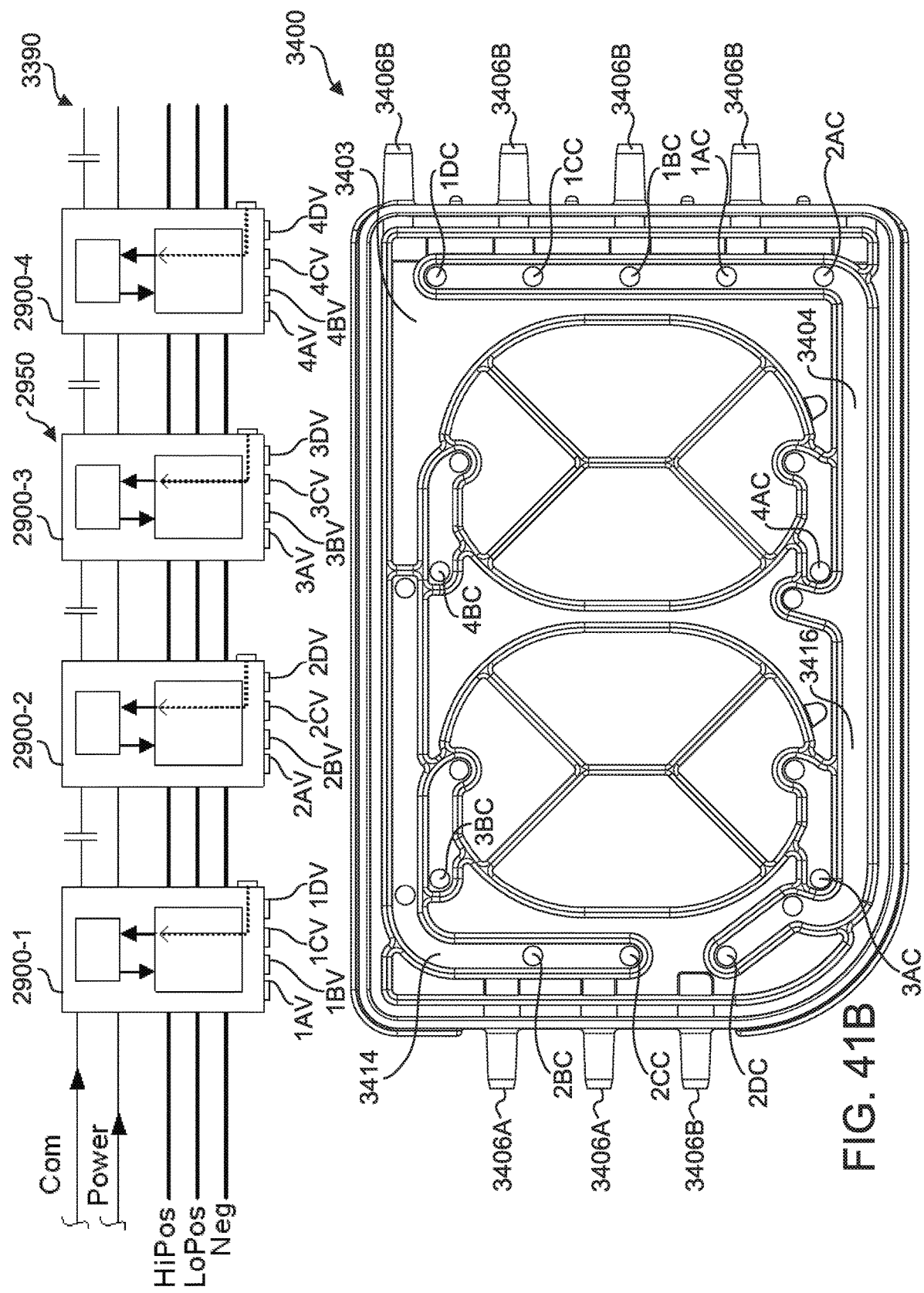

FIGS. 41A-41B depict an example embodiment of a manifold assembly 2950 including a number of valve manifold modules 2900-1, 2900-2, 2900-3, 2900-4 that have been installed in a cassette based fluid pumping system 3390. Although this example employs a pneumatically driven pumping system, a similar arrangement can be applied in a hydraulically driven system. A hydraulic system may vary in its configuration to allow for pump or valve actuators that can be driven in opposite directions by appropriately directed separate positive hydraulic pressure lines acting on the actuators in opposing directions, rather than the positive and negative pressure lines acting on the same side of a membrane actuator described in the following pneumatically driven system.

In the example embodiment, there are four valve manifold modules 2900-1, 2900-2, 2900-3, 2900-4. Each of the modules 2900-1, 2900-2, 2900-3, 2900-4 in the example may be substantially identical in size, location of ports, and electrical connections in order to be swappable with one another. Each module 2900-1, 2900-2, 2900-3, 2900-4 may include a similar electronic control board. Each module 2900-1, 2900-2, 2900-3, 2900-4 also includes a block of electrically actuated pneumatic valves. The pneumatic valve blocks are similar to those described above. In this example, each pneumatic valve block includes four valves and an outlet port for each valve. The outlet ports of the valves are labeled "n"av, bv, cv, dv in which "n" is the module number (i.e. 2900-"n"). The portion of the cassette 3400 controlled by a particular port on the manifold 2950 is labeled correspondingly. For example, a fluid valve controlled by port "n"bv on the manifold 2950 would be labeled "n"bc on the cassette

3400. Despite the valve modules 2900-1, 2900-2, 2900-3, 2900-4 being substantially identical, the valve modules 2900-1, 2900-2, 2900-3, 2900-4 perform a variety of functions and are applied in a variety of ways within the cassette based fluid pumping system 3390. A first side 3401 of the cassette 3400 is shown in FIG. 41A while a second, opposing side 3403 of the cassette 3400 is shown in FIG. 41B.

In the example embodiment shown in FIGS. 41A-41B, modules 2900-1 and 2900-2 are valve manifold modules which control fluid valves 1AC-1DC and 2AC-2DC on the cassette 3400. Referring primarily to FIG. 41A, each of the fluid valves 1AC-1DC and 2AC-2DC may include a valve well 3410 defined by a valve wall 3408. Within the valve well 3408 is a valve seat 3412. The valve wall 3410 may be slightly proud of the valve seat 3412. A flexible sheet covers each valve well 3408 and seals against the top of the valve wall 3410. Application of pressure to the flexible sheet causes the sheet to displace, but the seal against the valve wall 3410 is maintained. Positive pressure causes the sheet to displace against the valve seat 3412 closing the respective fluid valve 1AC-1DC and 2AC-2DC. Negative pressure draws the sheeting away from the valve seat 3412, opening the fluid valve 1AC-1DC and 2AC-2DC and allowing fluid to flow through. Such fluid valves are further described in U.S. Pat. No. 5,350,357 which is incorporated by reference herein in its entirety.

Referring again to both FIGS. 41A-41B, by commanding modules 2900-1 and 2900-2 to apply pressure so that fluid valves 1AC-1DC and 2AC-2DC on the cassette 3400 are opened and closed in a desired manner, various fluid pathways in the cassette may be established or blocked. Valves 2BC and 2CC may be opened/closed to control communication between a first fluid bus 3414 of the cassette 3400 and cassette ports 3406A associated with each of those valves. Valve 1AC-1DC, 2AC, and 2DC may be opened/closed to control communication between a second fluid bus 3416 of the cassette and cassette ports 3406B associated with each of those valves.

Modules 2900-3 and 2900-4 are pumping or chamber modules which control fluid valves 3AC, 3BC, 4AC, 4BC of the cassette 3400. These valves 3AC, 3BC, 4AC, 4BC act as inlet/outlet valves to or from the pump chambers 3420A, 3420B of the cassette 3400. Outputs 3CV, 3DV, 4CV, and 4DV of the manifold assembly 2950 are arranged to apply pressure to flexible sheeting spanning over pump chambers 3420A, 3420B of the cassette 3400 as indicated by reference numbers 3CC, 3DC, 4CC, 4DC. This flexible sheeting may act as the flexible wall or barrier 3088 described above in relation to FIG. 36. Outputs 3CV, 3DV, 4CV, and 4DV may supply pressure to respective control chambers 3082 (FIG. 36). This pressure may cause a change in volume in the associated pumping chamber 3420A, 3420B and thus cause fluid to be pumped by the pumping chamber 3420A, 3420B of the cassette 3400.

The valve assembly providing output to 3CV can be arranged to access the positive pressure line only, in which case the valve assembly providing output to 3DV can be arranged to access the negative pressure line only, or vice versa. Outputs 3CV and 3DV can subsequently be merged into a single flowpath to the control port communicating with the flexible membrane overlying the pump chamber (3CC, 3DC). Access of a valve assembly to only one pressure line in a pumping module can be achieved, for example, by substituting an inlet gasket having no hole communicating with the unwanted pressure line in the manifold module. Alternatively a two way valve connected to only one of the pressure lines may be used. The valve manifold module 2900-4 controlling the pumping chamber designated 4CC, 4DC, can be arranged in a manner similar to module 2900-3.

In some embodiments, the cassette 3400 may be used to pump fluid during a dialysis therapy such as a peritoneal dialysis therapy. In such embodiments, the cassette ports 3406B associated with fluid valves 1AC-1DC may each be connected to a reservoir (e.g. a bag) of dialysate solution. The cassette port 3406A associated with fluid valve 2BC of the cassette 3400 can be connected to a heated reservoir (e.g. a bag on a heating tray). The cassette port 3406A associated with fluid valve 2CC of the cassette can be connected to a drain or waste reservoir. The cassette port 3406B associated with fluid valve 2DC of the cassette 3400 can be connected to a fluid line leading to the peritoneal cavity of a patient. The modules 2900-1, 2900-2, 2900-3, 2900-4 may be controlled by an on-board controller or an external controller (or combination of the two) such that fluid is transferred through the cassette 3400 to administer a dialysis therapy. For example, modules 2900-1, 2900-2, 2900-3, 2900-4 may be controlled so that fluid is transferred from a solution reservoir to the heated reservoir. The modules 2900-1, 2900-2, 2900-3, 2900-4 may be controlled so that fluid is transferred from the heated reservoir to the patient. The modules 2900-1, 2900-2, 2900-3, 2900-4 may be controlled so that spent fluid is transferred from the patient to the drain or waste reservoir. Further description on how such a cassette may be used to transfer fluid for a dialysis therapy may be found in U.S. patent application Ser. No. 14/732,571, filed Jun. 5, 2015, and entitled Medical Treatment System and Methods Using a Plurality of Fluid Lines, which is incorporated by reference herein in its entirety.

As mentioned above, the modules 2900-1, 2900-2, 2900-3, 2900-4 may, in some embodiments, control operation of the cassette to transfer fluid from one cassette port to another autonomously (i.e. via a suitably programmed on-board controller in the valve manifold module). Alternatively, the modules 2900-1, 2900-2, 2900-3, 2900-4 may receive only high level commands from a main controller of the fluid pumping system 3390. Such commands may include, for example, a command to start pumping, stop or pause pumping, pump from a solution line to a heater bag, pump from a heater bag to a patient line, pump from a patient line to a drain line, etc. The on-board controller in turn can be programmed to coordinate the cassette valves and pumps to fulfill the high level commands. The on-board controllers of the modules 2900-1, 2900-2, 2900-3, 2900-4 may also communicate and coordinate operations among themselves to accomplish the high level commands with minimal or no further input from the main controller.

Figure 42A:
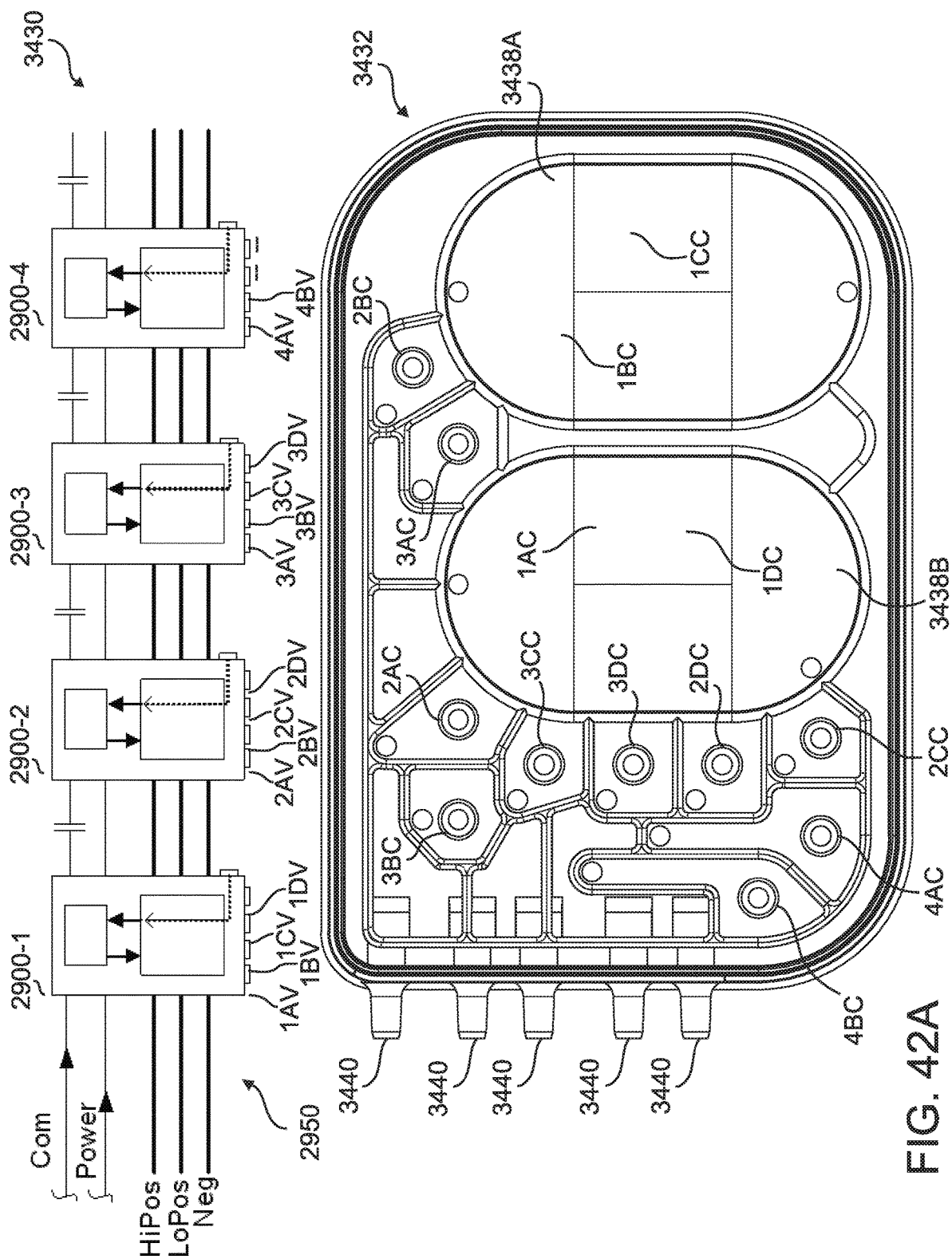
FIGS. 42A-B depict another schematic representation of a group of valved manifold modules configured to control pumping of fluid through a fluid handling cassette.
Figure 42B:
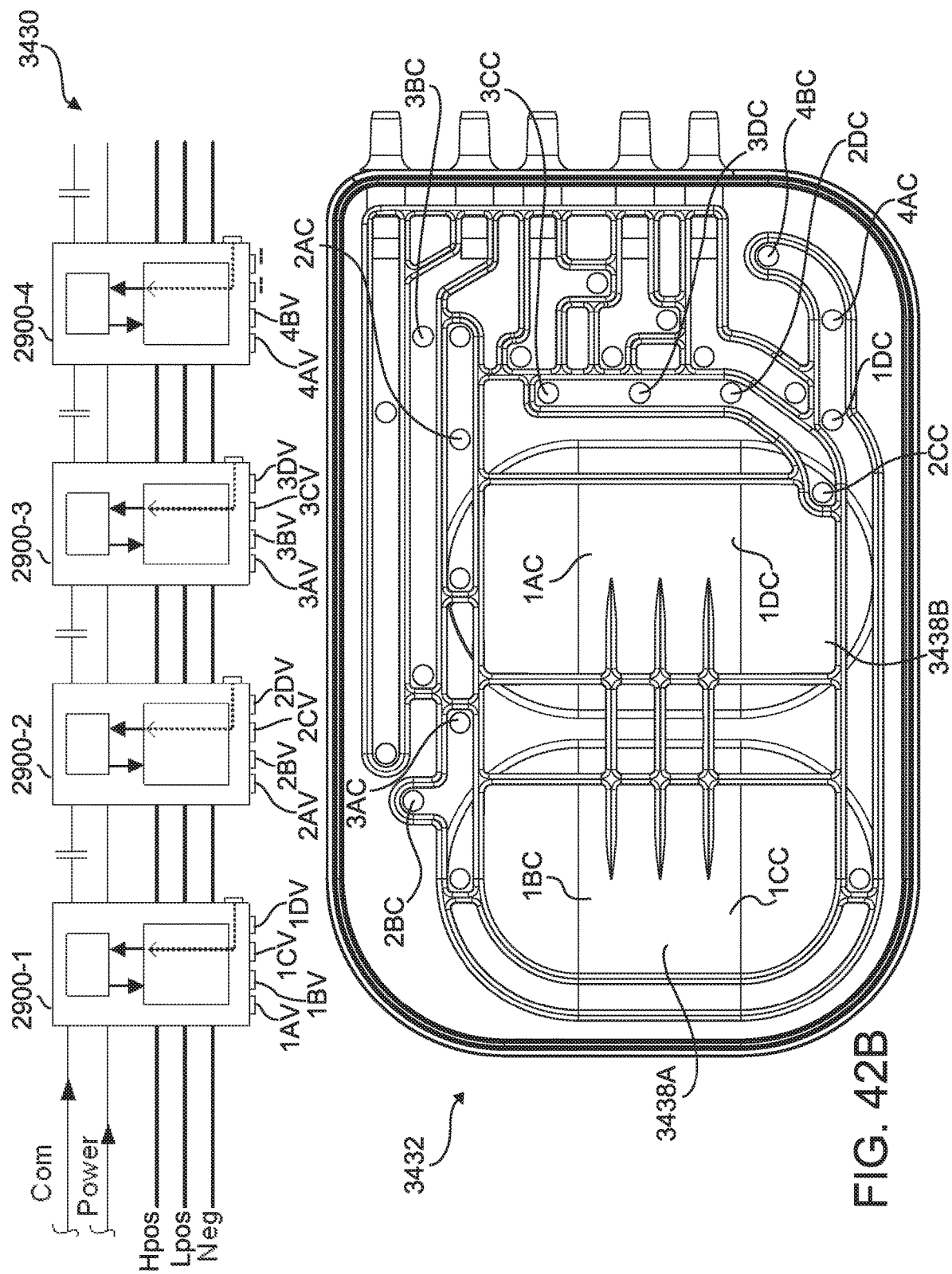

FIGS. 42A and 42B depict an example embodiment of a manifold assembly 2950 including a number of valve manifold modules 2900-1, 2900-2, 2900-3, 2900-4 that have been installed in a cassette based fluid pumping system 3430. FIG. 42A shows the manifold assembly 2950 and the first side 3434 of a cassette 3432. FIG. 42B shows the manifold assembly 2590 and a second, opposing side 3436 of the cassette 3432. The manifold assembly 2950 is similar to that shown in FIGS. 41A and 41B, however, the cassette 3432 has a different arrangement of flow paths, valves and ports. The cassette 3430 may, however, be operated in generally the same manner as that described above in FIGS. 41A and 41B. Modules 2900-2, 2900-3, 2900-4 are arranged as valve control modules which operate the fluid valves 2AC-2DC, 3AC-3DC, 4AC, and 4BC of the cassette 3430. Module 2900-1 is arranged as a pump chamber control module. In the example embodiment, the pump chamber control module 2900-1 does not control inlet/outlet valves to the pump chambers 3438A, B of the cassette 3432. Instead, the chamber control module 2900-1 supplies pressure to the control chambers 3082 (FIG. 36) of a base unit of the system, providing pressure to the membrane overlying the pumping chambers 3438A, 3438B of the cassette. Two valve assemblies on the module supply pressure to one pump chamber—one positive pressure and the other negative pressure. By coordinating operations of modules 2900-1, 2900-2, 2900-3, 2900-4 within the manifold 2950, fluid may be pumped through the cassette 3432 to and from the various ports 3440 of the cassette 3432. In some embodiments, this may be done, for example, to perform a dialysis therapy such as a peritoneal dialysis therapy. Further description on how such a cassette may be used to transfer fluid for a dialysis therapy may be found in U.S. Pat. No. 5,350,357, issued Sep. 27, 1994, and entitled Peritoneal Dialysis System Employing a Liquid Distribution and Pumping Cassette that Emulates Gravity Flow which is incorporated by reference herein in its entirety.

Figure 43A:
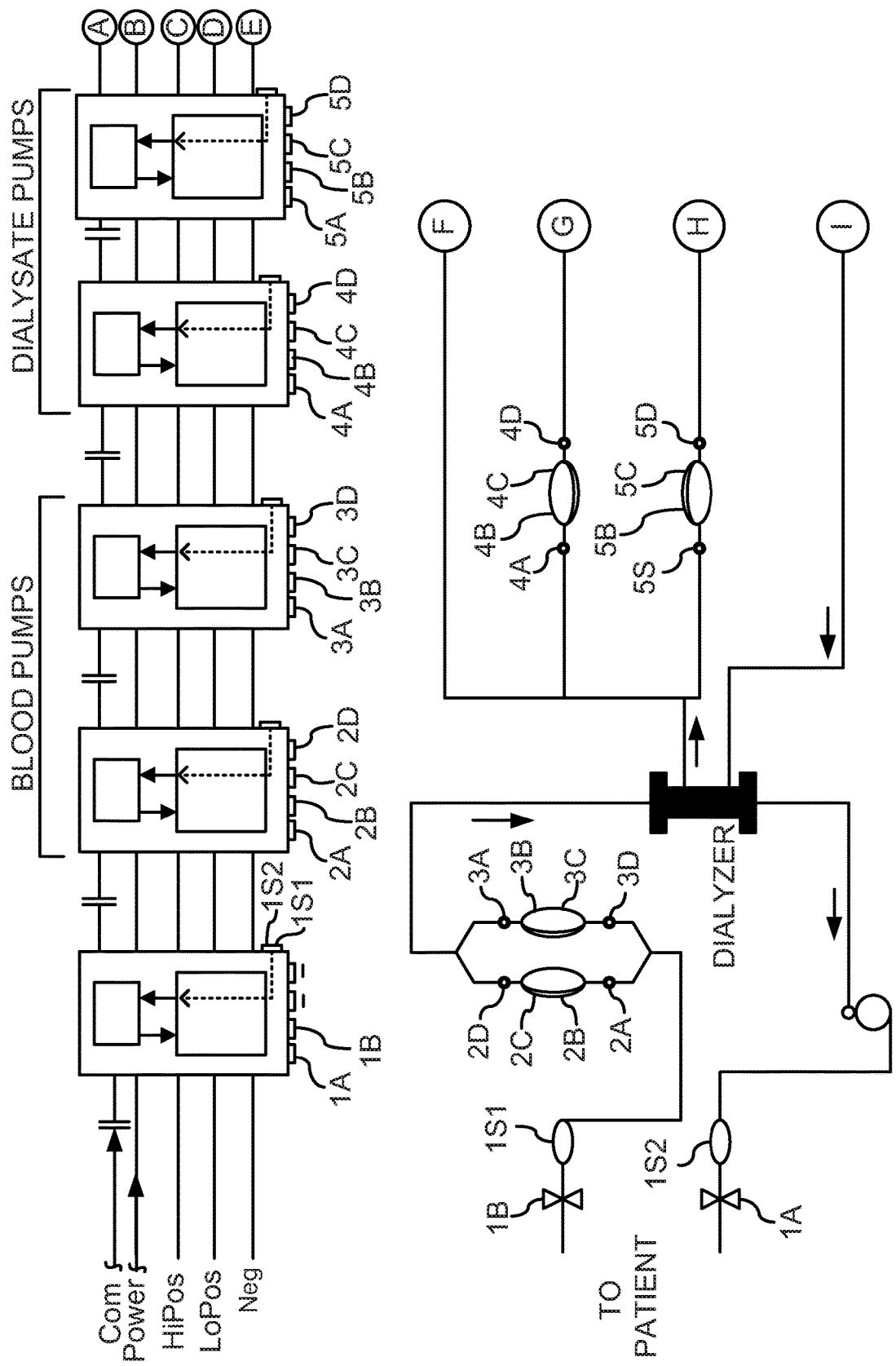
FIGS. 43A and 43B depict a schematic representation of an implementation of a manifold assembly comprising a group of programmable valved manifold modules operating various pumps and valves of a hemodialysis system.
Figure 43B:
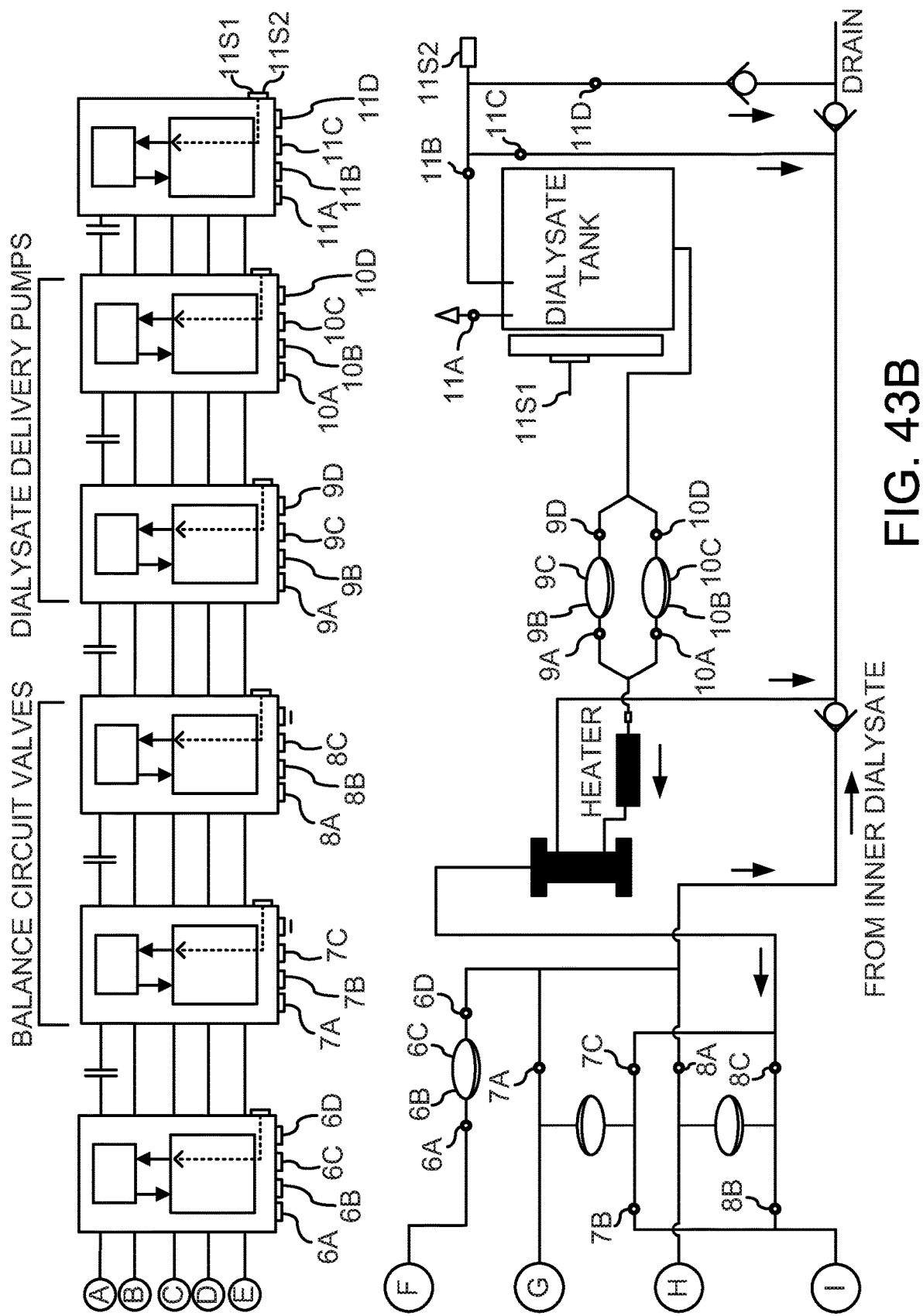

FIGS. 43A and 43B depict an example embodiment of a manifold assembly including a number of valve manifold modules that have been installed or concatenated together for use in a hemodialysis system. The valve manifold modules may be concatenated in a single bank, or a smaller subset may be concatenated into a manifold bank, with a number of manifold banks stacked one above the other to optimize the space occupied by the manifold assembly. Each bank can be arranged to have ported access to positive and negative pressure lines. In the example embodiment there are 11 valve modules with the first valve module being the leftmost module and the $11^{th}$ valve module being the rightmost module. Each of the modules in the example may be substantially identical. Each module may include substantially the same programmable electronic control board. Each module also includes a pneumatic manifold block. The pneumatic blocks are similar to those described above. In this example, each pneumatic block includes four valve assemblies and an outlet port for each valve to form a valve manifold module. Each of the outlet ports is labeled "n"a-d in which "n" is the module number. The portion of the dialysis circuit controlled by a particular port on the manifold is labeled correspondingly. For example, a valve controlled by port "n"b on the manifold would be labeled "n"b on the dialysis circuit. The pneumatic lines connecting the ports of the manifold to the dialysis circuit are not depicted for the sake of clarity of illustration. Despite the valve modules being substantially identical, the valve modules perform a variety of functions and are applied in a variety of ways within the dialysis machine, each said function being determined at least in part by the location of the module along the manifold assembly.

A valve manifold assembly that controls the operation of a membrane pump may comprise a valve assembly that switches between access to positive or negative pressure for an inlet flow valve of the membrane pump, a similar valve assembly for an outlet flow valve of the membrane pump, a valve assembly having access to a positive pressure line, and a valve assembly having access to a negative pressure line, the latter two valve assemblies configured to control operation of the pump membrane. Access of a valve assembly to a pressure line can be denied relative simply, for example, by replacing a gasket between the valve assembly and the pressure lines with a gasket having only one access port to either one pressure line or the other.

A power and a communication bus may optionally extend from module to module throughout the manifold. In an embodiment, the communications bus is configured similar to a CAN-bus, in which disruption of one module along the chain may disrupt communications to the downstream modules. However, the power bus to all modules may remain intact so that any of the downstream modules may remain operational. In certain locations along the manifold assembly, the module may be pre-programmed to enter an autonomous mode of operation for a designated period of time upon loss of communications, so that a blood pump, for example, may continue to operate when an upstream module fails or is disconnected.

Additionally, negative, high positive, and low positive pressure pneumatic buses extend from module to module throughout the manifold. Each module includes an on-board processor which commands the valved pneumatic block of the module and sends signals to actuate the valves of the module. Additionally, each processor receives pressure data from fluid flow paths in the pneumatic block, so that, for example, the pressure of the pumping chambers of each pump in the system can be monitored by the valve manifold module control boards. Each module also includes a generic connector which allows the module to be connected to any of a variety of peripherals. For example, any of a variety of sensors may be connected to the module via the generic connector. Data from a connected peripheral device may be conveyed to the processor of the module. In FIGS. 43A and 43B, signals coming from peripheral devices in the dialysate circuit are labeled "n"s"#" where "n" is the module to which the peripheral device is connected, s is an abbreviation for the word signal, and # is an identifier for the peripheral device to distinguish between peripheral devices when more than one peripheral device is connected to an individual module.

As shown, module 1 is connected to the dialysate machine circuit such that only two of its outputs 1a and 1b are used. The other ports of the module are blocked off. 1a and 1b control two pneumatic or hydraulic occluders in the example diagram. The occluders may be bladders or a piston/cylinder arrangement which may be actuated with positive pressure to cause displacement of an occluder blade that contacts the fluid line to open the associated fluid line. The occluders controlled by 1a and 1b may be spring-biased and used to respectively occlude (through, e.g., release of pressure) an arterial line from a patient and a venous line to the patient.

As shown, in an optional arrangement, module 1 also receives a signal from two peripheral devices in the dialysis machine. The first signal, 1s1, is generated by an air-in-line sensor installed on the arterial line of the dialysis machine circuit. The second signal, 1s2, is generated by a second air-in-line sensor installed on the venous line of the dialysis machine circuit. The processor of module 1 may monitor signals 1s1, and 1s2 from the air-in-line sensors. In response a determination that a signal indicates there is air in at least one of the lines, the processor of the module may issue commands to the valves to cause the pneumatic occluders to deploy. Thus based on 1s1 and 1s2, the module may release the occluder bladders to block fluid flow and prevent air from reaching the patient.

Module 2 and 3, which can be substantially the same as any other module in the manifold, are used to control fluid pumping within the system. As shown, module 2 and module 3 operate their valves to pump fluid in a two chamber fluid pump. This pump is similar to the two chamber fluid pump 2896 of FIG. 34F. In the example of a hemodialysis machine, it may be desirable that the two chambers be operated such that fluid is pumped in a substantially continuous fashion. This may require coordination between the on-board controllers of modules 2 and 3 as signified by the bracket grouping the two blood pump modules (2 and 3) on the manifold. The on-board controllers of modules 2 and 3 may communicate with one another over the communication bus of the manifold to synchronize pumping. Specifically, for example, the modules may coordinate pumping operations such that one blood pump is filling its fluid pumping chamber while the other module is delivering its fluid pumping chamber.

The blood pumps may pump blood through a dialyzer of the hemodialysis system, which is designed to extract substances such as creatinine, urea, etc. from the blood. The modules may control the two chambers of the fluid pump to pump blood at a desired rate based on coordinated commands from their respective processors.

Modules 4 and 5 are also used to control fluid pumping within the dialysis machine circuit. In the example in FIG. 43A, modules 4 and 5 are dialysate pumps which control the pumping of dialysate through the dialyzer. As above, a bracket grouping modules 4 and 5 indicates that the modules may coordinate operations with one another to ensure that dialysate is pumped in a specified manner.

Module 6, also configured as a pump in FIG. 43B, may control an ultrafiltrate pump of the dialysis machine circuit. Module 6 may optionally control the UF pump to draw fluid out of the patient's blood as commanded by the system controller.

Modules 7 and 8, which again can be substantially identical to every other module in the manifold, are used as pneumatic valve controllers which serve to operate valves of a balancing circuit of the dialysis machine circuit. Modules 7 and 8 may control the valves in the balancing circuit to ensure that the amount of fresh dialysate flowing to the dialyzer is substantially equal to the amount of spent dialysate flowing from the dialyzer. The balancing circuit valve modules are grouped together to indicate that these modules coordinate operations to ensure proper function of the dialysis machines balancing circuit. As shown, the grouped dialysate pump modules and the grouped balancing circuit valves may also coordinate operations. This may allow the dialysate pumps and balance circuit valves to work effectively together in a fully coordinated manner.

Modules 9 and 10, which are configured as to operate fluid pumps are also shown as a group of modules whose on-board controllers may coordinate operations with one another. As shown in FIG. 43B, modules 9 and 10 control the pumping of fluid by another two chamber fluid pump. The two chamber fluid pump is a dialysate delivery pump is a pump which pumps fluid through a heater element and to the balancing circuit of the dialysis machine. As described above in relation to modules 2 and 3, modules 9 and 10 may coordinate pumping operations to cause dialysate to pump in a substantially continuous manner.

Module 11, in the example embodiment, is shown as controlling a number of routing valves. These valves may route fluid entering the depicted circuit (e.g. from a mixing circuit) to a plurality of destinations. The valve controlled by module output port 11a controls a venting pathway for the dialysate reservoir. The valve controlled by module output port 11b may be opened or closed to allow or prevent fluid flow into the dialysate reservoir or tank. The valve controlled by module output port 11c may be opened or closed to allow or prevent fluid flow to a drain line or drain destination. The valve controlled by 11d also may be opened or close to make or break a flow path to a drain line. In some embodiments, only one valve is required to coordinate flow through a single line to drain.

As shown, module 11 also receives a signal from two peripheral devices in the dialysis machine. The first signal, 11s1, is generated by a level sensor installed on or in the dialysate tank or reservoir of the dialysis machine circuit. This level sensor may be any suitable variety of level sensors. In various embodiments, the level sensor may be, but is not limited to, a capacitive sensor, optical sensor, float sensor, rangefinder, etc. The controller of module 11 may monitor the signal 11s1 and open the valve controlled by output port 11b to allow dialysate to flow into the dialysate reservoir when the level sensor indicates the dialysate volume in the reservoir has dropped below a threshold value. The valve controlled by 11a may also be opened at this time to allow for air to be displaced out of the reservoir as new dialysate enters the reservoir. In some embodiments, signal 11s1 may also be conveyed to modules 9-10 such that the valve may be opened when fluid is pumped out of the dialysate reservoir to allow air to replace the fluid being removed. Alternatively, modules 9-10 may coordinate with module 11 to accomplish the same task. In the event that signal 11s1 indicates that the reservoir is has a dialysate volume above a threshold value, the valve controlled by module output port 11b may be commanded closed and the valve controlled by module output port 11c and/or d may be commanded open. Thus any excessive dialysate will be dumped to drain.

The second signal, 11s2, is generated by a conductivity sensor installed on the fluid line coming from a mixing circuit (not shown). The processor of module 11 may monitor signal 11s2 from the conductivity sensor. In response a determination that the signal indicates the dialysis solution entering the depicted circuit is not suitable for use (e.g. due to a mixing problem) the controller of the module may issue commands to close the valve controlled by output port 11b and open at least one of the valves controlled by output port 11c or d. Thus the unsuitable dialysate may be prevented from entering the dialysate reservoir and may instead by diverted to drain.

Figure 44:
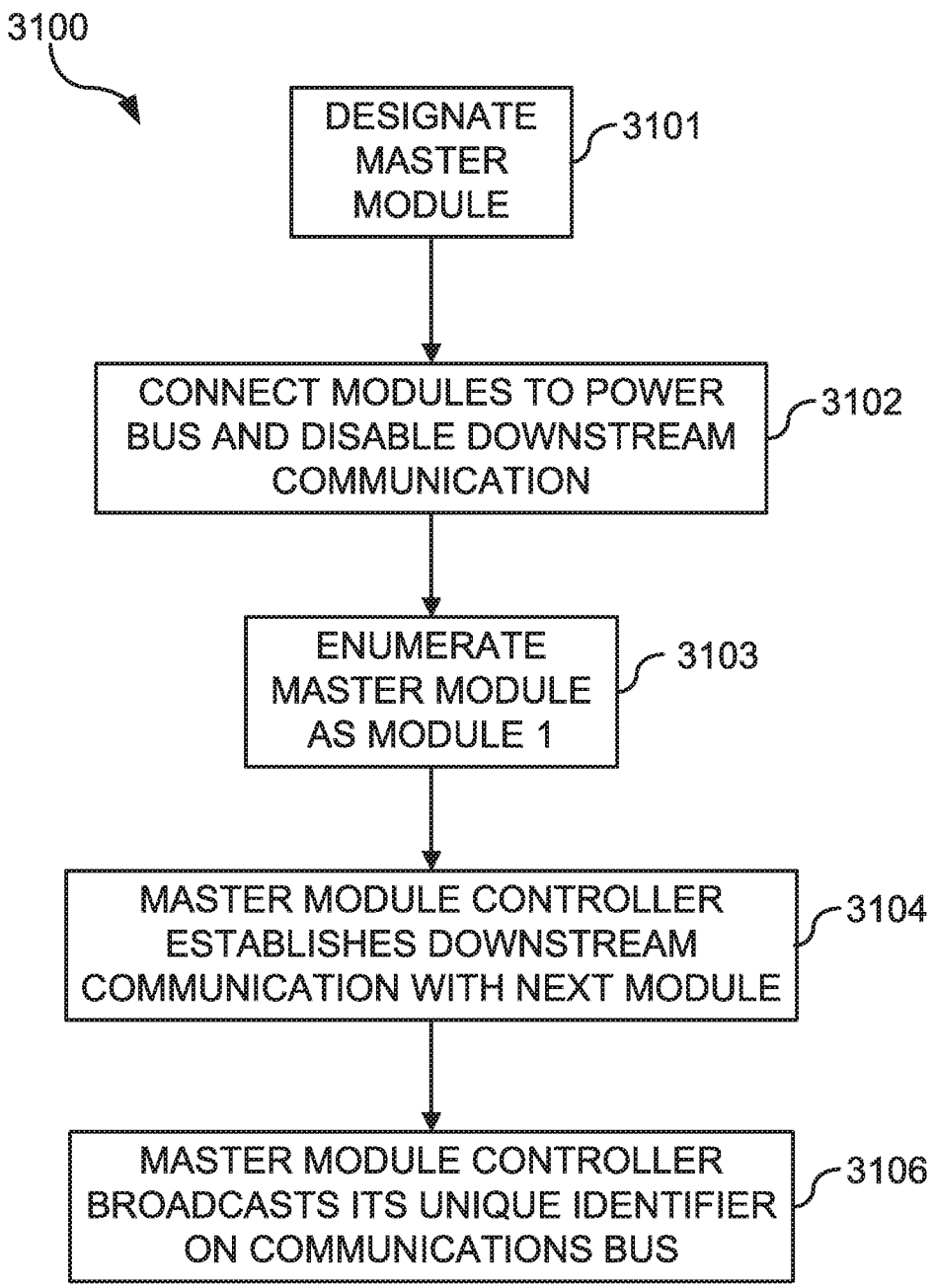
FIG. 44 depicts a flowchart outlining a procedure for initiating automatic enumeration of manifold modules in a manifold assembly.

FIG. 44 depicts a flowchart outlining an example procedure 3100 for initiating automatic enumerating or assigning of unique identifiers to manifold modules in a manifold assembly. The assignation may be mediated by an on-board controller of the module via a connection to a common electronic communications bus. The procedure 3100 may begin with a manifold module being designated 3101 a master module. The master module may in some embodiments, be designated the master module by a hardware switch on a PCB of the manifold module. This switch may be toggled to designate a module as a master module. Alternatively, a module may be designated a master module by programming the controller of the module to designate the module as a master module. For simplicity, the master module may generally be at an end of a communications bus, for example, the first module on the communications bus. Each module may be connected to power from a power bus and defaulted to a configuration in which communication in a direction along a communications bus with any additional modules in has been disabled 3102. For purposes of example, this direction will be referred to as a downstream direction. The master module controller may assign itself a unique identifier. For example, the master module may enumerate 3103 as module 1. The master module may establish downstream communications 3104 to the next module of the communications bus. The master module broadcasts 3106 its module identifier on the communications bus. In an exemplary implementation, this broadcast may be performed for a predetermined period of time, for example, 20-100 ms.

Figure 45:
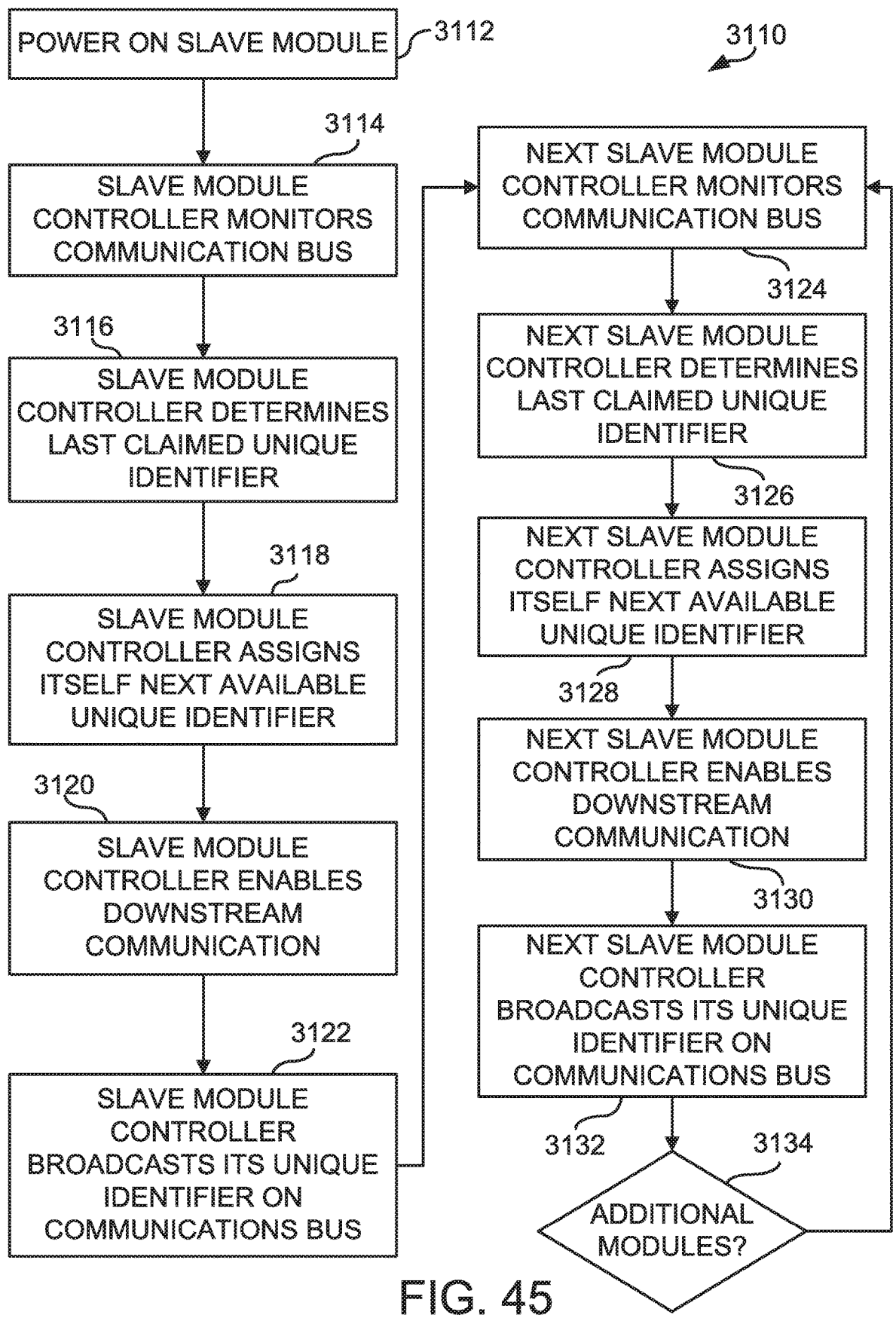
FIG. 45 depicts a flowchart outlining a procedure for automatically enumerating manifold modules on a communications bus.

FIG. 45 depicts a flowchart outlining an example procedure 3110 for automatically enumerating or assigning unique identifiers to manifold modules on a communications bus. A slave module first powers on 3112. The slave module controller becomes receptive 3114 to communications on the communication bus. In some exemplary implementations, the slave module controller may be in a receiving mode 3114 to the communications bus for a predetermined period of time. This period of time may, for example, be 50-100 ms. The slave module controller may determine 3116 the value of the last claimed unique identifier. For example, the slave module controller may save the highest identifier received while receiving messages on the communications bus. The slave module controller may assign itself 3118 as the next available unique identifier. In an example, the next available unique identifier may be determined by adding one to the saved highest identifier. For example, if the highest identifier received is 1, the slave module controller would assign itself as module 2. The slave module may establish downstream communication 3120 with the next module. The slave module can then broadcast 3122 the unique identifier it assigned itself.

The next slave module controller may in turn become receptive 3124 to communications on the communications bus. The controller of the next slave module determines 3126 the last claimed unique identifier while being receptive 3124 to the communications bus. This identifier should be the identifier just assigned to the previous module. The slave module controller may then assign 3128 itself the next available unique identifier. The slave module may establish downstream communication 3130 with the next downstream module. The slave module controller transmits 3132 its unique identifier on the communications bus. If 3134 there are additional modules, the procedure 3110 may return to 3124 and repeat, allowing any additional modules on the communications bus to assign themselves a unique identifier.

Figure 46:
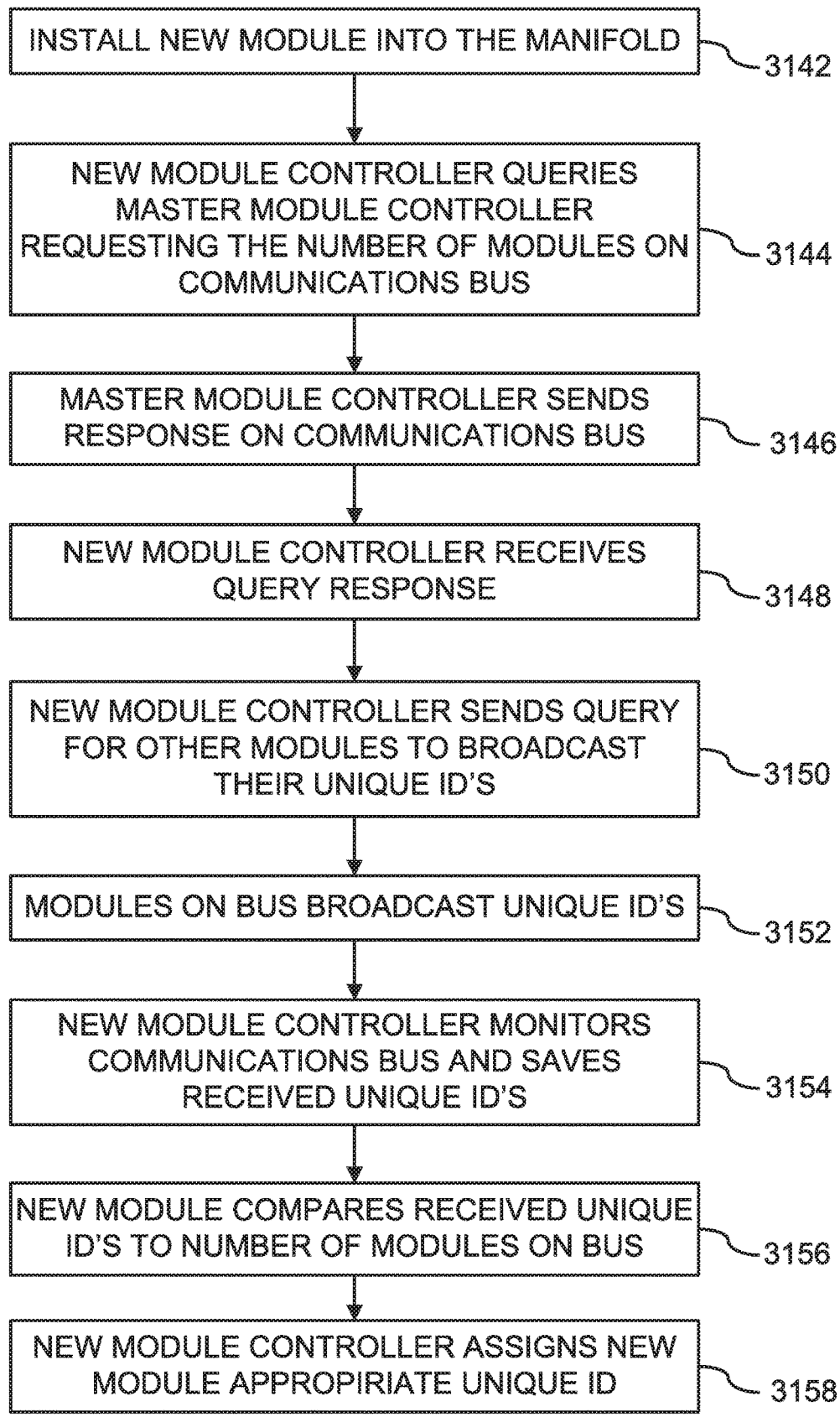
FIG. 46 depicts a flowchart outlining a procedure for enumerating a new module being installed onto a communications bus that has already been enumerated.

FIG. 46 depicts a flowchart outlining an example procedure 3140 for enumerating or assigning a unique identifier to a module which is installed onto a communications bus which has already been enumerated. Such a procedure 3140 may, for example, be used in the event that a bank of manifold modules of a manifold assembly needs to be expanded or when a module is swapped/replaced. The new module may be installed 3142 into the manifold assembly and connected to the communications bus. The new module controller can send a query 3144 to the master controller requesting the number of modules on the bus. The master module controller sends an appropriate response 3146 on the communications bus. The new module controller receives 3148 the response and sends 3150 a query on the communications bus requesting other modules to send their respective IDs. Each module controller can send a response 3152 on the communications bus specifying their ID. The new module controller is placed in a receiving mode on the communications bus and saves 3154 the IDs received. The new module controller can then compare 3156 the received IDs to the number of modules on the communications bus. Based on the comparison, the new module controller can determine and assign itself 3158 the appropriate identity. For example, if the new module controller receives 3148 a response that there are 10 modules on the bus and the new module controller saves 3154 identifiers for every module except module 7, the new module can assign itself 3158 as module 7. Alternatively, if the new module controller, for example, receives 3148 a response that there are 10 modules on the bus and the new module controller saves 3154 identifiers for modules 1-10, it may assign 3158 itself as module 11.

Optionally, the new identity may be transmitted on the communications bus by the new module controller. During this transmission the controllers of modules on the communications bus can check the new module unique identifier against their own and generate an error if the unique identifier matches their own. Additionally, the master module controller can save the new module unique identifier and update the total number of modules on the communications bus if necessary.

Figure 47:
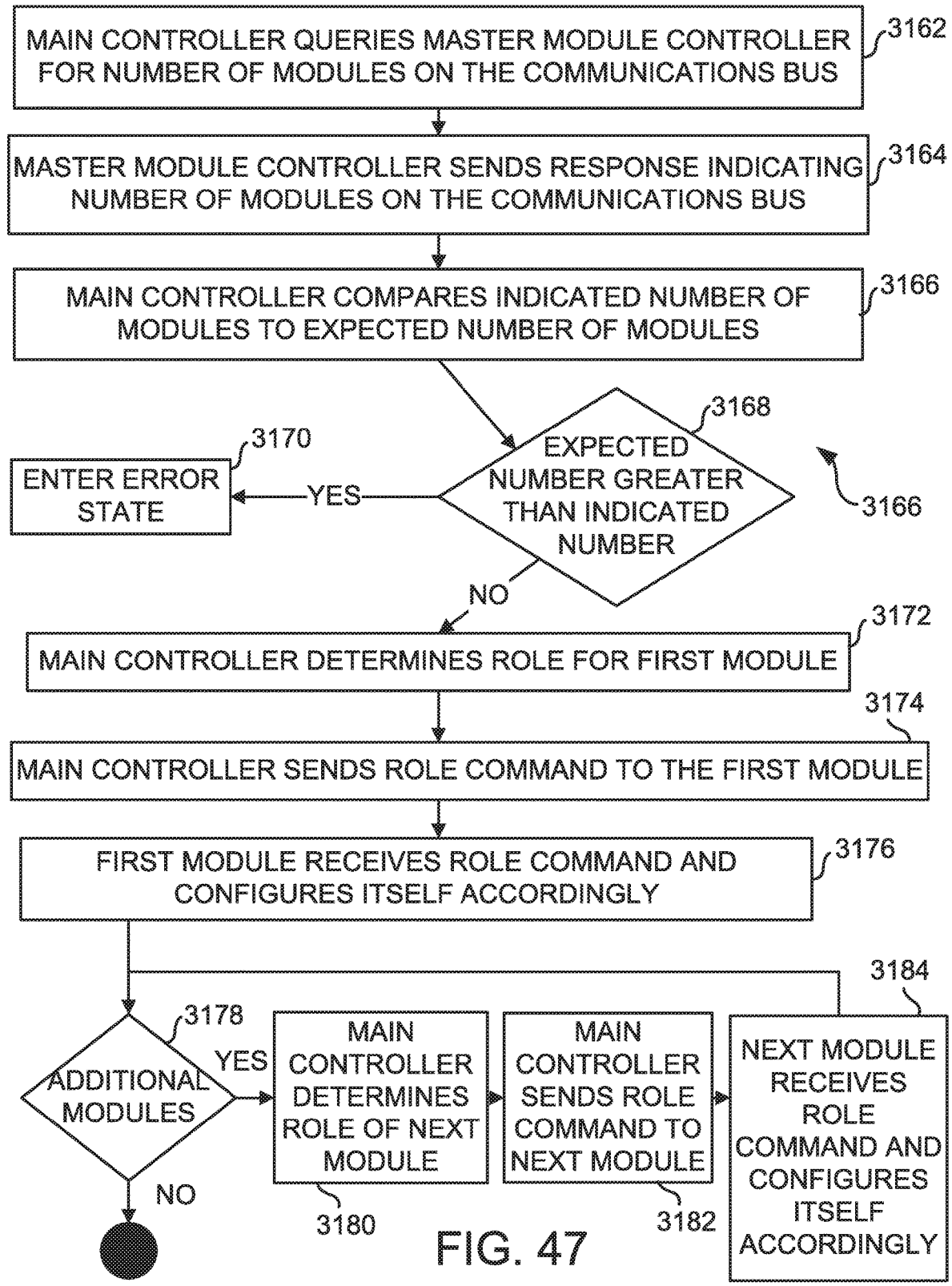
FIG. 47 depicts a flowchart outlining a procedure which may be used to assign tasks to various modules in a manifold assembly.

FIG. 47 depicts a flowchart outlining an example procedure 3160 which may be used to assign tasks to various modules in a manifold assembly. In the example procedure 3160, the main controller may have pre-programmed tasks for a number of different manifold modules. In other embodiments, the tasks may be pre-programmed onto a master module controller and input from a main controller need not be employed. The main controller can send 3162 a query to the master module controller requesting the number of modules on the communications bus. The master module controller may send 3164 a response indicating the number of modules on the communications bus. The main controller can then compare 3166 the number of modules specified by the master controller to an expected number of modules. If 3168 the expected number of modules is greater than the number reported by the master module controller, the main controller may enter an error state and generate a notification 3170 for display on a user interface of the device in which the manifold assembly is used. In some embodiments, the main controller may enter an error state if the number of modules reported by the master module controller differs from the expected number. For example, an error state may be entered and a notification generated if the master module controller indicates that extra modules are present.

If 3168 the expected number of modules matches the number reported by the master module controller, the main controller can proceed to determine 3172 a task or task set for the first manifold module. The main controller can send a task command 3174 to the first module. Upon receipt, the first module controller may configure 3176 the module for the specified task or set of tasks. If 3178 there are no further modules, the task assignment process can end. If 3178 there are additional modules, the main controller determines 3180 the task set of the next module. The main controller can send a task command 3182 to the next module and upon receipt, that module controller may configure 3184 its module accordingly. If 3178 there are no further modules, the task assignment process can end. If 3178 there are additional modules, 3180, 3182 and 3184 may repeat until all modules have been assigned a task set.

The task command generated by the main controller may, in some embodiments, be a high level command. For example, in embodiments in which the modules control pneumatic pathways leading to a pumping cassette, the task command may specify that a manifold module be a pump chamber module or a fluid valve module, or a combination of the two. In an exemplary implementation, the recipient module controller may interpret this task command and automatically set its program for valve configurations, sequencing and default states accordingly. Alternatively, the task command may provide specific valve configuration information to a module. For example, a task command may include configuration settings for individual valves of the module. The task configuration command may, for example, specify a module number, valve number (e.g. 1-4), and configuration setting. Each manifold module may be configured to accept a plurality of valve assemblies. In a preferred embodiment, the number of valve assemblies per module is standardized to permit ready replacement or substitution of a valve assembly and gasket at an assigned location in the module, or ready replacement of the entire module without necessitating re-programming of the module controller. In some cases, the gasket mating a particular valve assembly to the fluidic bus (pneumatic or hydraulic) may have different communication holes or ports to the bus to permit or deny access of the valve to a particular pressure line in the bus. A non-limiting number of example configuration settings are shown in TABLE 1 as follows:

TABLE 1

| Valve Configurations | Description |
| --- | --- |
| Fluid Valve | 3 way valve with an input connected to positive pressure and an input connected to negative pressure |
| Chamber Valve Pos | 2 way valve with an input connected to positive pressure |
| Chamber Valve Neg | 2 way valve with an input connected to negative pressure |
| Regulator | Valve which outputs to an accumulator and toggles to regulate a source pressure to an accumulator pressure |
| Vent | Valve which is connected to a vent reservoir or atmosphere |
| Measurement Valve | Valve arranged to make and break fluid communication between a reference volume and a control chamber |
| Blocked | Valve which is in a module but unused and has had its ports blocked off |

Optionally, each module may default to predetermined valve configuration settings. In such embodiments, the main controller may not generate a task command for a module if the default settings are appropriate for the task set. In some specific examples, each module may default to a pump chamber control module configuration in which two valves of the module are configured as fluid valves, one is configured as a positive chamber valve, and another is configured as a negative chamber valve.

Optionally, task commands may include primary or grouped task sets addressed to a master module controller. Any of the module controllers in a manifold assembly may be assigned to be a master module controller. The master module controller can receive a primary or grouped task set assignment from a main or system controller via the communications bus. The primary or grouped task command set may assign a master module a task set to coordinate the tasks of a specific secondary module or group of secondary modules. For example, in some embodiments, the primary or grouped task command set may specify that the master module controller coordinates or synchronizes pumping performed by two or more pump chamber modules (e.g. pump chamber modules controlling two or more pump chambers of the same device or the same pump cassette). This may cause the specified secondary modules to effectively operate in tandem to provide the pumping device with greater potential throughput. Such a grouped task assignment may allow the main controller to transmit a single command set with a group identifier. The master controller of the primary module can receive this command or set of commands and transmit individual commands or tasks to secondary modules associated with the group identifier to execute the main controller command set. Although timing of inlet and outlet pump valve operations with an associated pump operation can be performed locally with the on-board controller of the individual pump control modules, synchronizing the operation of one pump/valve combination with another pump/valve combination may be a function of the group command set coordinated by the master controller. The master controller may be a program installed on any of the on-board controllers of the valved manifold modules. Optionally a master controller may not be used. Instead a controller external to the manifold assembly, such as a main or system controller may perform the functions of a master controller.

Another primary task command set may specify that the master module controller coordinate operations of a pump chamber module with a volume measurement module (e.g. a manifold module having a valved connection to a reference chamber and to vent for pressure/volume calculations). This may cause the master module controller to synchronize operations of the volume measurement module with the pump chamber module so that the volume measurement module performs a pressure measurement to determine the volume transferred in each pump stroke commanded by the pump chamber module.

Figure 48:
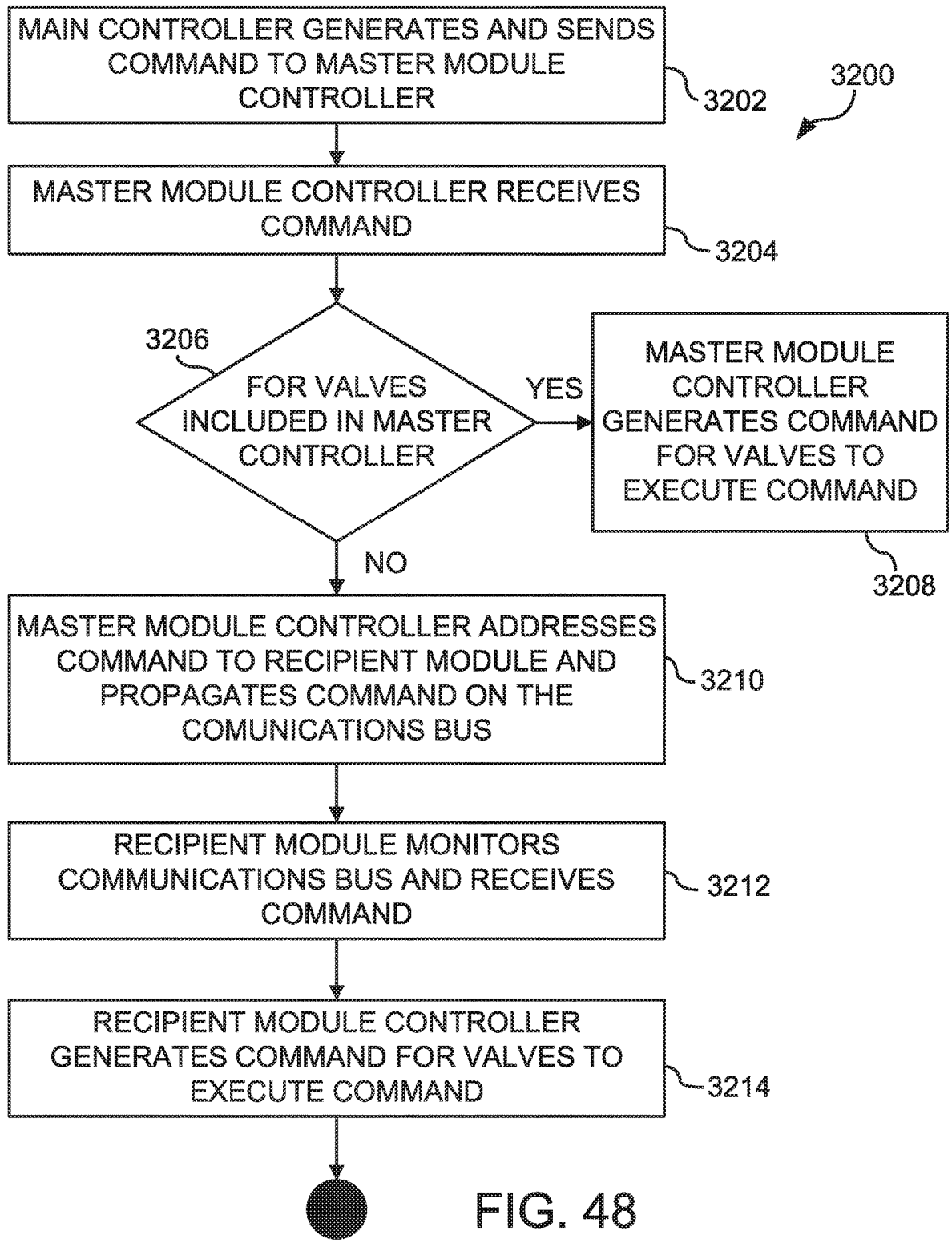
FIG. 48 depicts a flowchart outlining a procedure for commanding operation of a module.

FIG. 48 depicts a flowchart outlining an example procedure 3200 for commanding operation of a module. The main controller generates a command or set of commands and transmits the command 3202 to the master module controller. The master module controller receives 3204 the command. If 3206 the command is for valves on the master module, the master module controller commands execution 3208 of the command. If 3206 the command is for a slave or secondary module, the master module controller transmits 3210 the command on the communication bus with the recipient module address. The recipient module controller monitors the communication bus and receives 3212 the command. The recipient module controller then executes 3214 the command.

In some cases, the command may flow directly from the main controller to the recipient module depending on the type of command. For example, if the command does not require coordination between multiple modules, the command may be read directly by the recipient module and acted upon.

Figure 49:
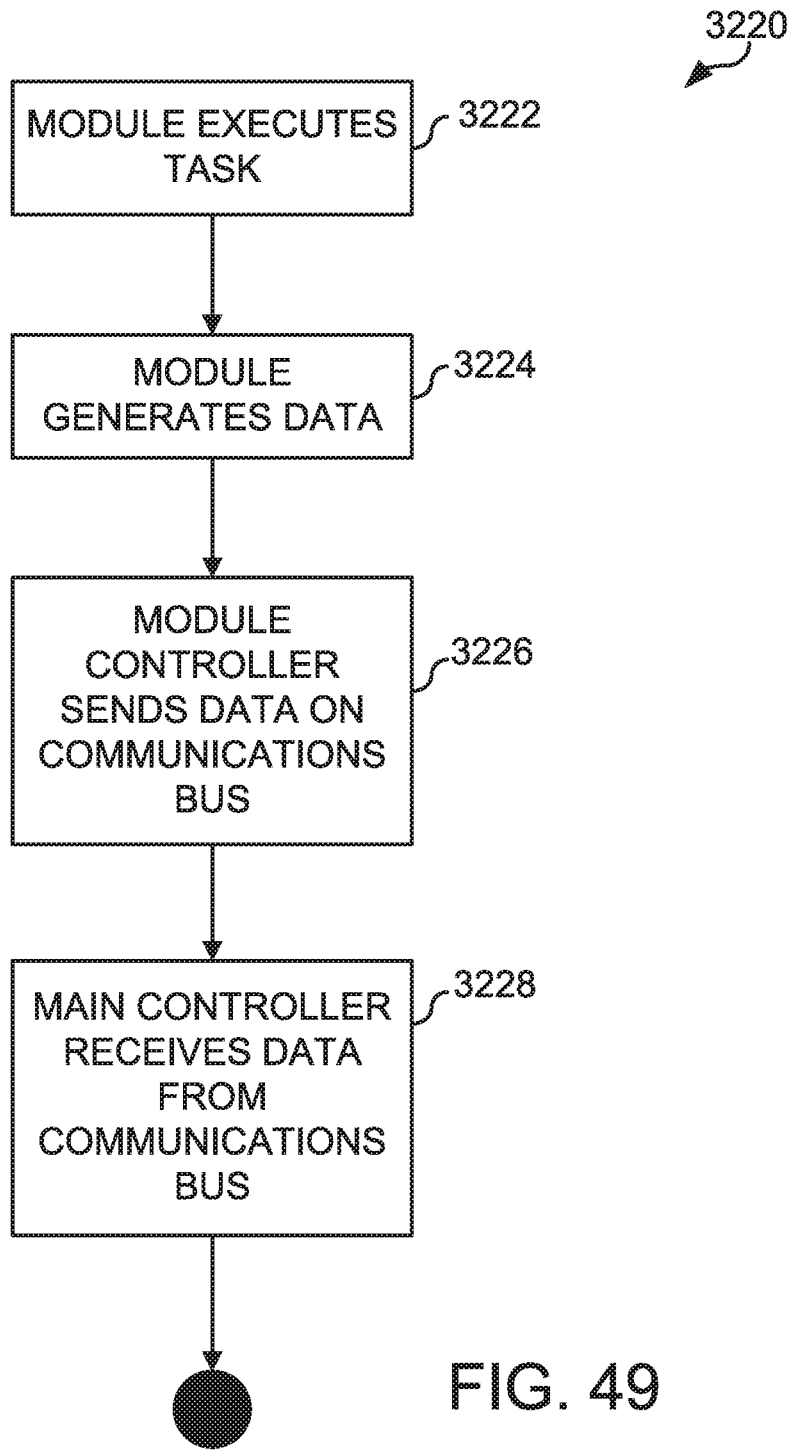
FIG. 49 depicts a flowchart outlining a procedure of transmitting feedback data from a valve module to a main controller.

FIG. 49 depicts a flowchart outlining an example procedure 3220 for transmitting feedback data from a valve module to a main controller. A module executes a task 3222 and generates data 3224. This data may be sensor data (e.g. pressure sensor data) generated by a sensor on the module as the task is executed. The data may also be data generated after execution of a task. For example, the data may be valve state data which specifies the current status of the valve (e.g. valve in first position or second position, valve open, valve closed, etc.). The module controller sends the data 3226 on the communications bus. In an example, data may be sent based on a predetermined schedule, for example, every 90-110 ms (e.g. every 100 ms). The main controller receives 3228 the data from the communications bus. Optionally, both the master module and any slave modules on a communications bus may provide feedback in this manner.

Figure 50:
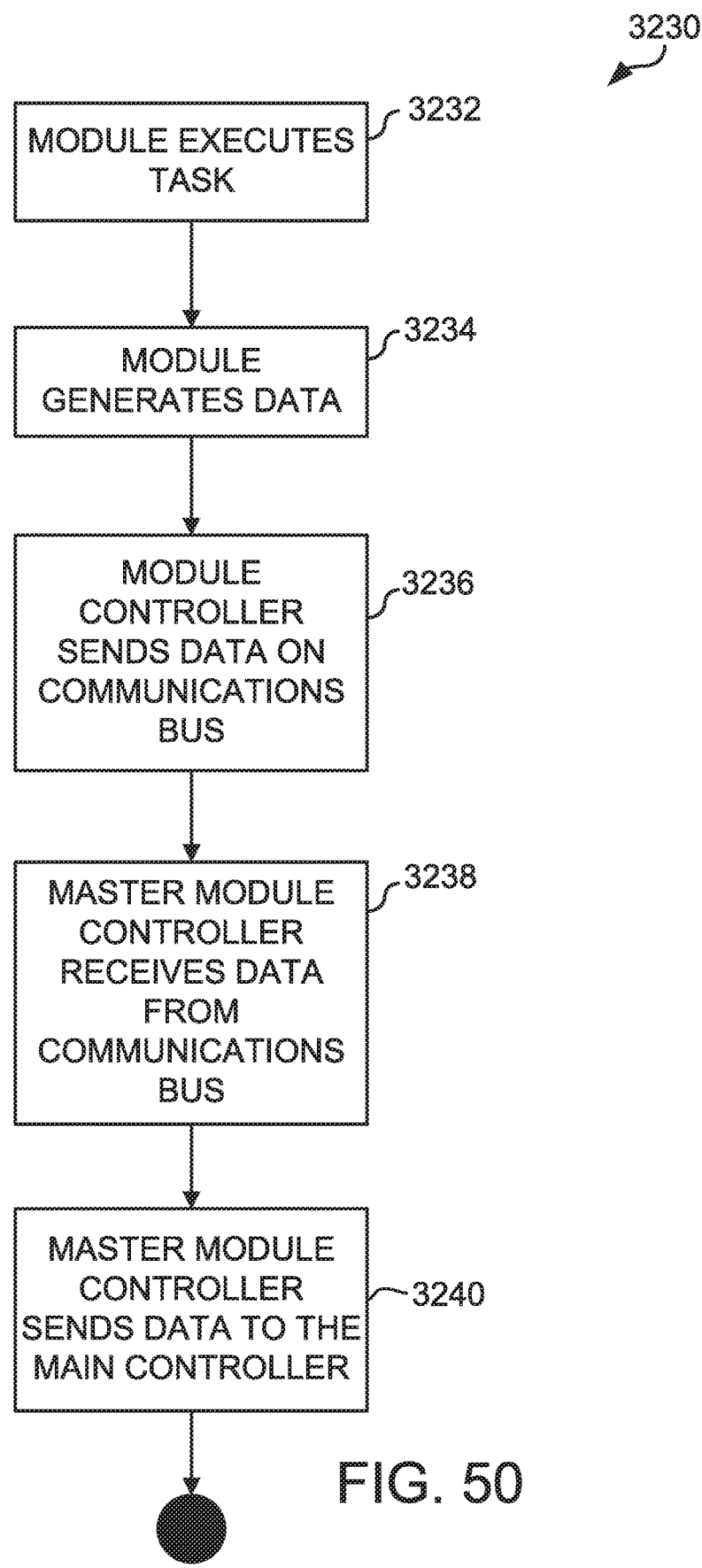
FIG. 50 depicts a flowchart outlining another example method for providing feedback from a module.

The master module may also receive data from other modules on the communications bus. This is useful in circumstances in which the master module controller coordinates operations between modules on the communications bus. FIG. 50 depicts a flowchart outlining another example method 3230 for providing feedback from a module. A module executes a task 3232 and generates data 3234. The module transmits the data 3236 on the communications bus. Data may be sent based on a predetermined schedule, for example, every 90-110 ms (e.g. every 100 ms). The master module controller receives 3238 the data from the communications bus, and passes 3240 the data to the main or system controller. Alternatively, both the master module controller and the main controller can receive the data when the modules transmit it.

The master module controller may be programmed to perform some degree of signal processing before it passes 3240 data to the main controller. For example, the master module controller may report data at a slower rate than the data it receives. It may send a summary or synopsis to the main or system controller. It may filter the data, or average a series of data points over a predetermined period of time and pass the filtered or averaged values to the main controller based on a predetermined schedule or time interval. In some exemplary implementations in a manifold system driving a fluid pumping cassette, pressure data related to the one or more pump chambers and valve state data may be transmitted to the main controller, and pumping chamber related data may be transmitted to both the main controller and the master module controller. Additionally, a master module controller or the main or system controller may generate a query requesting information (e.g. valve state data) from a specific module controller.

Figure 51:
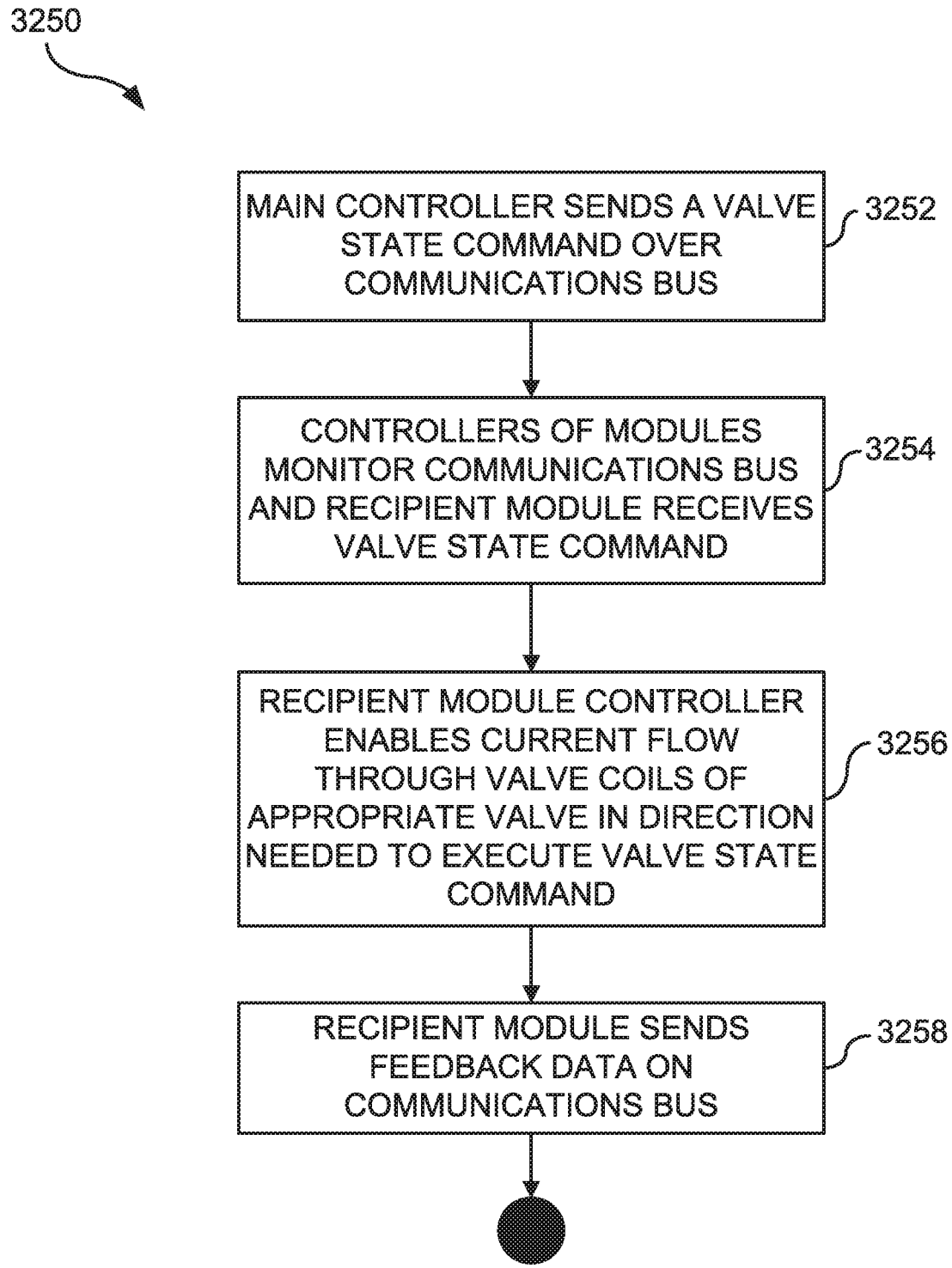
FIG. 51 depicts a flowchart outlining a procedure for commanding operation of a valve within a valve module.

FIG. 51 depicts a flowchart outlining an example procedure 3250 of commanding operation of a valve within a valve module. The main controller sends a valve state command 3252 over the communications bus. This command may specify a valve state and be addressed to a specific valve in a specific recipient module. The controllers of the modules monitor the communications bus and the recipient module receives the command 3254. The recipient module processor enables current flow 3256 through valve coils of the appropriate valve in a direction suitable to execute the valve state command. The recipient module sends feedback data 3258 on the communications bus. In some exemplary implementations, this data may be sent continuously or periodically on a predetermined schedule over the communications bus. For example, data may be sent every 90-110 ms.

Figure 52A:
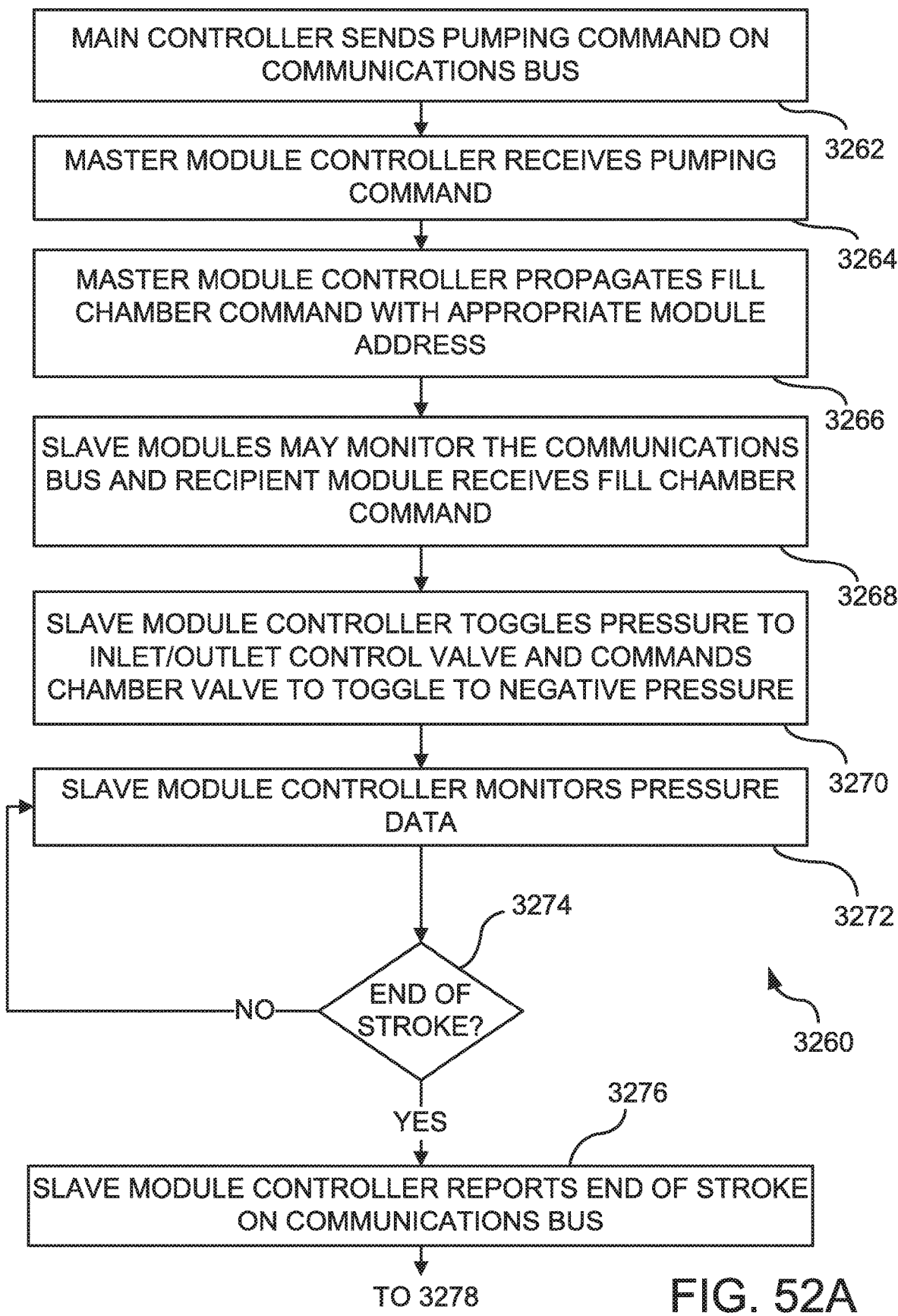
FIGS. 52A-B depict a flowchart outlining a procedure for a valve manifold module actuating the pumping of fluid through a pump chamber of a cassette.
Figure 52B:
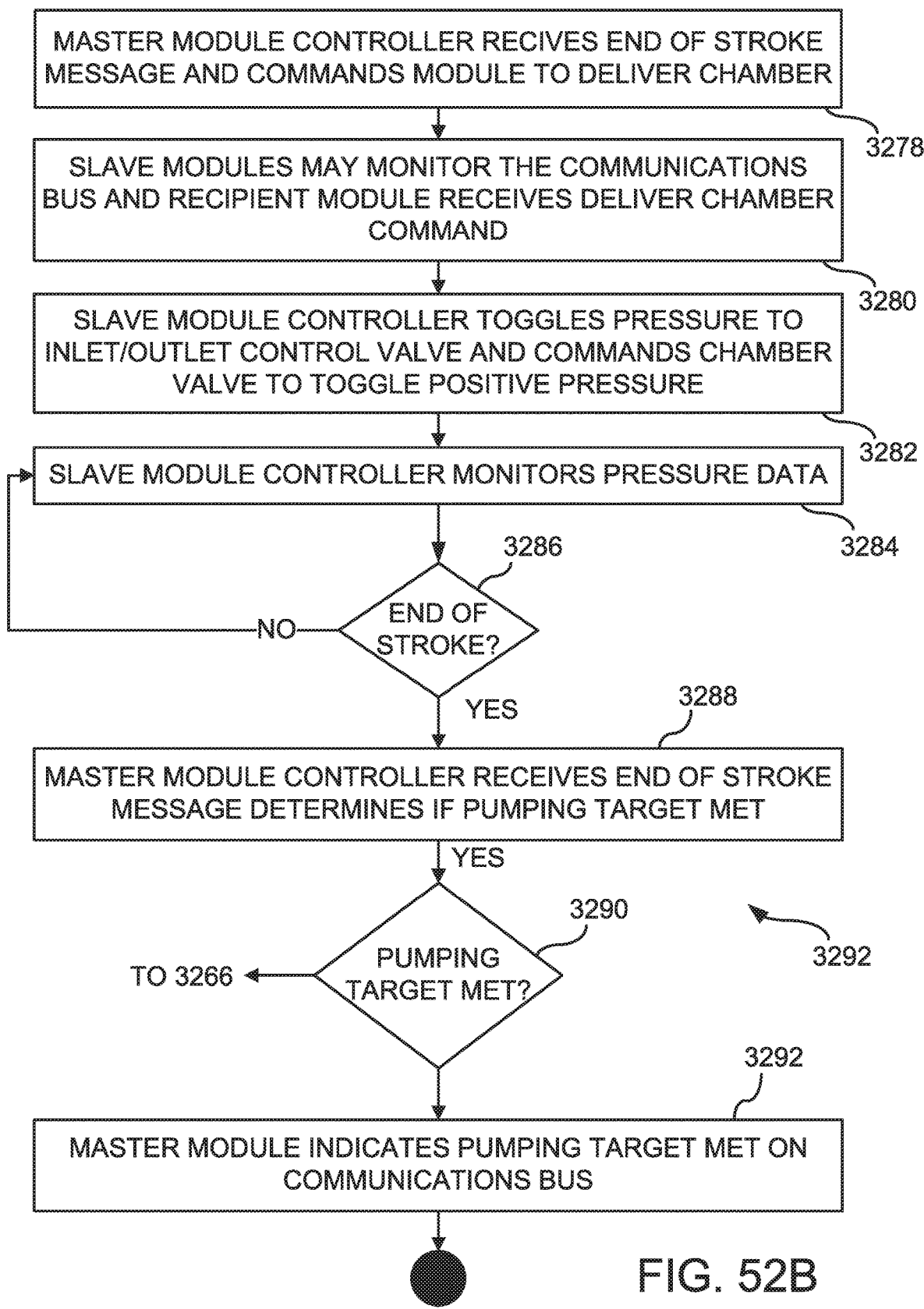

FIGS. 52A-52B depicts a flowchart outlining an example procedure 3260 of a valve manifold module actuating the pumping of fluid through a pump chamber of a cassette. For sake of simplicity, the flowchart outlines pumping via a single valve manifold module, but a plurality of modules may also be employed to actuate a single pump chamber of a cassette (see, e.g. FIG. 34G). In the example provided, the pumping command set is directed to one or more slave modules on a manifold assembly. A main controller transmits a pumping command 3262 over the communications bus. The pumping command may be a high level command. For example, the pumping command may be a start/resume pumping or stop/pause pumping command and may specify a pumping flow rate. The command may also specify one or more pumping targets. For example, the high level command may specify a duration of pumping, number of pumping strokes, and/or volume to be transferred. The pumping command may also specify a source and a destination for the fluid being pumped. A master module in a bank of manifold modules may be tasked to receive and process 3264 the high level pumping command set.

The master module controller transmits 3266 a chamber pump command with an appropriate module address. The chamber pump command specifies that a specific module toggles its valves to trigger a fill stroke or a delivery stroke of a pumping chamber, or that pumping from a pumping chamber is to be stopped or paused. In the example shown, the master module controller transmits 3266 a fill chamber command addressed to a recipient module. Slave modules monitor the communications bus and the recipient module receives the chamber fill command 3268. The recipient module executes the chamber fill command by generating one or more valve commands. Since the chamber command is a fill chamber command in the example, the slave module controller toggles the manifold valves controlling the inlet and outlet pump chamber valves to the appropriate pressure line on the pneumatic bus, and commands the pump chamber control valves to toggle so that the positive pressure manifold valve is closed and the negative pressure control valve is opened 3270. The inlet and outlet control valves are toggled to place the pump chamber of the cassette in communication with a fluid source. Toggling open the negative pressure manifold valve results in the application of negative pressure to the pump chamber, drawing fluid into the chamber fluid from the fluid source. The slave module controller optionally monitors pressure data 3272 sensed by a pressure sensor monitoring the pressure supplied to the pump control chamber of the pump cassette. If 3274 an end-of-stroke is detected from the pressure data, the controller of the slave module performing the pumping stroke can report the end-of-stroke condition 3276 on the communications bus. If 3274 end-of-stroke has not yet been detected the slave module controller continues monitoring pressure data 3272. In some aspects, the slave module controller may report the end-of-stroke condition 3276 by indicating that it is in an idle state. In some aspects, the slave module controller may also be programmed to calculate or determine the flow rate during the stroke and report the result on the communications bus. This may be calculated as pump chamber volume over the time elapsed during the stroke before an end-of-stroke condition is detected. If the pumping module is paired with a measurement module or has integral volume measurement hardware (such as, e.g. a valved reference chamber, or valved communication to vent), a measurement of the volume pumped over the stroke may be taken. This measurement may be reported over the communications bus and can be used to calculate overall flow rate of the pumping cassette or of a pumping chamber.

The master module controller may receive the signal indicating the end-of-stroke condition and issue a command 3278 for pumping to continue, pause or stop. In the example provided, since a fill stroke was just performed, the master module controller may command for a deliver stroke to be performed, or alternatively may withhold a stop or pause command, and the on-board controller of the pump module may proceed as programmed to perform a deliver stroke. The recipient slave module controller monitors the communications bus and receives the deliver chamber command 3280, or alternatively proceeds with its pre-programmed deliver stroke in the absence of a contrary command from the master module controller or the main or system controller. The slave module controller toggles the inlet and outlet control valves of the module to the appropriate positive or negative pressure lines to direct pumping to the appropriate fluid delivery destination, and commands the chamber valves to toggle so that positive pressure is supplied 3282 to the pump control chamber. The application of positive pressure will cause fluid to be expelled out of the pump chamber to the destination. The slave module is optionally equipped with a pressure sensor to periodically measure or monitor pressure 3284 supplied to the pumping chamber via the pump control chamber. If 3286 end-of-stroke has not yet been detected the slave module controller continues monitoring pressure data 3284. If 3286 an end-of-stroke is detected from the pressure data, the controller of the slave module performing the pumping stroke reports the end-of-stroke condition 3288 on the communications bus. The master module controller or main controller receives the end-of-stroke signal and determines 3290 whether the pumping target (e.g. a target volume to be transferred) has been reached.

If 3292 the pumping target has not been reached, the master module controller or main controller can either repeat a command signal 3266 to the slave module to perform another fill stroke, or alternatively in the absence of a stop or pause command from the master module controller or main controller, the slave module controller continues its pre-programmed or pre-loaded pumping utility. The operation 3260 may repeat from that point until the pumping target has been met. If 3292 the pumping target has been reached, the master module controller may report 3294 this on the communications bus for receipt by the main or system controller. In some aspects, the master module controller may enter an idle state if 3292 the pumping target has been reached, and report 3294 the idle state on the communications bus.

Tracking the pumping volume or liquid flow rate can be performed in a number of ways. For example, the pumping target may be specified by the number of pumping strokes. When the number of pumping strokes is equal to the target number, the pumping target may be determined to have been met. If the pumping target is specified as pumping volume and is not a whole number multiple of a pump stroke volume, the pumping target may be deemed to have been met when the first pump stroke that causes the cumulative pumped volume to exceed the pumping target has been delivered. Alternatively, when the cumulative volume is within a pump chamber stroke volume of the target volume, the main controller, master module controller, or even the slave module controller may be programmed to determine whether another stroke (and thus an over delivery) would yield a cumulative pumped volume that is closer to the target volume than the current cumulative pumped volume. In some embodiments, if the cumulative pumped volume is within a pump chamber stroke volume of the target volume, the volume pumped during the next stroke may be tracked during the actual stroke and the pump membrane may be halted in mid-stroke when the target volume has been met. Further description of tracking a pumped volume during a stroke is provided in U.S. patent application Ser. No. 14/732,571, filed Jun. 5, 2015, entitled Medical Treatment System and Methods Using a Plurality of Fluid Lines, which is incorporated by reference herein in its entirety.

In an embodiment, the controller of the slave module supplying pressure to the pumping chamber commands pumping actions (with inlet and outlet pump valve control) autonomously after receiving a high level command from the main controller. For example, the controller of the slave module supplying pressure to the pumping chamber may perform pump strokes and determine when the pumping target has been reached. If coordination with another manifold module or group of modules in not needed, a master module controller may not be needed to coordinate pumping operations. Instead, the slave module may act directly based off of commands from a main controller. Alternatively, if the pumping module is paired with a measurement module, the measurement module controller may determine when the pumping target has been reached.

In some embodiments, a high level pumping command from the main controller specifies a pumping source and destination. The master module controller commands modules controlling fluid valves of a pumping cassette to open or close to place the pump chamber in communication with the specified source before a fill stroke is performed. Likewise, the master module controller may command modules controlling fluid valves of the pumping cassette to open or close to place the pump chamber in fluid communication with the fluid destination before a delivery stroke is performed.

Figure 53:
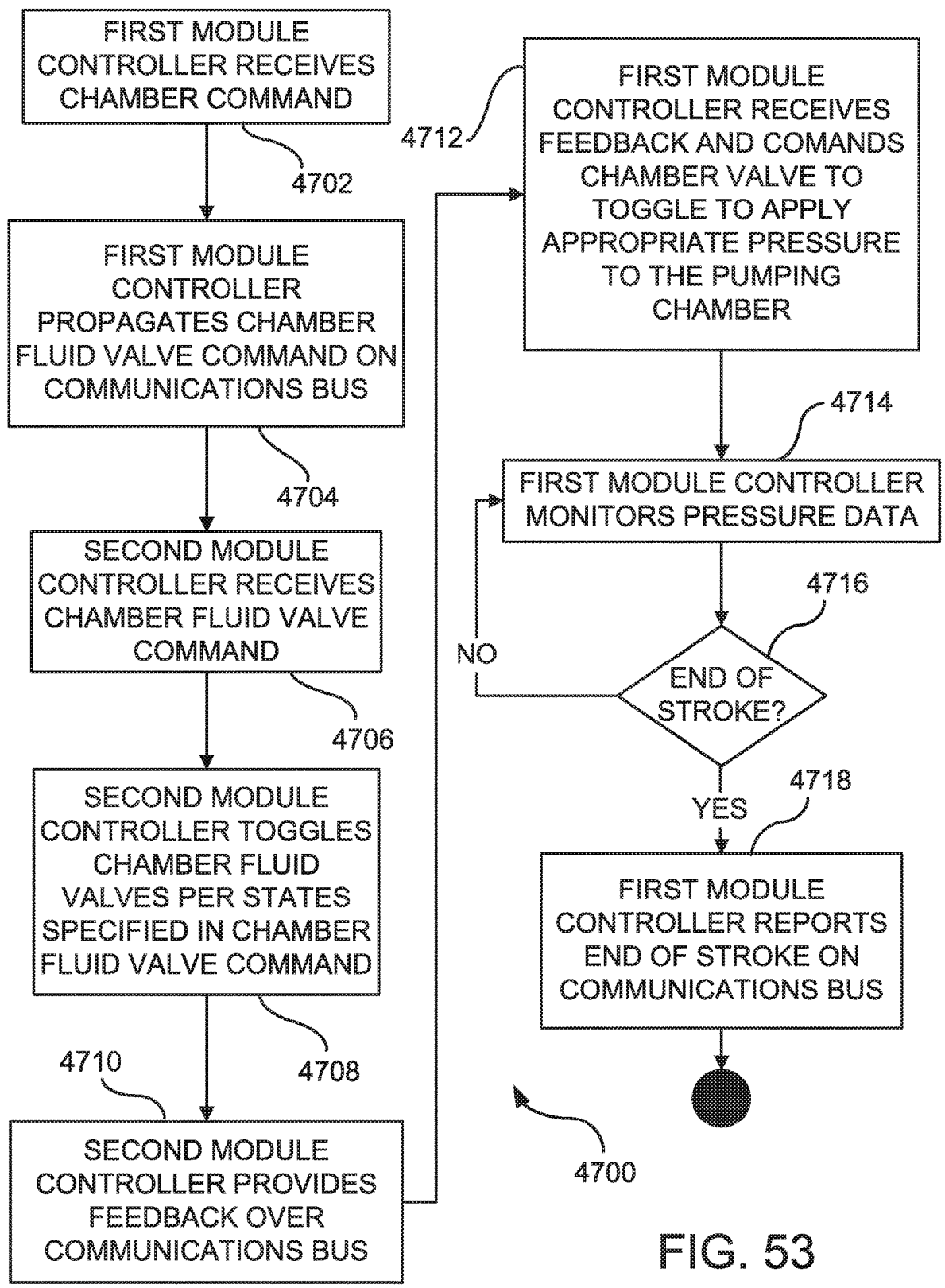
FIG. 53 depicts a flowchart outlining a procedure for commanding a pump stroke from a pump chamber of a cassette via a number of valve modules.

FIG. 53 depicts a flowchart outlining an example procedure 4700 for commanding a pump stroke from a pump chamber of a cassette via a number of valve modules. In the example shown, a first module controls pressure applied to the pump chamber and a second module controls the inlet/outlet fluid valves of the pump chamber. The procedure 4700 may, however, be readily generalized to embodiments in which the inlet/outlet fluid valves of the pump chamber are controlled by more than a single module. In general, the module controlling pressure applied to the pump chamber may receive a chamber command. This module may then coordinate operation of paired companion modules so that the proper inlet/outlet valve is opened or closed before the pump stroke begins.

The first module controller may receive 4702 a chamber command. The chamber command may be a fill or deliver command. This command may be generated and transmitted as described above in FIGS. 52A-52B. The first module controller transmits 4704 a chamber fluid valve command on the communications bus. The second module controller receives 4706 the chamber fluid valve command. The second module controller toggles 4708 its chamber fluid valves per the valve states specified in the chamber fluid valve command. The second module controller provides feedback data 4710 over the communications bus. This data may include an acknowledgement that the chamber fluid valve command was executed.

The first module controller receives this feedback and command the chamber valves of the first module to apply appropriate pressure (positive for delivery, negative for fill) to the pumping chamber 4712. The first module controller may monitor pressure data 4714 produced by a pressure sensor periodically measuring or monitoring the pressure supplied to the pumping chamber. If 4716 end-of-stroke has not yet been detected the first module controller continues monitoring pressure data 4714.

If 4716 an end-of-stroke is detected from the pressure data, the controller of the first module may report the end-of-stroke condition 4718 on the communications bus. A master module controller may receive and act on the end of stroke condition report as described above in relation FIGS. 52A-52B.

Figure 54:
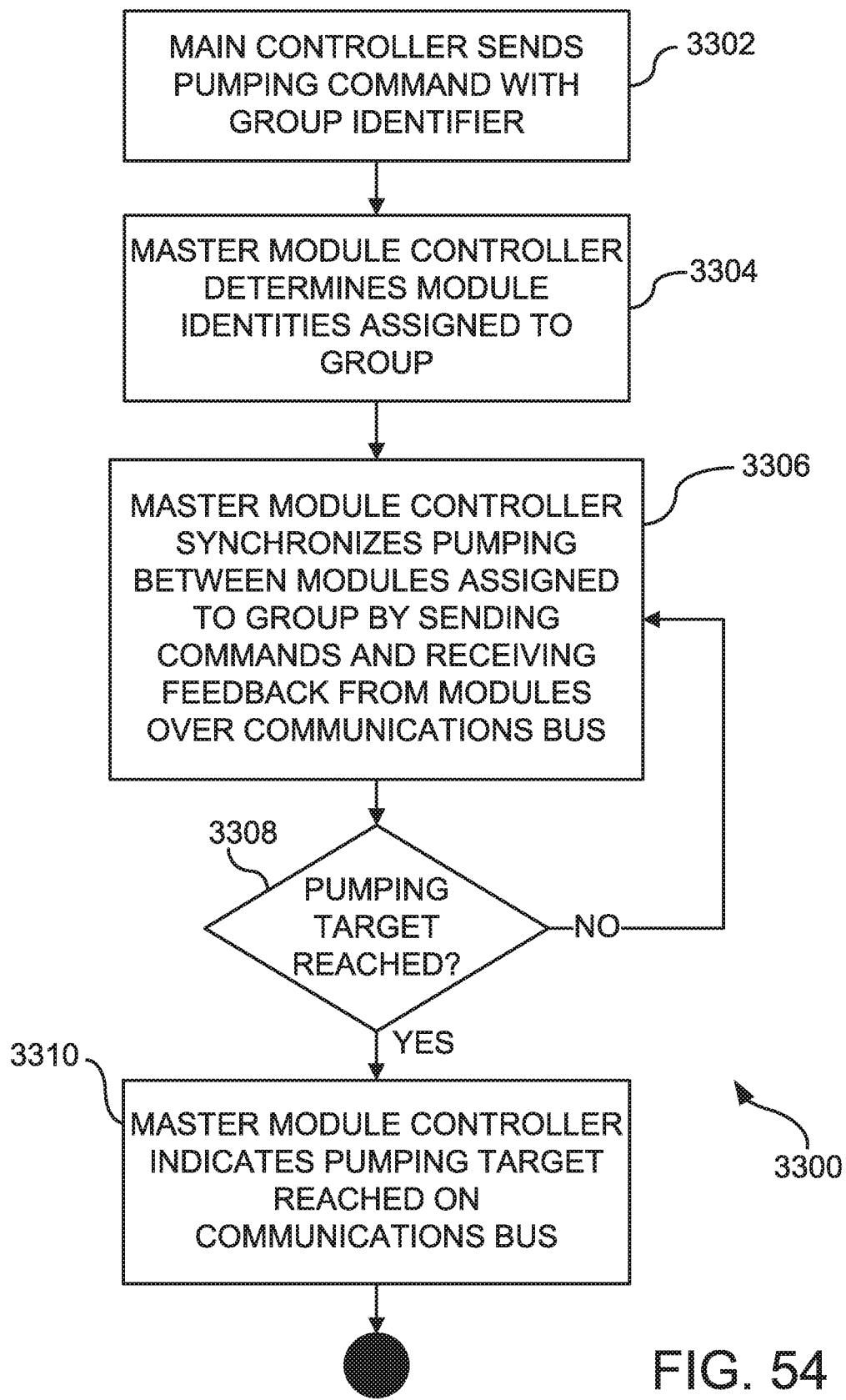
FIG. 54 depicts a flowchart outlining a procedure for commanding coordinated pumping of fluid through multiple pump chambers.

FIG. 54 depicts a flowchart outlining an example procedure 3300 for commanding coordinated pumping of fluid through multiple pump chambers. Pumping may be coordinated to enhance or maximize throughput of fluid in an efficient manner. For example, pumping can be coordinated to fill one chamber while delivering another, and to minimize or reduce the amount of time a pump chamber is in an idle state.

A main controller can send a pumping command set 3302 specifying which modules are to be used to pump the fluid. In this example, the master module controller can be programmed, for example with a primary or grouped task set (described above in relation to FIG. 47), to assign a a plurality of modules as constituents of a secondary group. In such embodiments, the high level command from the main controller may specify a group number or identifier. The master module controller determines 3304 which module identities are assigned to the group. The master module controller can then coordinate pumping by addressing chamber commands to those modules assigned to the group identifier. In the example provided, the master module controller synchronize 3306 pumping between modules assigned to the group by sending commands and receiving feedback from the modules over the communications bus. If 3308 the pumping target volume has not been reached, the master module controller continues synchronizing pumping operations 3306. If 3308 the master module controller determines that the pumping target has been met, the master module controller may indicate 3310 that the pumping target volume has been met over the communications bus to the main controller.

Figure 55:
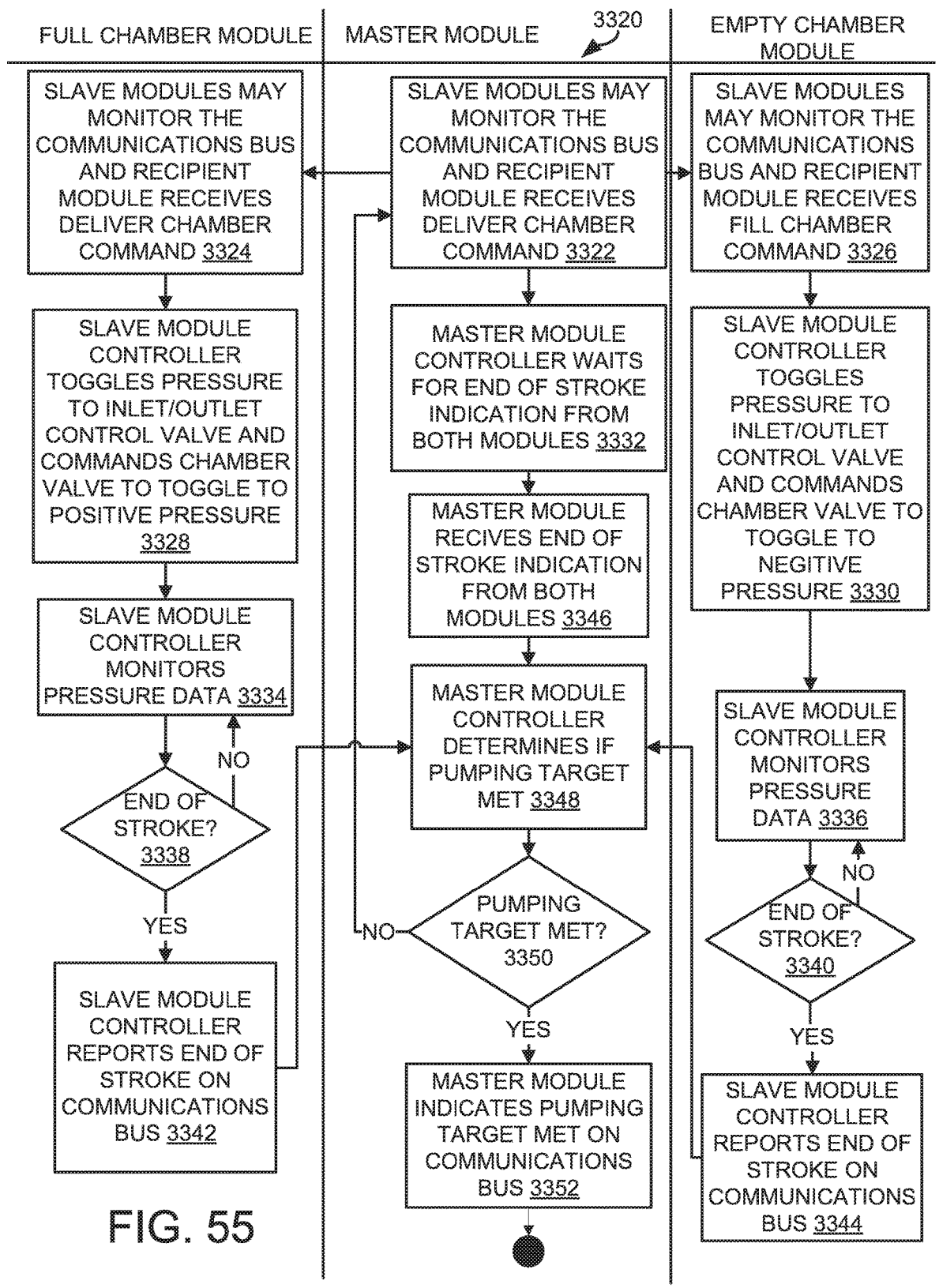
FIG. 55 depicts a flowchart outlining a pumping command set having been sent from a main controller and a procedure for commanding pumping of fluid with one pumping chamber in a filled state.

FIG. 55 depicts a flowchart outlining an example procedure 3320 of commanding pumping of fluid with one pumping chamber in a filled state and a pumping command set already having been sent from a main controller. The pumping command set is for a group of two pump chambers in this case, although the procedure 3320 may be readily generalized for pumping commands to groups of more than two pump chambers.

The master module controller transmits 3322 a chamber command to each module of the pump group. In this example, the master module controller transmits 3322 a deliver chamber command to the pre-filled chamber module and transmits a fill chamber command to the empty chamber module. The master module controller may then monitor the communications bus and wait 3332 for an end-of-stroke indication to be issued from each chamber module.

The slave modules can monitor the communications bus, the full chamber module receives the deliver command 3324, and the empty chamber module receives the fill chamber command 3326. The full chamber module toggles the inlet and outlet control valves of the module between positive and negative pressure lines, and commands the chamber valves to toggle so that positive pressure is supplied to the pump control chamber 3328. The inlet and outlet control valves of the full chamber module are toggled so that the pump chamber of the cassette is in communication with a designated fluid delivery destination. The empty chamber module toggles the inlet and outlet control valves of the module to connect the pump chamber with the fluid source, and commands the chamber valves to toggle so that negative pressure is supplied to the pump control chamber 3330. The full chamber module controller may measure or monitor pressure data 3334. The empty chamber module controller may measure or monitor pressure data 3336. If 3338 the full chamber module controller does not detect an end-of-stroke condition or 3340 the empty chamber module does not detect an end-of-stroke condition their controllers continue to monitor pressure data 3334, 3336. If 3338 the full chamber module controller detects an end-of-stroke condition, the full chamber module controller may indicate the condition over the communications bus 3342. If 3340 the empty chamber module controller detects an end-of-stroke condition, the empty chamber module controller may indicate the condition over the communications bus 3344.

In this example, the master module controller is configured to receive an end-of-stroke indication from both modules 3346. The master module controller determines 3348 if a pumping target has been met, and if so 3350, the master module controller transmits an indicator signal 3352 on the communications bus. If 3350 the pumping target has not been met, the procedure 3220 repeats from step 3322. Upon each repeated operation, the full chamber module and empty chamber module will switch modes from fill to deliver and vice versa.

In the example provided, the master module controller waits for both chamber control module controllers to report an end-of-stroke condition before commanding additional pump strokes. In an additional configuration, the master module controller synchronizes a group of chamber control modules using one of a set of pre-programmed synchronization schemes. For example, the master module controller may synchronize pumping according to any of the pumping synchronization schemes described in U.S. patent application Ser. No. 14/732,571, filed Jun. 5, 2015, entitled Medical Treatment System and Methods Using a Plurality of Fluid Lines, which is incorporated by reference herein in its entirety.

Figure 56:
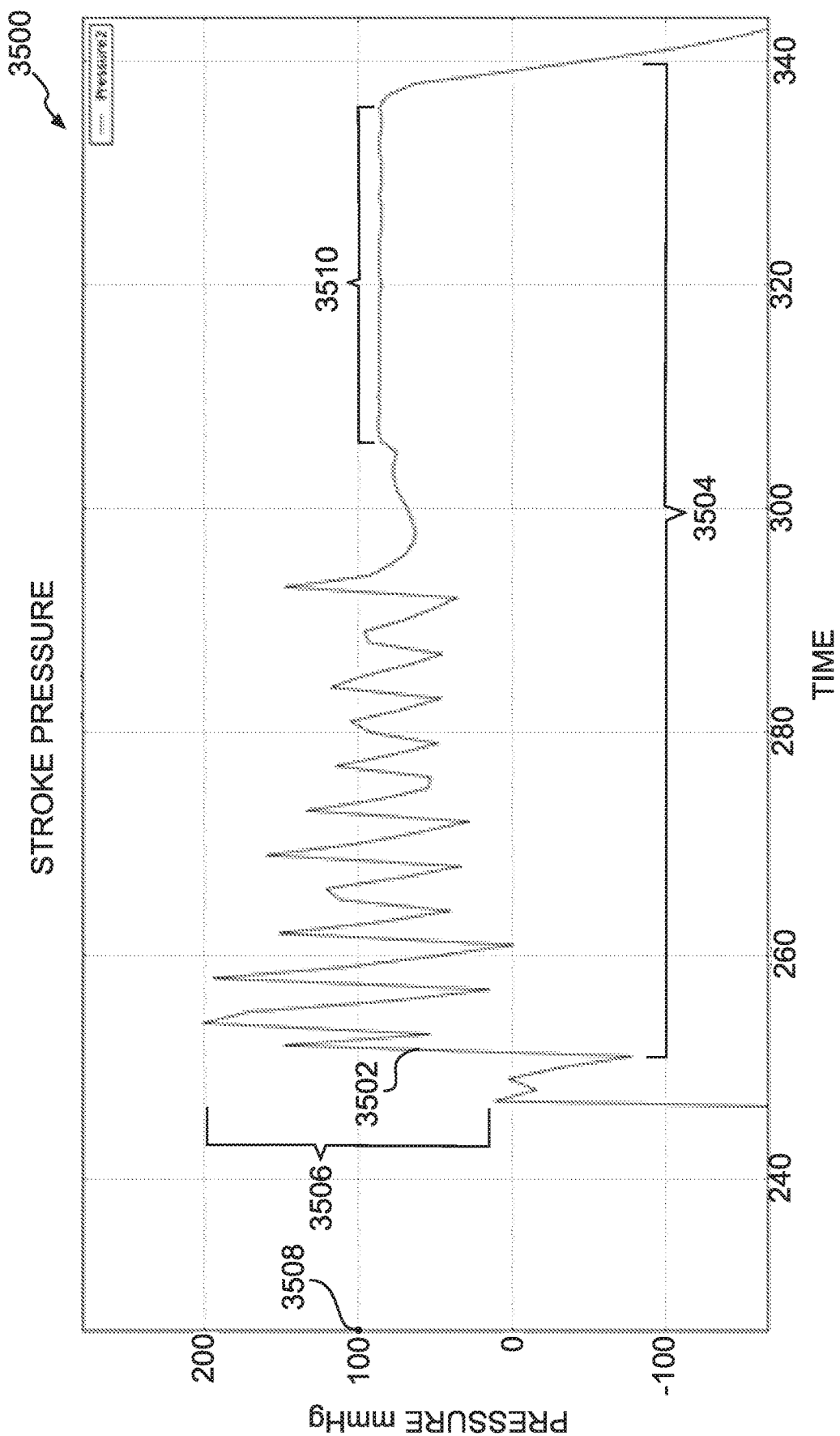
FIG. 56 shows an exemplary graph depicting pressure of a control chamber of a pump over time during a pump stroke.

FIG. 56 shows an exemplary graph 3500 depicting pressure 3502 of a control chamber over time during a pump stroke 3504. In the example graph 3500, the pump stroke 3504 is a delivery stroke and positive pressure is supplied to the control chamber. When pressure 3502 is supplied to a control chamber during a pump stroke 3504, the barrier or membrane between the control and pumping chamber is displaced toward the pumping chamber, delivering fluid and reducing its volume. A volume increase in the control chamber will drop its pressure 3502 if not communicating with the pneumatic bus at the manifold assembly. A module controller may attempt to keep the pressure 3502 supplied to an associated control chamber within a range 3506 of a target pressure 3508 during the pump stroke 3504. This may require opening and closing a manifold valve separating the control chamber from a pressure source (i.e. pneumatic bus) multiple times over the stroke 3504 when the module controller detects that the pressure 3502 is outside the range 3506. This may help to ensure fluid is pumped at a generally constant flow rate. As shown in the example graph 3500, the pressure 3502 rises and falls multiple times over the stroke 3504. Each rise in the example graph 3500 may correspond with an opening of a valve separating a control chamber from a pressure source to repressurize the control chamber. Each pressure decay may correspond to the control chamber changing in volume as fluid is pumped by the pumping chamber.

When a pump stroke 3504 has been completed, the control chamber volume is no longer changing. Consequently, the control chamber pressure remains substantially constant 3510. The module controller may monitor the pressure of the control chamber to determine if the change in pressure over time is indicative of an end-of-stroke condition. In general, after a period of time with relatively little pressure change, the module controller may make a determination that an end-of-stroke condition has occurred.

Figure 57:
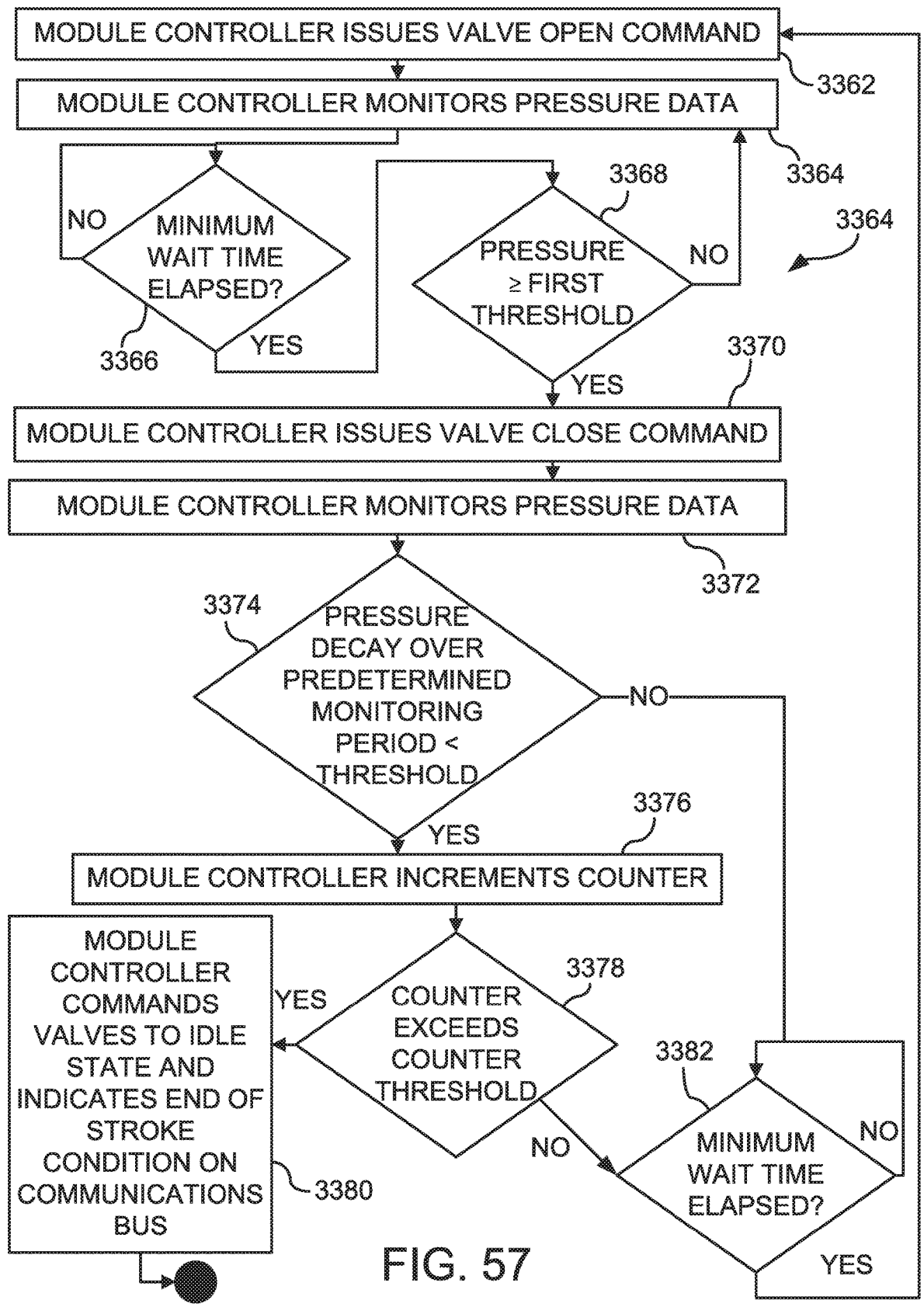
FIG. 57 depicts a flowchart outlining a procedure for detecting an end-of-stroke condition with a chamber control module controller.

FIG. 57 depicts a flowchart outlining an example procedure 3360 for detecting an end-of-stroke condition with a chamber control module controller. A module controller issues a valve open command 3362 at the beginning of a pumping stroke. The module controller monitors pressure data 3364 generated while the valve is open. If 3366 a minimum wait time has elapsed and if 3368 the pressure is not greater than or equal to a first threshold, the module controller continues to monitor pressure data 3364. If 3366 a minimum wait time has elapsed and if 3368 the pressure is greater than or equal to a first threshold, the module controller issues a valve close command 3370. The module controller continues to monitor pressure data 3372 generated while the valve is closed.

In an exemplary implementation, if 3374 the pressure decay over a predetermined monitoring period is not less than a threshold and if 3382 a minimum wait time has elapsed, the procedure 3360 may restart from 3362. If 3374 the pressure decay over a predetermined monitoring period is less than a threshold, the module controller increments a counter 3376. If 3378 the counter does not exceed a counter threshold and if 3382 a minimum wait time has elapsed the procedure 3360 may be restarted from 3362. If 3378 the counter exceeds a counter threshold, the module controller commands valves to an idle state and indicates an end-of-stroke condition over the communications bus 3380. The counter threshold in an exemplary implementation can be two to three counts. In the idle state, the module controller commands the inlet/outlet control valves to apply positive pressure to close the inlet and outlet fluid valves of the pumping chamber. In the idle state, the module controller commands the chamber control valves to a position in which fluid communication between pressure sources and the control chamber has been interrupted.

Figure 58:
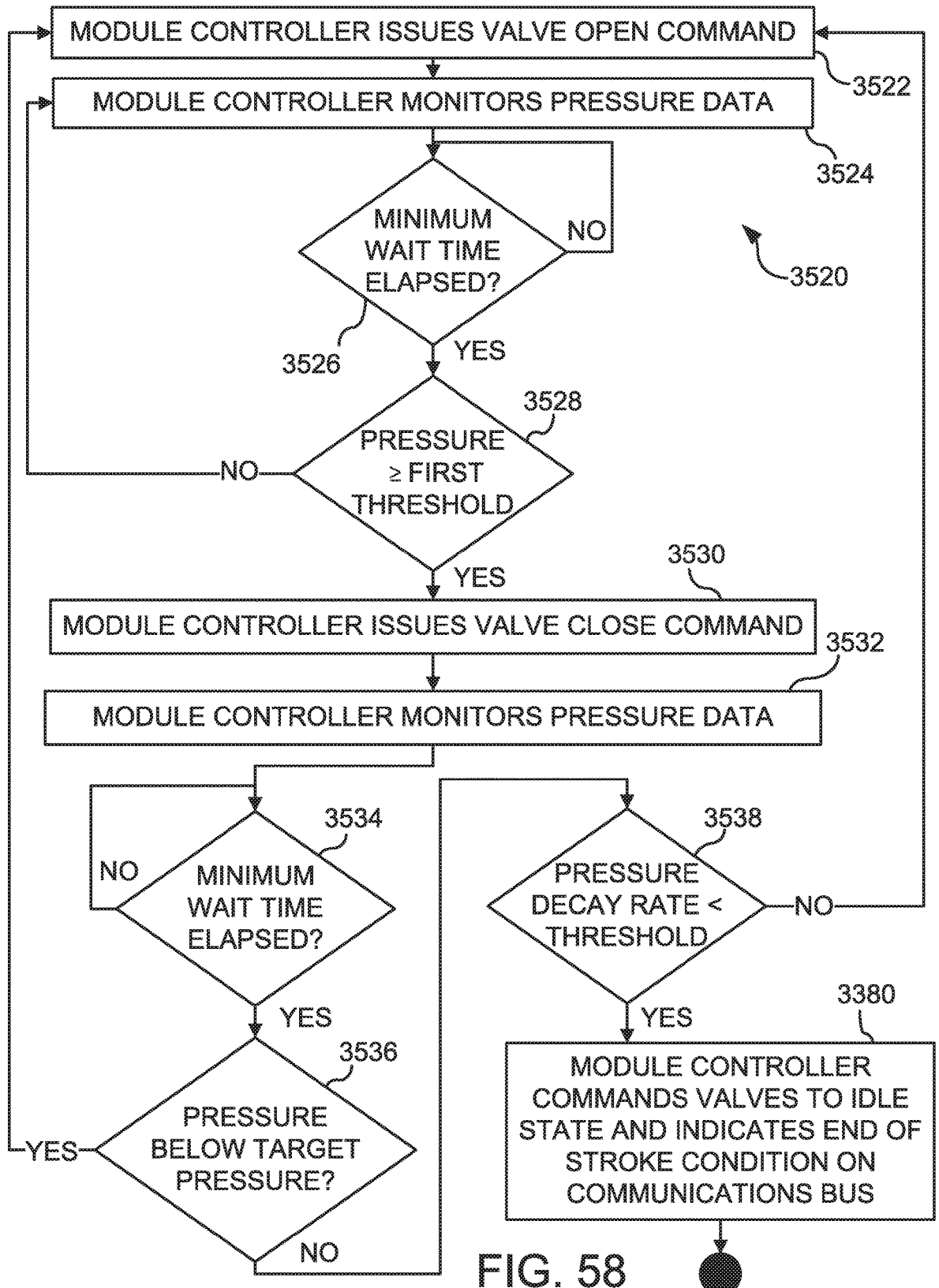
FIG. 58 depicts a flowchart outlining a procedure for detecting an end-of-stroke condition with a chamber control module controller.

FIG. 58 depicts a flowchart outlining an example procedure 3520 for detecting an end-of-stroke condition with a chamber control module controller. A module controller issues a valve open command 3522 at the beginning of a pumping stroke. The module controller monitors pressure data 3524 generated while the valve is open. If 3526 a minimum wait time has elapsed and if 3528 the pressure is not greater than or equal to a first threshold, the module controller continues to monitor pressure data 3524. If 3526 a minimum wait time has elapsed and if 3528 the pressure is greater than or equal to a first threshold, the module controller issues a valve close command 3530. The module controller continues to monitor pressure data 3532 generated while the valve is closed.

If 3534 a minimum wait time has elapsed and if 3536 the measured pressure is below the target pressure 3508 (FIG. 56), the procedure 3520 restarts at 3522. If 3534 a minimum wait time has elapsed and if 3536 the measured pressure is below the target pressure 3508 (FIG. 56), the module controller checks to if the pressure decay rate over the minimum wait time is less than a threshold. If 3538 the pressure decay rate is greater than the threshold the procedure 3520 restarts at 3522. If 3538 the pressure decay rate is less than the threshold, the module controller commands its valves to an idle state and indicates an end-of-stroke condition over the communications bus 3540.

Figure 59:
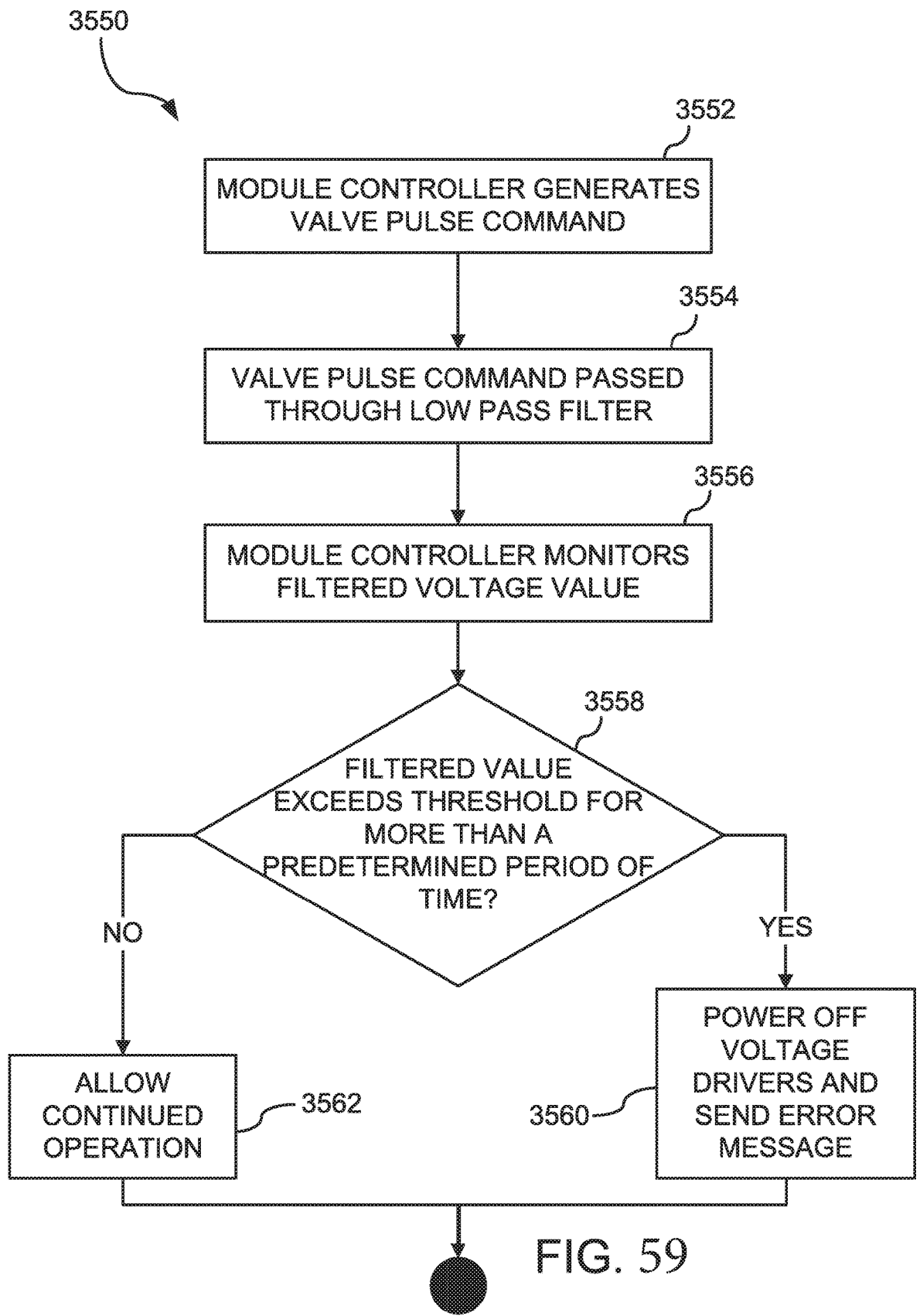
FIG. 59 depicts a flowchart outlining a procedure for limiting the toggle frequency of a valve within a valve module.

FIG. 59 depicts a flowchart outlining an example procedure 3550 for limiting the toggle frequency of a valve within a valve module. A module controller may generate a valve pulse command 3552, causing current to be passed through the coils of the valve to toggle the valve from a first position to a second position. The valve pulse command may be passed 3554 through a filter such as a low pass filter. The voltage value after filtering may be monitored 3556. If 3558 the filtered value exceeds a threshold value for more than a predefined period of time, the module controller may power off voltage drivers to the valve and will generate an error message 3560. If 3558 the filtered value does not exceed the threshold value for more than the predefined period of time, the module controller allows continued operation of the valve 3562. The time period may differ depending on the implementation. In one example, the predefined period of time may be 3-7 seconds (e.g. 5 seconds). The low pass filter may be tuned so that it limits toggle frequency to a desired value. For example, the toggle frequency may be limited to between 20-30 hz (e.g. ~25 hz or 40 ms). Also, the corner frequency of the low pass filter can be adjusted to obtain a filtered value consistent with the performance characteristics of the valve assembly. In one example, it can be set to about 0.1 hz.

Figure 60:
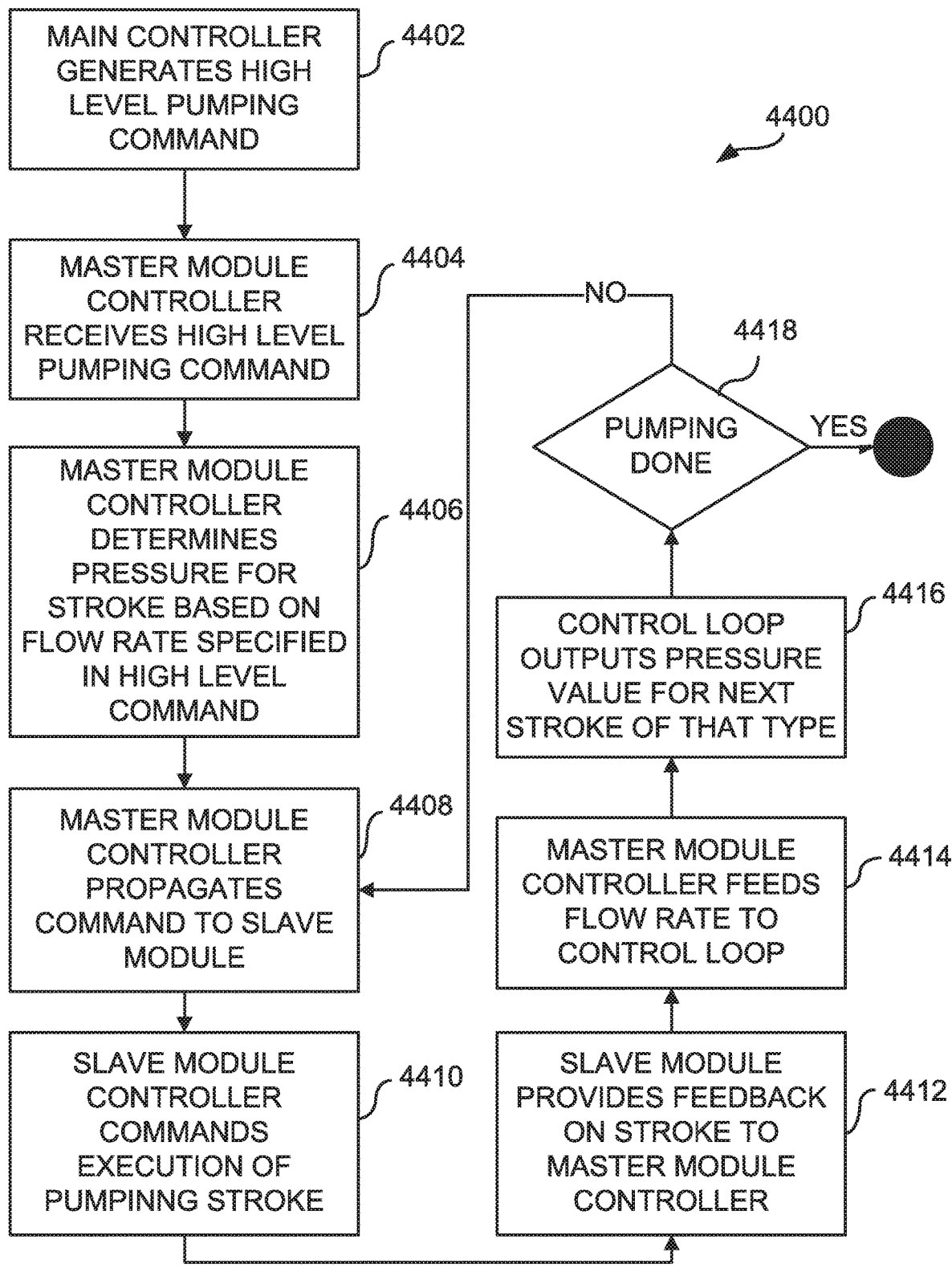
FIG. 60 depicts a flowchart outlining a procedure that may be used to control the amount of pressure delivered to a pump control chamber.

FIG. 60 depicts a flowchart outlining an example procedure 4400 that may be used to control the amount of pressure delivered to a pump control chamber, which in turn can affect the instantaneous flow rate into or out of the pump chamber. in the example, the main controller generates 4402 a high level pumping command. This command may be of the type described in relation to FIGS. 52A-52B and may also specify a flow rate. The pump control module controller or the master module controller can receive 4404 the high level pumping command or command set. The master module controller (if part of the process) determines 4406 a pressure for a stroke based on the flow rate specified in the high level pump command. In some embodiments, the pressure may be determined 4406 based on querying a look-up table stored in memory. Alternatively, a pressure may be computed based on the flow rate specified and a pre-programmed model. The master module controller transmits 4408 a chamber command to a slave module controller, which commands execution 4410 of a pumping stroke. The slave module controller provides feedback 4412 on the stroke to the master module controller after the stroke has been completed. The feedback includes a flow rate for the stroke, which is based on monitored pressure (at a suitable sampling rate) during the pump stroke. The master module controller may use the flow rate data for the stroke in a control loop 4414. The control loop can be any suitable type of control loop such as a PI (proportional-integral) or PID (proportional-integral-derivative) control loop. The control loop outputs an estimate for the pressure value 4416 for the next stroke of that type (e.g. fill stroke, deliver stroke) to be performed. For example, the control loop may output a pressure value 4416 for the next fill stroke if the stroke just completed was a fill stroke. If 4418 pumping has not completed (e.g. a pumping target has not been reached), the procedure 4400 may repeat from step 4408 with the new pressure value from the control loop being used when commanding the subsequent stroke of that type.

The various embodiments described herein may be used in any of a variety of products which use fluid valves. For example, various embodiments described herein may be used in dialysis machines such as those described in U.S. Provisional Application Ser. No. 62/008,342, filed Jun. 5, 2014, and entitled Medical Treatment System Using a Plurality of Fluid Lines, U.S. Provisional Application Ser. No. 62/003,374, filed May 27, 2014, and entitled Blood Treatment System and Methods, and U.S. Provisional Application Ser. No. 62/003,346, filed May 27, 2014, and entitled Hemodialysis System, as well as pneumatic pressure controllers such as those described in U.S. Provisional Application Ser. No. 62/029,813, filed Jul. 28, 2014, and entitled Dynamic Support Apparatus.

While the principles of the disclosure have been described herein, it is to be understood by those skilled in the art that this description is made only by way of example and not as a limitation as to the scope of the disclosure. Modifications and substitutions by one of ordinary skill in the art are considered to be within the scope of the present disclosure.

The invention claimed is:

1. A modular manifold assembly comprising;
   a plurality of concatenated manifold blocks, each manifold block having a flowpath connecting a pressure line inlet port on a first side of the manifold block to a pressure line outlet port on a second side of the manifold block via a fluidic bus in the manifold block, the pressure line outlet port of a first manifold block connected to the pressure line inlet port of an adjacent second manifold block;

the first and second manifold blocks each reversibly connected to each other, and each separately reversibly connected to a first positively pressurized fluid line having a first pressure, to a second positively pressurized fluid line having a second pressure different from the first pressure and a negatively pressurized fluid line;

each manifold block having a valve assembly receiving station for mounting a pre-determined number of valve assemblies;

each valve assembly comprising an inlet configured to fluidically communicate with a respective fluidic bus port of the manifold block;

each valve assembly configured to be electrically actuated to open or block fluid communication between a cavity of the valve assembly and the inlet of the valve assembly, the cavity of each valve assembly in fluid communication with a respective outlet of the manifold block and in fluid communication with a respective pressure sensing port of the manifold block;

each valve assembly having electrical contacts for actuating the respective valve assemblies, the electrical contacts configured to connect to a programmable controller board mounted on the manifold block;

the controller board comprising pressure sensors configured to reversibly and sealably connect to respective sensing ports on the manifold block;

wherein each of the plurality of manifold blocks is arranged by its associated controller board to control one or more of a plurality of pumps or valves of a liquid flow control apparatus wherein a first one of the manifold blocks comprises four mounted valve assemblies, a first valve assembly connected to the positively pressurized fluid line having the first pressure, a second valve assembly connected to the negatively pressurized fluid line, and a third and a fourth valve assembly connected to the positively pressurized fluid line having the second pressure.

2. The modular manifold assembly of claim 1, wherein the controller board of the first one of the manifold blocks is configured to control each of the first, second, third and fourth valve assemblies in a sequence determined at least in part by information received from the pressure sensors associated with each of the first, second, third and fourth valve assemblies.

3. The modular manifold assembly of claim 1, wherein the controller board is configured to actuate the first valve assembly and second valve assembly alternately, and is configured to actuate the third valve assembly and fourth valve assembly alternately.

4. The modular manifold assembly of claim 1, wherein the positively pressurized fluid lines and the negatively pressurized fluid line are pressurized pneumatically.

5. The modular manifold assembly of claim 1, wherein each of the valve assemblies comprises a magnetic shuttle configured to travel within the cavity between first and second opposing inlet orifices, a first one of said inlet orifices connected to the inlet, each inlet orifice associated with a ferrous post surrounded by an electromagnetic coil, so that activation of the electromagnetic coil by the controller board of the associated manifold block moves the shuttle toward the associated inlet orifice, occludes the inlet orifice and maintains the occlusion after deactivation of the electromagnetic coil.

6. The modular manifold assembly of claim 5, wherein the first and second manifold blocks are each connected to a positively pressurized fluid line and a negatively pressurized fluid line.

7. The modular manifold assembly of claim 6, wherein the inlet is a first inlet, the pressurized fluid line is positively pressurized, and wherein the second inlet orifice is connected to a second inlet of the valve assembly and configured to connect to a second fluidic bus port of the manifold block, wherein the second fluidic bus port is connected to the negatively pressurized fluid line.

8. The modular manifold assembly of claim 5, wherein the first and second manifold blocks are each connected to a positively pressurized fluid line and to a non-pressurized fluid line connected to atmosphere.

9. The modular manifold assembly of claim 8, wherein the inlet is a first inlet, the pressurized fluid line is positively pressurized, and wherein the second inlet orifice is connected to a second inlet of the valve assembly and configured to connect to a second fluidic bus port of the manifold block, wherein the second fluidic bus port is connected to the non-pressurized fluid line.

* * * * *